(12) United States Patent
Kimura et al.

(10) Patent No.: US 8,154,493 B2
(45) Date of Patent: Apr. 10, 2012

(54) LIQUID CRYSTAL DISPLAY DEVICE, DRIVING METHOD OF THE SAME, AND ELECTRONIC DEVICE USING THE SAME

(75) Inventors: Hajime Kimura, Kanagawa (JP); Atsushi Umezaki, Kanagawa (JP); Shunpei Yamazaki, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 942 days.

(21) Appl. No.: 11/805,277

(22) Filed: May 22, 2007

(65) Prior Publication Data
US 2007/0279374 A1 Dec. 6, 2007

(30) Foreign Application Priority Data
Jun. 2, 2006 (JP) .................................. 2006-155468

(51) Int. Cl.
G09G 3/36 (2006.01)
(52) U.S. Cl. .............................. 345/89; 345/87; 345/102
(58) Field of Classification Search .................... 345/102
See application file for complete search history.

(56) References Cited

U.S. PATENT DOCUMENTS

| | | | |
|---|---|---|---|
| 5,200,846 A | 4/1993 | Hiroki et al. | |
| 5,337,068 A * | 8/1994 | Stewart et al. | 345/88 |
| 5,731,794 A * | 3/1998 | Miyazawa | 345/102 |
| 6,073,034 A | 6/2000 | Jacobsen et al. | |
| 6,211,992 B1 * | 4/2001 | Van Aerle et al. | 359/254 |
| 6,232,937 B1 | 5/2001 | Jacobsen et al. | |
| 6,486,862 B1 | 11/2002 | Jacobsen et al. | |
| 6,525,707 B1 * | 2/2003 | Kaneko et al. | 345/88 |
| 6,545,654 B2 | 4/2003 | Jacobsen et al. | |
| 6,559,825 B2 | 5/2003 | Jacobsen et al. | |
| 6,597,348 B1 | 7/2003 | Yamazaki et al. | |
| 6,677,936 B2 | 1/2004 | Jacobsen et al. | |
| 6,909,419 B2 * | 6/2005 | Zavracky et al. | 345/102 |
| 6,965,367 B2 * | 11/2005 | Tanaka et al. | 345/102 |

(Continued)

FOREIGN PATENT DOCUMENTS

EP 1 345 202 A1 9/2003

(Continued)

OTHER PUBLICATIONS

Office Action re Chinese application No. CN 200710109877.4, dated Oct. 25, 2010 (with English translation).

Primary Examiner — Richard Hjerpe
Assistant Examiner — Dorothy Harris
(74) Attorney, Agent, or Firm — Husch Blackwell LLP

(57) ABSTRACT

It is an object to provide a display module which can display a correct gray scale by a field sequential driving method and an electronic device including the display module. One frame period is divided into a plurality of lighting periods, and in each of the plurality of lighting periods, signals are supplied to a pixel a plurality of times, whereby the transmissivity of a liquid crystal element is changed over time. Accordingly, even with the use of a liquid crystal element with low response speed as a display element, a correct gray scale can be expressed. In addition, the transmissivity of the liquid crystal element is set at 0% or a backlight is controlled not to emit light in switching of lighting of a backlight or switching of lighting periods, whereby a more correct gray scale can be expressed.

18 Claims, 68 Drawing Sheets

U.S. PATENT DOCUMENTS

| | | | |
|---|---|---|---|
| 7,119,775 B2 | 10/2006 | Ozaki | |
| 7,123,228 B2 | 10/2006 | Ozaki | |
| 7,321,354 B1 | 1/2008 | Jacobsen et al. | |
| 7,372,447 B1 | 5/2008 | Jacobsen et al. | |
| 2001/0017604 A1 | 8/2001 | Jacobsen et al. | |
| 2001/0043166 A1* | 11/2001 | Jacobsen et al. | 345/27 |
| 2002/0075216 A1* | 6/2002 | Satake | 345/89 |
| 2002/0122019 A1* | 9/2002 | Baba et al. | 345/88 |
| 2002/0149576 A1* | 10/2002 | Tanaka et al. | 345/204 |
| 2002/0171792 A1* | 11/2002 | Kubota et al. | 349/114 |
| 2002/0196220 A1* | 12/2002 | Sato et al. | 345/87 |
| 2003/0011553 A1 | 1/2003 | Ozaki | |
| 2003/0011559 A1 | 1/2003 | Adachi et al. | |
| 2003/0058210 A1* | 3/2003 | Yamazaki et al. | 345/89 |
| 2004/0095402 A1* | 5/2004 | Nakano | 346/102 |
| 2004/0263499 A1 | 12/2004 | Tanada et al. | |
| 2005/0035939 A1* | 2/2005 | Akiyama | 345/102 |
| 2005/0035940 A1* | 2/2005 | Lazaridis et al. | 345/102 |
| 2005/0068280 A1 | 3/2005 | Ozaki | |
| 2005/0068468 A1 | 3/2005 | Yamazaki et al. | |
| 2005/0140632 A1* | 6/2005 | Tsuda et al. | 345/92 |
| 2005/0248592 A1* | 11/2005 | Feng et al. | 345/690 |
| 2006/0007098 A1* | 1/2006 | Tong et al. | 345/102 |
| 2006/0071900 A1* | 4/2006 | Drader et al. | 345/102 |
| 2006/0262077 A1* | 11/2006 | Terasaka | 345/102 |
| 2007/0070023 A1* | 3/2007 | Yasuda et al. | 345/102 |
| 2007/0211013 A1* | 9/2007 | Uehara et al. | 345/102 |
| 2007/0222743 A1* | 9/2007 | Hirakata | 345/102 |
| 2008/0048960 A1 | 2/2008 | Jacobsen et al. | |
| 2010/0164919 A1* | 7/2010 | Yamamoto et al. | 345/207 |

FOREIGN PATENT DOCUMENTS

| | | |
|---|---|---|
| JP | 3338438 | 10/2002 |
| JP | 2003-99015 | 4/2003 |
| WO | WO 98/19435 A2 | 5/1998 |
| WO | WO 2005/104072 A1 | 11/2005 |

* cited by examiner

FIG. 3A

| gray scale data | pattern data |
|---|---|
| 0 | x0 |
| 1 | x1 |
| 2 | x2 |
| 3 | x3 |
| 4 | x4 |
| 5 | x5 |
| ⋮ | ⋮ |

FIG. 3B

| gray scale data | pattern data a | pattern data b | pattern data c | pattern data d | ....... |
|---|---|---|---|---|---|
| 0 | a0 | b0 | c0 | d0 | ------- |
| 1 | a1 | b1 | c1 | d1 | ------- |
| 2 | a2 | b2 | c2 | d2 | ------- |
| 3 | a3 | b3 | c3 | d3 | ------- |
| 4 | a4 | b4 | c4 | d4 | ------- |
| 5 | a5 | b5 | c5 | d5 | ------- |
| ⋮ | ⋮ | ⋮ | ⋮ | ⋮ | ------- |

FIG. 26A1
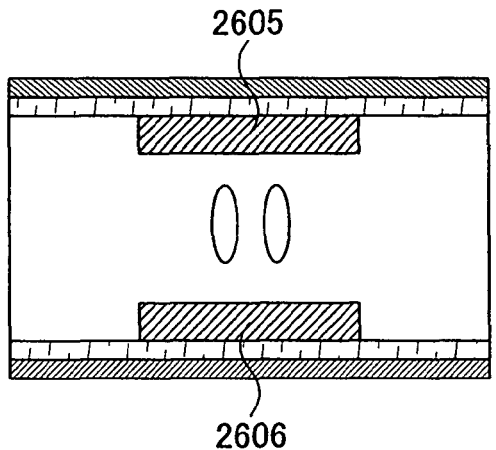
FIG. 26A2
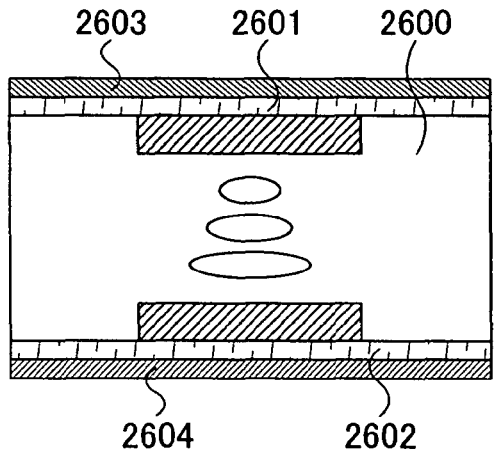
FIG. 26B1
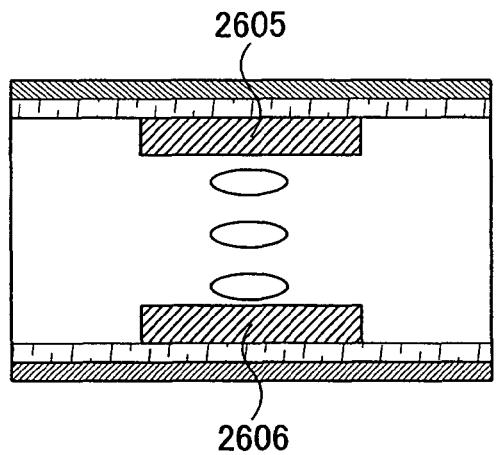
FIG. 26B2
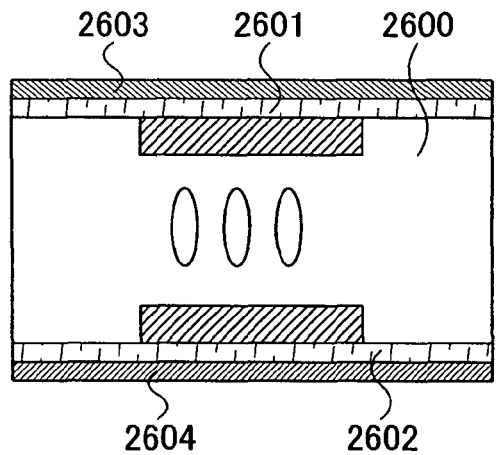
FIG. 26C1
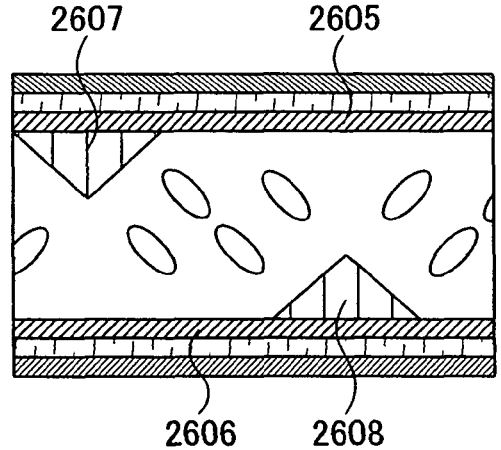
FIG. 26C2
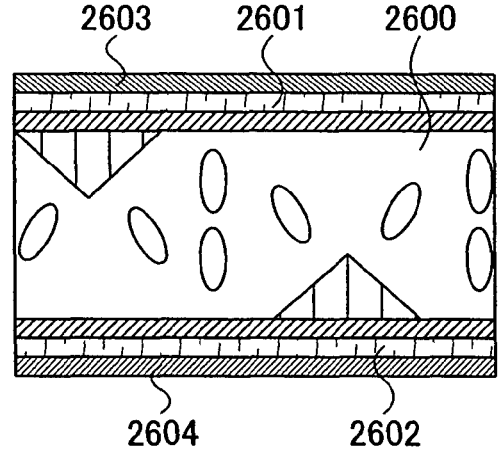

FIG. 27A1
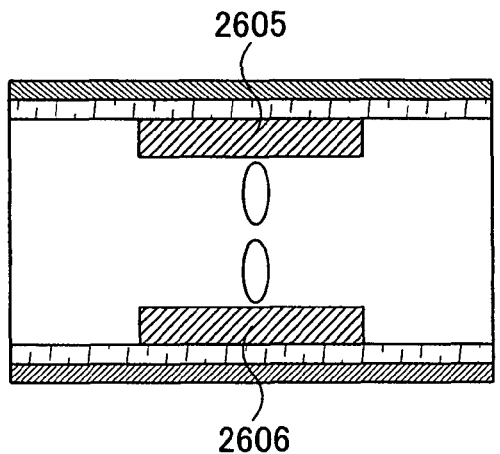
FIG. 27A2
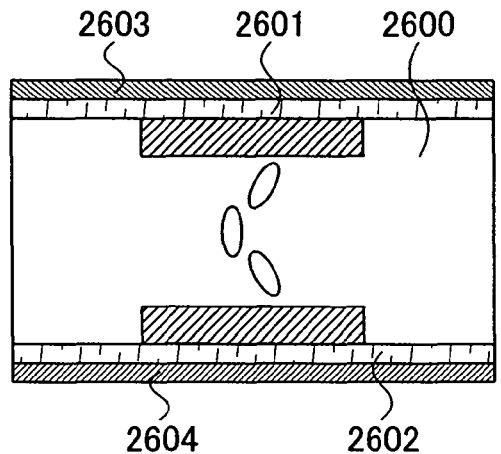
FIG. 27B1
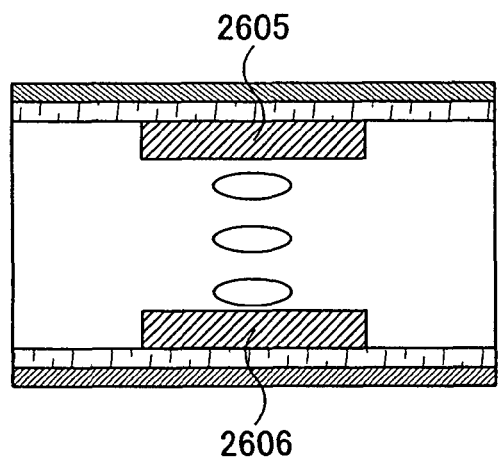
FIG. 27B2
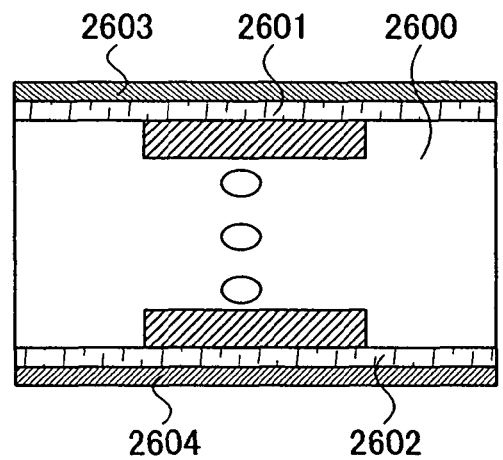

FIG. 28A1
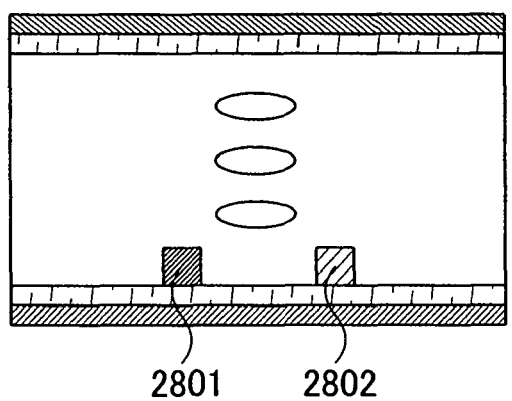
2801  2802
FIG. 28A2
2603  2601  2600
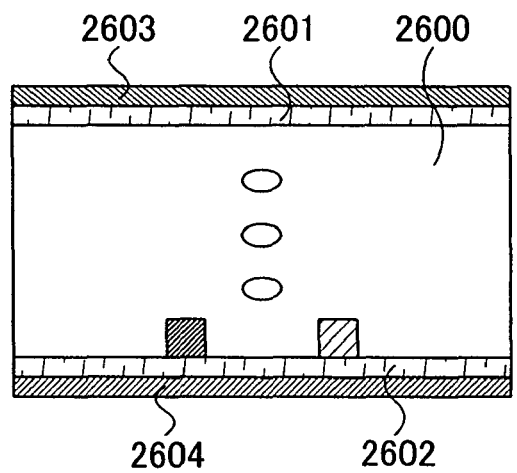
2604  2602
FIG. 28B1
2605
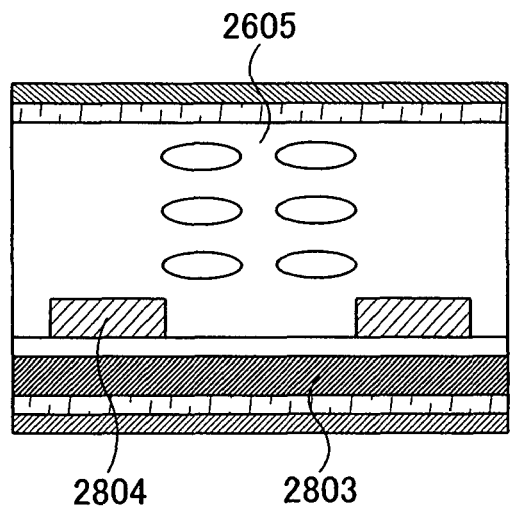
2804  2803
FIG. 28B2
2603  2601  2600
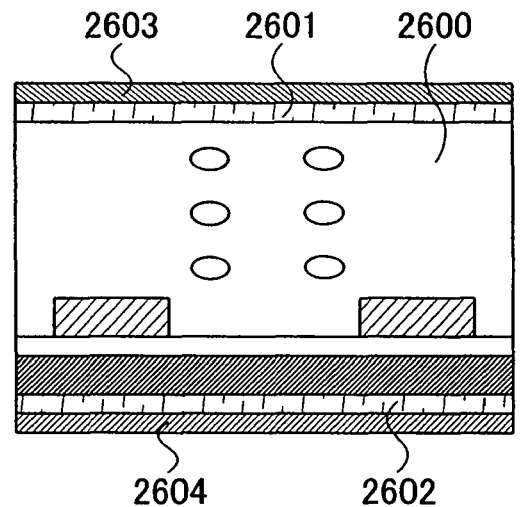
2604  2602

FIG. 59A cross-sectional view of pixel
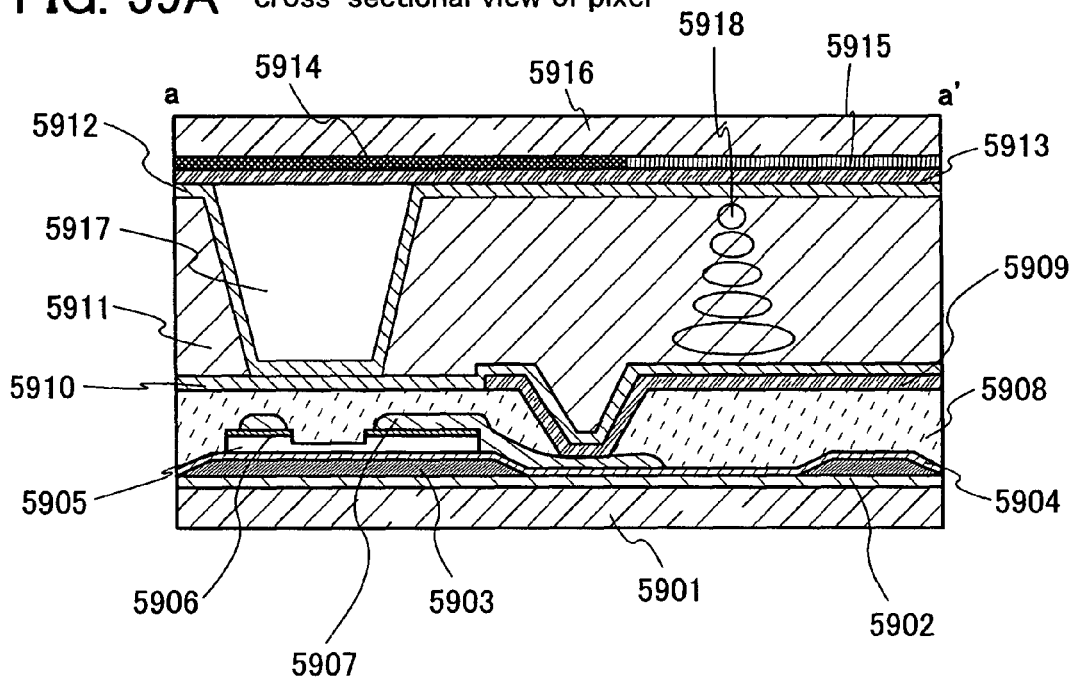
FIG. 59B top view of pixel
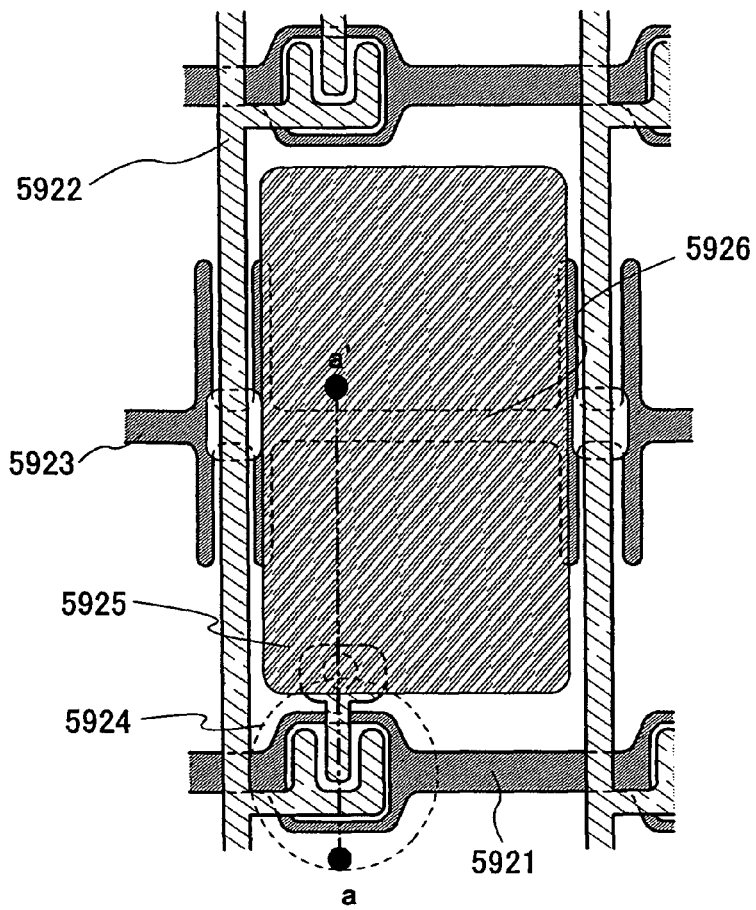

FIG. 60A cross-sectional view of pixel
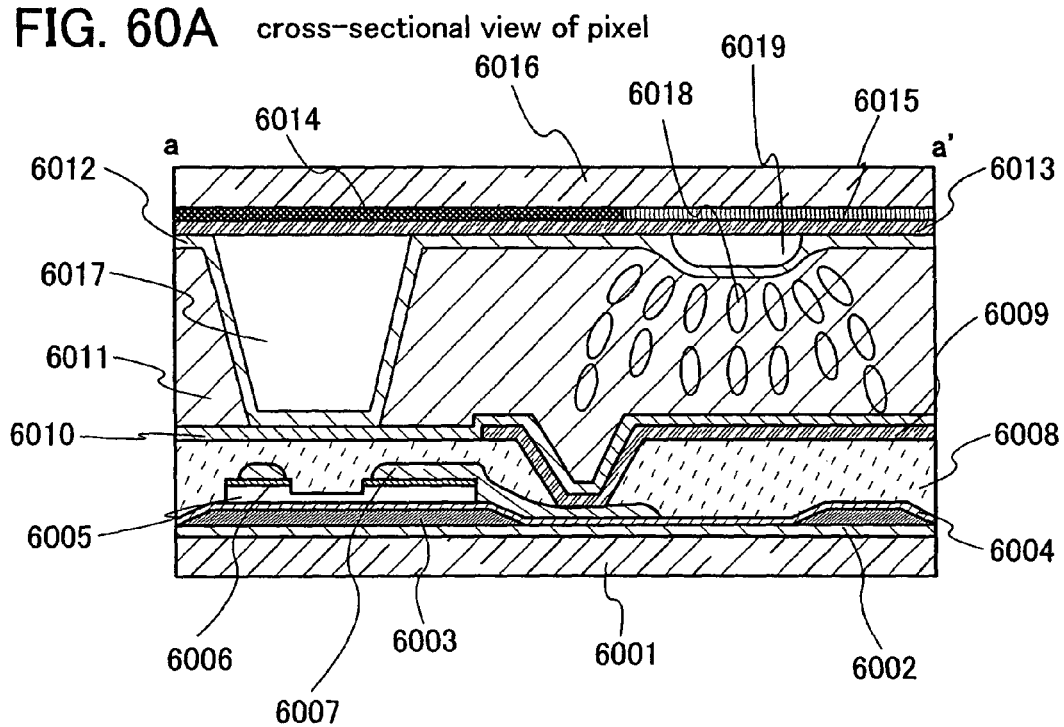
FIG. 60B top view of pixel
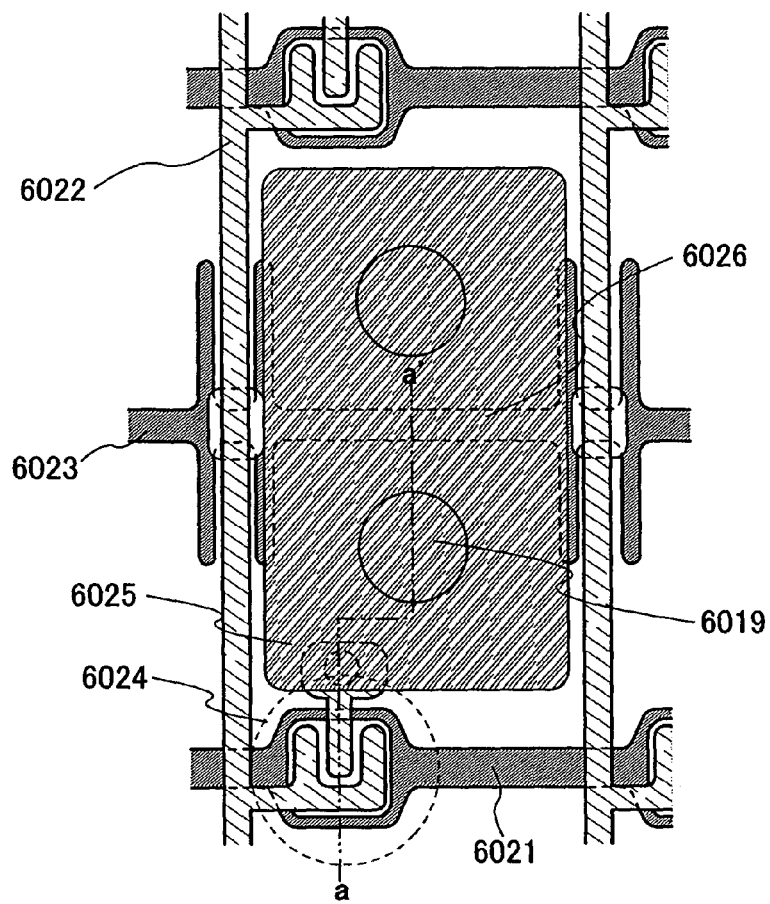

FIG. 61A cross-sectional view of pixel
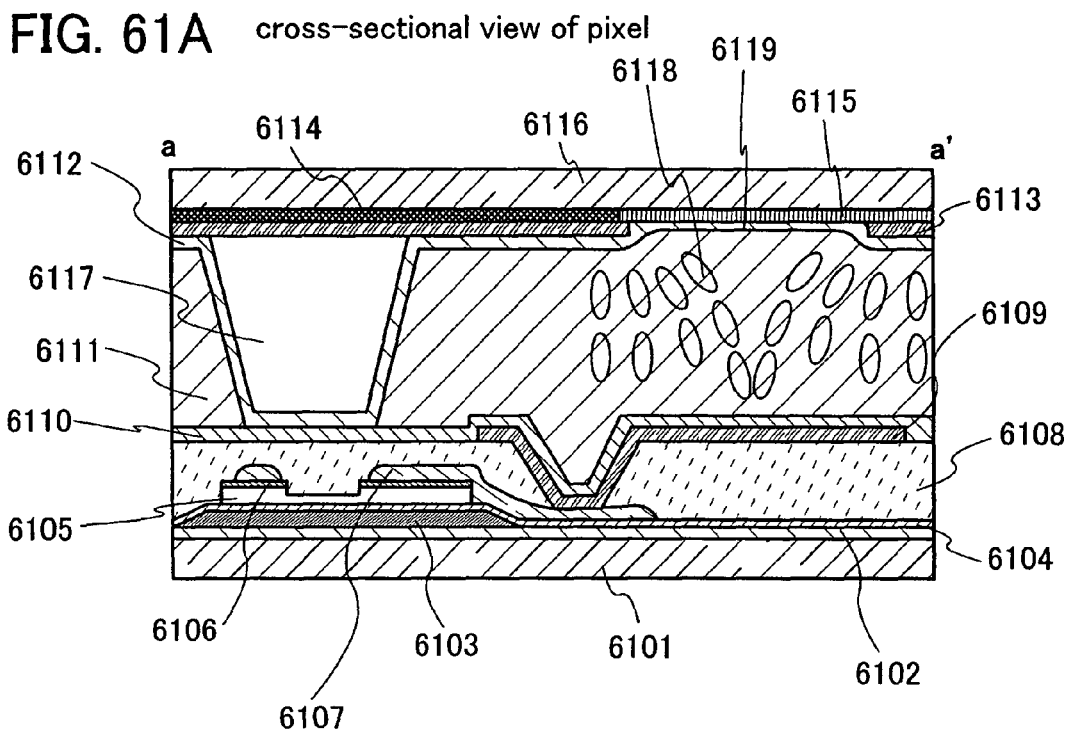
FIG. 61B top view of pixel
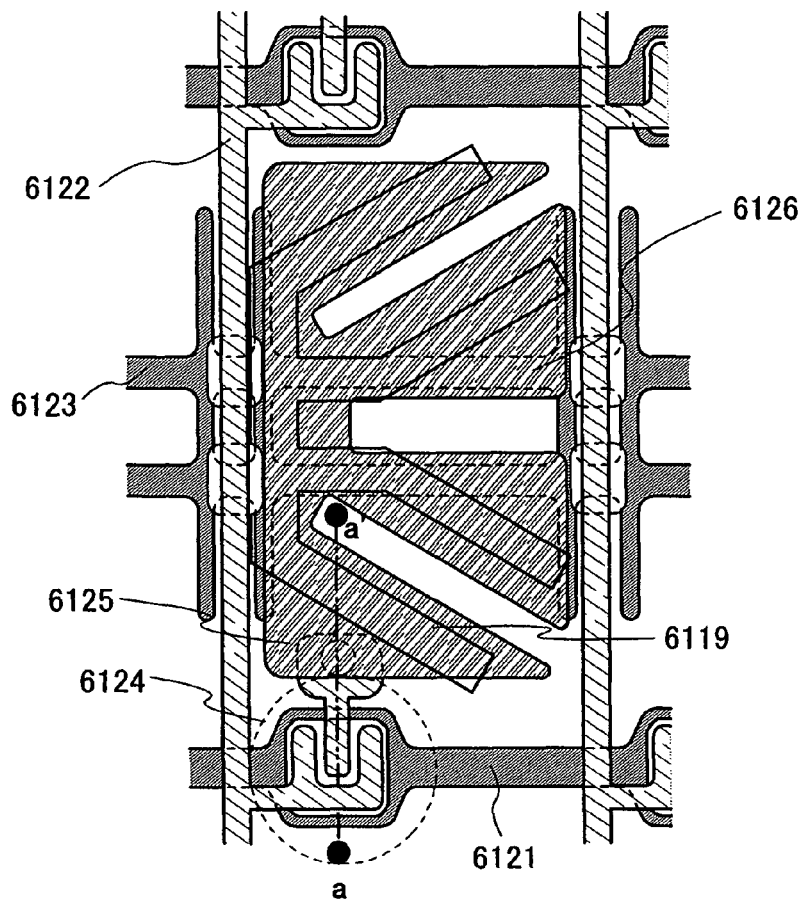

FIG. 62A cross-sectional view of pixel
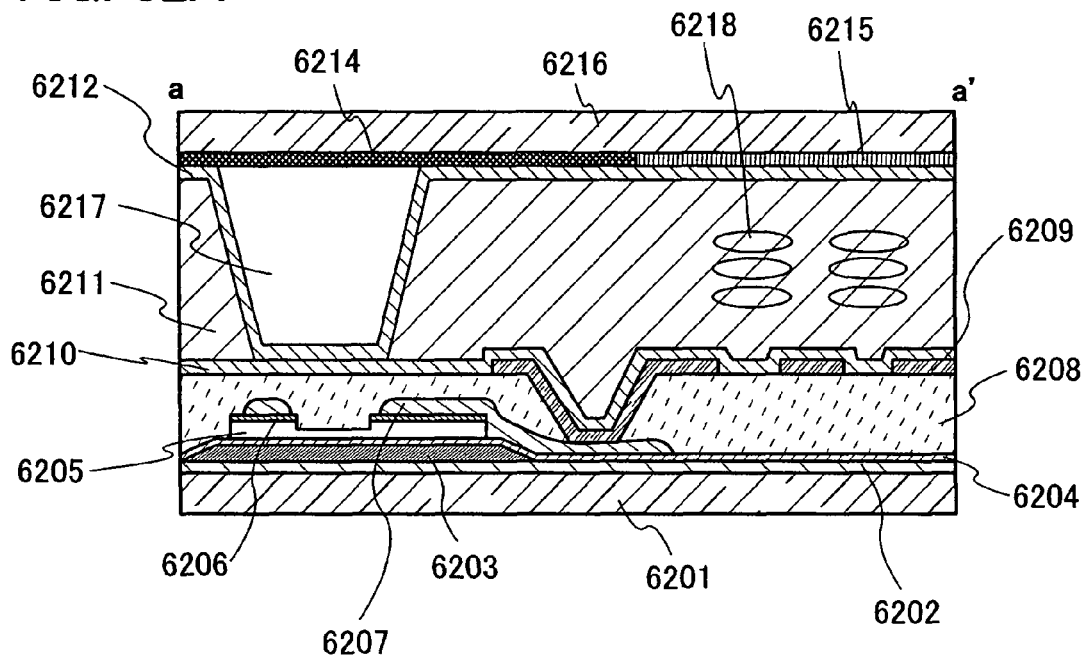
FIG. 62B top view of pixel
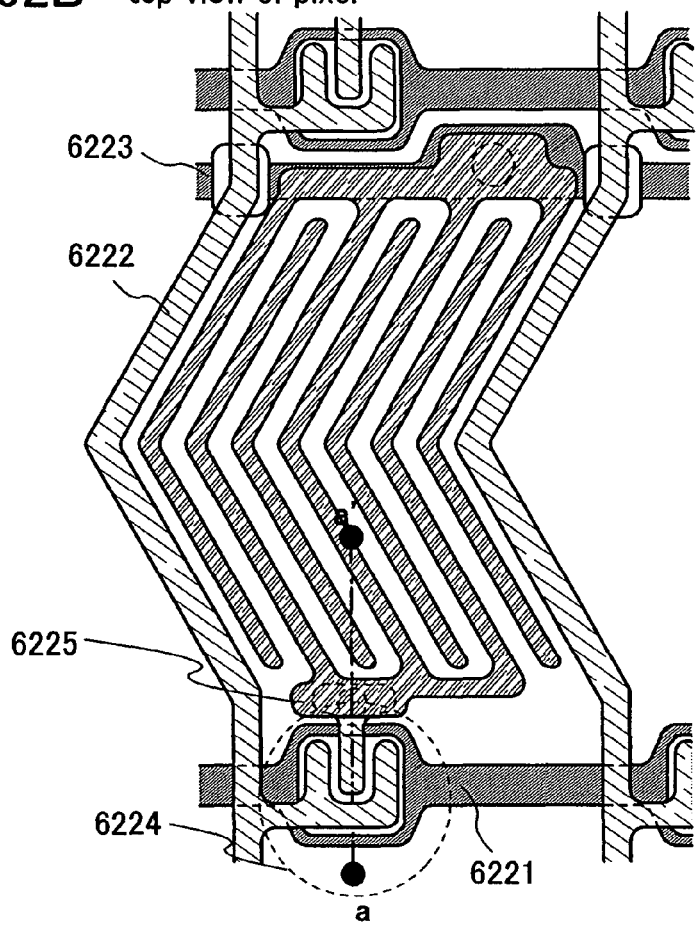

FIG. 63A cross-sectional view of pixel
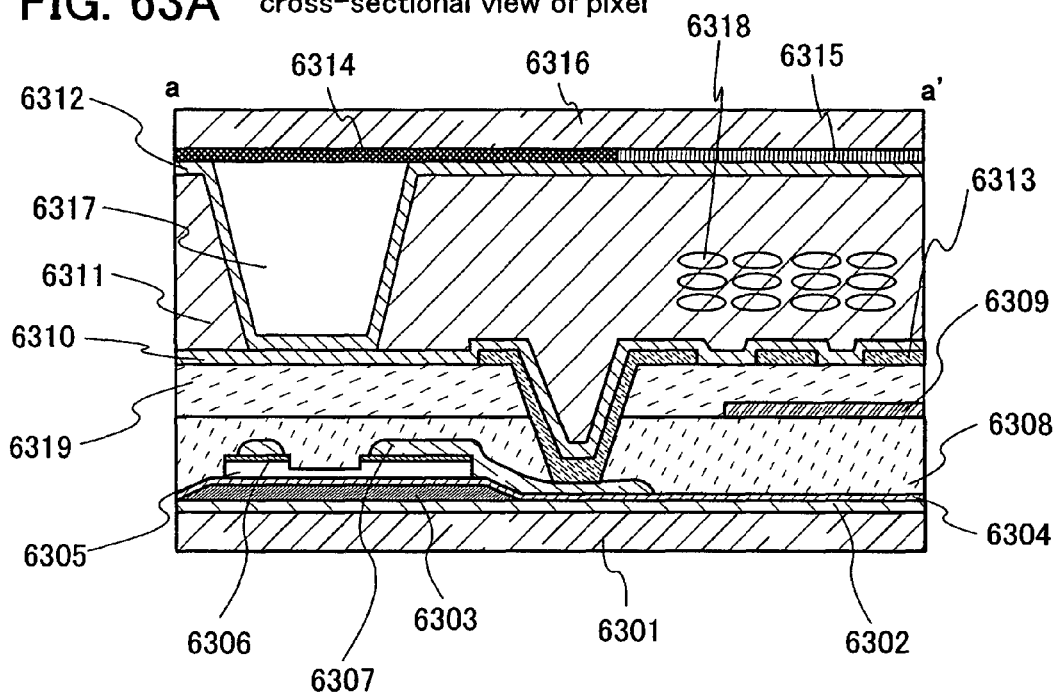
FIG. 63B top view of pixel
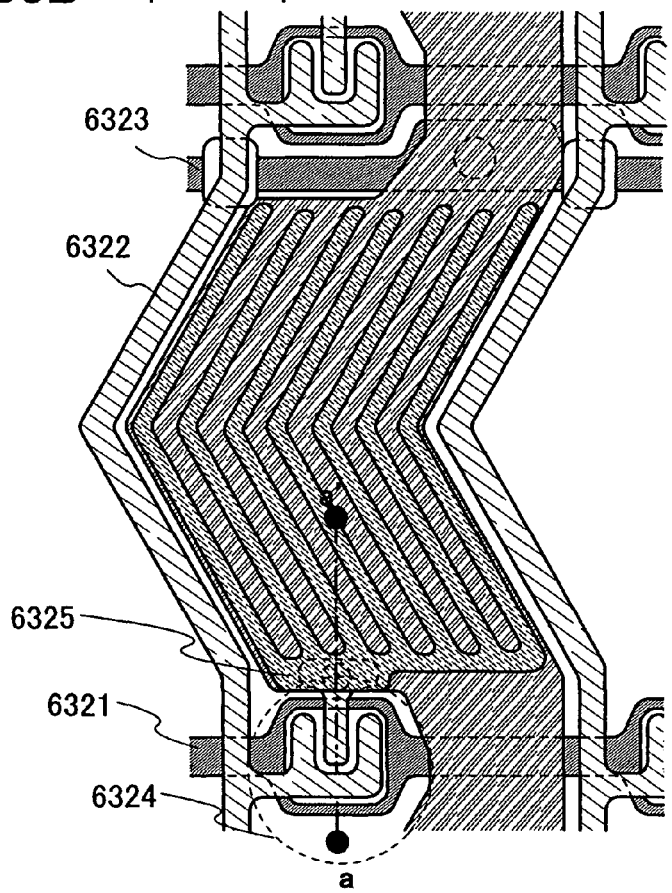

FIG. 64A one common line
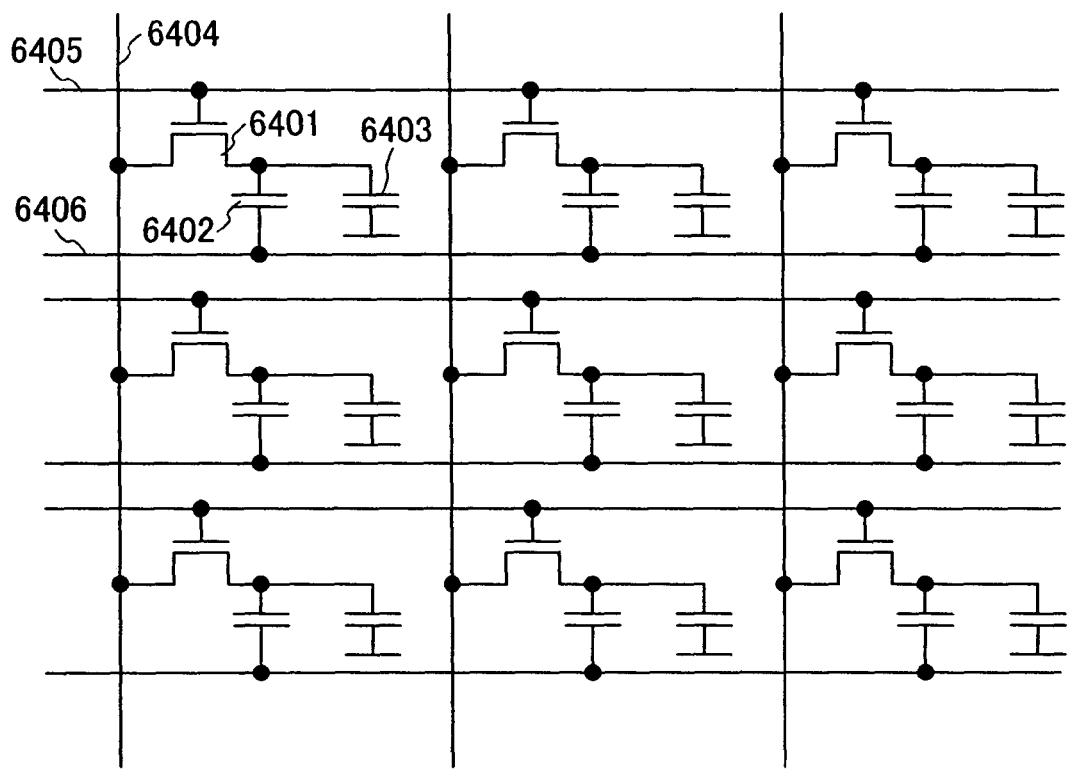
FIG. 64B two common lines
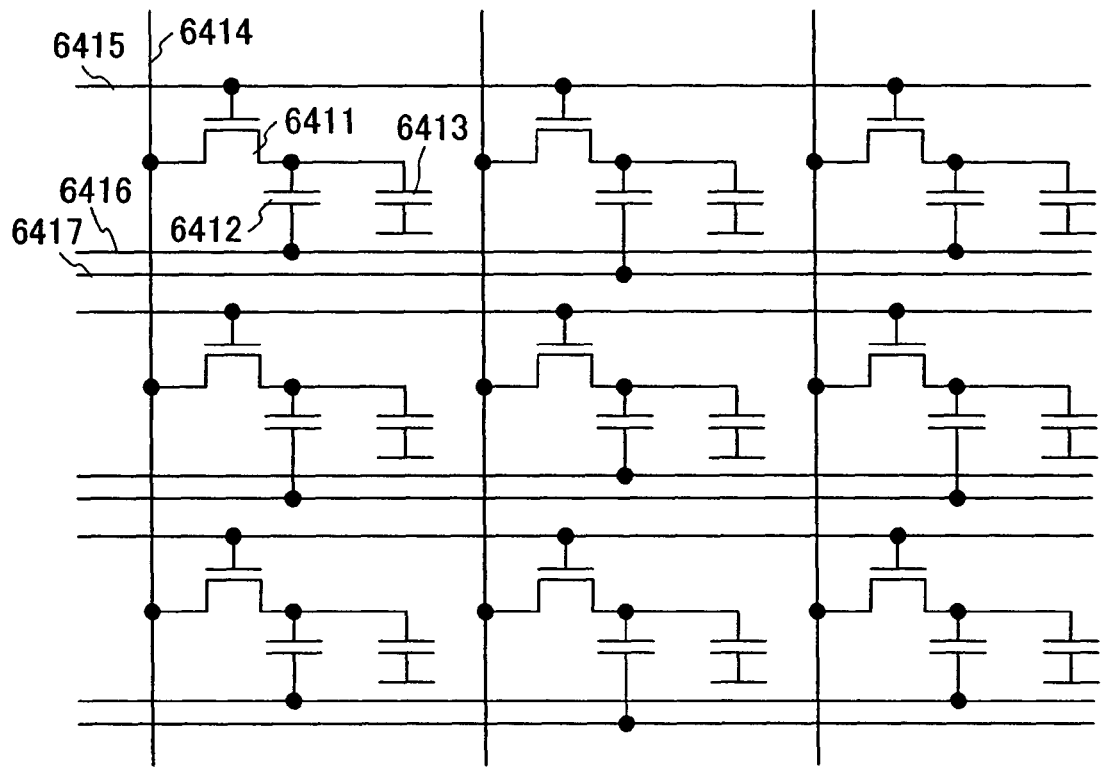

FIG. 65A cold-cathode tube
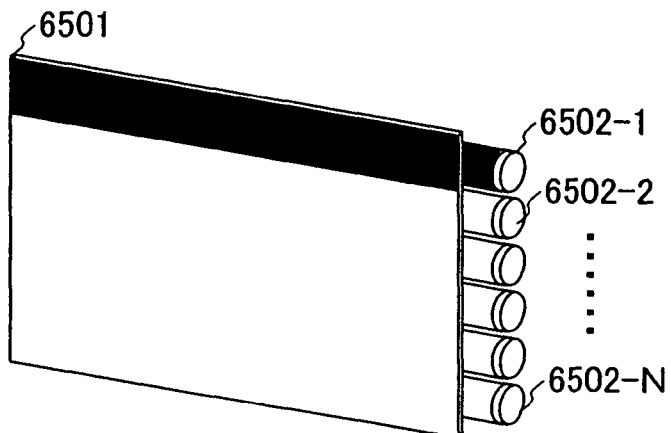
FIG. 65B LED
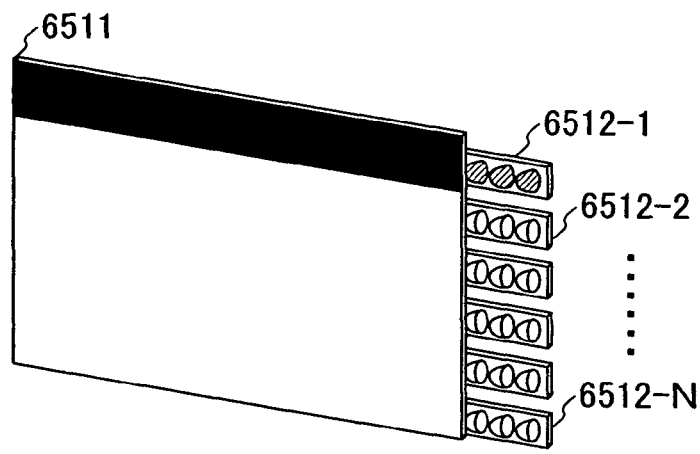
FIG. 65C scanning
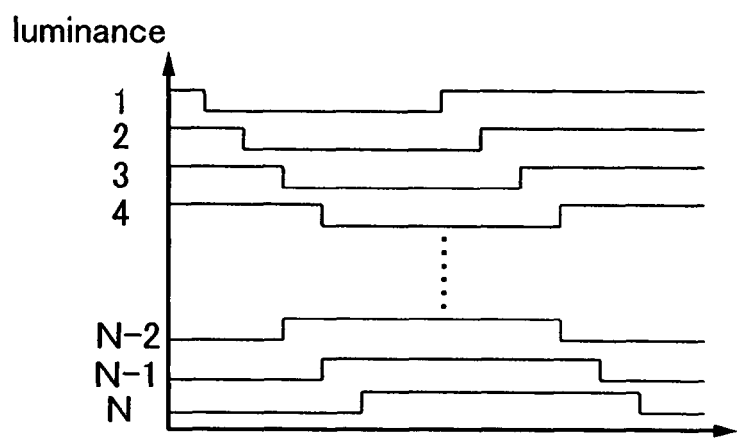

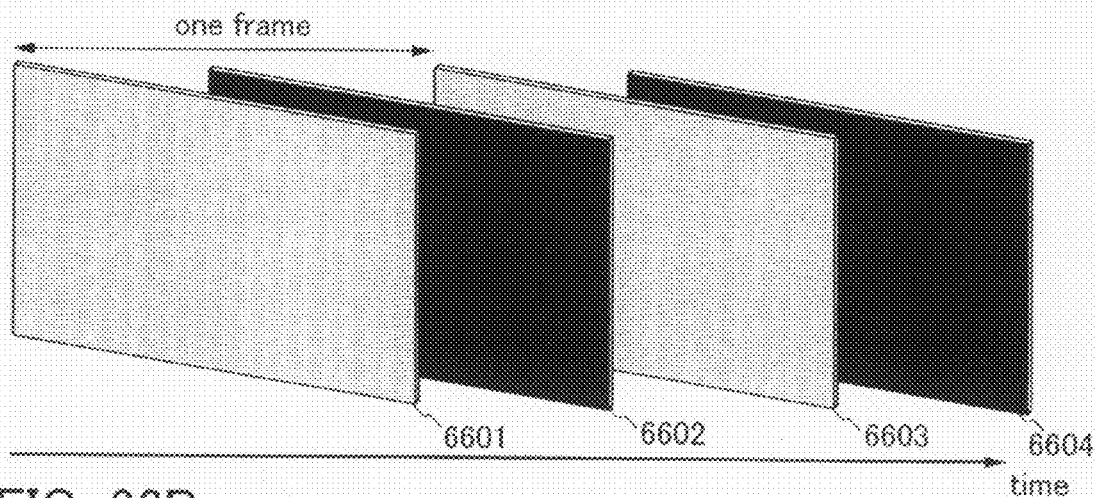
FIG. 66A insertion of dark image at 60Hz
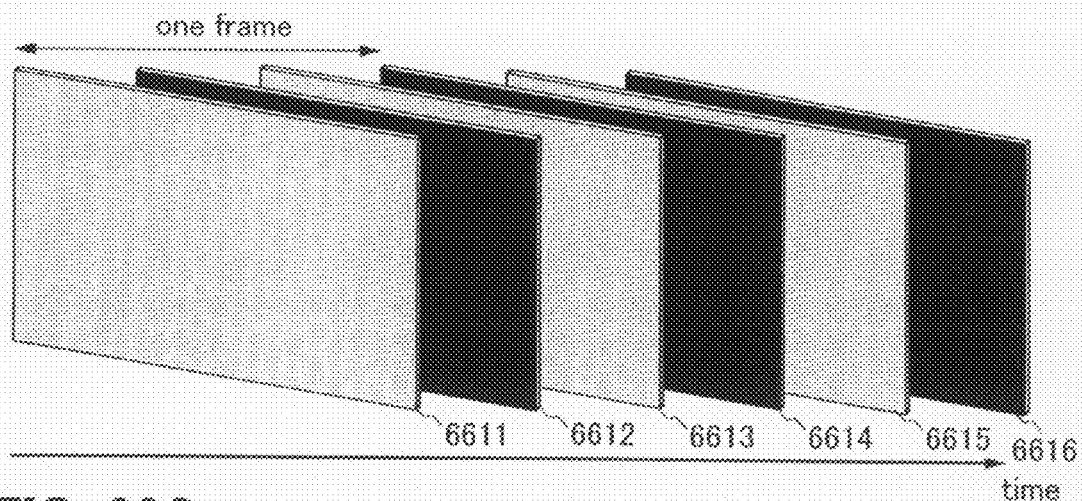
FIG. 66B insertion of dark image at 90 Hz
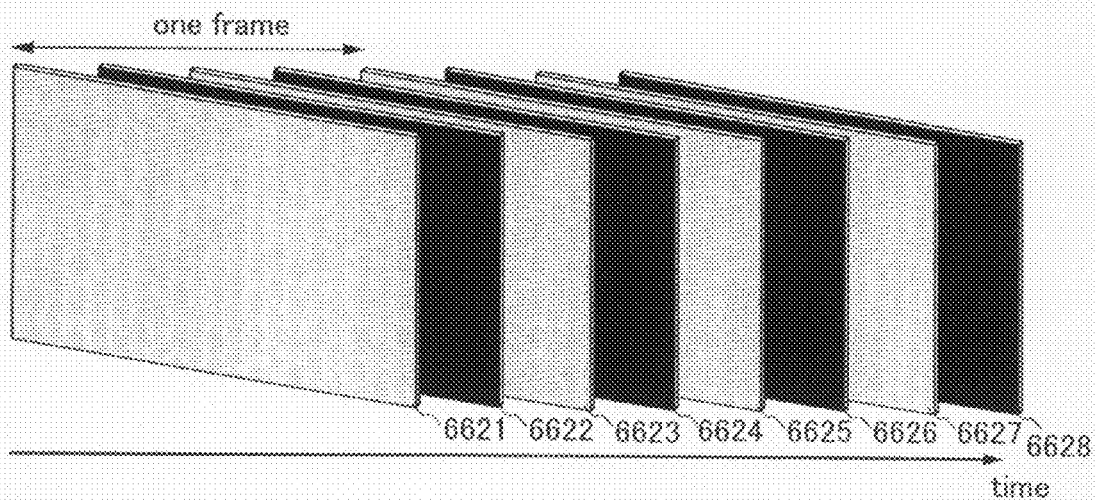
FIG. 66C insertion of dark image at 120 Hz FIG. 68A voltage and luminance
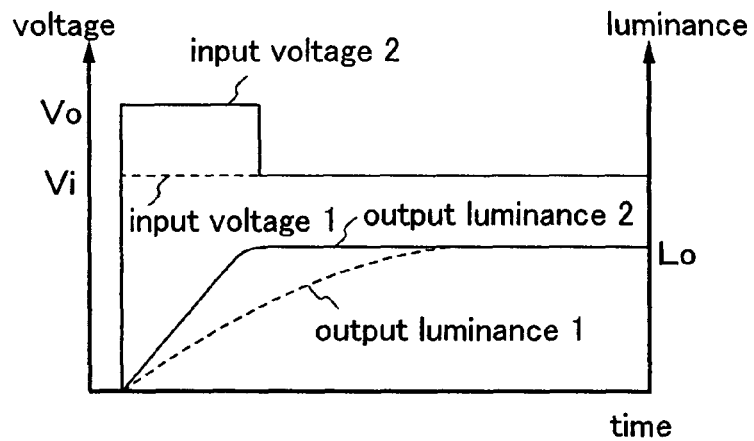
FIG. 68B overdriving circuit (analog)
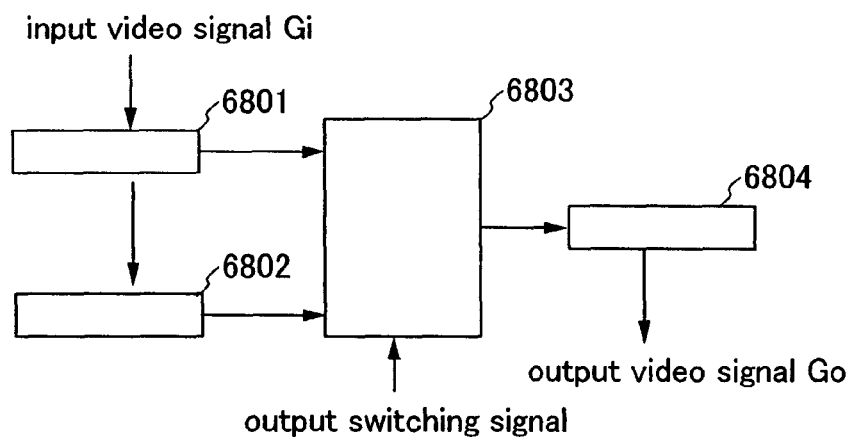
FIG. 68C overdriving circuit (digital)
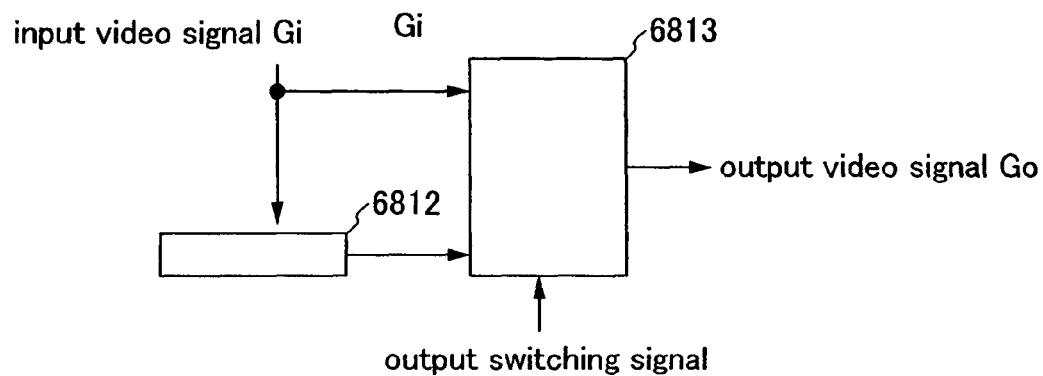

LIQUID CRYSTAL DISPLAY DEVICE, DRIVING METHOD OF THE SAME, AND ELECTRONIC DEVICE USING THE SAME

BACKGROUND OF THE INVENTION

1. Field of the Invention

The present invention relates to a liquid crystal display device, in particular, a driving method of a liquid crystal display device. In addition, the present invention relates to a liquid crystal display device using the driving method and an electronic device including the liquid crystal display device.

2. Description of the Related Art

In recent years, display devices such as a liquid crystal display device and a light-emitting display device have been actively developed to be used for a personal computer, a mobile device, and a liquid crystal television. In particular, the display devices are required to have a high resolution. However, in the current display devices, a pixel portion is formed using three pixels for red (hereinafter abbreviated as R), green (hereinafter abbreviated as G), and blue (hereinafter abbreviated as B); thus, there is a limitation on increase in resolution of the liquid crystal display devices.

In order to solve the above problem, a driving method called a field sequential driving method has been researched. In a field sequential driving method, backlights are sequentially switched, and light of R, G, and B is supplied to a display panel; therefore, R, G, and B can be expressed in one pixel. However, in a field sequential driving method, a video signal has to be written into a pixel at a speed that is three times higher than that of a normal liquid crystal display device. Therefore, a liquid crystal element cannot respond in time, and there is a problem in that a correct gray scale cannot be expressed.

Therefore, in a field sequential driving method disclosed in Patent Document 1 (Japanese Patent No. 3338438), in order to solve the problem of the low response speed of a liquid crystal element, the transmissivity of a liquid crystal element is changed over time so that a correct gray scale is expressed.

SUMMARY OF THE INVENTION

In Patent Document 1, a specific driving method for changing the transmissivity of a liquid crystal element over time is not disclosed. In addition, in a field sequential driving method, it is important to control a backlight. This is because a correct gray scale cannot be expressed in some cases depending on the writing timing of a video signal and the switching timing of R, G, and B of a backlight. However, if the switching timing of light of R, G, and B supplied to a display panel from the backlight of Patent Document 1 is applied to a display device, the backlight has to be controlled individually for each pixel. Therefore, since a display device generally includes a number of pixels, control of a backlight becomes quite difficult.

Accordingly, it is an object of the present invention to provide a specific driving method for changing the transmissivity of a liquid crystal element over time, control timing of a backlight, a driving method of a liquid crystal display device using such a field sequential driving method, a liquid crystal display device using the driving method, and an electronic device including the liquid crystal display device.

One aspect of the present invention is a method for driving a display device which includes a plurality of pixels arranged in a matrix, a source driver, a gate driver, and a backlight unit, including the step of dividing one frame period into a plurality of lighting periods, where, in each of the plurality of lighting periods, the source driver supplies digital signals into the pixel a plurality of times; the gate driver scans the pixel a plurality of times; and the backlight unit changes a wavelength of light.

Another aspect of the present invention is a method for driving a display device which includes a plurality of pixels arranged in a matrix, a source driver, a gate driver, and a backlight unit, including the step of dividing one frame period into a plurality of lighting periods, where, in each of the plurality of lighting periods, the source driver supplies digital signals into the pixel a plurality of times; the gate driver scans the pixel a plurality of times; and the backlight unit changes a wavelength of light so that it emits no light when the gate driver scans the pixel and emits light when the gate driver does not scan the pixel.

Another aspect of the present invention is a method for driving a display device which includes a plurality of pixels arranged in a matrix, a source driver, a gate driver, and a backlight unit, including the step of dividing one frame period into a plurality of lighting periods, where, in each of the plurality of lighting periods, the source driver supplies digital signals into the pixel a plurality of times; a digital signal which is supplied to the pixel at the end of the lighting period has a value which turns the pixel into a non-emission state; the gate driver scans the pixel a plurality of times; and the backlight unit changes a wavelength of light.

Another aspect of the present invention is a method for driving a display device which includes a plurality of pixels arranged in a matrix, a source driver, a gate driver, and a backlight unit, including the step of dividing one frame period into a plurality of lighting periods, where, in each of the plurality of lighting periods, the source driver supplies digital signals into the pixel a plurality of times; the gate driver scans the pixel a plurality of times; and the backlight unit changes a wavelength of light so that no light enters a pixel to which a digital signal is supplied from the source driver at the beginning of the lighting period.

It is to be noted that the digital signal may be a ternary signal.

It is to be noted that a switch shown in the present invention can have various modes, and an electrical switch, a mechanical switch, or the like can be given as an example. That is, any element can be used as long as it can control a current flow; thus, a switch is not limited to a certain element, and various elements can be used. For example, it may be a transistor, a diode (for example, a PN diode, a PIN diode, a Schottky diode, a diode-connected transistor, or the like), a thyristor, or a logic circuit combining such elements. Therefore, in a case where a transistor is employed as a switch, the polarity (conductivity type) of the transistor is not limited to a certain type since it operates just as a switch. However, when an off-state current is preferred to be low, a transistor of the polarity with a low off-state current is preferably employed. A transistor provided with an LDD region, a transistor with a multi-gate structure, or the like is given as a transistor with a low off-state current. In addition, it is preferable that an n-channel transistor be employed when a potential of a source terminal of the transistor which is operated as a switch is closer to a low-potential-side power source (such as Vss, GND, or 0 V), while a p-channel transistor be employed when the potential of the source terminal is closer to a high-potential-side power source (such as Vdd). This is because the absolute value of a gate-source voltage can be increased, and the transistor can easily function as a switch.

It is to be noted that a CMOS switch may also be employed by using both n-channel and p-channel transistors. The CMOS switch can be easily operated as a switch since a current can flow when either a p-channel or n-channel transistor is conducted. For example, in the case of either a high voltage or a low voltage of a signal input to the switch, a voltage can be appropriately output. In addition, since a voltage amplitude value of a signal which turns on or off the switch can be reduced, power consumption can be reduced.

When a transistor is used as a switch, the transistor includes an input terminal (one of a source terminal and a drain terminal), an output terminal (the other of a source terminal and a drain terminal), and a terminal which controls conduction (a gate terminal). Meanwhile, when a diode is used as a switch, the diode does not include a terminal which controls conduction in some cases. Therefore, a wiring for controlling a terminal can be reduced.

It is to be noted that, in the present invention, description 'being connected' includes a case where elements are electrically connected, a case where elements are functionally connected, and a case where elements are directly connected. Accordingly, in structures disclosed in the present invention, another element may be provided in addition to predetermined connected elements. For example, one or more elements which enable an electrical connection (for example, a switch, a transistor, a capacitor, an inductor, a resistor, a diode, or the like) may be provided between one portion and another portion. Alternatively, one or more circuits which enable a functional connection (such as a logic circuit (an inverter, a NAND circuit, a NOR circuit, or the like), a signal converter circuit (a DA converter circuit, an AD converter circuit, a gamma-correction circuit, or the like), a potential-level converter circuit (a power source circuit such as a step-up circuit or a step-down circuit, a level shifter circuit which changes a potential level such as an H signal or an L signal, or the like), a power source, a current source, a switching circuit, an amplifier circuit (a circuit which can increase signal amplitude, the current amount, or the like, such as an operational amplifier, a differential amplification circuit, a source follower circuit, or a buffer circuit), a signal generating circuit, a memory circuit, a control circuit, and the like) may be provided between one portion and another portion. Alternatively, the above circuits or elements may be directly connected without another element or circuit interposed therebetween.

In the case where elements are connected without another element or circuit interposed therebetween, description 'being directly connected' is employed. It is to be noted that description 'being electrically connected' includes the case where elements are electrically connected (that is, the case where elements are connected with another element interposed therebetween), the case where elements are functionally connected (that is, the case where elements are connected with another circuit interposed therebetween), and the case where elements are directly connected (that is, the case where elements are connected without another element or circuit interposed therebetween).

It is to be noted that a display element, a display device, a light-emitting element, or a light-emitting device can employ various modes or can include various elements. For example, as a display element, a display device, a light-emitting element, or a light-emitting device, a display medium whose contrast varies by an electromagnetic action can be used, such as an EL element (an organic EL element, an inorganic EL element, or an EL element containing organic and inorganic substances), an electron-emitting element, a liquid crystal element, electron ink, a grating light valve (GLV), a plasma display panel (PDP), a digital micromirror device (DMD), a piezoceramic display, or a carbon nanotube. It is to be noted that a display device using an EL element includes an EL display; a display device using an electron-emitting element includes a field emission display (FED), an SED flat panel display (SED: Surface-conduction Electron-emitter Display), and the like; a display device using a liquid crystal element includes a liquid crystal display, a transmissive liquid crystal display, a semi-transmissive liquid crystal display, and a reflective liquid crystal display; and a display device using electronic ink includes electronic paper.

It is to be noted that various types of transistors can be applied to the present invention, and an applicable type of the transistor is not limited. Accordingly, for example, the present invention can employ a thin film transistor (TFT) using a non-single crystal semiconductor film typified by amorphous silicon or polycrystalline silicon. Such a transistor can be manufactured at a manufacturing temperature that is not high, at low costs, and over a large or transparent substrate, or the transistor can transmit light. In addition, a transistor formed using a semiconductor substrate or an SOI substrate, a MOS transistor, a junction transistor, a bipolar transistor, and the like can be employed. By these transistors, a transistor having less variation, a transistor capable of supplying a current efficiently, or a transistor which is small in size can be manufactured, and a circuit with less power consumption can be formed. In addition, a transistor using a compound semiconductor such as ZnO, a-InGaZnO, SiGe, or GaAs, or a thin film transistor which is obtained by thinning the compound semiconductor, and the like can be employed. These transistors can be manufactured at a manufacturing temperature that is not high or a room temperature, or directly over a substrate with low heat resistance such as a plastic substrate or a film substrate. In addition, a transistor formed by an ink jet method, a printing method, or the like can be employed. These transistors can be manufactured at a room temperature, in a low-vacuum state, or over a large substrate. Further, since the transistor can be manufactured without using a mask (reticle), layout of the transistor can be easily changed. In addition, a transistor using an organic semiconductor or a carbon nanotube, or other transistors can also be employed. These transistors can be formed over a bendable substrate. It is to be noted that the non-single crystal semiconductor film may contain hydrogen or halogen. In addition, a substrate over which a transistor is provided can be various types and is not particularly limited. Therefore, for example, the transistor can be formed using a single crystalline substrate, an SOI substrate, a glass substrate, a quartz substrate, a plastic substrate, a paper substrate, a cellophane substrate, a stone substrate, a stainless steel substrate, a substrate including stainless steel foil, or the like. In addition, after a transistor is formed over one substrate, the transistor may be transposed to another substrate to be located thereover. By these substrates, a transistor with favorable characteristics or low power consumption can be formed, or a device that is not easily defected or has heat resistance can be obtained.

A transistor can have various structures without limitation to a certain structure. For example, a multi-gate structure having two or more gate electrodes may be used. By the multi-gate structure, channel regions are connected in series; therefore, a plurality of transistors are connected in series. By the multi-gate structure, an off-state current can be reduced, and the withstand voltage of the transistor can be increased, whereby reliability is improved. In addition, even if a drain-source voltage fluctuates when the transistor operates in a saturation region, a drain-source current does not fluctuate very much, and flat characteristics can be provided. In addition, a structure in which gate electrodes are formed above and below a channel may be used. With the use of the structure in which gate electrodes are formed above and below the channel, a channel region is enlarged so that the amount of a current flowing therethrough is increased, or a depletion layer can be easily formed so that the S value is decreased. Further, when the gate electrodes are provided above and below the channel, a plurality of transistors are connected in parallel.

In addition, a structure in which a gate electrode is formed over a channel, a structure in which a gate electrode is formed below a channel, a staggered structure, an inverse staggered structure, a structure in which a channel region is divided into a plurality of regions and the divided regions are connected in parallel or in series may be employed. A source electrode or a drain electrode may overlap with a channel (or part thereof). With the structure in which the source electrode or the drain electrode overlaps with the channel (or part thereof), electric charge can be prevented from being accumulated in part of the channel, and an unstable operation can be prevented. In addition, an LDD region may be provided. With the LDD region, an off-state current can be reduced, and the withstand voltage of the transistor can be increased, whereby reliability is improved. In addition, even if a drain-source voltage fluctuates when the transistor operates in a saturation region, a drain-source current does not fluctuate very much, and flat characteristics can be provided.

It is to be noted that, in the present invention, various types of transistors can be used and can be formed over any substrate. Therefore, all the circuits may be formed using a glass substrate, a plastic substrate, a single crystalline substrate, an SOI substrate, or any other substrates. When all the circuits are formed over the same substrate, the costs can be reduced since the number of components is reduced, and reliability can be improved since the number of parts connected to components in the circuits is reduced. Alternatively, it is possible that some circuits are formed over one substrate and some other circuits are formed over another substrate. That is, all the circuits are not necessarily formed over the same substrate. For example, some circuits are formed over a glass substrate by using transistors while some other circuits are formed on a single crystalline substrate, and an IC chip may be provided over the glass substrate by a COG (Chip On Glass) method. Alternatively, the IC chip may be connected to the glass substrate by a TAB (Tape Auto Bonding) method or by using a printed board. In this manner, when some circuits are formed over the same substrate, the costs can be reduced since the number of components is reduced, and reliability can be improved since the number of parts connected to components in the circuits is reduced. Further, when portions with high drive voltage or high drive frequency, which consume more power, are not formed over the same substrate as the above circuits, the increase in power consumption can be prevented.

A transistor is an element including at least three terminals, a gate, a drain, and a source. A channel region is provided between a drain region and a source region, and a current can flow through the drain region, the channel region, and the source region. Here, it is difficult to determine which of two terminals is a source or a drain since a source and a drain are switched depending on a structure, operating condition, and the like of the transistor. Therefore, in the present invention, regions which function as a source and a drain are not referred to as a source and a drain in some cases, and referred to as a first terminal and a second terminal.

It is to be noted that a transistor may also be an element including at least three terminals, a base, an emitter, and a collector. Also in this case, an emitter and a collector may be referred to as a first terminal and a second terminal.

It is to be noted that a gate includes a gate electrode and a gate wiring (also referred to as a gate line, a gate signal line, or the like) or part thereof. A gate electrode corresponds to a portion of a conductive film, which overlaps with a semiconductor forming a channel region, an LDD (Lightly Doped Drain) region, and the like, with a gate insulating film interposed therebetween. A gate wiring corresponds to a wiring for connecting gate electrodes of each of pixels and connecting a gate electrode and another wiring.

It is to be noted that there is also a portion which functions as a gate electrode and also as a gate wiring. Such a region may be referred to as a gate electrode or a gate wiring. That is, there is a region which cannot be clearly distinguished as a gate electrode or a gate wiring. For example, in a case where a channel region overlaps with a gate wiring which is extended, the overlapped region functions as a gate wiring and also as a gate electrode. Therefore, such a region may be referred to as a gate electrode or a gate wiring.

Further, a region which is formed of the same material as that of a gate electrode and connected to the gate electrode may be referred to as a gate electrode as well. Similarly, a region which is formed of the same material as that of a gate wiring and connected to the gate wiring may be referred to as a gate wiring. In a strict sense, such a region does not overlap with a channel region or does not have a function to connect to another gate electrode in some cases. However, there is a region which is formed of the same material as that of a gate electrode or a gate wiring and connected to the gate electrode or the gate wiring. Therefore, such a region may also be referred to as a gate electrode or a gate wiring.

For example, in a multi-gate transistor, gate electrodes of one transistor and another transistor are often connected through a conductive film formed of the same material as that of the gate electrode. Such a region is a region for connecting the gate electrodes and may be referred to as a gate wiring, but since a multi-gate transistor can be considered as one transistor, such a region may also be referred to as a gate electrode. That is, a component which is formed of the same material as that of a gate electrode or a gate wiring and connected to the gate electrode or the gate wiring may be referred to as a gate electrode or a gate wiring.

Moreover, for example, a conductive film in a portion which connects a gate electrode and a gate wiring may also be referred to as a gate electrode or a gate wiring.

It is to be noted that a gate terminal corresponds to part of a region of a gate electrode or a region electrically connected to the gate electrode.

It is to be noted that a source includes a source region, a source electrode, and a source wiring (also referred to as a source line, a source signal line, or the like) or part thereof. A source region corresponds to a semiconductor region which contains a large amount of p-type impurities (boron, gallium, or the like) or n-type impurities (phosphorus, arsenic, or the like). Therefore, a region containing a small amount of p-type impurities or n-type impurities, that is, a so-called LDD (Lightly Doped Drain) region is not included in a source region. A source electrode corresponds to a conductive layer in a portion which is formed of a material different from that of a source region and electrically connected to the source region. It is to be noted that a source electrode including a source region may be referred to as a source electrode. A source wiring corresponds to a wiring for connecting source electrodes of each of pixels or connecting a source electrode and another wiring.

However, there is a portion which functions as a source electrode and also as a source wiring. Such a region may be referred to as a source electrode or a source wiring. That is, there is a region which cannot be clearly distinguished as a source electrode or a source wiring. For example, in a case where a source region overlaps with a source wiring which is extended, the overlapped region functions as a source wiring and also as a source electrode. Therefore, such a region may be referred to as a source electrode or a source wiring.

Further, a region which is formed of the same material as that of a source electrode and connected to the source electrode; or a portion which connects one source electrode and another source electrode may also be referred to as a source electrode. Further, a portion which overlaps with a source region may be referred to as a source electrode. Similarly, a region which is formed of the same material as that of a source wiring and connected to the source wiring may be referred to as a source wiring. In a strict sense, there is a case where such a region does not have a function to connect one source electrode to another source electrode. However, there is a region which is formed of the same material as that of a source electrode or a source wiring and connected to the source electrode or the source wiring. Therefore, such a region may also be referred to as a source electrode or a source wiring.

For example, a conductive film in a portion which connects a source electrode and a source wiring may be referred to as a source electrode or a source wiring.

It is to be noted that a source terminal corresponds to part of a source region, a source electrode, or a region electrically connected to a source electrode.

It is to be noted that the same thing as that of a source can be also applied to a drain.

It is to be noted that, in the present invention, a semiconductor device corresponds to a device including a circuit having a semiconductor element (a transistor, a diode, or the like). Further, a semiconductor device may generally correspond to a device which functions by utilizing semiconductor characteristics.

A display device corresponds to a device including a display element (such as a liquid crystal element). It is to be noted that a display device may correspond to a display panel itself in which a plurality of pixels including display elements such as a liquid crystal element and a peripheral driver circuit for driving the pixels are formed over the same substrate. Moreover, a display device may include a peripheral driver circuit provided over a substrate by wire bonding or bump, that is, a so-called COG (Chip On Glass), and further, a device provided with a flexible printed circuit (FPC) or a printed wiring board (PWB) (such as an IC, a resistor, a capacitor, an inductor, or a transistor). Further, a display device may include an optical sheet such as a polarizing plate or a retardation plate. Further, it may include a backlight unit (which may include a light guiding plate, a prism sheet, a diffusion sheet, a reflective sheet, and a light source (e.g., an LED or a cold-cathode tube)).

In addition, a liquid crystal display device is a display device including a liquid crystal element.

In the present invention, an expression that an object is formed on or over a different object does not necessarily mean that the object is in direct contact with the different object. The expression may include a case where two objects are not in direct contact with each other, that is, a case where another object is interposed therebetween. Accordingly, for example, when it is described that a layer B is formed on (or over) a layer A, it means either case where the layer B is formed on and in direct contact with the layer A, or where another layer (for example, a layer C or a layer D) is formed on and in direct contact with the layer A and the layer B is formed on and in direct contact with the layer C or D. In addition, when it is described that an object is formed above a different object, it does not necessarily mean that the object is in direct contact with the different object, and another object may be interposed therebetween. Accordingly, for example, when it is described that a layer B is formed above a layer A, it means either case where the layer B is formed on and in direct contact with the layer A, or where another layer (for example, a layer C or a layer D) is formed in direct contact with the layer A and the layer B is formed on and in direct contact with the layer C or D. Similarly, when it is described that an object is formed below or under a different object, it means either case where the objects are in direct contact with each other or not in contact with each other.

In accordance with the present invention, when the transmissivity of a liquid crystal element is changed over time in a plurality of lighting periods which are obtained by dividing one frame period, a display device can express a correct gray scale even though the response speed of the liquid crystal element is low. In addition, in each lighting period, a backlight unit supplies light of various colors, whereby full-color display can be performed in one pixel.

BRIEF DESCRIPTION OF THE DRAWINGS

In the accompanying drawings:

FIGS. 3A and 3B are diagrams each showing a pattern table shown in FIGS. 2A and 2B;

FIGS. 26A1 to 26C2 are views each showing a liquid crystal mode of a pixel of the present invention;

FIGS. 27A1 to 27B2 are views each showing a liquid crystal mode of a pixel of the present invention;

FIGS. 28A1 to 28B2 are views each showing a liquid crystal mode of a pixel of the present invention;

FIGS. 59A and 59B are views for explaining the present invention;

FIGS. 60A and 60B are views for explaining the present invention;
FIGS. 61A and 61B are views for explaining the present invention;
FIGS. 62A and 62B are views for explaining the present invention;
FIGS. 63A and 63B are views for explaining the present invention;
FIGS. 64A and 64B are diagrams for explaining the present invention;
FIGS. 65A to 65C are views for explaining the present invention;
FIGS. 66A to 66C are views for explaining the present invention;
FIGS. 68A to 68C are diagrams for explaining the present invention.

DESCRIPTION OF THE INVENTION

Figure 1:
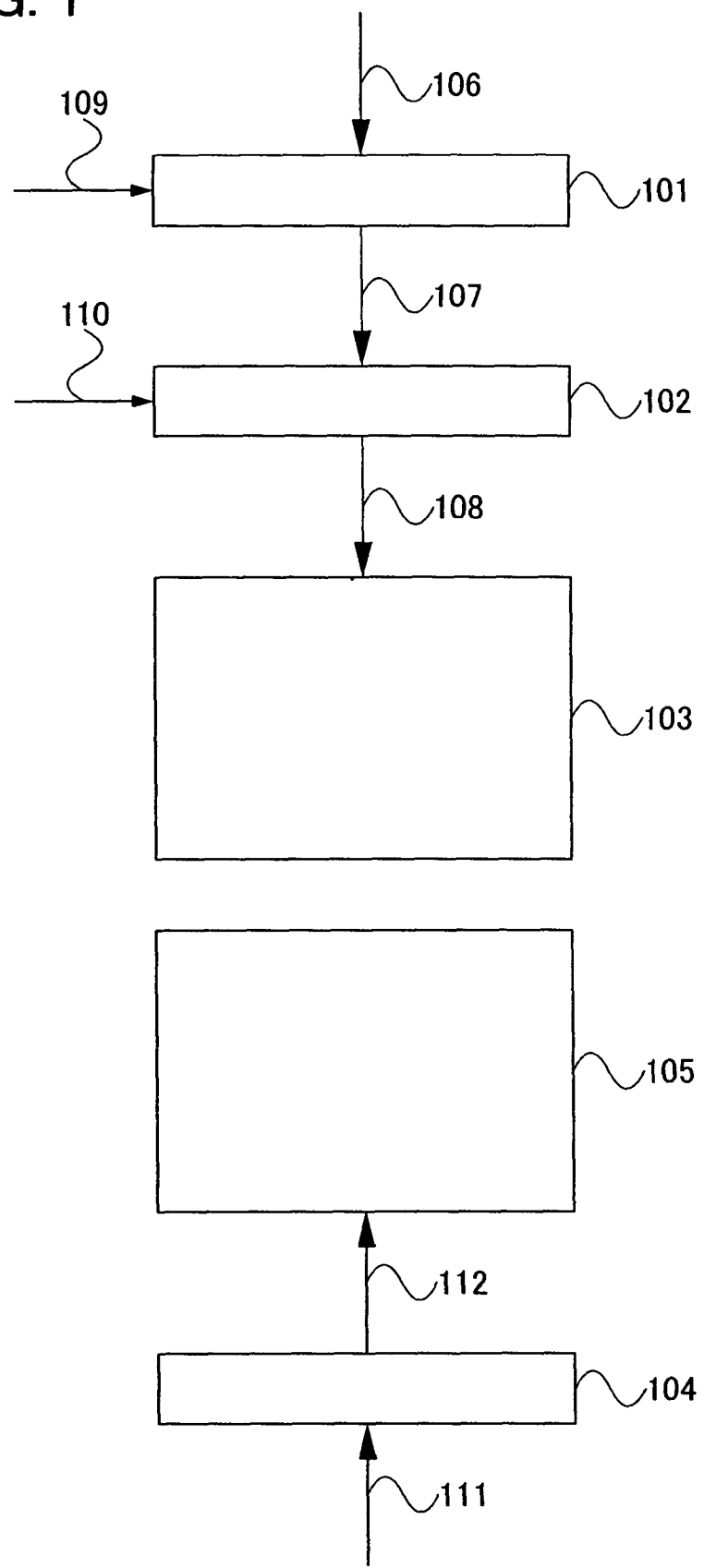
FIG. 1 is a diagram showing a system block of a display device of the present invention.

Hereinafter, Embodiment Modes of the present invention will be explained with reference to the accompanying drawings. It is to be noted that the present invention can be implemented in various modes, and it is easily understood by those skilled in the art that modes and details thereof can be modified in various ways without departing from the spirit and the scope of the present invention. Therefore, the present invention should not be interpreted as being limited to the following description of the embodiment modes. In the drawings of this specification, the same portions or portions having similar functions are denoted by the same reference numerals, and explanation thereof will be omitted.

Embodiment Mode 1

(Configuration of a Display Device Used in the Present Invention)

First, an overview of a configuration of a display device used in the present invention will be explained with reference to FIG. 1.

FIG. 1 shows a configuration example of a system block diagram of a display device used in the present invention. The display device used in the present invention includes a converter 101, a driving portion 102, a display portion 103, a backlight controller 104, and a backlight unit 105.

In FIG. 1, a gray scale signal 106 and a control signal 109 are input to the converter 101. The converter 101 outputs a driving portion control signal 107 to the driving portion 102. It is to be noted that the gray scale signal 106 is image data (such as a moving image or a still image) which is to be displayed on the display portion 103, and the control signal 109 is a signal which serves as a reference such as a clock pulse for driving the converter 101. The driving portion control signal 107 is a binary digital signal which is equivalent to a signal obtained by converting the gray scale signal 106 by the converter 101. Specifically, the driving portion control signal 107 contains converted image data and a signal for driving the driving portion 102.

In FIG. 1, the driving portion control signal 107 and a control signal 110 are input to the driving portion 102. The driving portion 102 outputs a display portion control signal 108 to the display portion 103. The control signal 110 is a signal which serves as a reference such as a clock pulse for driving the driving portion 102. The display portion control signal 108 is a digital signal for inputting converted image data to a pixel included in the display portion 103.

In FIG. 1, the display portion control signal 108 is input to the display portion 103. The display portion 103 includes a plurality of pixels each having a liquid crystal element. Converted image data is supplied to the liquid crystal element in each of the plurality of pixels, and the transmissivity of the liquid crystal element is determined in accordance with the converted image data.

An operation of the liquid crystal element in each of the plurality of pixels will be explained. The liquid crystal element includes two electrodes, and when a potential difference between two electrodes is 0 V (hereinafter also referred to as "non-voltage-applied time" or a "non-voltage-applied state"), the transmissivity of this element is 0% (hereinafter also referred to as normally black). The liquid crystal element is not limited to the above element and may be an element whose transmissivity is 100% in non-voltage-applied time (hereinafter also referred to as normally white). In addition, when a potential difference is generated between two electrodes of the liquid crystal element (hereinafter also referred to as "voltage-applied time" or a "voltage-applied state"), the transmissivity of the liquid crystal element is changed. It is to be noted that when the state of the liquid crystal element is changed from a non-voltage-applied state to a voltage-applied state, the liquid crystal element does not have a transmissivity of 100% immediately, but it takes time. It is to be noted that the time which is required for the liquid crystal element to increase the transmissivity from 10% to 90% is to be Ton. Similarly, when the state of the liquid crystal element is changed from a voltage-applied state to a non-voltage-applied state, the liquid crystal element does not have a transmissivity of 0% immediately, but it takes time. It is to be noted that the time which is required for the liquid crystal element to reduce the transmissivity from 90% to 10% is to be Toff. Ton is shorter than Toff.

In addition, in a general display device, a constant potential is applied to a first electrode of the liquid crystal element, and an analog voltage is applied only once to a second electrode in one frame period, whereby the transmissivity of the liquid crystal element is controlled. In a display device used in the present invention, a constant potential is applied to a first electrode of the liquid crystal element, and digital voltages (digital signal) are applied a plurality of times to a second electrode in one frame period, whereby the transmissivity of the liquid crystal element is controlled. Specifically, in the display device used in the present invention, one frame period is divided into a plurality of sub-lighting periods. Each of the sub-lighting periods is controlled to be in a non-voltage-applied state or a voltage-applied state. Accordingly, the amount of transmitted light in one frame period (the total transmissivity of the liquid crystal element) is controlled.

As described above, the display device used in the present invention utilizes a characteristic that the transmissivity of the liquid crystal element is not changed immediately (the respond speed is low) when the state of the liquid crystal element is changed from a non-voltage-applied state to a voltage-applied state or when the state of the liquid crystal element is changed from a voltage-applied state to a non-voltage-applied state, and controls the amount of transmitted light in one frame period, whereby a desired gray scale can be more correctly expressed.

In addition, the display device used in the present invention utilizes a characteristic that the response speed of the liquid crystal element is low, and applies a digital voltage to the liquid crystal element at a high speed continuously, whereby the amount of transmitted light in one frame period (the total transmissivity of the liquid crystal element) is controlled. That is, the display device of the present invention is suitable for a high speed operation. Therefore, the display device of the present invention is suitable for a driving method which requires the liquid crystal element to operate at a high speed, such as a field sequential driving method, an impulse driving method, or a black insertion driving method. In particular, in a field sequential driving method, one frame period is divided into an R-lighting period, a G-lighting period, and a B-lighting period, and a gray scale of each color is displayed in each period. Therefore, the present invention can solve a problem of a field sequential driving method in which the liquid crystal element has to be driven three times faster, and, because of the low response speed of the liquid crystal element, a gray scale of each color in each period cannot be properly expressed. Thus, the present invention is more suitable for a field sequential driving method. Of course, as described above, the display device of the present invention is also suitable for an impulse driving method, a black insertion driving method, or the like.

In FIG. 1, a backlight controller control signal 111 is input to the backlight controller 104. The backlight controller 104 outputs a backlight unit control signal 112 to the backlight unit 105. It is to be noted that the backlight controller control signal 111 may be predetermined signals that are repeated, or may be changed in accordance with the gray scale signal 106. The backlight unit control signal 112 is a signal which determines whether the backlight unit 105 is to emit light. In addition, the backlight unit control signal 112 is a signal which selects a color component of light which is to be supplied from the backlight unit 105 to the display portion.

In FIG. 1, the backlight unit control signal 112 is input to the backlight unit 105. The backlight unit 105 is controlled to emit light or not to emit light by the backlight unit control signal 112. In addition, the backlight unit control signal 112 may control which part of the backlight unit 105 is to emit light. Further, the backlight unit control signal 112 may control which color is to be emitted from the backlight unit 105 in field sequential driving.

(Configuration of a Converter Used in the Present Invention)

Next, a detailed configuration and an operation of the converter 101 shown in FIG. 1 will be explained with reference to FIGS. 2A and 2B.

Figure 2A:
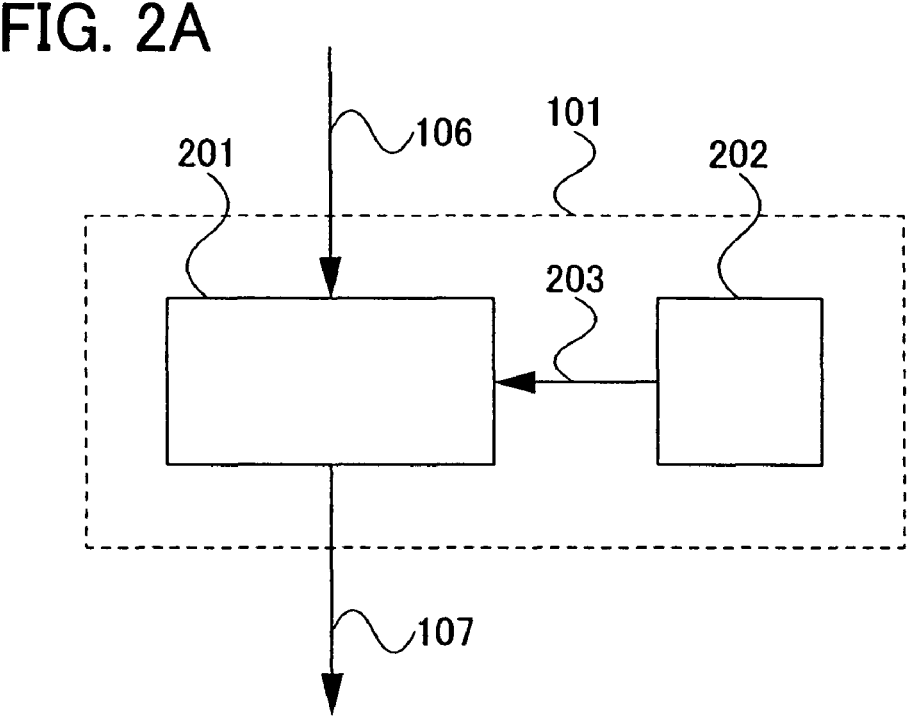
FIGS. 2A and 2B are diagrams each showing a system block of a controller shown in FIG. 1.

FIG. 2A shows a system block diagram of the converter 101 included in the display device used in the present invention. The converter 101 includes a gray scale data converter 201 and a memory portion 202.

A pattern table is stored in the memory portion 202. The pattern table is a table which shows a relation between the gray scale signal 106 and pattern data. Specifically, the pattern table stores pattern data corresponding to gray scale data as shown in FIG. 3A.

Figure 4A:
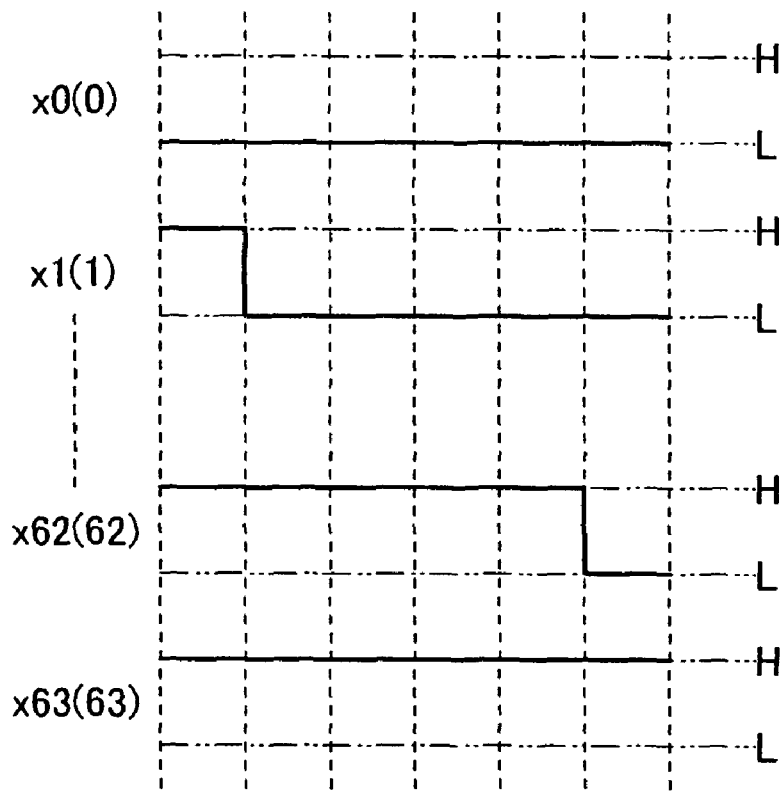
FIGS. 4A and 4B are diagrams each showing a pattern table shown in FIGS. 2A and 2B.

FIG. 4A shows an example of the pattern data. For example, when the gray scale signal 106 is a 6-bit signal, 0 to 63 gray scales can be displayed. FIG. 4A shows pattern data x0 of a gray scale level of 0, pattern data x1 of a gray scale level of 1, pattern data x62 of a gray scale level of 62, and pattern data x63 of a gray scale level of 63. In addition, one frame period is divided into at least two periods, and each pattern data is determined to be at an H level or an L level in each period. Therefore, each pattern data shows an H level or an L level in each of the plurality of periods obtained by dividing one frame period.

Figure 4B:
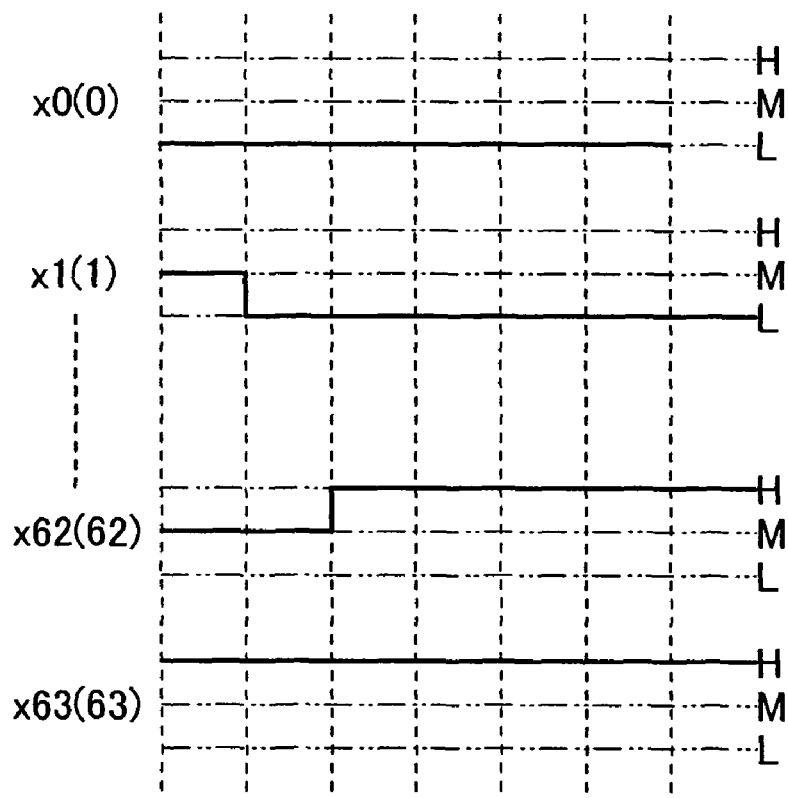

It is to be noted that each pattern data may have three levels such as an H level, an L level, and an M (middle) level, or alternatively, four levels. When each pattern data has three or four levels, the display device of the present invention can display more gray scale levels. FIG. 4B shows an example of pattern data, in which each pattern data has three levels.

It is to be noted that each pattern data preferably has four or less levels since a configuration of the memory portion 202 has a large scale in the case of five or more levels. This is because, for example, the capacity of the memory portion 202 necessary for storing pattern data of one gray scale signal 106 is 1-bit in the case of 2 levels of each pattern data, 2-bits in the case of 3 or 4 levels of each pattern data, and 3-bits in the case of 3 or 4 levels of each pattern data. Therefore, when each pattern data has 5 levels, the capacity of the memory portion 202 is three or more times larger compared to the case where each pattern data has 2 levels.

When one frame period is divided into a plurality of lighting periods and each of the plurality of lighting periods is divided into a plurality of sub-lighting periods, pattern data is determined in each lighting period.

As the memory portion 202, a RAM (Random Access Memory), a ROM (Read Only Memory), or the like can be used. As a RAM, an SRAM (Static RAM), a DRAM (Dynamic RAM), a VRAM (Video RAM), a DPRAM (Dual Port RAM), a NOVRAM (Non Volatile RAM), a PRAM (Pseudo RAM), or the like can be used. As a ROM, an EPROM, a one time programmable ROM, an EEPROM, a flash memory, a mask ROM, or the like can be used.

In FIG. 2A, the gray scale data converter 201 compares the gray scale signal 106 and a pattern table 203, and outputs the driving portion control signal 107. The driving portion control signal 107 contains pattern data of the pattern table 203 corresponding to the gray scale signal 106 and a signal for driving the driving portion 102.

Then, a detailed configuration and an operation of the converter 101 which are different from those of FIG. 2A will be explained with reference to FIG. 2B.

Figure 2B:
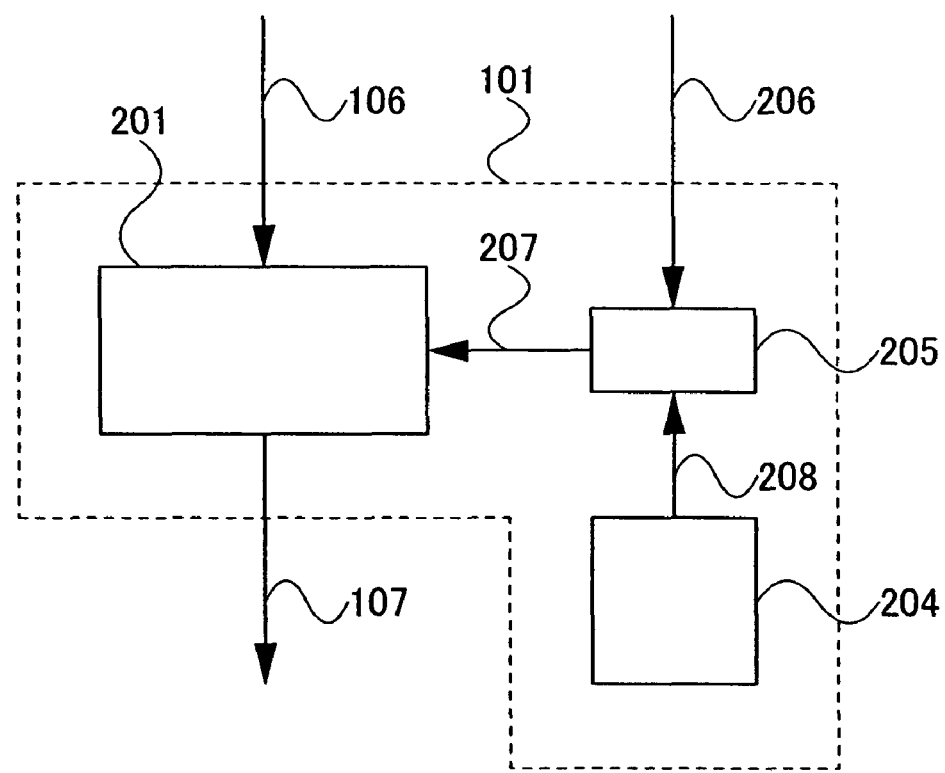

FIG. 2B shows a system block diagram of the converter 101 included in the display device used in the present invention. The converter 101 includes a gray scale data converter 201, a memory portion 204, and a selection portion 205.

A pattern table is stored in the memory portion 204. The pattern table is a table which shows a relation between the gray scale signal 106 and pattern data. Specifically, the pattern table stores pattern data corresponding to gray scale data as shown in FIG. 3B.

It is to be noted that the pattern table in FIG. 3B includes one piece of gray scale data and a plurality of pieces of pattern data. For example, as shown in FIG. 3B, the pattern table includes a plurality of pieces of pattern data with respect to one piece of gray scale data.

As the memory portion 204, a RAM (Random Access Memory), a ROM (Read Only Memory), or the like can be used. As a RAM, an SRAM (Static RAM), a DRAM (Dynamic RAM), a VRAM (Video RAM), a DPRAM (Dual Port RAM), a NOVRAM (Non Volatile RAM), a PRAM (Pseudo RAM), or the like can be used. As a ROM, an EPROM, a one time programmable ROM, an EEPROM, a flash memory, a mask ROM, or the like can be used.

In FIG. 2B, an environmental signal 206 and a pattern table 208 are input to the selection portion 205. The environmental signal 206 indicates an environment of the display device, such as a surrounding temperature of the display device, a temperature of the panel, and surrounding luminance of the display device. Based on the environmental signal 206, the selection portion 205 selects appropriate pattern data and outputs a selected pattern table 207 to the gray scale data converter 201. It is to be noted that the selected pattern table 207 contains gray scale data and one piece of appropriate pattern data of the pattern table stored in the memory portion 204.

In FIG. 2B, the gray scale data converter 201 compares the gray scale signal 106 and the selected pattern table 207 which is selected by the selection portion 205, and outputs the driving portion control signal 107. The driving portion control signal 107 contains pattern data of the selected pattern table 207 corresponding to the gray scale signal 106 and a signal for driving the driving portion 102.

A case where there are a plurality of pieces of pattern data with respect to one piece of gray scale data is explained with reference to FIG. 3B. However, the present invention is not limited thereto. The number of bits of pattern data may be increased with respect to the number of bits of gray scale data, and gray scale data and pattern data may be made to correspond to each other based on the environmental signal 206. For example, when the number of bits of gray scale data is 6-bits and the number of bits of pattern data is 8-bits, the gray scale data is data with 64 gray scale levels, and the pattern data is data with 256 gray scale levels. That is, the gray scale level of 32 of the gray scale data does not necessarily correspond to the gray scale level of 32 of the pattern data, and may correspond to the gray scale level of 256, gray scale level of 230, or gray scale level of 260 depending on the environmental signal.

(Configuration of a Display Portion Used in the Present Invention)

A detailed configuration and an operation of the display portion 103 shown in FIG. 1 will be explained with reference to FIG. 5. A configuration and an operation of the driving portion 102 will also be explained briefly.

Figure 5:
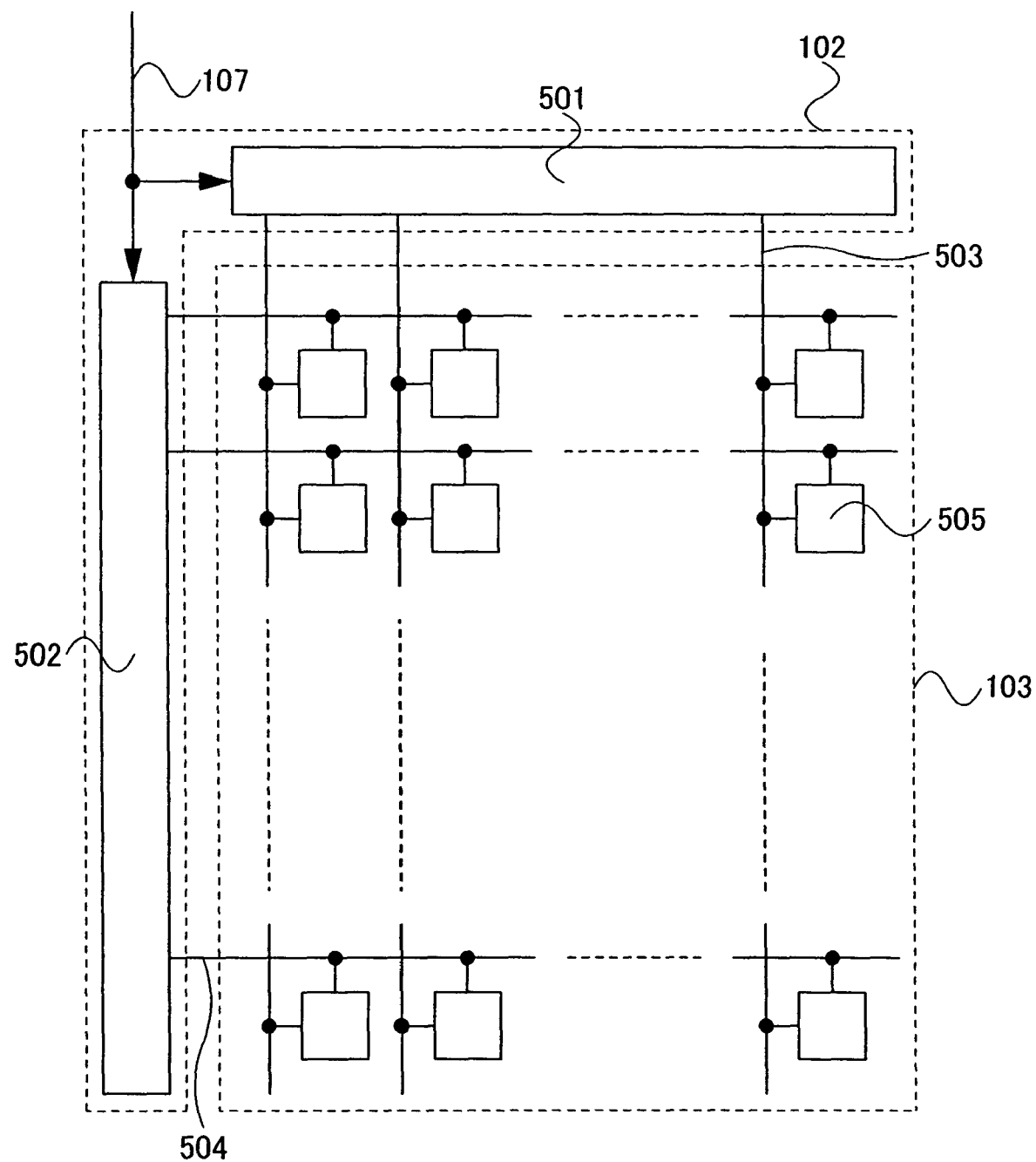
FIG. 5 is a diagram showing a display portion and a controller shown in FIG. 1.

FIG. 5 shows configurations of the driving portion 102 and the display portion 103 included in the display device used in the present invention. The driving portion 102 includes a source driver 501, a gate driver 502, and the like. In the display portion 103, a plurality of pixels 505 are arranged in a matrix.

The gate driver 502 supplies a scanning signal to each of a plurality of wirings 504. By this scanning signal, the pixels 505 are determined to be in a selected state or non-selected state on a row-by-row basis. In addition, the gate driver 502 supplies a scanning signal to each of the plurality of wirings 504 so that the pixels 505 in one row are in a selected state sequentially from the first row. That is, the gate driver 502 scans the wirings 504 from the first row.

In FIG. 5, the source driver 501 supplies a video signal to each wiring 503. This video signal is supplied to the selected pixel 505 and not supplied to the non-selected pixel 505. In addition, the video signal is a binary digital signal. However, when the display device of the present invention is driven by a driving method in which the video signal is inverted, the video signal may also be a ternary signal which has a reference potential (a potential equivalent to that of a counter electrode), a potential on a positive electrode side, and a potential on a negative electrode side. It is preferable that the absolute value of the potential on a positive electrode side be roughly the same as that of the potential on a negative electrode side.

In FIG. 5, as described above, the plurality of pixels 505 are arranged in a matrix in the display portion 103. However, the pixels 505 are not necessarily arranged in a matrix, and may be arranged in a delta pattern or in a Bayer pattern. In addition, the wiring 503 and the wiring 504 are connected to each of the plurality of pixels 505.

Next, a detailed configuration and an operation of the pixel 505 provided in the display portion 103 in FIG. 5 will be explained with reference to FIGS. 6A and 6B.

Figure 6A:
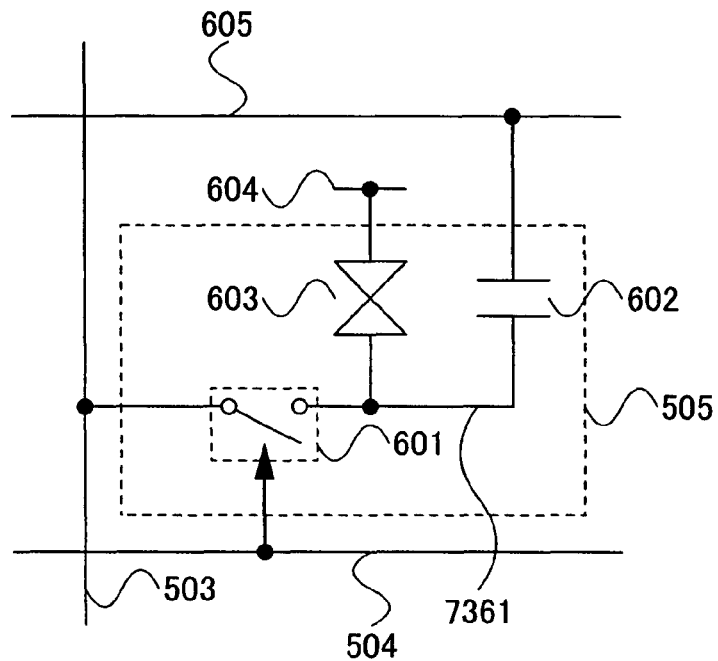
FIGS. 6A and 6B are diagrams showing a configuration and a timing chart of a pixel of the present invention.

FIG. 6A shows a configuration of the pixel 505. The pixel 505 includes a switch 601, a capacitor element 602 having two electrodes, and a liquid crystal element 603 having two electrodes. A first terminal of the switch 601 is connected to a wiring 503. A first electrode of the capacitor element 602 is connected to a wiring 605, and a second electrode thereof is connected to a second terminal of the switch 601. A first electrode of the liquid crystal element 603 is connected to a counter electrode 604, and a second electrode thereof is connected to the second terminal of the switch 601. It is to be noted that a node of the second terminal of the switch 601, the second electrode of the capacitor element 602, and the second electrode of the liquid crystal element 603 is a node 7361. The switch 601 is controlled to be turned on or off by a wiring 504.

As the liquid crystal element 603, a ferroelectric liquid crystal may be used, or an antiferroelectric liquid crystal may be used. As a driving mode of the liquid crystal, a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, an FLC (Ferroelectric Liquid Crystal) mode, an AFLC (Anti-Ferroelectric Liquid Crystal) mode, or the like can be arbitrarily used.

As the switch 601, an n-channel transistor or a p-channel transistor can be used. When the n-channel transistor or the p-channel transistor is used as the switch 601, a gate of the transistor is connected to the wiring 504, a first terminal thereof is connected to the wiring 503, and a second terminal thereof is connected to the node 7361.

Then, a basic operation of the pixel 505 in FIG. 6A will be explained. When the pixel 505 is selected, the switch 601 is turned on, and a video signal is supplied to the node 7361 through the wiring 503. At this time, the capacitor element 602 holds a difference between a potential of the wiring 605 and a potential of the video signal.

When the pixel 505 is not selected, the switch 601 is turned off, and the video signal is not supplied to the pixel 505. Further, the node 7361 is in a floating state. Here, the capacitor element 602 holds a difference between a potential of the wiring 605 and a potential of the video signal. Therefore, when the potential of the wiring 605 is constant, the node 7361 holds the potential of the video signal.

In the case where an n-channel transistor is used as the switch 601, the scanning signal is at an H level when the pixel 505 is selected and at an L level when the pixel 505 is not selected. Further, in the case where a p-channel transistor is used as the switch 601, the scanning signal is at an L level when the pixel 505 is selected and at an H level when the pixel 505 is not selected.

When an n-channel transistor or a p-channel transistor is used as the switch 601, an H level of the scanning signal is higher than the maximum voltage of the video signal. In addition, an L level of the scanning signal is lower than the minimum voltage of the video signal.

Here, a detailed configuration and an operation of the pixel 505 which are different from those of FIG. 6A will be explained with reference to FIG. 14A.

Figure 14A:
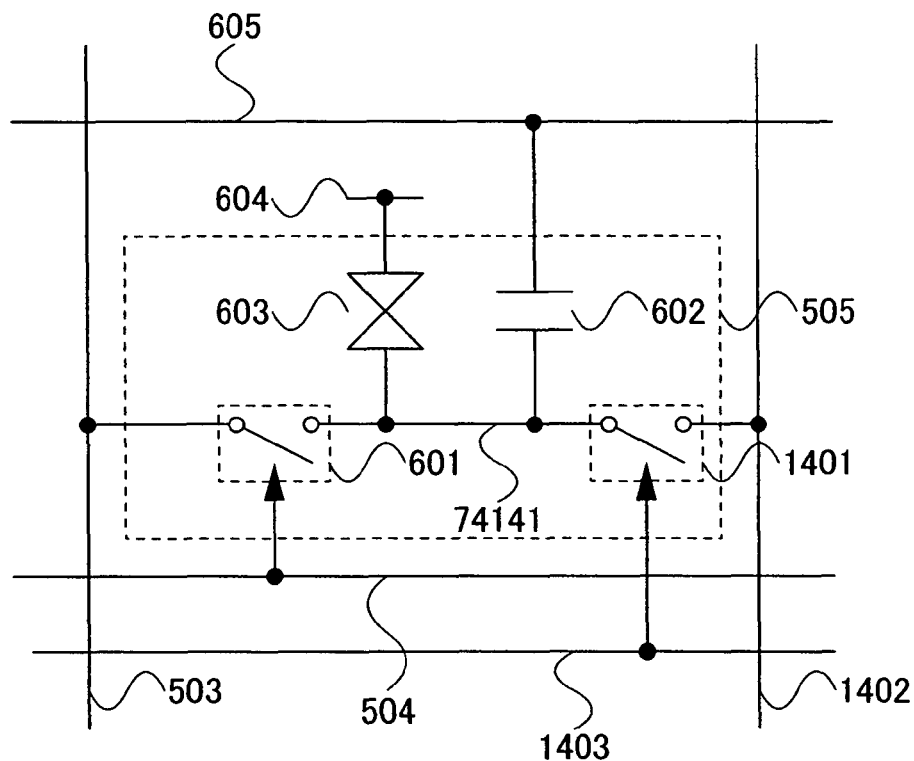
FIGS. 14A and 14B are diagrams each showing a pixel configuration of the present invention.

FIG. 14A shows a configuration of the pixel 505. The pixel 505 includes a switch 601, a capacitor element 602 having two electrodes, a liquid crystal element 603 having two electrodes, and a switch 1401. A first terminal of the switch 601 is connected to a wiring 503. A first electrode of the capacitor element 602 is connected to a wiring 605, and a second electrode thereof is connected to a second terminal of the switch 601. A first electrode of the liquid crystal element 603 is connected to a counter electrode 604, and a second electrode thereof is connected to the second terminal of the switch 601. A first terminal of the switch 1401 is connected to a wiring 1402, and a second terminal thereof is connected to the second terminal of the switch 601. It is to be noted that a node of the second terminal of the switch 601, the second electrode of the capacitor element 602, the second electrode of the liquid crystal element 603, and the first terminal of the switch 1401 is a node 74141. The switch 601 is controlled by a potential (signal) of a wiring 504 to be turned on or off, and the switch 1401 is controlled by a potential (signal) of a wiring 1403 to be turned on or off.

As the switch 1401, an n-channel transistor or a p-channel transistor can be used. When an n-channel transistor or a p-channel transistor is used as the switch 1401, a gate of the transistor is connected to the wiring 1403, the first terminal thereof is connected to the wiring 1402, and the second terminal thereof is connected to the node 74141.

Then, a basic operation of the pixel 505 in FIG. 14A will be explained. When the pixel 505 is selected, the switch 601 is turned on, and a video signal is supplied to the node 74141 through the wiring 503. At this time, the capacitor element 602 holds a difference between a potential of the wiring 605 and a potential of the video signal. It is to be noted that the switch 1401 is turned off.

When the pixel 505 is not selected, the switch 601 is turned off, and the video signal is not supplied to the pixel 505. Further, the node 74141 is in a floating state. Here, the capacitor element 602 holds a difference between a potential of the wiring 605 and a potential of the video signal. Therefore, when the potential of the wiring 605 is constant, the node 74141 holds the potential of the video signal.

In addition, in FIG. 14A, an erasing operation can be performed by control of on and off of the switch 1401. For example, when the switch 1401 is turned on, a potential of the node 74141 is equivalent to that of the wiring 1402. When a potential of the wiring 1402 is set to be equivalent to that of the counter electrode 604, the liquid crystal element 603 has a transmissivity of 0%; therefore, an erasing operation can be performed in the pixel 505 of FIG. 14A.

When the liquid crystal element 603 is a normally white liquid crystal element, the potential of the wiring 1402 may be set sufficiently higher or lower than that of the counter electrode 604.

Further, in the pixel 505 in FIG. 14A, not only the above-described erasing operation but also a writing operation can be performed by supply of a video signal to the wiring 1402. In addition, by supply of video signals with different amplitude to the wiring 1402 and the wiring 503, a gray scale can be better controlled, and higher-level gray scale display can be achieved.

A scanning signal is supplied to the wiring 1403, similarly to the wiring 504. However, the scanning signals are supplied to the wiring 1403 and the wiring 504 at different timings.

When an n-channel transistor is used as the switch 1401, the scanning signal of the wiring 1403 is at an H level in a period of the erasing operation and is at an L level in other periods. In addition, when a p-channel transistor is used as the switch 1401, the scanning signal of the wiring 1403 is at an L level in a period of the erasing operation and is at an H level in other periods.

Figure 14B:
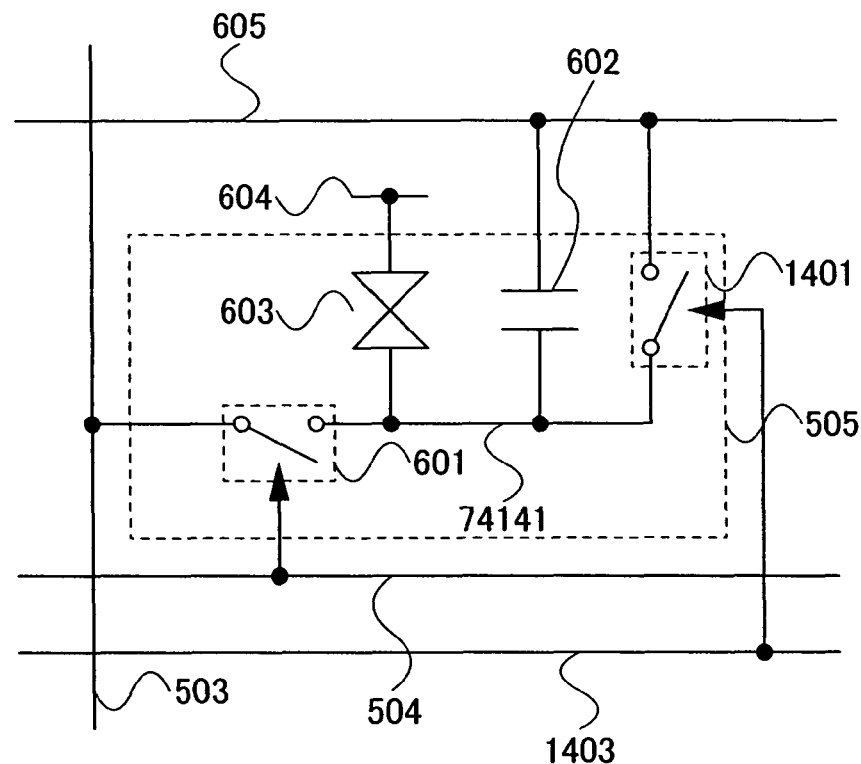

Further, as shown in FIG. 14B, the first terminal of the switch 1401 may be connected to the wiring 605 instead of being connected to the wiring 1402. This is because the wiring 605 has only to have a constant potential, and when the potential of the wiring 605 is set equivalent to that of the counter electrode 604, an erasing operation can be performed in FIG. 14B.

When the liquid crystal element 603 is a normally white liquid crystal element, the potential of the wiring 605 may be set sufficiently higher or lower than that of the counter electrode 604.

Next, a relation between the video signal and transmissivity of the liquid crystal element 603 will be explained with reference to FIG. 6B. FIG. 6B shows a case where attention is paid to a certain pixel.

Figure 6B:
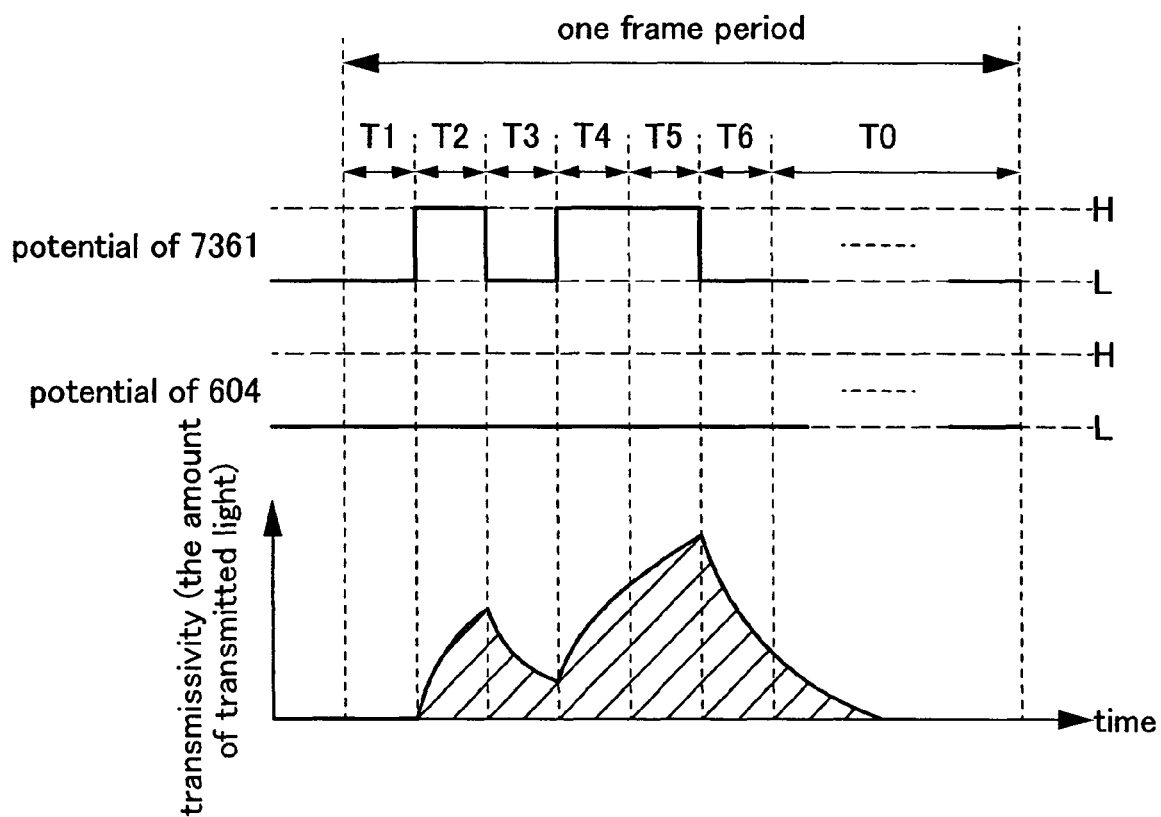

FIG. 6B shows a potential of the node 7361, a potential of the counter electrode 604, and the transmissivity of the liquid crystal element 603 (the amount of light transmitted through the liquid crystal element 603) when the video signal is written six times in one frame period. Further, one frame period is divided into periods T1 to T6 and T0 for explanation.

Each of the periods T1 to T6 contains a period in which the video signal is written into the pixel 505 and a period in which the video signal is held at the node 7361. That is, in a certain pixel 505, a selected state and a non-selected state are provided in each of the periods T1 to T6. Therefore, each of the periods T1 to T6 is a period after a selected state and before the next selected state of a certain pixel 505.

The period T0 is a period in one frame period other than the periods T1 to T6. It is desirable that the potential of the node 7361 be at an L level in the period T0.

As described above, the video signal is a binary digital signal. Therefore, the potential of the node 7361 is also binary. In addition, an L level of the node 7361 is the same potential as that of the counter electrode 604. It is to be noted that when the liquid crystal element 603 is a normally white liquid crystal element, the potential of the node 7361 in the period T0 may be set sufficiently higher or lower than that of the counter electrode 604.

In addition, FIG. 6B shows the case where the video signal is written six times in one frame period, but the present invention is not limited thereto.

It is to be noted that a pattern of the video signal (potential at the node 7361) is at an L level in the period T1, an H level in the period T2, an L level in the period T3, an H level in the period T4, an H level in the period T5, and an L level in the period T6, but the present invention is not limited thereto. The pattern of the video signal is determined by a liquid crystal material, a voltage of the video signal, or the like.

In the period T1 of FIG. 6B, since the potential of the node 7361 is at an L level, the liquid crystal element 603 is in a non-voltage-applied state. Therefore, the transmissivity of the liquid crystal element 603 is kept at 0%.

In the period T2 of FIG. 6B, since the potential of the node 7361 is at an H level, the liquid crystal element 603 is in a voltage-applied state. Therefore, the transmissivity of the liquid crystal element 603 starts to increase. The increase in transmissivity of the liquid crystal element 603 is stopped when the transmissivity becomes 100%. However, the transmissivity of the liquid crystal element 603 does not necessarily become 100%.

In the period T3 of FIG. 6B, since the potential of the node 7361 is at an L level, the liquid crystal element 603 is in a non-voltage-applied state. Therefore, the transmissivity of the liquid crystal element 603 starts to decrease. The decrease in transmissivity of the liquid crystal element 603 is stopped when the transmissivity becomes 0%. However, the transmissivity of the liquid crystal element 603 does not necessarily become 0%.

In the period T4 of FIG. 6B, since the potential of the node 7361 is at an H level, the liquid crystal element 603 is in a voltage-applied state. Therefore, the transmissivity of the liquid crystal element 603 starts to increase. The increase in transmissivity of the liquid crystal element 603 is stopped when the transmissivity becomes 100%. However, the transmissivity of the liquid crystal element 603 does not necessarily become 100%.

In the period T5 of FIG. 6B, since the potential of the node 7361 is kept at an H level, the liquid crystal element 603 is kept in a voltage-applied state. Therefore, the transmissivity of the liquid crystal element 603 starts to further increase. The increase in transmissivity of the liquid crystal element 603 is stopped when the transmissivity becomes 100%. However, the transmissivity of the liquid crystal element 603 does not necessarily become 100%.

In the period T6 of FIG. 6B, since the potential of the node 7361 is at an L level, the liquid crystal element 603 is in a non-voltage-applied state. Therefore, the transmissivity of the liquid crystal element 603 starts to decrease. The decrease in transmissivity of the liquid crystal element 603 is stopped when the transmissivity becomes 0%.

As described above, in the display device used in the present invention, it is determined by the video signal in which of the periods T1 to T6 the liquid crystal element 603 is set in a voltage-applied state or in a non-voltage-applied state, whereby the amount of light transmitted through the liquid crystal element 603 is made to change over time. Therefore, a gray scale is determined by a value which is obtained by integrating the amount of light transmitted through the liquid crystal at each point with respect to one frame period. Accordingly, a gray scale of the liquid crystal element 603 shown in FIG. 6B is indicated by a diagonally shaded area.

In an actual case, the gray scale of the display device used in the present invention is not determined by a value which is obtained by integrating the amount of light transmitted through the liquid crystal at each point with respect to one frame period, but determined by a value which is obtained by integrating the amount of light transmitted through the liquid crystal at each point with respect to a lighting period of a backlight.

Figure 58:
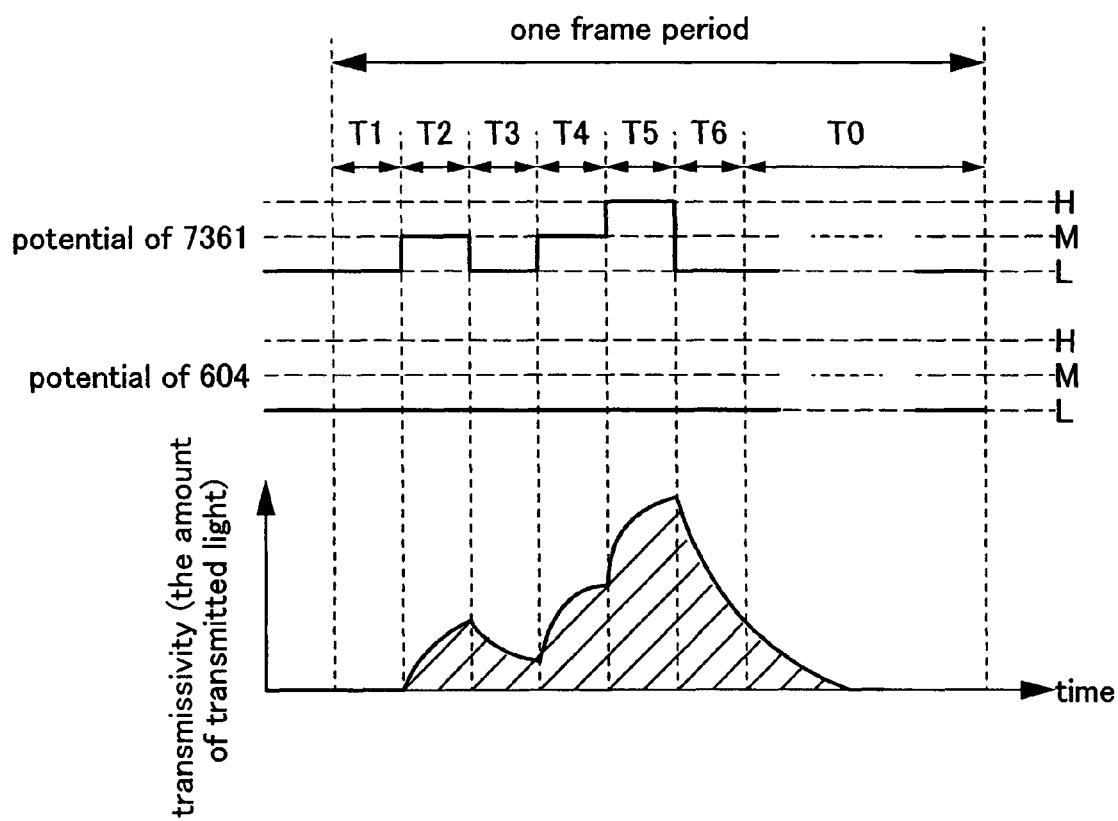
FIG. 58 is a diagram for explaining the present invention.

When the video signal has three values, an L level, an M level, and an H level, as shown in FIG. 58, the amount of light transmitted through the liquid crystal element can be more precisely controlled. Since the amount of light transmitted through the liquid crystal element can be precisely controlled, a large number of gray scale levels can be expressed in a short period (by less writings of the video signals).

Next, a relation between the video signal and transmissivity of the liquid crystal element 603 when the display device used in the present invention is driven by a field sequential driving method will be explained with reference to FIG. 7. In a field sequential driving method shown in FIG. 7, a backlight emits light of R (red), G (green), and B (blue) sequentially in one frame period. In addition, FIG. 7 shows a case where attention is paid to a certain pixel.

Figure 7:
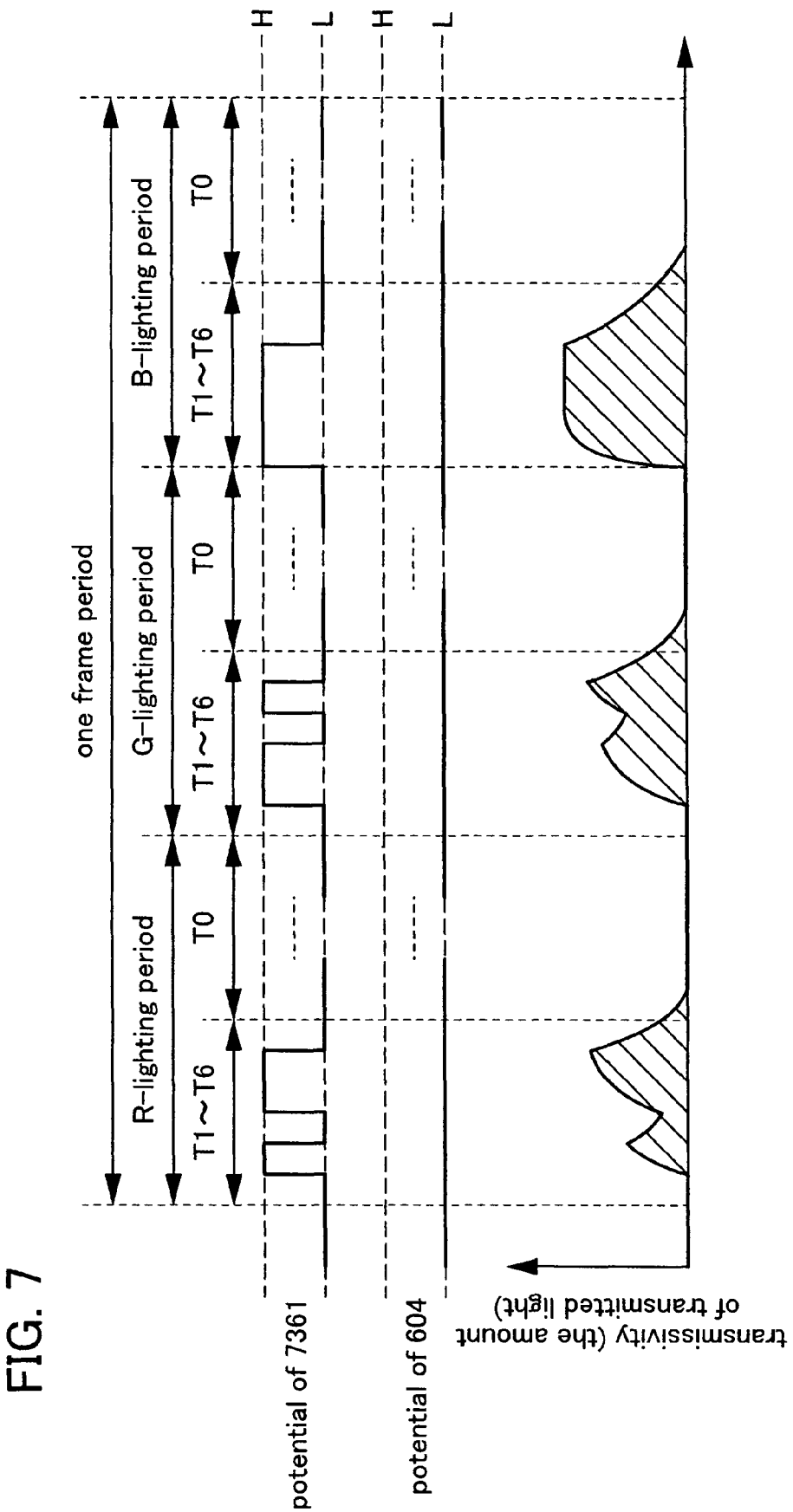
FIG. 7 is a diagram showing a timing chart of a pixel of the present invention.

FIG. 7 shows a potential of the node 7361, a potential of the counter electrode 604, and the transmissivity of the liquid crystal element 603 (the amount of light transmitted through the liquid crystal element 603). In addition, one frame period is divided into an R-lighting period, a G-lighting period, and a B-lighting period. Each of the R-lighting period, the G-lighting period, and the B-lighting period is divided into periods T1 to T6 and T0 for explanation, similarly to FIG. 6B. FIG. 7 shows a case where a video signal is written into the pixel 505 six times in each lighting period.

The R-lighting period, the G-lighting period, and the B-lighting period are different only in that color components (wavelengths) of light which is transmitted through the liquid crystal element 603 are different. In the R-lighting period, light of a color component (wavelength) of R (red) is transmitted through the liquid crystal element 603. In the G-lighting period, light of a color component (wavelength) of G (green) is transmitted through the liquid crystal element 603. In the B-lighting period, light of a color component (wavelength) of B (blue) is transmitted through the liquid crystal element 603.

Each of the periods T1 to T6 contains a period in which the video signal is written into the pixel 505 and a period in which the video signal is held at the node 7361. That is, in a certain pixel 505, a selected state and a non-selected state are provided in each of the periods T1 to T6. Therefore, each of the periods T1 to T6 is a period after a selected state and before the next selected state of a certain pixel 505.

The period T0 is a period in one frame period other than the periods T1 to T6. It is desirable that the potential of the node 7361 be at an L level in the period T0. When the liquid crystal element 603 is a normally white liquid crystal element, the potential of the node 7361 may be set sufficiently higher or lower than that of the counter electrode 604 in the period T0.

As described above, the video signal is a binary digital signal. Therefore, the potential of the node 7361 is also binary. In addition, an L level of the node 7361 is the same potential as that of the counter electrode 604.

In addition, FIG. 7 shows the case where the video signal is written six times in each lighting period, but the present invention is not limited thereto.

In each of the periods T1 to T6 of each lighting period, the potential of the node 7361 is at an H level or an L level, similarly to FIG. 6B. Therefore, the amount of light transmitted through the liquid crystal element 603 (transmissivity) is made to change over time in accordance with the video signal. Thus, a gray scale of the liquid crystal element 603 is determined by a value which is obtained by integrating the amount of light transmitted through the liquid crystal at each point with respect to each lighting period. Accordingly, a gray scale of the liquid crystal element 603 in each lighting period is indicated by a diagonally shaded area of each lighting period.

In the R-lighting period, light of a color component (wavelength) of R (red) is transmitted through the liquid crystal element 603. Therefore, a gray scale of light of a color component of R which is transmitted through the liquid crystal element 603 is determined by the total amount of light transmitted through the liquid crystal element 603 in the R-lighting period.

In the G-lighting period, light of a color component (wavelength) of G (green) is transmitted through the liquid crystal element 603. Therefore, a gray scale of light of a color component of G which is transmitted through the liquid crystal element 603 is determined by the total amount of light transmitted through the liquid crystal element 603 in the G-lighting period.

In the B-lighting period, light of a color component (wavelength) of B (blue) is transmitted through the liquid crystal element 603. Therefore, a gray scale of light of a color component of B which is transmitted through the liquid crystal element 603 is determined by the total amount of light transmitted through the liquid crystal element 603 in the B-lighting period.

As described above, the display device of the present invention can display light of a plurality of color components (wavelengths) in one frame period by dividing one frame period into a plurality of lighting periods. This is so-called field sequential driving.

In general, in a field sequential driving method, an analog voltage is input to a pixel in each of a plurality periods obtained by dividing one frame period. However, since the response speed of the liquid crystal element is low, there is a problem in that a correct gray scale cannot be expressed even when the video signals are input a plurality of times in one frame period.

However, in the display device used in the present invention, even though the response speed of the liquid crystal element is low, a correct gray scale can be expressed since the response speed of the liquid crystal element is made to change over time in each lighting period.

In FIG. 7, one frame period is divided into the R-lighting period in which light of a color component of R is transmitted through the liquid crystal element 603, the O-lighting period in which light of a color component of G is transmitted through the liquid crystal element 603, and the B-lighting period in which light of a color component of B is transmitted through the liquid crystal element 603. However, one frame period is not limited to be divided into three lighting periods and may be divided into four or more lighting periods. Further, in each lighting period, color components of light which is transmitted through the liquid crystal element 603 are not limited to R, G and B, and color components other than R, G, and B may also be used. As color components other than R, G, and B, color components of B (Black), W (White), Y (Yellow), C (Cyan), M (Magenta), emerald green, vermilion, and the like can be given.

For example, one frame period may be divided into an R-lighting period, a G-lighting period, a B-lighting period, and a W-lighting period in which light of a color component of W is transmitted through the liquid crystal element 603. By addition of the W-lighting period, power savings of the display device of the present invention can be achieved.

Of course, one frame period may be divided into an R-lighting period, a G-lighting period, a B-lighting period, and a lighting period in which light of another color component (B, Y, C, M, emerald green, vermilion, or the like) is transmitted through the liquid crystal element 603.

As another example, one frame period may be divided into a Y-lighting period in which light of a color component of Y is transmitted through the liquid crystal element 603, a C-lighting period in which light of a color component of C is transmitted through the liquid crystal element 603, and an M-lighting period in which light of a color component of M is transmitted through the liquid crystal element 603.

Of course, one frame period may be divided into a Y-lighting period, a C-lighting period, an M-lighting period, and a lighting period in which light of another color component (R, G, B, W, emerald green, vermilion, or the like) is transmitted through the liquid crystal element 603.

Besides, one frame period may be divided into an R-lighting period, a O-lighting period, a B-lighting period, and a lighting period in which light of a color component which is similar to at least one of R, G, and B is transmitted through the liquid crystal element 603. With the use of such a color component, display which is close to a real thing can be performed, and power consumption can be reduced.

For example, one frame period may be divided into an R1-lighting period in which light of a color component of R1 is transmitted through the liquid crystal element 603, an R2-lighting period in which light of a color component of R2 is transmitted through the liquid crystal element 603, a G-lighting period, and a B-lighting period. It is to be noted that both a color component of R1 and a color component of R2 are red but slightly different in color component (a wavelength and a frequency).

Similarly, one frame period may be divided into an R-lighting period, a G1-lighting period in which light of a color component of G1 is transmitted through the liquid crystal element 603, a G2-lighting period in which light of a color component of G2 is transmitted through the liquid crystal element 603, and a B-lighting period. It is to be noted that both a color component of G1 and a color component of G2 are green but slightly different in color component (a wavelength and a frequency).

Similarly, one frame period may be divided into an R-lighting period, a G-lighting period, a B1-lighting period in which light of a color component of B1 is transmitted through the liquid crystal element 603, and a B2-lighting in which light of a color component of B2 is transmitted through the liquid crystal element 603. It is to be noted that both a color component of B1 and a color component of B2 are blue but slightly different in color component (a wavelength and a frequency).

Of course, one frame period may be divided into an R1-lighting period, an R2-lighting period, a G1-lighting period, a G2-lighting period, and a B-lighting period.

Similarly, one frame period may be divided into an R1-lighting period, an R2-lighting period, a G-lighting period, a B1-lighting period, and a B2-lighting period.

Similarly, one frame period may be divided into an R1-lighting period, a G1-lighting period, a G2-lighting period, a B1-lighting period, and a B2-lighting period.

Of course, one frame period may be divided into an R1-lighting period, an R2-lighting period, a G1-lighting period, a G2-lighting period, a B1-lighting period, and a B2-lighting period.

Figure 8:
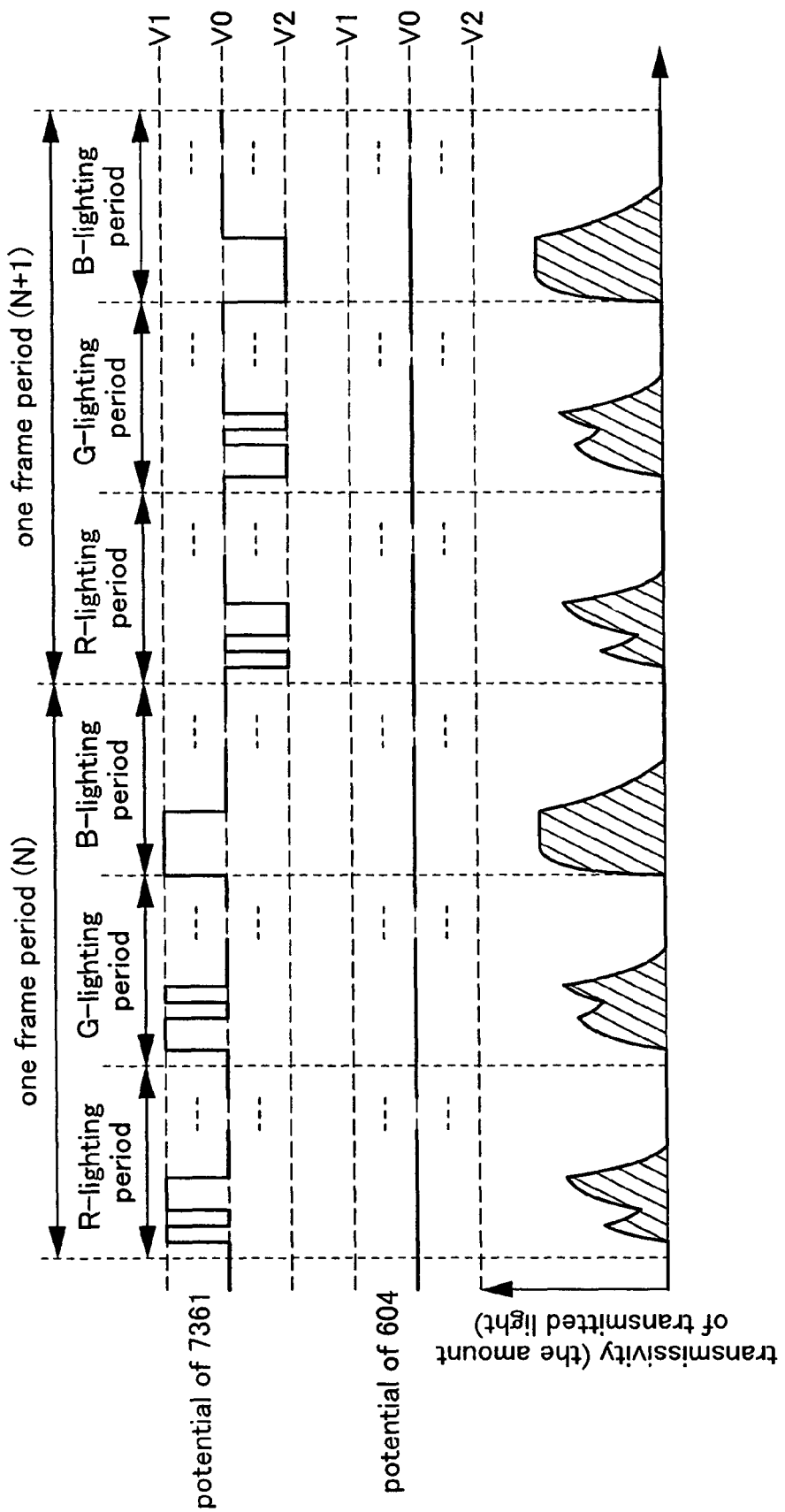
FIG. 8 is a diagram showing a timing chart of a pixel of the present invention.

Next, with reference to FIG. 8, the following will explain a relation between a video signal and the transmissivity of the liquid crystal element 603 in a case where the display device of the present invention employs a frame-inversion driving method. In a frame-inversion driving method shown in FIG. 8, the polarity of a video signal is inverted to be positive or negative in every frame period. FIG. 8 shows a case where attention is paid to a certain pixel.

It is to be noted that a frame-inversion driving method is a driving method in which the polarity of a video signal which is input to a pixel is inverted in every frame period with respect to a potential of a counter electrode. The display device of the present invention supplies video signals a plurality of times to a pixel in one frame period. Therefore, burn-in is easily caused in the liquid crystal element of the display device of the present invention, compared to a general display device in which a video signal is supplied only once to a pixel in one frame period. Accordingly, in the display device of the present invention, burn-in in the liquid crystal element can be suppressed by a frame-inversion driving method shown in FIG. 8.

FIG. 8 shows a potential of the node 7361, a potential of the counter electrode 604, and the transmissivity of the liquid crystal element 603 (the amount of light transmitted through the liquid crystal element 603). In addition, FIG. 8 shows an even-numbered frame period (N) and an odd-numbered frame period (N+1). Each of the frame period (N) and the frame period (N+1) is divided into an R-lighting period, a G-lighting period, and a B-lighting period, similarly to FIG. 7. Each lighting period is divided into periods T1 to T6 and T0, similarly to FIG. 7, but they not shown in FIG. 8.

The R-lighting period, the G-lighting period, and the B-lighting period are different only in that color components (wavelengths) of light which is transmitted through the liquid crystal element 603 are different. In the R-lighting period, light of a color component (wavelength) of R (red) is transmitted through the liquid crystal element 603. In the G-lighting period, light of a color component (wavelength) of G (green) is transmitted through the liquid crystal element 603.

In the B-lighting period, light of a color component (wavelength) of B (blue) is transmitted through the liquid crystal element 603.

Each of the periods T1 to T6 contains a period in which the video signal is written into the pixel 505 and a period in which the video signal is held at the node 7361. That is, in a certain pixel 505, a selected state and a non-selected state are provided in each of the periods T1 to T6. Therefore, each of the periods T1 to T6 is a period after a selected state and before the next selected state of a certain pixel 505.

The period T0 is a period in one frame period other than the periods T1 to T6. It is desirable that the potential of the node 7361 be at an L level in the period T0. When the liquid crystal element 603 is a normally white liquid crystal element, the potential of the node 7361 may be set sufficiently higher or lower than that of the counter electrode 604 in the period T0.

In addition, FIG. 8 shows the case where the video signal is written six times in each lighting period, but the present invention is not limited thereto.

It is to be noted that a voltage of the video signal has three values, V0, V1, and V2. In addition, a potential difference between V0 and V1 (V1−V0) and a potential difference between V2 and V0 (V0−V2) are the same.

In the R-lighting period, the G-lighting period, and the B-lighting period of the frame period (N), a voltage of the video signal is V0 or V1. The amount of light transmitted through the liquid crystal element 603 is changed over time in accordance with the video signal.

In the R-lighting period, the G-lighting period, and the B-lighting period of the frame period (N+1), a voltage of the video signal is V0 or V2. The amount of light transmitted through the liquid crystal element 603 is changed over time in accordance with the video signal.

Unless the absolute value of a potential difference between the first electrode and the second electrode of the liquid crystal element 603 changes, the liquid crystal element 603 has the same transmissivity (the amount of light transmitted through the liquid crystal element) regardless of the polarity of voltages applied to the first electrode and the second electrode.

Therefore, when the polarity of a video signal in the frame period (N) and the polarity of a video signal in the frame period (N+1) are just inverted, the total amount of light transmitted through the liquid crystal element 603 in the frame period (N) is the same as that in the frame period (N+1).

As described above, also when the display device of the present invention employs a frame-inversion driving method, the appropriate amount of light can be transmitted through the liquid crystal element 603.

In addition, when the display device of the present invention employs a frame-inversion driving method, a problem of burn-in in the liquid crystal element 603 can be effectively solved. This is because burn-in in the liquid crystal element 603 is easily caused since a voltage-applied state and a non-voltage-applied state are repeated in one frame period of the liquid crystal element 603, and further, burn-in in the liquid crystal element 603 is easily caused since a video signal in a voltage-applied state is the maximum or the minimum of a video signal of a general display device.

Figure 9:
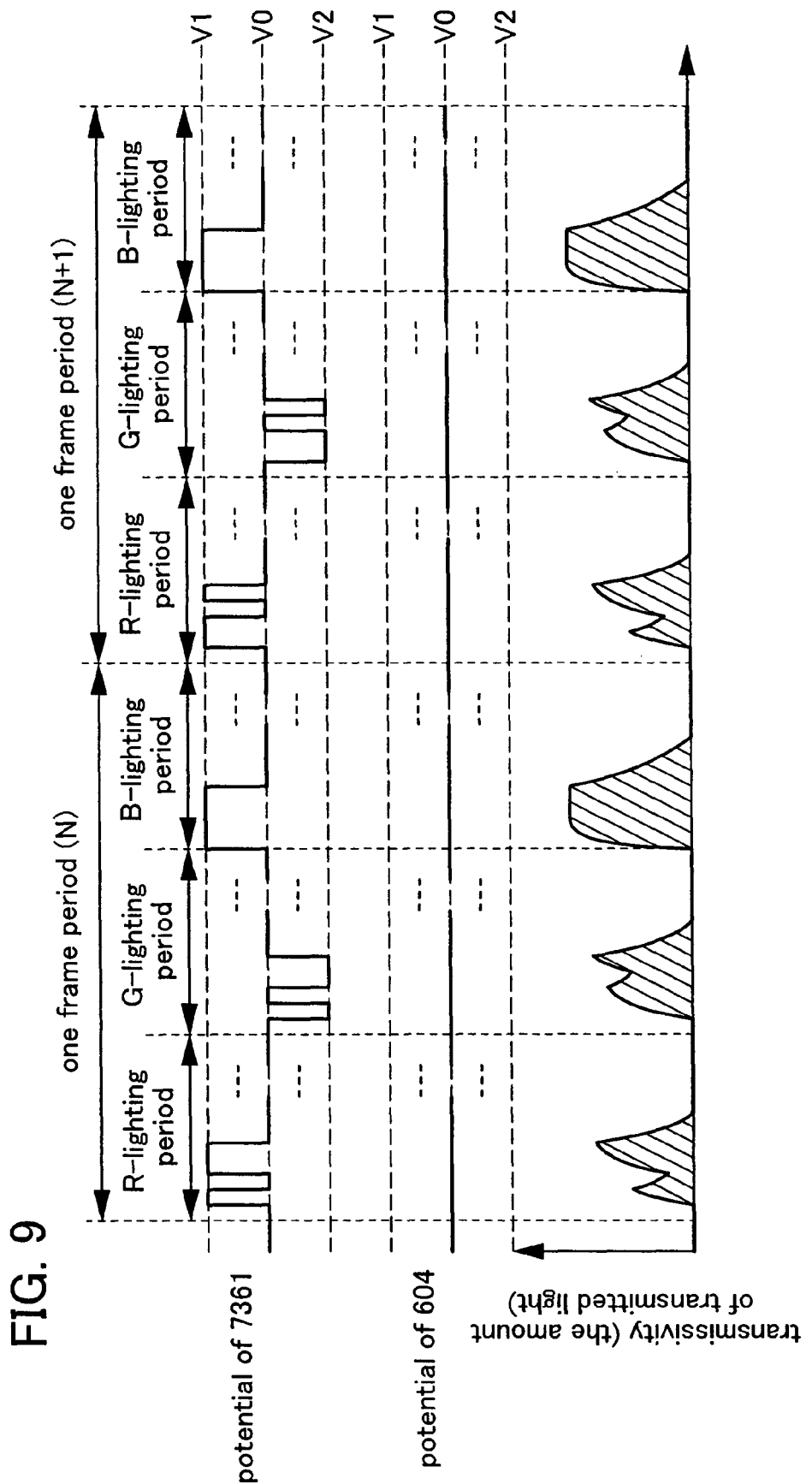
FIG. 9 is a diagram showing a timing chart of a pixel of the present invention.

Next, with reference to FIG. 9, the following will explain a relation between a video signal and the transmissivity of the liquid crystal element 603 in a case where the display device of the present invention employs a video signal inversion driving method, which is different from a frame-inversion driving method shown in FIG. 8. FIG. 9 shows a case where attention is paid to a certain pixel.

In a video signal inversion driving method, which is different from a frame-inversion driving method shown in FIG. 8, the polarity of a video signal input to a pixel is inverted in every lighting period with respect to a potential of the counter electrode. That is, the polarity of a video signal is inverted in a shorter period than in a frame-inversion driving method shown in FIG. 8; therefore, burn-in in the liquid crystal element can be better suppressed.

FIG. 9 shows a potential of the node 7361, a potential of the counter electrode 604, and the transmissivity of the liquid crystal element 603 (the amount of light transmitted through the liquid crystal element 603). In addition, FIG. 9 shows an even-numbered frame period (N) and an odd-numbered frame period (N+1). Each of the frame period (N) and the frame period (N+1) is divided into an R-lighting period, a G-lighting period, and a B-lighting period, similarly to FIGS. 7 and 8. Each lighting period is divided into periods T1 to T6 and T0, similarly to FIGS. 7 and 8, but they are not shown in FIG. 9.

The R-lighting period, the G-lighting period, and the B-lighting period are different only in that color components (wavelengths) of light which is transmitted through the liquid crystal element 603 are different. In the R-lighting period, light of a color component (wavelength) of R (red) is transmitted through the liquid crystal element 603. In the G-lighting period, light of a color component (wavelength) of G (green) is transmitted through the liquid crystal element 603. In the B-lighting period, light of a color component (wavelength) of B (blue) is transmitted through the liquid crystal element 603.

Each of the periods T1 to T6 contains a period in which the video signal is written into the pixel 505 and a period in which the video signal is held at the node 7361. That is, in a certain pixel 505, a selected state and a non-selected state are provided in each of the periods T1 to T6. Therefore, each of the periods T1 to T6 is a period after a selected state and before the next selected state of a certain pixel 505.

The period T0 is a period in one frame period other than the periods T1 to T6. It is desirable that the potential of the node 7361 be at an L level in the period T0. When the liquid crystal element 603 is a normally white liquid crystal element, the potential of the node 7361 may be set sufficiently higher or lower than that of the counter electrode 604 in the period T0.

In addition, FIG. 9 shows the case where the video signal is written six times in each lighting period, but the present invention is not limited thereto.

It is to be noted that a voltage of the video signal has three values, V0, V1, and V2. In addition, a potential difference between V0 and V1 (V1−0) and a potential difference between V2 and V0 (V0−V2) are the same.

In the R-lighting period of the frame period (N), the B-lighting period of the frame period (N), the R-lighting period of the frame period (N+1), and the B-lighting period of the frame period (N+1), a voltage of the video signal is V0 or V1. The amount of light transmitted through the liquid crystal element 603 is changed over time in accordance with the video signal.

In the G-lighting period of the frame period (N) and the G-lighting period of the frame period (N+1), a voltage of the video signal is V0 or V2. The amount of light transmitted through the liquid crystal element 603 is changed over time in accordance with the video signal.

Unless the absolute value of a potential difference between the first electrode and the second electrode of the liquid crystal element 603 changes, the liquid crystal element 603 has the same transmissivity (the amount of light transmitted through the liquid crystal element) regardless of the polarity of voltages applied to the first electrode and the second electrode of the liquid crystal element 603.

Therefore, when the polarity of a video signal is just inverted, the total amount of light transmitted through the liquid crystal element 603 is the same.

As described above, also when the display device used in the present invention employs a driving method in which the polarity of a video signal is inverted in every lighting period, the appropriate amount of light can be transmitted through the liquid crystal element 603.

In addition, when the display device used in the present invention employs a driving method in which the polarity of a video signal is inverted in every lighting period, a problem of burn-in in the liquid crystal element 603 can be effectively solved. This is because burn-in in the liquid crystal element 603 is easily caused since a voltage-applied state and a non-voltage-applied state are repeated in one frame period of the liquid crystal element 603, and further, burn-in in the liquid crystal element 603 is easily caused since a video signal in a voltage-applied state is the maximum or the minimum of a video signal of a general display device.

FIG. 9 shows the case where one frame period is divided into three lighting periods, but one frame period may also be divided into more than three lighting periods. Also when one frame period is divided into more than three lighting periods, the polarity of a video signal may be inverted in every lighting period.

Figure 57:
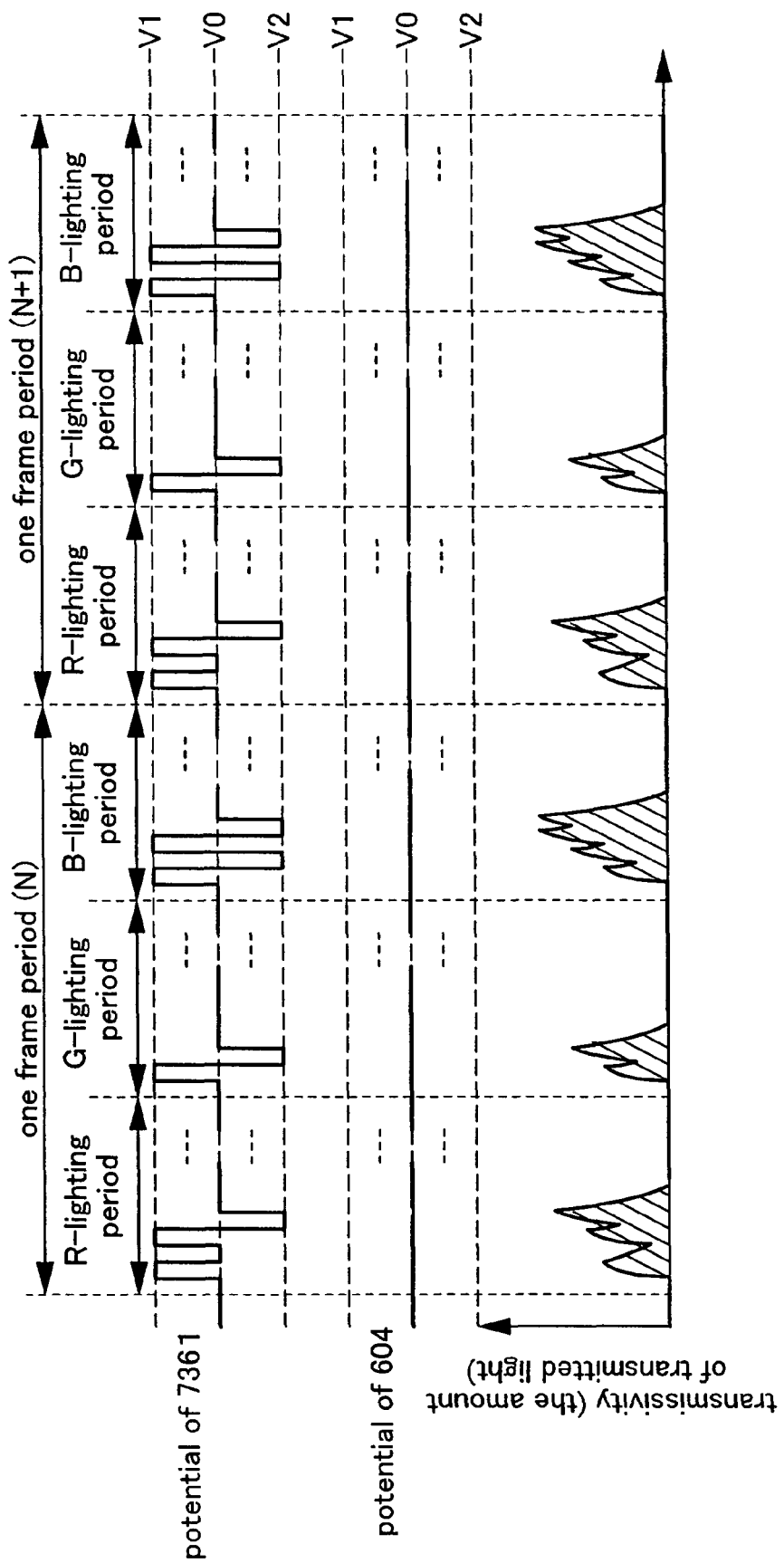
FIG. 57 is a diagram for explaining the present invention.

FIG. 57 shows a potential of the node 7361, a potential of the counter electrode 604, and the transmissivity of the liquid crystal element 603 (the amount of light transmitted through the liquid crystal element 603). In addition, FIG. 57 shows an even-numbered frame period (N) and an odd-numbered frame period (N+1). Each of the frame period (N) and the frame period (N+1) is divided into an R-lighting period, a O-lighting period, and a B-lighting period, similarly to FIGS. 7, 8, and 9. Each lighting period is divided into periods T1 to T6 and T0, similarly to FIGS. 7, 8 and 9, but they are not shown in FIG. 57.

The R-lighting period, the G-lighting period, and the B-lighting period are different only in that color components (wavelengths) of light which is transmitted through the liquid crystal element 603 are different. In the R-lighting period, light of a color component (wavelength) of R (red) is transmitted through the liquid crystal element 603. In the G-lighting period, light of a color component (wavelength) of G (green) is transmitted through the liquid crystal element 603. In the B-lighting period, light of a color component (wavelength) of B (blue) is transmitted through the liquid crystal element 603.

Each of the periods T1 to T6 contains a period in which a video signal is written into the pixel 505 and a period in which a video signal is held at the node 7361. That is, in a certain pixel 505, a selected state and a non-selected state are provided in each of the periods T1 to T6. Therefore, each of the periods T1 to T6 is a period after a selected state and before the next selected state of a certain pixel 505.

The period T0 is a period in one frame period other than the periods T1 to T6. It is desirable that the potential of the node 7361 be at an L level in the period T0. When the liquid crystal element 603 is a normally white liquid crystal element, the potential of the node 7361 may be set sufficiently higher or lower than that of the counter electrode 604 in the period T0.

In addition, FIG. 9 shows the case where the video signal is written six times in each lighting period, but the present invention is not limited thereto.

It is to be noted that a voltage of the video signal has three values, V0, V1, and V2. In addition, a potential difference between V0 and V1 (V1−V0) and a potential difference between V2 and V0 (V0−V2) are the same.

In the periods T1 to T6, a period in which a voltage of the video signal is V0 or V1 and a period in which a voltage of the video signal is V0 or V2 are sequentially repeated. That is, FIG. 57 shows inversion driving in each lighting period.

As described above, when the display device of the present invention employs inversion driving in each lighting period, higher gray scale levels can be expressed.

In addition, when the display device of the present invention employs inversion driving in a lighting period, a problem of burn-in in the liquid crystal element 603 can be effectively solved. This is because burn-in in the liquid crystal element 603 is easily caused since a voltage-applied state and a non-voltage-applied state are repeated in one frame period of the liquid crystal element 603, and further, burn-in in the liquid crystal element 603 is easily caused since a video signal in a voltage-applied state is the maximum or the minimum of a video signal of a general display device.

FIG. 57 shows the case where one frame period is divided into three lighting periods, but one frame period may also be divided into more than three lighting periods. Also when one frame period is divided into more than three lighting periods, the polarity of a video signal may be inverted in every lighting period.

Next, a timing chart in a case where video signals are written into a plurality of pixels will be explained with reference to FIG. 10.

Figure 10:
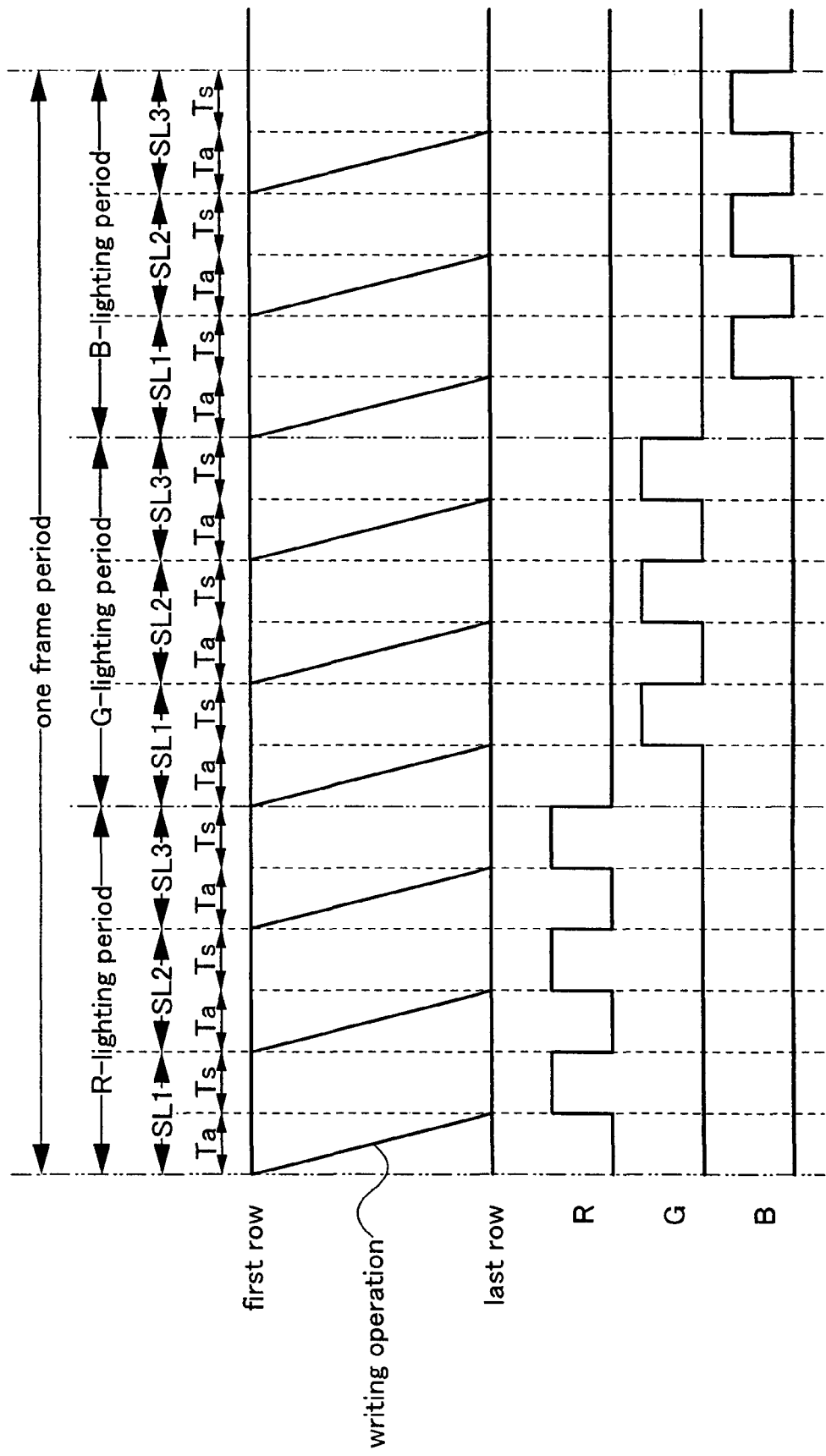
FIG. 10 is a diagram showing a timing chart of a backlight of the present invention.

FIG. 10 shows a timing chart in a case where one frame period is divided into an R-lighting period, a G-lighting period, and a B-lighting period, and further, each lighting period is divided into three sub-lighting periods (SL1, SL2, and SL3). It is to be noted that, as described above, a lighting period of a color other than R, G, and B may also be provided in one frame period, or one frame period may be divided into more than three lighting periods. In addition, each lighting period may be divided into more than three sub-lighting periods.

Further, in the timing chart of FIG. 10, each of a plurality of sub-lighting periods is divided into a writing period Ta and a display period Ts. In the writing period Ta, a gate signal line (scanning line) is scanned, and a video signal is written into each pixel. That is, a writing operation is performed. It is to be noted that light is not transmitted through the liquid crystal element in the writing period Ta. In the display period Ts, light of each color component (wavelength) is transmitted through all the liquid crystal elements, and an image is displayed on the display portion.

It is to be noted that the length of the display period Ts may be different in each sub-lighting period. When the length of the display period Ts is different in each sub-lighting period, further higher gray scale levels can be expressed. For example, when a relative ratio of the lengths of the display periods Ts in the sub-lighting periods is power of 2 such as 1:2:4:8 . . . , display with higher gray scale levels can be performed. In addition, a sub-lighting period with a higher relative ratio of the length of the display period Ts may be further divided into a plurality of periods such as 1:2:4:4 (split of 8):4 (split of 8) . . . . When a sub-lighting period with a larger relative ratio of the length of the display period Ts is divided into a plurality of periods, an image with less fluctuation such as flickers can be displayed.

The timing chart of FIG. 10 has a feature in that the sub-lighting period is divided into the writing period Ta and the display period Ts. This is because, when the sub-lighting period is divided into the writing period Ta and the display period Ts, disorder of alignment of the liquid crystal element in the writing period Ta does not influence display. In addition, since the writing period Ta (black display) is provided in each display period Ts (gray scale display), an image lag or blurs in moving image display can be suppressed, and the display performance of a moving image can be improved.

Figure 11:
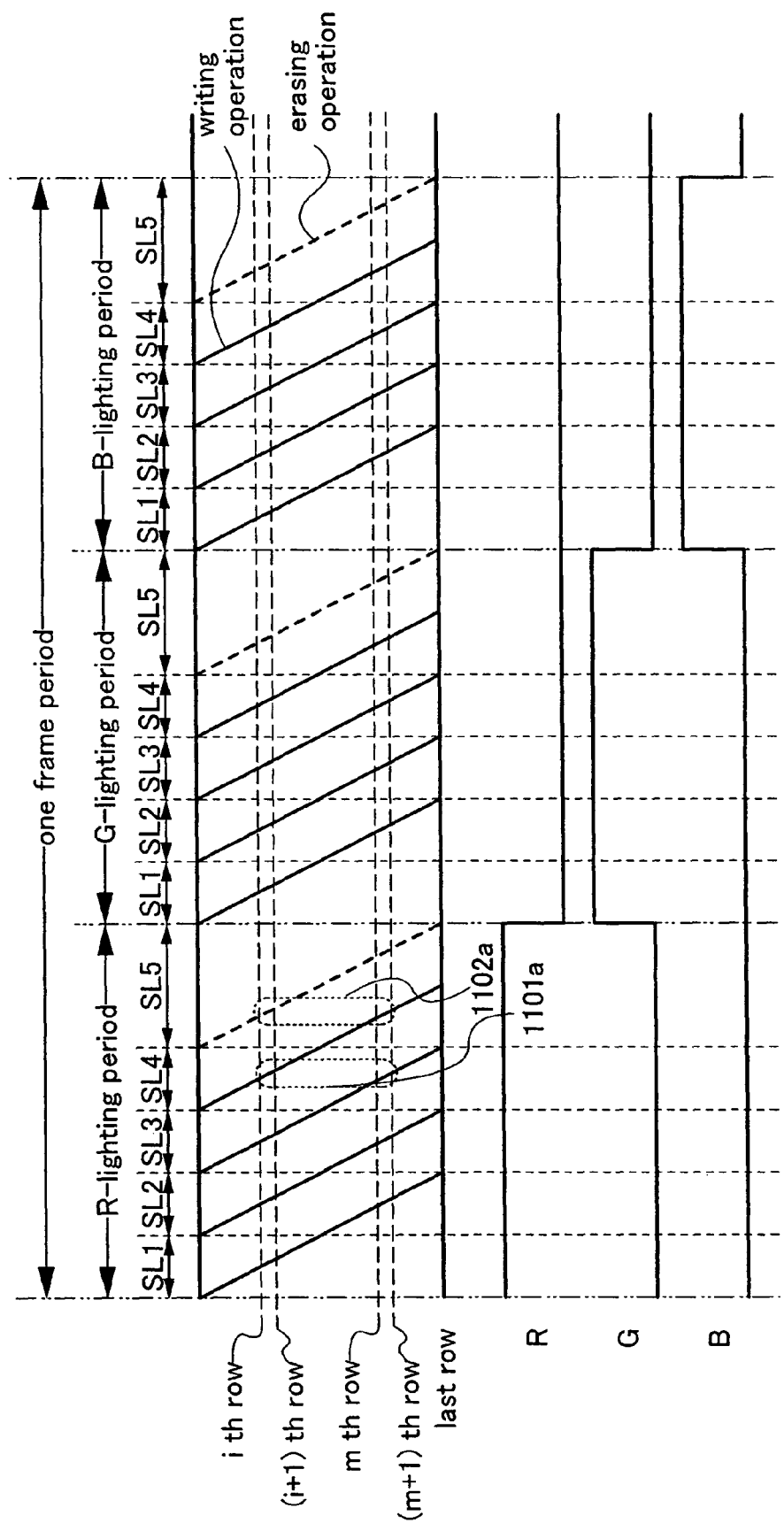
FIG. 11 is a diagram showing a timing chart of a backlight of the present invention.

Then, with reference to FIG. 11, the following will explain a timing chart, which is different from that of FIG. 10, in a case where a video signal is written into a plurality of pixels.

FIG. 11 shows a timing chart in a case where one frame period is divided into an R-lighting period, a G-lighting period, and a B-lighting period, and further, each lighting period is divided into five sub-lighting periods (SL1, SL2, SL3, SL4, and SL5). It is to be noted that, as described above, a lighting period of a color other than R, G, and B may be provided in one frame period, or one frame period may be divided into more than three lighting periods. In addition, each lighting period may be divided into more than five sub-lighting periods.

In the timing chart of FIG. 11, a writing operation is performed in the sub-lighting periods SL1 to SL4. In a writing operation, a gate signal line (scanning line) is scanned, and a video signal is written into each pixel. Further, in the timing chart of FIG. 11, an erasing operation is performed in the sub-lighting period SL5. In the erasing operation, the gate signal line (scanning line) is scanned, and a video signal which sets the transmissivity of the liquid crystal element at 0% or a power source potential is written into each pixel.

In addition, the next lighting period starts after an erasing operation of the sub-lighting period SL5 has been terminated in a certain lighting period. For example, a writing operation starts in the sub-lighting period SL1 of the G-lighting period after an erasing operation has been performed up through the last row in the sub-lighting period SL5 in the R-lighting period.

It is to be noted that the lengths of the sub-lighting periods SL1 to SL4 may be different. When the lengths of the sub-lighting periods SL1 to SL4 are different, higher gray scale levels can be expressed. For example, when a relative ratio of the lengths of the sub-lighting periods SL1 to SL4 is power of 2 such as 1:2:4:8 . . . , display with higher gray scale levels can be performed. In addition, a sub-lighting period with a higher relative ratio of the length of the display period may be further divided into a plurality of periods such as 1:2:4:4 (split of 8):4 (split of 8) . . . . When a sub-lighting period with a higher relative ratio of the length is divided into a plurality of periods, an image with less fluctuation such as flickers can be displayed.

It is to be noted that a blanking period may be provided after the sub-lighting period SL5. This is because the transmissivity of the liquid crystal element does not become 0% immediately after the erasing operation is terminated in the sub-lighting period SL5. With the blanking period, a writing operation in the next lighting period can be performed after the transmissivity of all the liquid crystal elements (in particular, the element in the last row) has certainly become 0%. Therefore, even though the response speed of the liquid crystal element is low, each of a plurality of pixels can express a correct gray scale.

It is to be noted that the writing operation in the sub-lighting period SL2 is started before the writing operation in the sub-lighting period SL1 is terminated. This is because, when the writing operation in the next sub-lighting period is started before the writing operation in a certain sub-lighting period is terminated, the sub-lighting period can be short. Therefore, the number of sub-lighting periods in each lighting period can be increased in the case where the writing operation in the next sub-lighting period is started before the writing operation in a certain sub-lighting period is terminated as compared to the case where the writing operation in the next sub-lighting period is started after the writing operation in a certain sub-lighting period has been terminated. In addition, by the increase in the number of the sub-lighting periods in each lighting period, higher gray scale levels can be expressed.

In order to realize the timing chart in FIG. 11, a driving method in which one gate selection period is divided into the first half and second half sub-gate selection periods is used. For example, in this driving method, a writing operation of the sub-lighting period SL1 is performed in the first half sub-gate selection period, and a writing operation of the sub-lighting period SL2 is performed in the second half sub-gate selection period. It is to be noted that, in the erasing operation of the sub-lighting period SL5, the liquid crystal element can have a transmissivity of 0% by input of a video signal having the same potential as that of the counter electrode to a pixel. Alternatively, a power source potential may be input to the pixel as shown in FIGS. 14A and 14B.

It is to be noted that one gate selection period may be divided into three sub-gate selection periods. When one gate selection period is divided into three sub-gate selection periods, writing operations in three sub-lighting periods can be performed at the same time. Therefore, the number of the sub-lighting periods in each lighting period can be increased; thus, higher gray scale level display can be performed.

In the timing chart in FIG. 11, in each lighting period, light of color components each corresponding to its respective lighting period (R, G, and B in the case of FIG. 11) is always transmitted through the liquid crystal element. Therefore, in the display device which performs the operation of FIG. 11, it is not necessary to control light (light source) which is transmitted through the liquid crystal element in a complicated manner; thus, a control circuit of light (light source) which is transmitted through the liquid crystal element can be comparatively smaller.

Figure 12:
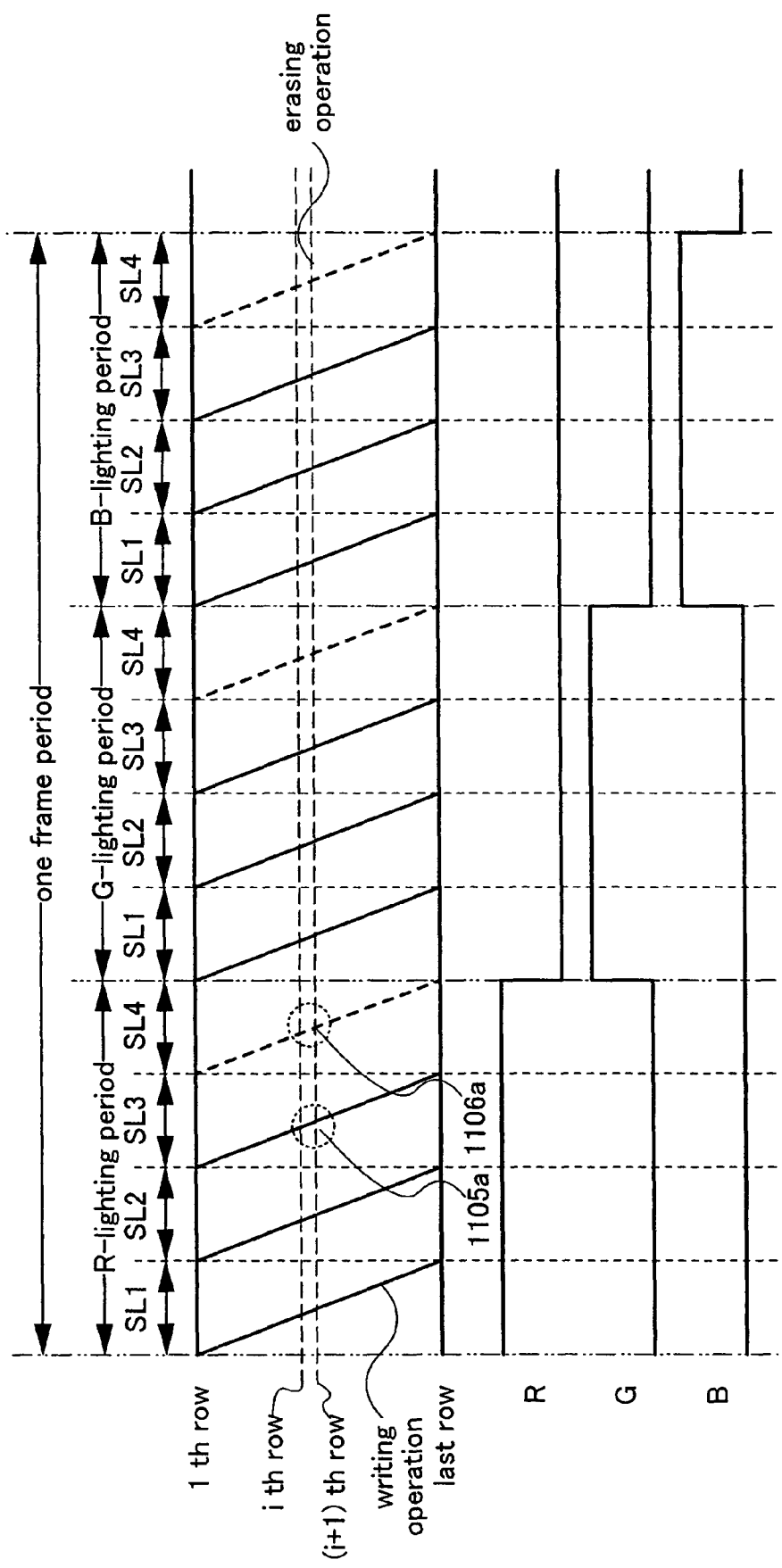
FIG. 12 is a diagram showing a timing chart of a backlight of the present invention.

As shown in FIG. 12, after a writing operation in a certain sub-lighting period has been terminated, a writing operation in the next sub-lighting period may be started. When the writing operation in the next sub-lighting period is started after the writing operation in a certain sub-lighting period has been terminated, it is not necessary to divide one gate selection period into two sub-gate selection periods, and the driving portion 102 can have a comparatively simple configuration.

Figure 53:
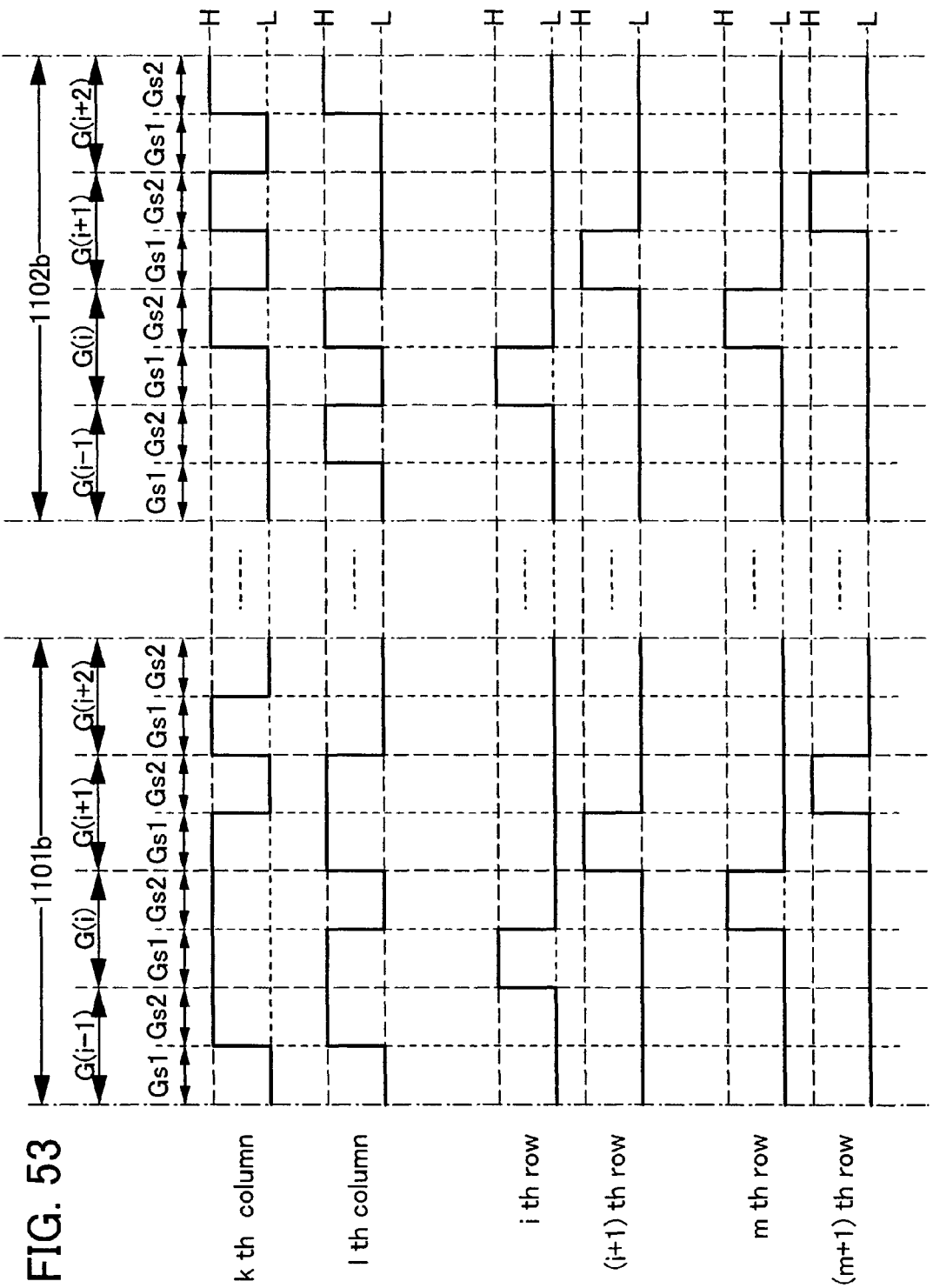
FIG. 53 is a diagram for explaining the present invention.

Here, with reference to FIG. 53, the following will explain a timing chart of scanning signals, which are supplied to a gate signal line in the i th row, a gate signal line in the (i+1) th row, a gate signal line in the m th row, and a gate signal line in the (m+1) th row shown in FIG. 11, and video signals, which are supplied to a source signal line in the k th column and a source signal line in the l th column. The timing chart shown in FIG. 53 is a timing chart in a case where attention is paid to time 1101a and time 1102a of FIG. 11. It is to be noted that i, m, k, and l are each an integer that is 1 or more. In addition, a relation between i and m is i<m.

In the timing chart of FIG. 11, when attention is paid to the time 1101a, the writing operation in the sub-lighting period SL3 and the writing operation in the sub-lighting period SL4 are performed at the same time. Therefore, one gate selection period is divided into two periods. As shown in a period 1101b of FIG. 53, one gate selection period G is divided into a sub-gate selection period Gs1 and a sub-gate selection period Gs2. Thus, in one gate selection period G(i), a gate signal line in the i th row is selected in the sub-gate selection period Gs1, and a gate signal line in the m th row is selected in the sub-gate selection period Gs2. In one gate selection period G(i+1), a gate signal line in the i+1 th row is selected in the sub-gate selection period Gs1, and a gate signal line in the m+1 th row is selected in the sub-gate selection period Gs2. In each sub-gate selection period, a video signal is supplied to the source signal line, whereby the video signal can be supplied to the pixel. It is to be noted that an erasing operation can be performed in the sub-gate selection period Gs1 by input of an L signal to the pixel as in a period 1102b.

Figure 56:
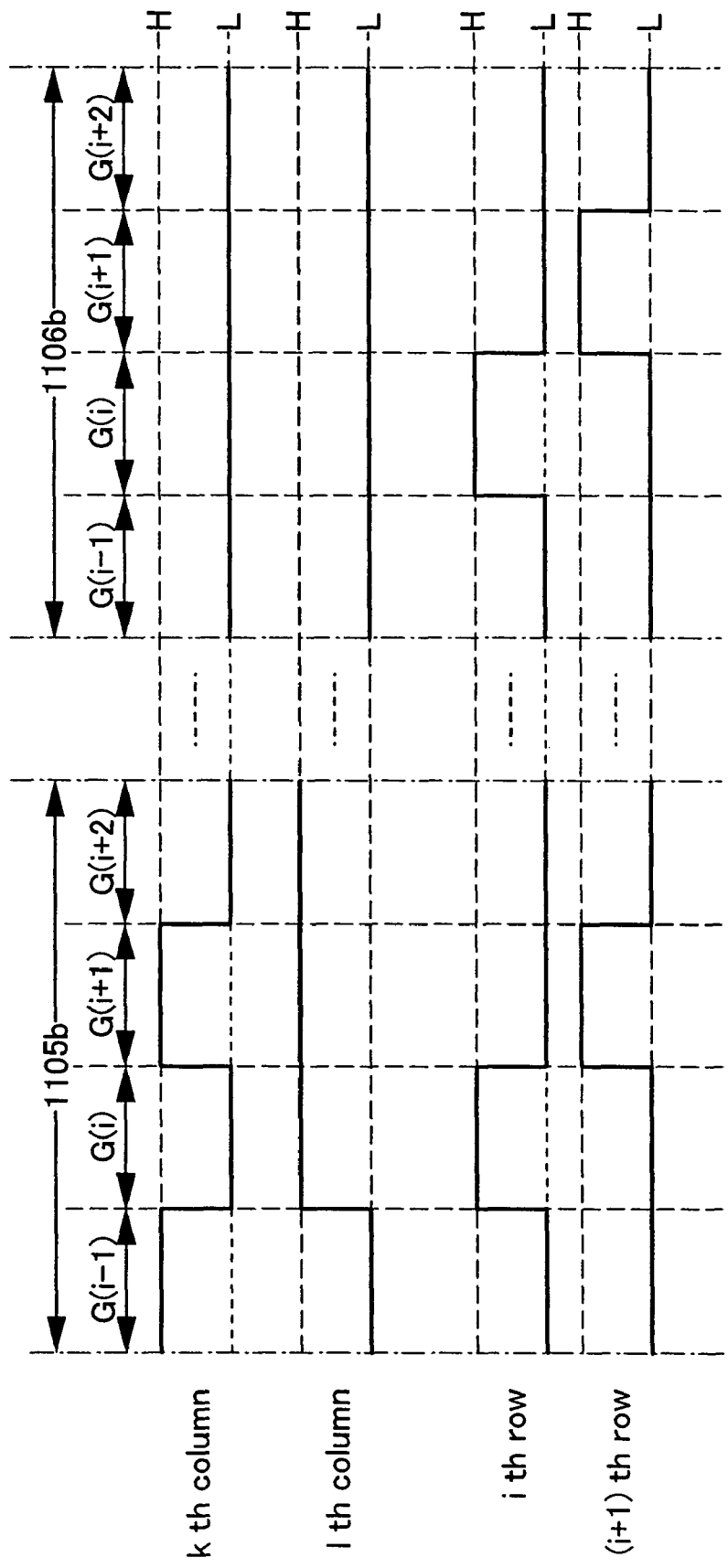
FIG. 56 is a diagram for explaining the present invention.

There is also a case, as shown in FIG. 12, where writing operations are not performed at the same time also when attention is paid to a certain time. FIG. 56 shows a timing chart in which attention is paid to time 1105a and time 1106a in such a case.

Figure 13:
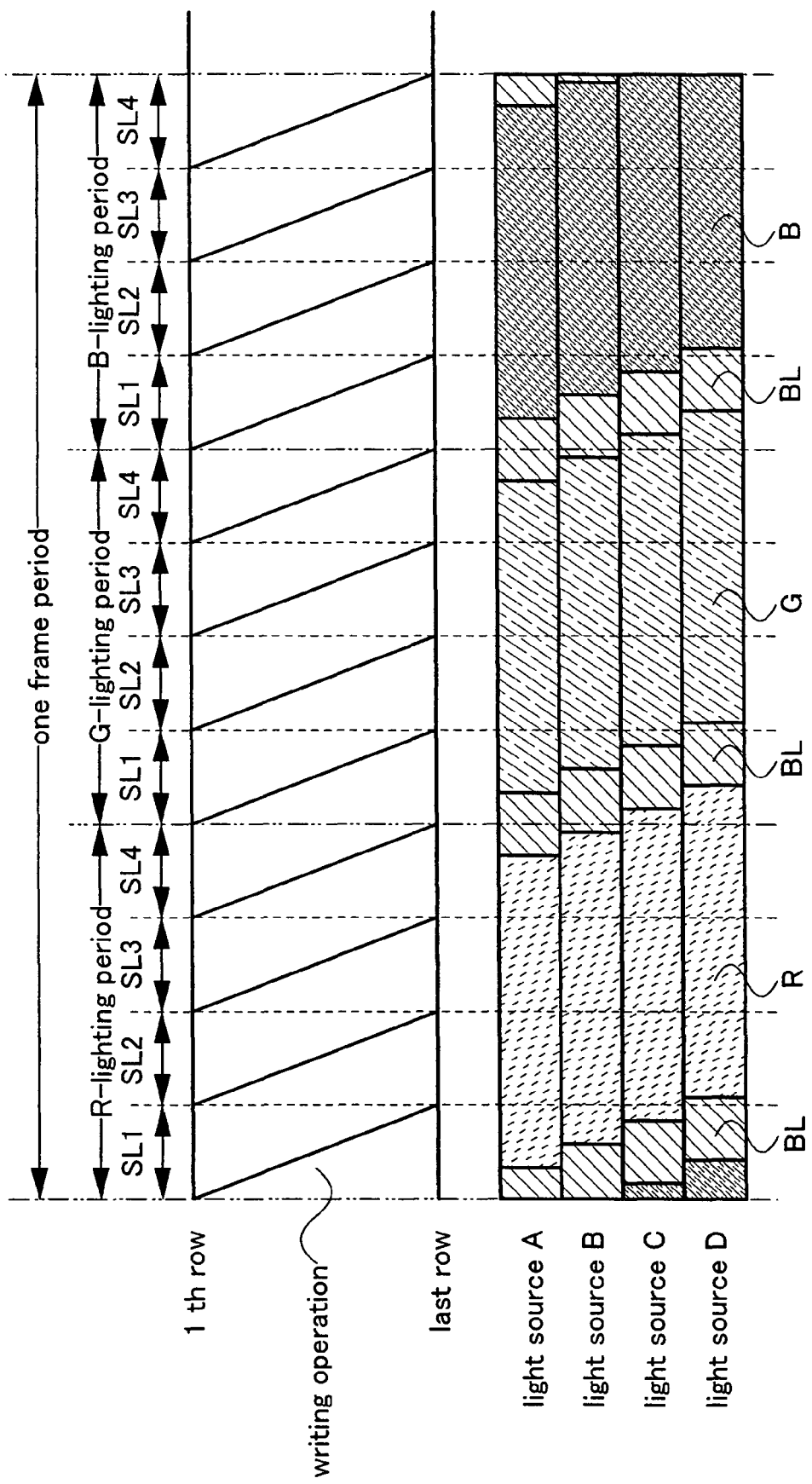
FIG. 13 is a diagram showing a timing chart of a backlight of the present invention.

Next, with reference to FIG. 13, the following will explain a timing chart, which is different from those of FIGS. 11 and 12, in a case where video signals are written into a plurality of pixels.

FIG. 13 shows a timing chart in a case where one frame period is divided into an R-lighting period, a G-lighting period, and a B-lighting period, and further, each lighting period is divided into four sub-lighting periods (SL1, SL2, SL3, and SL4). It is to be noted that, as described above, a lighting period of a color other than R, G, and B may be provided in one frame period, or one frame period may be divided into more than three lighting periods. In addition, each lighting period may be divided into more than four sub-lighting periods.

In the timing chart of FIG. 13, a writing operation is performed in the sub-lighting periods SL1 to SL4. In the writing operation, a gate signal line (scanning line) is scanned, and a video signal is written into each pixel.

The timing chart of FIG. 13 has a feature in that light of each color component is not transmitted through the liquid crystal element in a row in which a writing operation is performed in the sub-lighting period SL1. For example, a case is considered, where a light source in a region to which writing of video data is performed is divided into four regions, a light source A, a light source B, a light source C, and a light source D, and the light sources A to D are sequentially lighted. In this case, the light source A can be made in a blanking (BL) period, and the blanking period is a period from starting to terminating a writing operation to a pixel in a region where light from the light source A is transmitted. This is because, when light of each color component is not transmitted through the liquid crystal element, it is not necessary to perform an erasing operation to a plurality of pixels in a row in which a writing operation is performed in the sub-lighting period SL1. Then, the light source B can be made in a blanking period, and the blanking period is a period from starting to terminating a writing operation to a pixel in a region where light from the light source B is transmitted. Similarly, the light sources C and D can be made in a blanking period, and the blanking period is a period from starting to terminating a writing operation to a pixel in a region where light from the light sources C and D is transmitted. Therefore, the period used for the erasing operation in each lighting period can be used for a writing operation; thus, the number of sub-lighting periods in each lighting period can be further increased, and higher gray scale level display can be performed.

Figure 54:
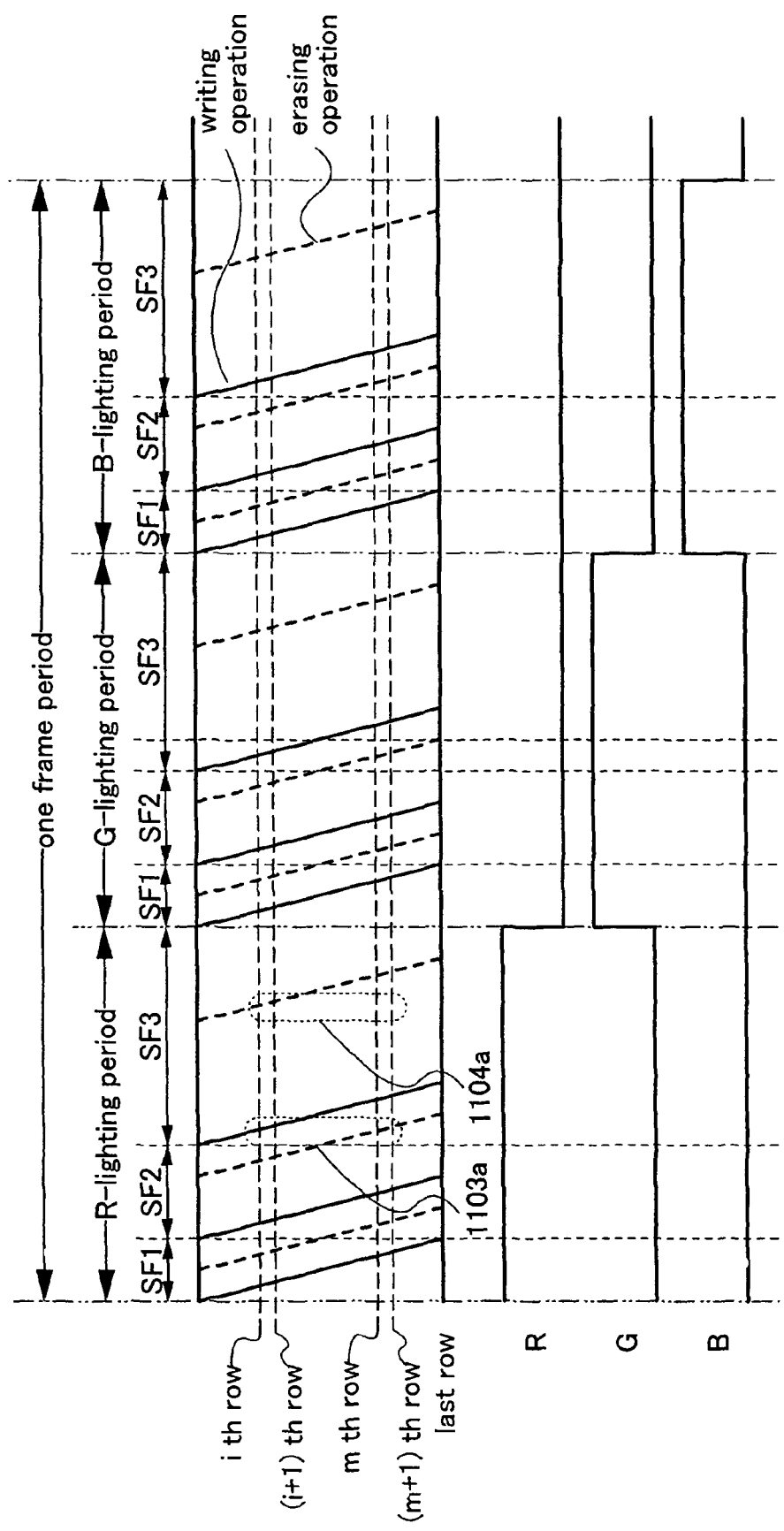
FIG. 54 is a diagram for explaining the present invention.

Next, with reference to FIG. 54, the following will explain a timing chart, which is different from those of FIGS. 11, 12, and 13, in a case where a video signal is written into a plurality of pixels.

FIG. 54 shows a timing chart in a case where one frame period is divided into an R-lighting period, a G-lighting period, and a B-lighting period, and further, each lighting period is divided into three sub-lighting periods (SL1, SL2, and SL3). It is to be noted that, as described above, a lighting period of a color other than R, G, and B may be provided in one frame period, or one frame period may be divided into more than three lighting periods. In addition, each lighting period may be divided into more than three sub-lighting periods.

The timing chart in FIG. 54 has a feature in that an erasing operation is performed after a writing operation in the sub-lighting period SL1. In a display device using the timing chart in FIG. 54, an interval between the writing operation and the erasing operation is changed; therefore, the number of gray scale levels to be expressed can be increased.

Figure 55:
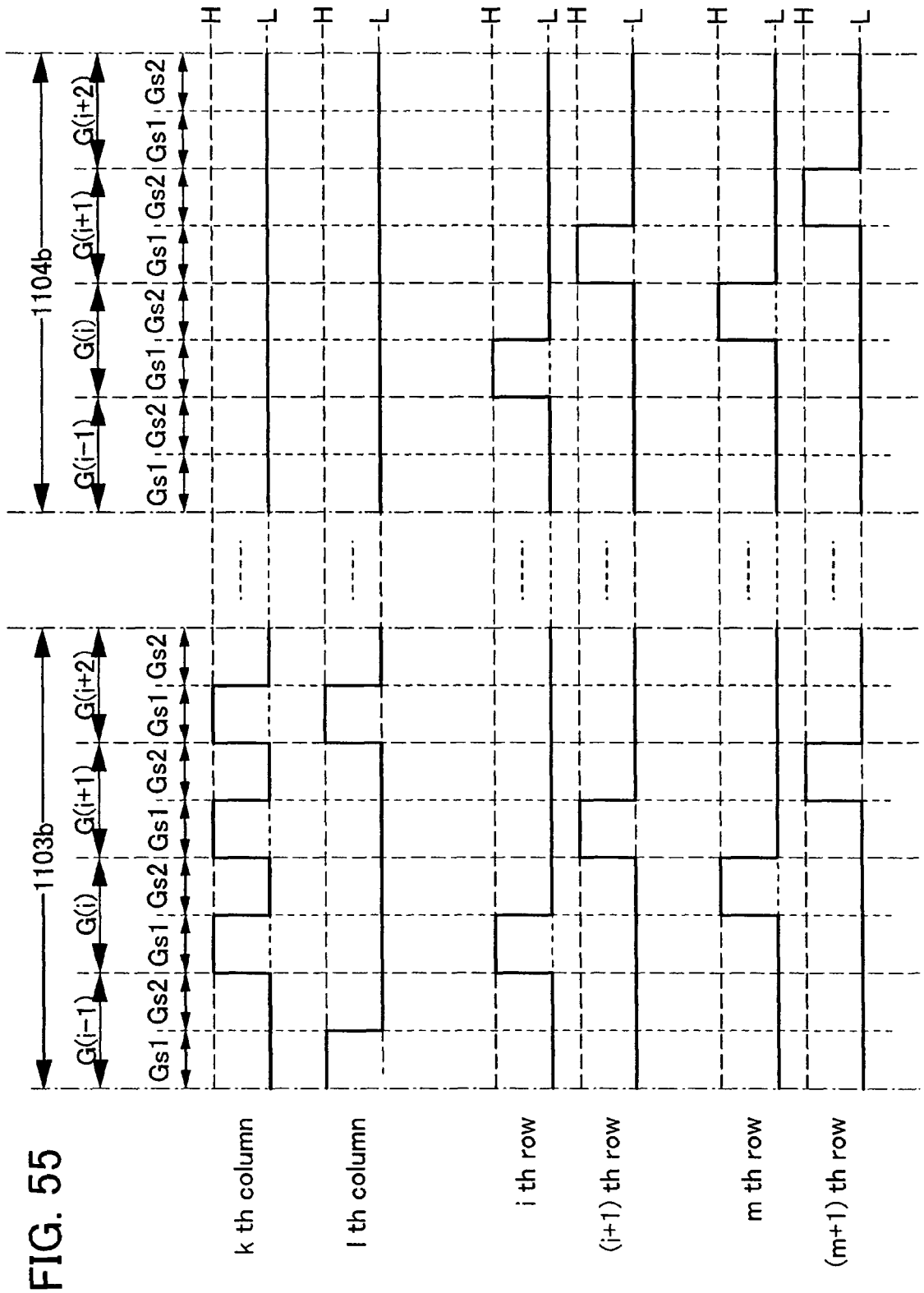
FIG. 55 is a diagram for explaining the present invention.

FIG. 55 shows a timing chart of scanning signals which are supplied to a gate signal line in the (i+1) th row, a gate signal line in the m th row, and a gate signal line in the (m+1) row, and video signals which are supplied to a source signal line in the k th column and a source signal line in the 1 th column, when attention is paid to time 1103a and time 1104a.

FIG. 55 shows a period 1103b and a period 1104b when attention is paid to the time 1103a and the time 1104a. Similarly to the timing chart in FIG. 53, one gate selection period is divided into two sub-gate selection periods. In one of the sub-gate selection periods, a video signal is at an L level, and an erasing operation is performed.

(Configuration of a Driving Portion Used in the Present Invention)

A detailed configuration and an operation of the driving portion 102 shown in FIG. 1 will be explained. In particular, a detailed configuration of the source driver 501 and the gate driver 502 will be explained.

A detailed configuration and an operation of the source driver 501 will be explained with reference to FIG. 15. The source driver in FIG. 15 has a configuration example to output two values, an H level and an L level, to a source signal line.

Figure 15:
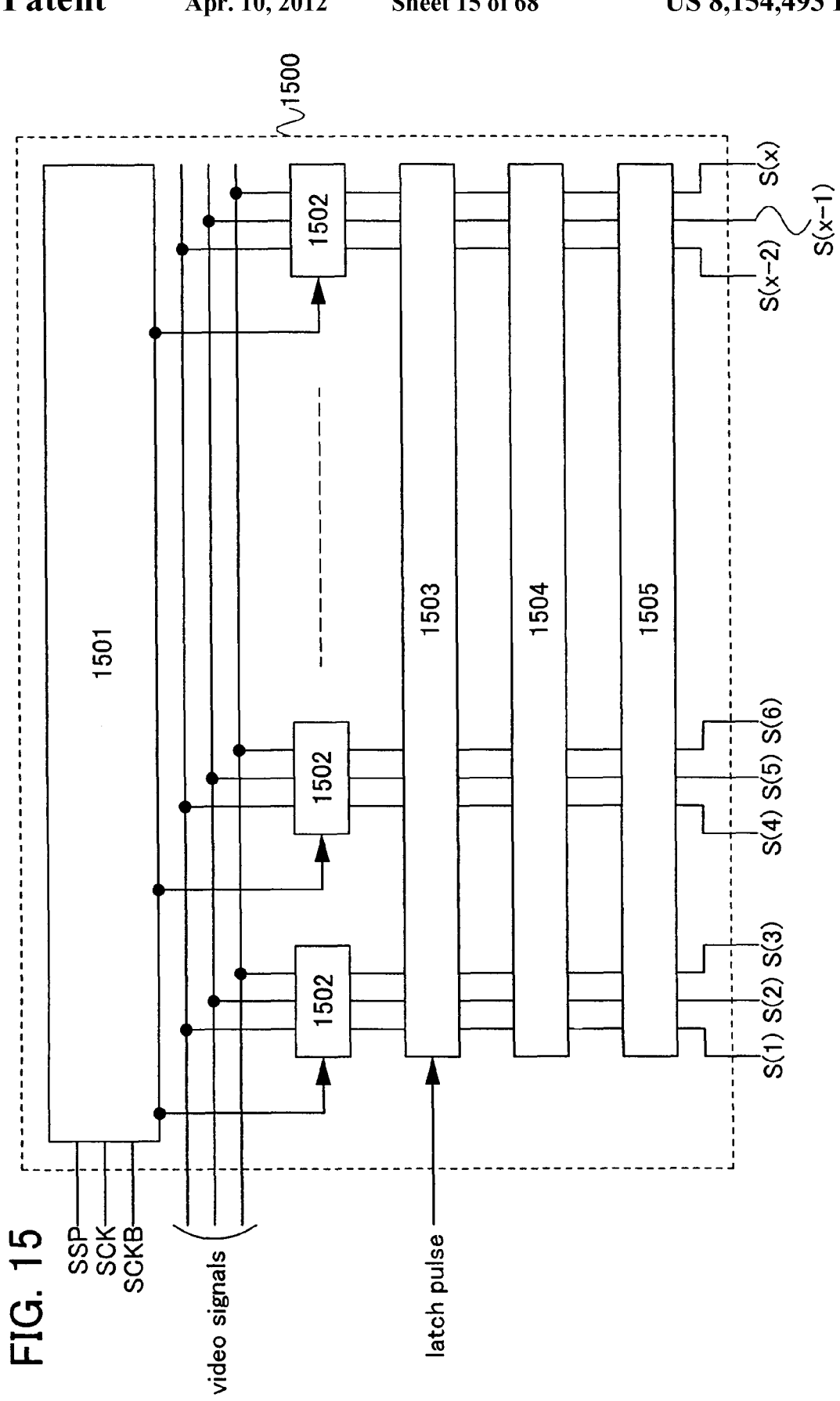
FIG. 15 is a diagram showing a configuration of a source driver of the present invention.

A source driver 1500 in FIG. 15 includes a shift register 1501, first latch circuits 1502, a second latch circuit 1503, a level shifter 1504, and a buffer portion 1505.

Output terminals of the shift register 1501 and a plurality of video signal lines are connected to input terminals of the first latch circuits 1502. Output terminals of the first latch circuits 1502 are connected to input terminals of the second latch circuit 1503. Output terminals of the second latch circuit 1503 are connected to input terminals of the level shifter 1504. Output terminals of the level shifter 1504 are connected to input terminals of the buffer portion 1505. Output terminals of the buffer portion 1505 are connected to source signal lines S(1) to S(x).

A source driver start pulse (SSP), a source driver clock signal (SCK), an inverted source driver clock signal (SCKB), and the like are supplied to the shift register 1501. The shift register 1501 sequential selects the first latch circuits 1502.

The first latch circuit 1502 latches three video signals at the same time sequentially in accordance with an output signal of the shift register 1501. It is to be noted that, although three video signal lines and video signals are used, the present invention is not limited thereto, and any number of video signal lines and video signals may be used. When latch operations of video signals in all the columns have been terminated, the first latch circuits 1502 in all the columns output video signals to the second latch circuit 1503 at the same time.

The second latch circuit 1503 latches video signals supplied from the first latch circuits 1502 at the same time in all the columns. The second latch circuit 1503 latches the video signals in accordance with latch pulses. The latch pulse may be SSP supplied to the shift register 1501 or an output signal of the last stage of the shift register 1501. It is to be noted that the second latch circuit 1503 outputs a latched video signal to the level shifter 1504 except when the video signal is latched.

The level shifter 1504 performs level shift of the video signal supplied from the second latch circuit 1503. The level shifter 1504 outputs the level-shifted video signal to the source signal line through the buffer portion 1505.

Next, with reference to FIG. 16, a detailed configuration and an operation of a source driver which are different from those of FIG. 15 will be explained. A source driver in FIG. 16 has a configuration example for outputting three values to a source signal line. The source driver in FIG. 16 can perform source inversion driving, line inversion driving, and dot inversion driving.

Figure 16:
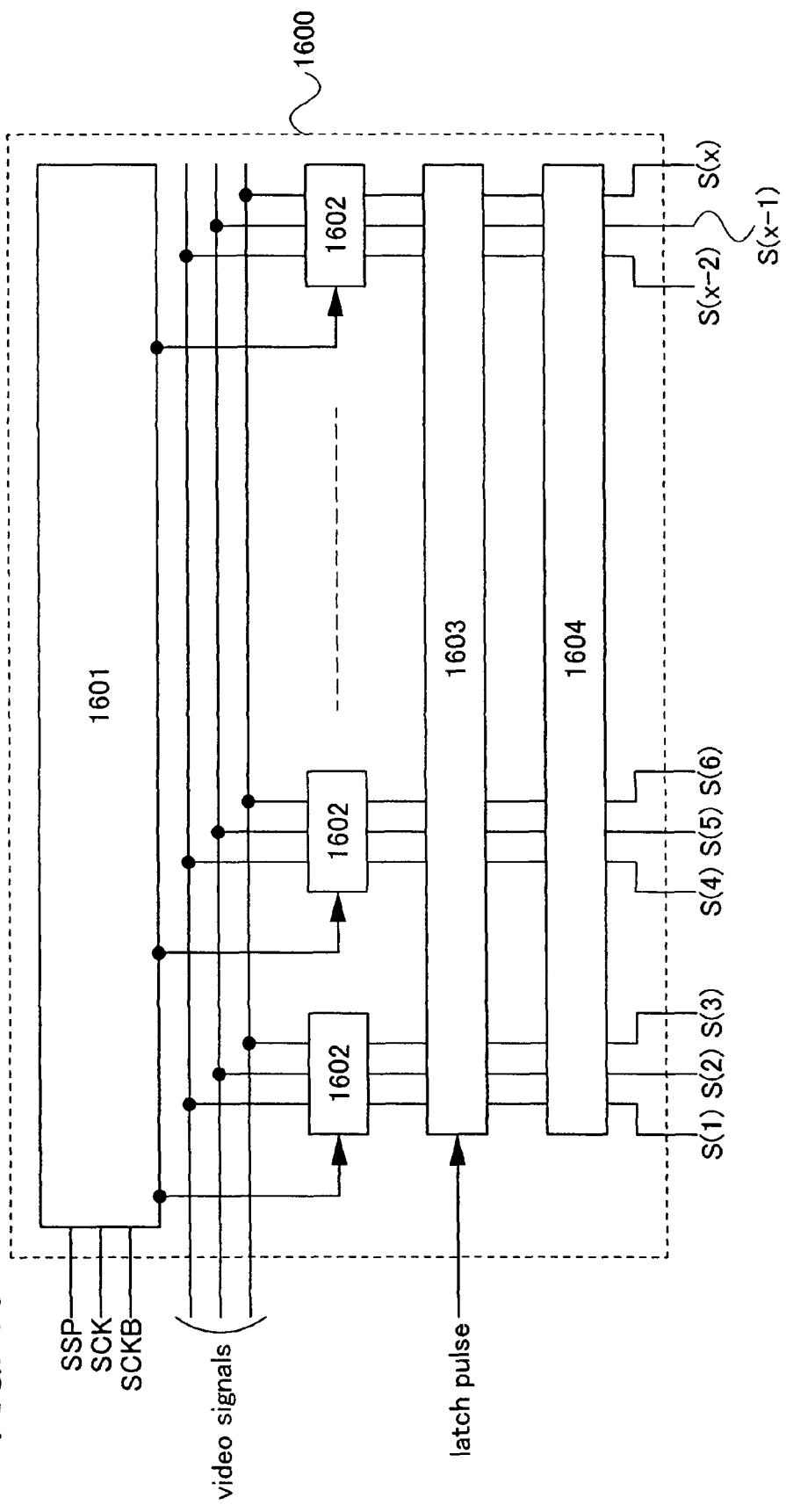
FIG. 16 is a diagram showing a configuration of a source driver of the present invention.

The source driver 1600 in FIG. 16 includes a shift register 1601, first latch circuits 1602, a second latch circuit 1603, and an inversion driving portion 1604.

Output terminals of the shift register 1601 and a plurality of video signal lines are connected to input terminals of the first latch circuits 1602. Output terminals of the first latch circuits 1602 are connected to input terminals of the second latch circuit 1603. Output terminals of the second latch circuit 1603 are connected to input terminals of the inversion driving portion 1604. Output terminal of the inversion driving portion 1604 are connected to source signal lines S(1) to S(x).

The shift register 1601, the first latch circuits 1602, and the second latch circuit 1603 can employ circuits similar to the shift register 1501, the first latch circuits 1502, and the second latch circuit 1503 in FIG. 15.

The inversion driving portion 1604 converts the video signal (binary value) supplied from the second latch circuit 1603 to ternary video signals in accordance with source inversion driving, line inversion driving, and dot inversion driving. The inversion driving portion 1604 supplies ternary video signals to the source signal lines.

A detailed configuration of the inversion driving portion 1604 will be explained with reference to FIG. 17. The inversion driving portion 1604 in FIG. 17 includes a level shifter 1701, a level shifter 1702, a level shifter 1703, a transistor 1704, a transistor 1705, a transistor 1706, a transistor 1707, an inverter 1708, an inverter 1709, and an analog switch 1710.

A control signal is supplied to a wiring 1711, a power source potential V3 is supplied to a wiring 1712, a power source potential V1 is supplied to a wiring 1713, a power source potential V2 is supplied to a wiring 1713, and a power source potential V0 is supplied to a wiring 1714. In the control signal supplied to the wiring 1711, an H signal potential is equivalent to the power source potential V1, and an L signal potential is equivalent to the power source potential V2. The power source potential V1 is higher than a potential of an H level video signal, the power source potential V2 is lower than a potential of an L level video signal, and the power source potential V0 is lower than a potential of an H level video signal and higher than a potential of an L level video signal. In addition, the power source potential V0 is equivalent to the potential of the counter electrode 604.

The level shifter 1701 makes a potential of an H level video signal equivalent to the power source potential V1 and outputs the video signal to a gate of the transistor 1705. The level shifter 1702 makes a potential of an L level video signal equivalent to the power source potential V2 and outputs the video signal to a gate of the transistor 1706 through the inverter 1708. The level shifter 1703 makes a potential of an H level video signal equivalent to the power source potential V1, makes a potential of an L level video signal equivalent to the power source potential V2, and outputs the video signals to the analog switch 1710. It is to be noted that the transistor 1705 and the transistor 1706 are controlled at the same time to be turned on or off. When the transistor 1705 and the transistor 1706 are turned on, the analog switch 1710 is turned off, whereas, when the transistor 1705 and the transistor 1706 are turned off, the analog switch 1710 is turned on. It is to be noted that one of the transistor 1704 and the transistor 1707 is turned on, and the other is turned off.

The level shifter 1701, the level shifter 1702, and the level shifter 1703 may output input video signals after inverting their H/L levels.

Figure 17:
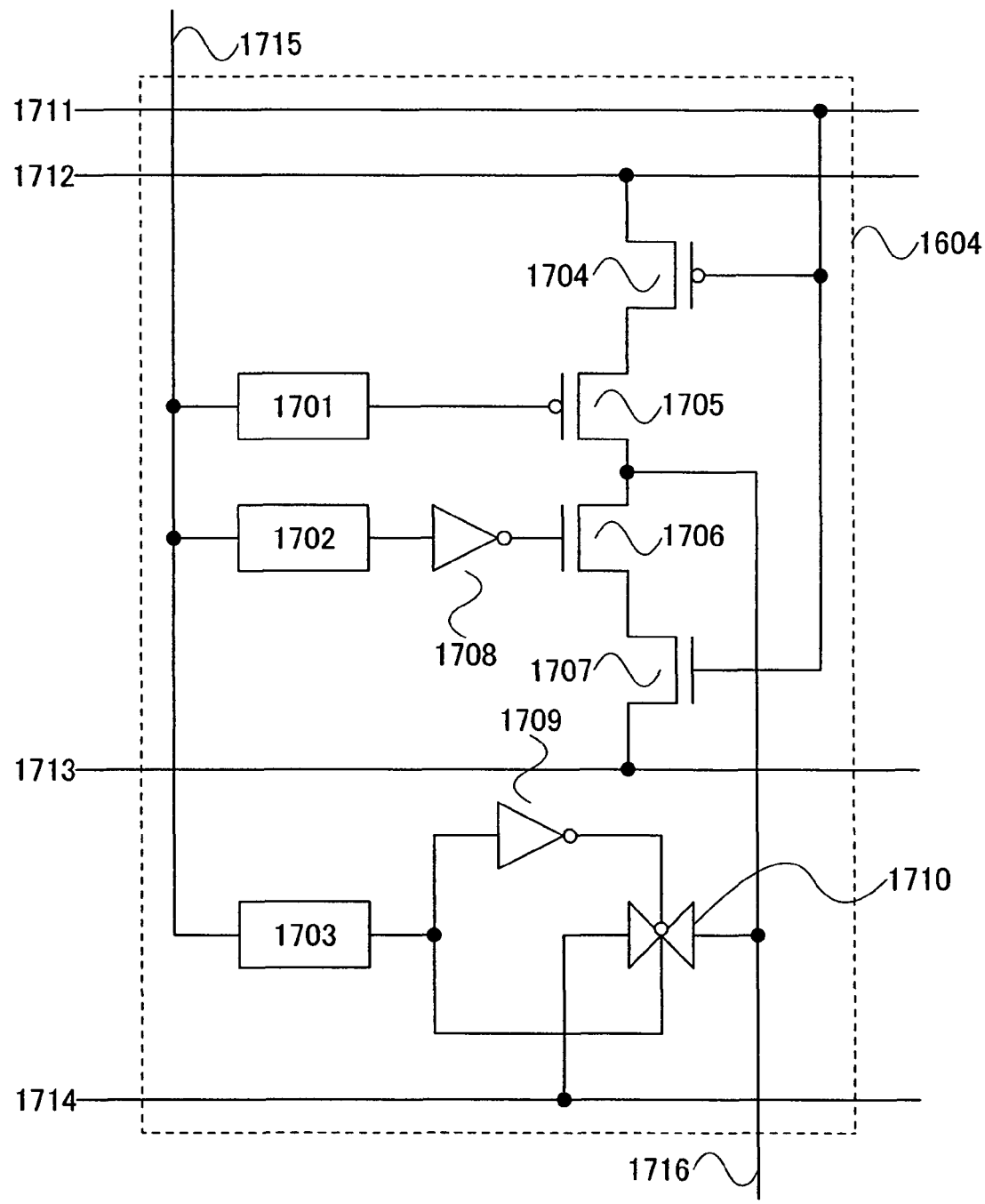
FIG. 17 is a diagram showing an inversion driving portion shown in FIG. 16.

When a control signal is supplied to the wiring 1711 which is inverted in every row, a display device using the inversion driving portion 1604 in FIG. 17 can easily perform source line inversion driving.

Therefore, it is determined by the video signal whether the power source potential V0 supplied to the wiring 1714 is supplied to the wiring 1716 (source signal line) through the analog switch 1710, or whether the power source potential V3 supplied to the wiring 1712 or the power source potential V2 supplied to the wiring 1713 is supplied to the wiring 1716. Further, it is determined by the control signal supplied to the wiring 1711 whether the power source potential V1 supplied to the wiring 1712 is supplied to the wiring 1716, or whether the power source potential V2 supplied to the wiring 1713 is supplied to the wiring 1716.

Figure 18:
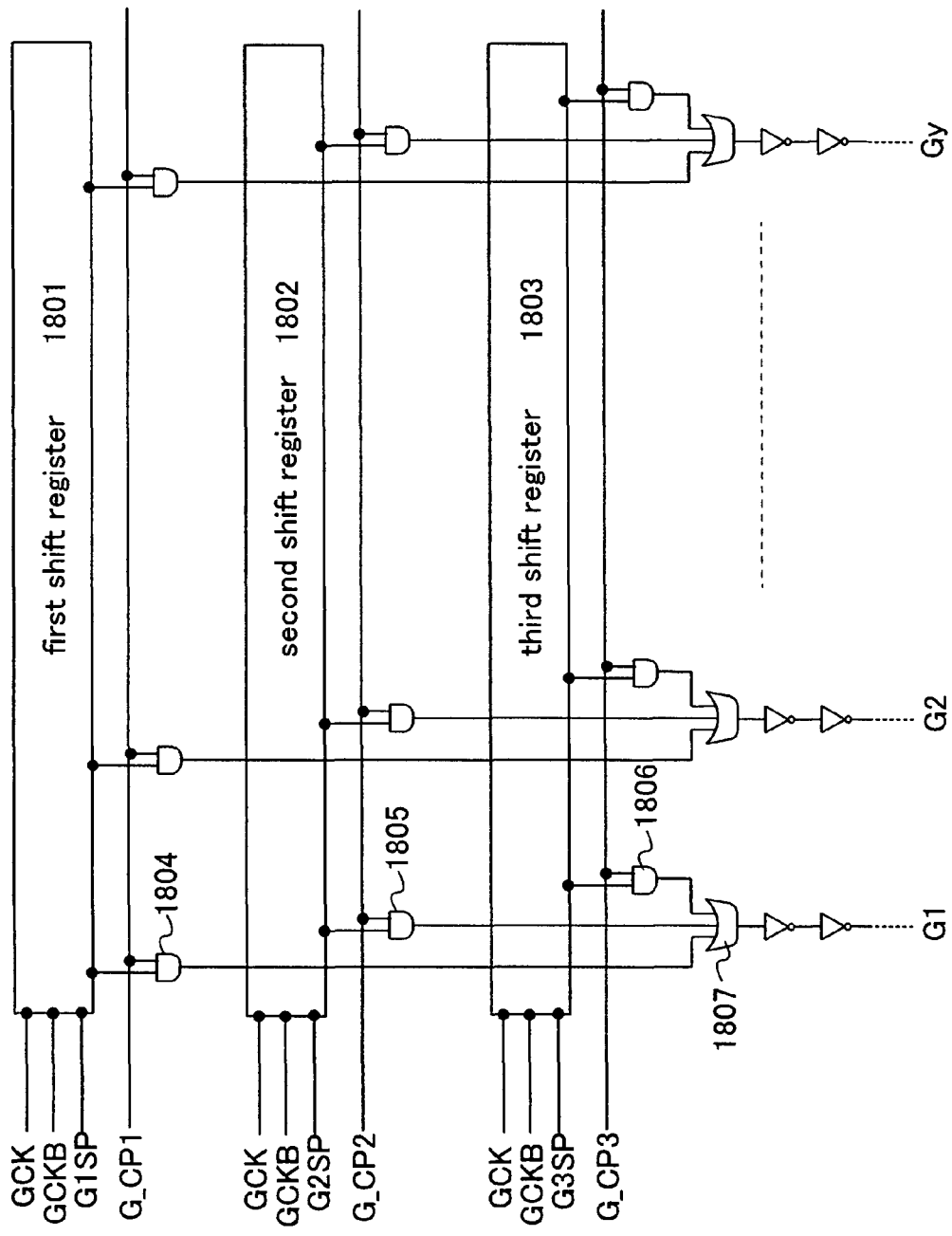
FIG. 18 is a diagram showing a configuration of a gate driver of the present invention.

Next, an example of the gate driver will be explained with reference to FIG. 18.

The gate driver includes a first shift register 1801, a second shift register 1802, a third shift register 1803, AND circuits 1804, AND circuits 1805, AND circuits 1806, and OR circuits 1807. GCK, GCKB, and GLSP are input to the first shift register 1801, GCK, GCKB, and G2SP are input to the second shift register 1802, and GCK, GCKB, and G3SP are input to the third shift register 1803. Outputs of the first shift register 1801 and G_CP1 are connected to inputs of the AND circuits 1804, outputs of the second shift register 1802 and G_CP2 are connected to inputs of the AND circuits 1805, and outputs of the third shift register 1803 and G_CP3 are connected to inputs of the AND circuits 1806. Outputs of the AND circuits 1804, 1805, and 1806 are connected to the OR circuits 1807. A combination of the outputs of the first shift register 1801, the second shift register 1802, and the third shift register 1803, with signals of G_CP1, G_CP2, and G_CP3 determines to which gate signal line Gy in which stage a signal is output. With the configuration of FIG. 18, three sub-gate selection periods can be provided. However, the number of the shift registers is not specifically limited, and the number of the sub-gate selection periods is not specifically limited, either.

Next, an example of a gate driver which is different from that of FIG. 18 will be explained with reference to FIG. 19.

The gate driver includes NAND circuits each having four input terminals, inverter circuits, a level shifter 1905, and a buffer circuit 1906. Four signals selected from a signal of a first input terminal 1901, a signal of a second input terminal 1902, a signal of a third input terminal 1903, a signal of a fourth input terminal 1904, an inverted signal of the first input terminal 1901, an inverted signal of the second input terminal 1902, an inverted signal of the third input terminal 1903, and an inverted signal of the fourth input terminal 1904 are input to each NAND circuit having four input terminals. An output of the NAND circuit having four input terminals is connected to an input of the inverter circuit, and an output of the inverter circuit is connected to an input of the level shifter 1905. An output of the level shifter 1905 is connected to an input of the buffer circuit 1906, and an output of the buffer circuit 1906 is connected to a pixel as a gate line.

Figure 19:
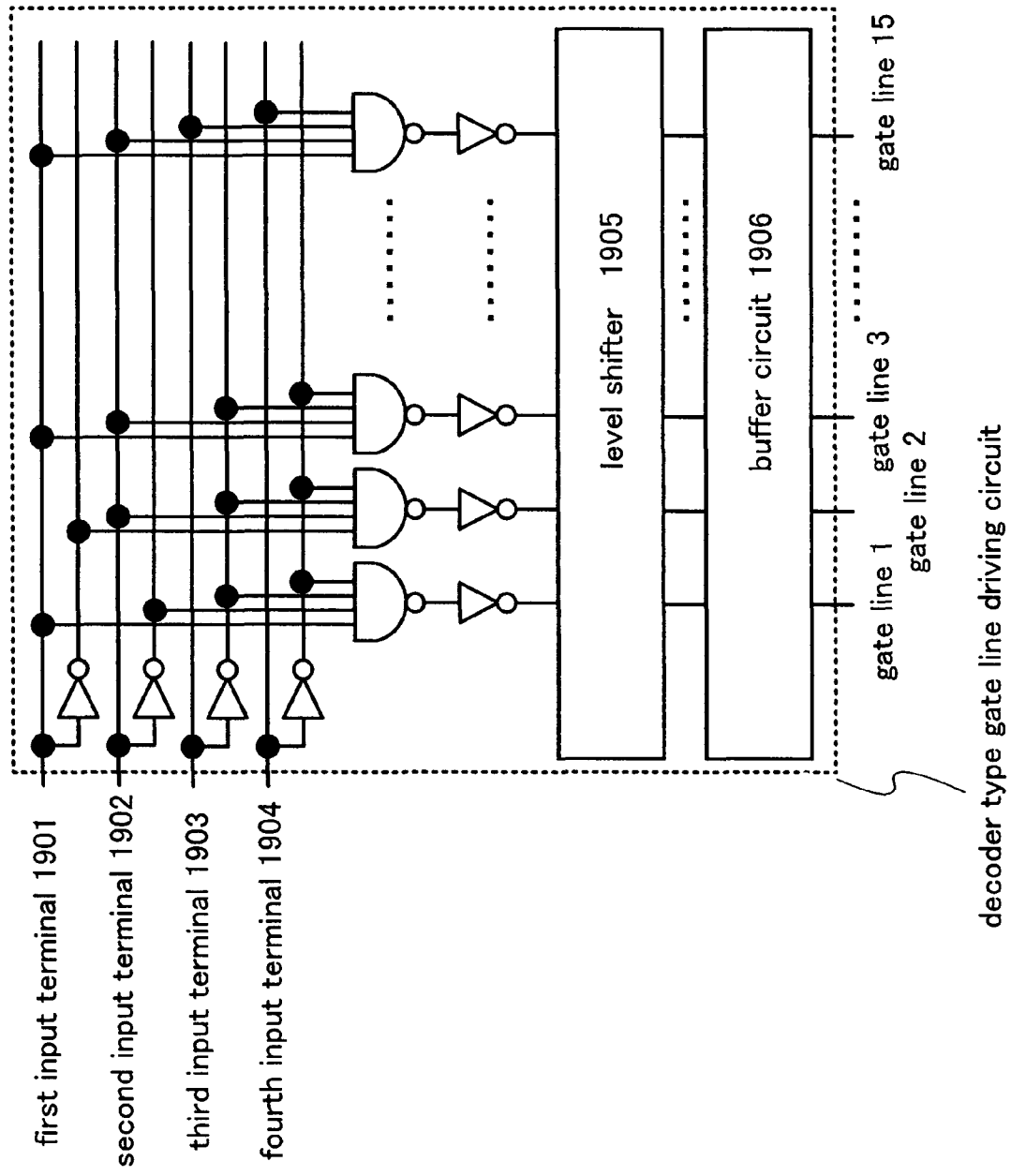
FIG. 19 is a diagram showing a configuration of a gate driver of the present invention.

Different combinations of the signals are input to the NAND circuits each having four input terminals, and with the configuration shown in FIG. 19, 16 kinds of outputs can be controlled.

(Configuration of a Backlight Unit Used in the Present Invention)

A detailed configuration and an operation of the backlight unit 105 and the backlight controller 104 shown in FIG. 1 will be explained with reference to FIG. 20.

Figure 20:
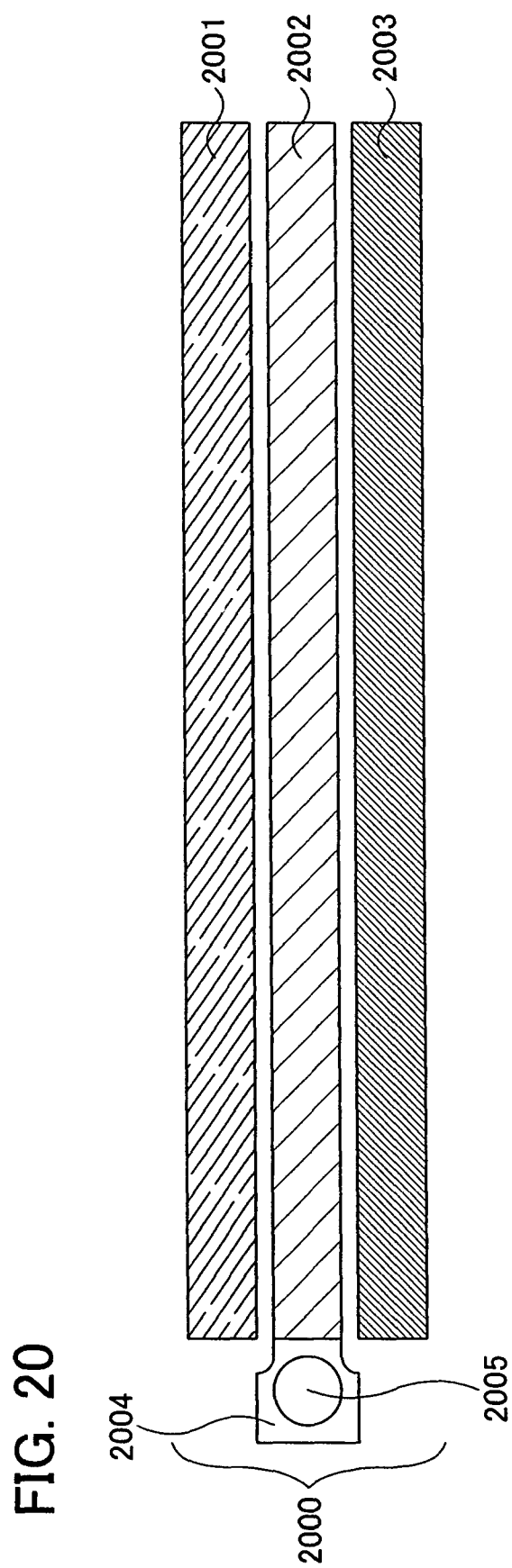
FIG. 20 is a view showing a structure of a backlight unit of the present invention.

A backlight unit 2000 in FIG. 20 includes a diffusing plate 2001, a light guide plate 2002, a reflective plate 2003, a lamp reflector 2004, and a light source 2005. A cold cathode tube, a hot cathode tube, a light-emitting diode, an inorganic EL element, an organic EL element, or the like is used as the light source 2005 which has a function of emitting light as needed. The light source 2005 can emit light of a plurality of color components (wavelengths). The lamp reflector 2004 has a function of efficiently leading light from the light source 2005 to the light guide plate 2002. The light guide plate 2002 has a function of totally reflecting light and leading the light to the entire surface. The diffusing plate 2001 has a function of reducing variation in brightness. The reflective plate 2003 has a function of reusing light which has leaked from the light guide plate 2002 downward.

Next, a detailed configuration of the lamp reflector 2004 and the light source 2005 shown in FIG. 20 will be explained with reference to FIGS. 21A to 21C.

Figure 21A:
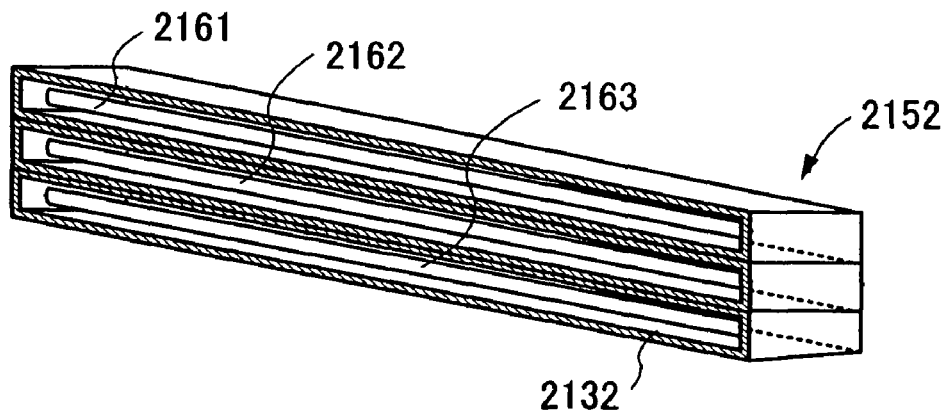
FIGS. 21A to 21C are views each showing a structure of a backlight unit of the present invention.

As shown in FIG. 21A, a backlight unit 2152 includes cold cathode tubes 2161, 2162, and 2163 of R, G, and B as a light source. The cold cathode tubes 2161, 2162, and 2163 of R, G, and B are controlled in accordance with the timing charts in FIGS. 10 to 12. In addition, a lamp reflector 2132 can be provided so that light from the cold cathode tubes 2161, 2162, and 2163 is efficiently reflected.

As described above, the color component of the cold cathode tube may be other than R, G, and B. In addition, the number of the color components of the cold cathode tubes may be more than three.

Figure 21B:
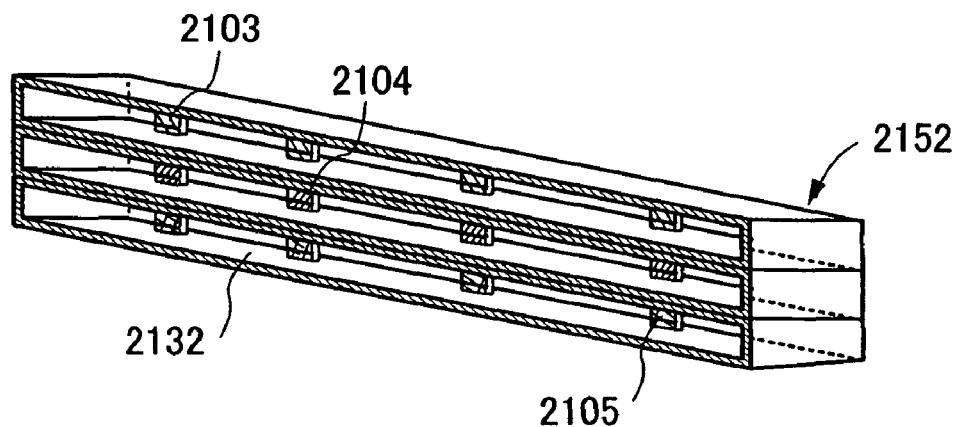

Further, as shown in FIG. 21B, the backlight unit 2152 can use light-emitting diodes (LEDs) 2103, 2104, and 2105 of R, G, and B as a light source. These light-emitting diodes (LEDs) 2103, 2104, and 2105 of R, G, and B are controlled in accordance with the timing charts in FIGS. 10 to 12. When the light-emitting diodes are controlled in accordance with the timing chart in FIG. 13, each of the light-emitting diodes (LEDs) 2103, 2104, and 2105 of R, G, and B is scanned. This is so-called backlight scan. In addition, a lamp reflector 2132 can be provided so that light from the light-emitting diode is efficiently reflected.

As described above, the color component of the light-emitting diode may be other than R, Q and B. In addition, the number of the color components of the light-emitting diodes may be more than three.

Figure 21C:
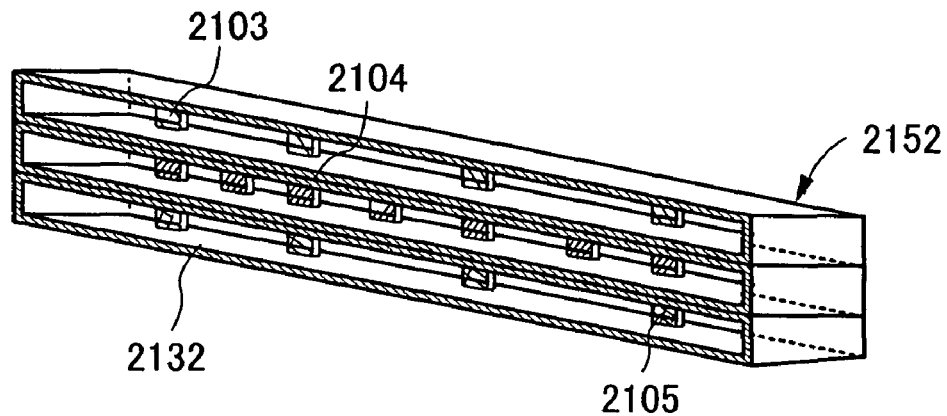

Further, as shown in FIG. 21C, when the light-emitting diodes (LEDs) 2103, 2104, and 2105 of R, G, and B are used as a light source, the number and the arrangement of the light-emitting diodes are not necessarily the same. For example, a plurality of light-emitting diodes of a color with low emission intensity (such as green) may be arranged.

Furthermore, a light-emitting diode which emits white light and the light-emitting diodes (LEDs) 2103, 2104, and 2105 of R, Q and B may be combined.

Since luminance of the light-emitting diode is high, the backlight unit using the light-emitting diode is suitable for a large display device. Further, since color purity of R, Q and B of the light-emitting diode is favorable, the light-emitting diode is superior to the cold cathode tube in color reproduction property, and an arrangement area thereof can be small. Therefore, when the light-emitting diode is applied to a small display device, a narrower frame can be achieved.

The light source is not necessarily provided like the backlight unit shown in FIGS. 21A to 21C. For example, when a backlight having light-emitting diodes is mounted on a large-sized display device, the light-emitting diodes can be provided on the back side of a substrate. In this case, the light-emitting diodes of R, G, and B can be sequentially arranged at predetermined intervals. A color reproduction property can be enhanced in accordance with the arrangement of the light-emitting diodes.

The arrangement of the light-emitting diodes on the back side of the substrate will be explained with reference FIGS. 22A and 22B, and 23A.

Figure 22A:
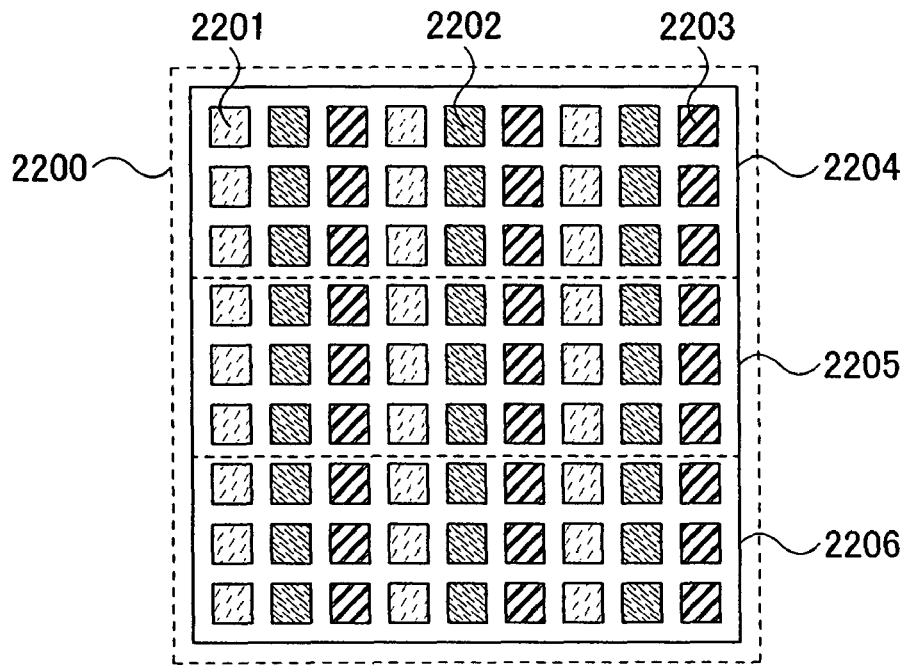
FIGS. 22A and 22B are views each showing a structure of a backlight unit of the present invention.

As shown in FIG. 22A, light-emitting diodes (LEDs) 2201, 2202, and 2203 of R, G, and B are arranged on the back side of a substrate. A substrate 2200 is provided with a diffusing plate, a reflective plate, and a prism sheet. In FIG. 22A, the light-emitting diodes (LEDs) 2201, 2202, and 2203 of R, G, and B are arranged in a column based on the color. Since the light-emitting diodes (LEDs) 2201, 2202, and 2203 of R, G, and B are arranged in a column based on the color, a step of arranging the light-emitting diodes (LEDs) 2201, 2202, and 2203 of R, G, and B can be simple.

It is to be noted that each of regions 2204, 2205, and 2206 is a region where backlight scan is performed. In FIG. 22A, the substrate is divided into three regions, but the present invention is not limited thereto. Further, when the backlight in FIG. 22A performs backlight scan, the light-emitting diodes (LEDs) 2201, 2202, and 2203 of R, G, and B are controlled to emit light or no light in accordance with the timing chart in FIG. 13.

Figure 22B:
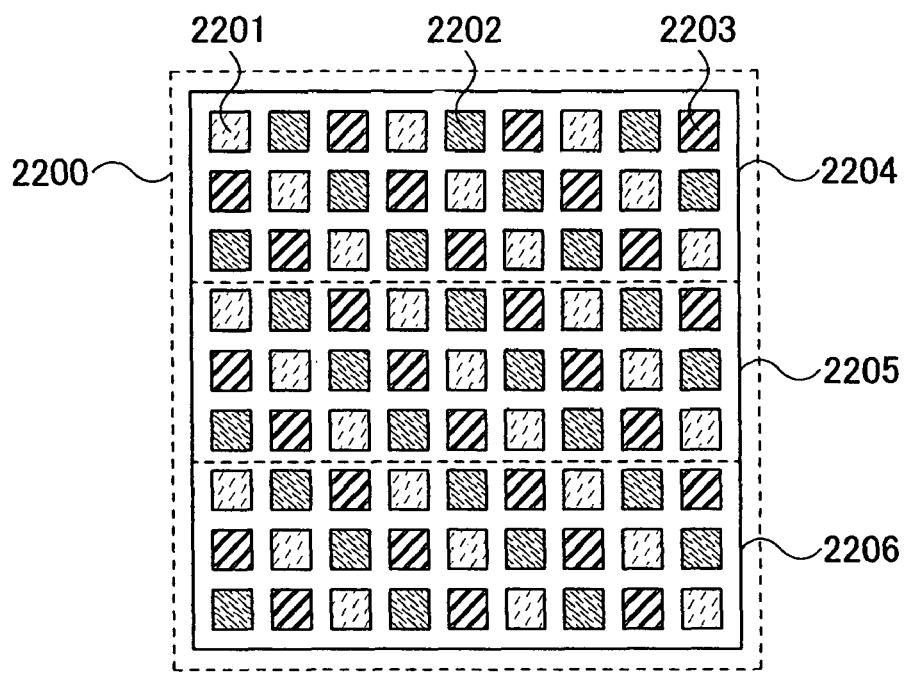

In addition, as shown in FIG. 22B, the light-emitting diodes (LEDs) 2201, 2202, and 2203 of R, G, and B may also be displaced by one or two pieces. When the light-emitting diodes (LEDs) 2201, 2202, and 2203 of R, G, and B are displaced by one or two pieces, color irregularities of the backlight can be reduced.

Figure 23A:
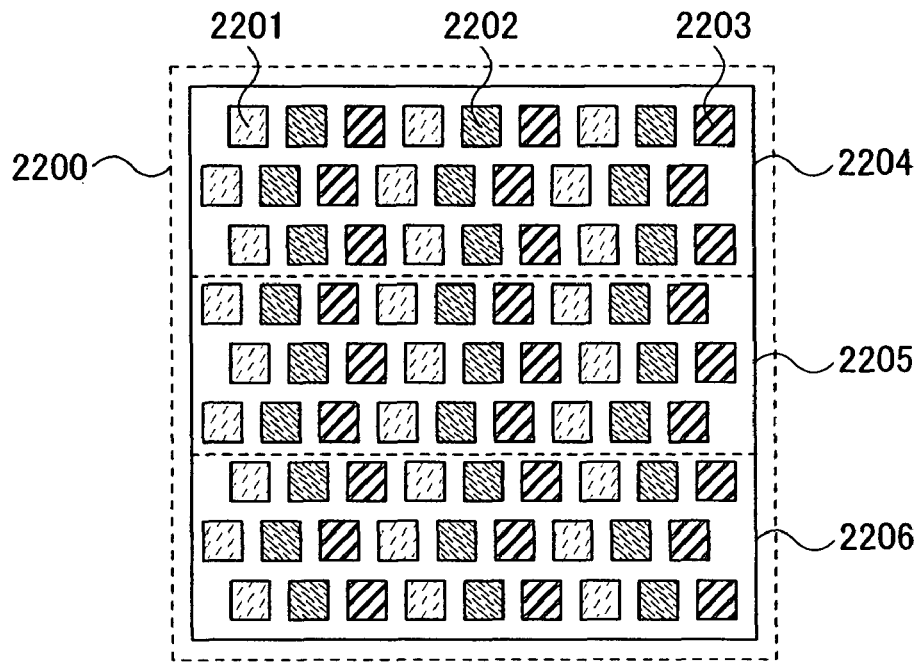
FIGS. 23A and 23B are views each showing a structure of a backlight unit of the present invention.

In addition, as shown in FIG. 23A, the light-emitting diodes (LEDs) 2201, 2202, and 2203 of R, G, and B may also be arranged in a delta pattern. When the light-emitting diodes (LEDs) 2201, 2202, and 2203 of R, G, and B are arranged in a delta pattern, color irregularities of the backlight can be reduced.

Figure 23B:
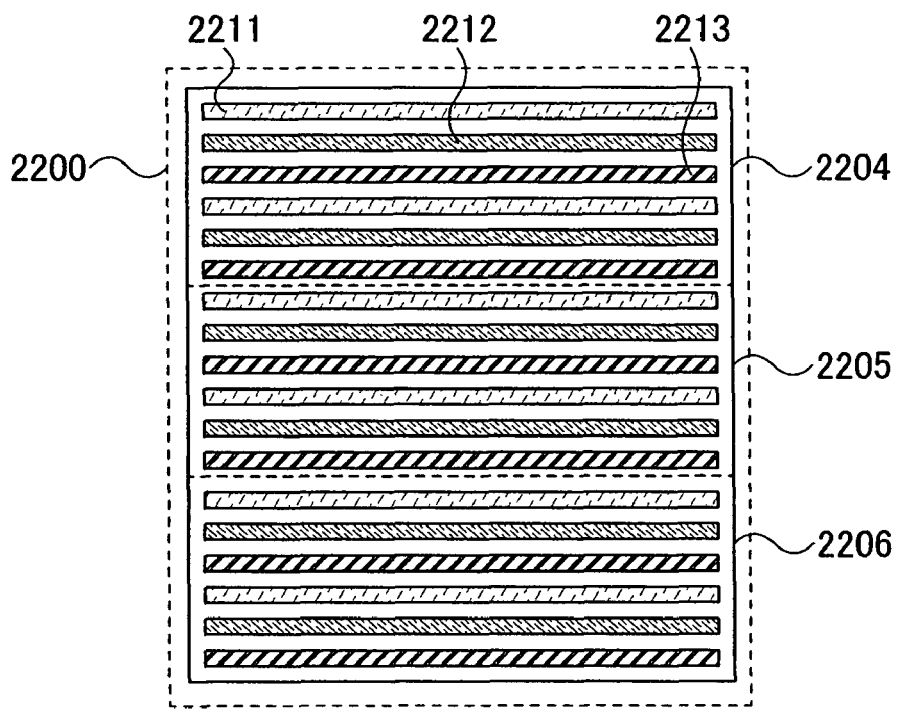

In addition, as shown in FIG. 23B, cold cathode tubes 2211, 2212, and 2213 of R, G, and B may also be arranged on the backside of the substrate.

This embodiment mode can be implemented by being freely combined with any description of other embodiment modes in this specification. Further, any descriptions in this embodiment mode can be freely combined to be implemented.

Embodiment Mode 2

In this embodiment mode, a pixel structure in a case where the display device used in the present invention is used as a semi-transmissive display device will be explained with reference to FIGS. 24A and 24B.

Figure 24A:
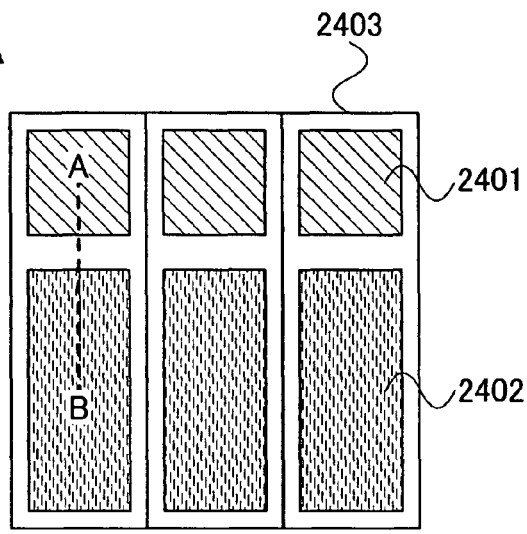
FIG. 24A is a top view and FIG. 24B is a cross-sectional view showing a structure of a pixel of the present invention.

In FIG. 24A, one pixel 2403 is divided into a reflective region 2401 and a transmissive region 2402. The reflective region 2401 is provided with a color filter, whereas the transmissive region 2402 is not provided with a color filter.

Figure 24B:
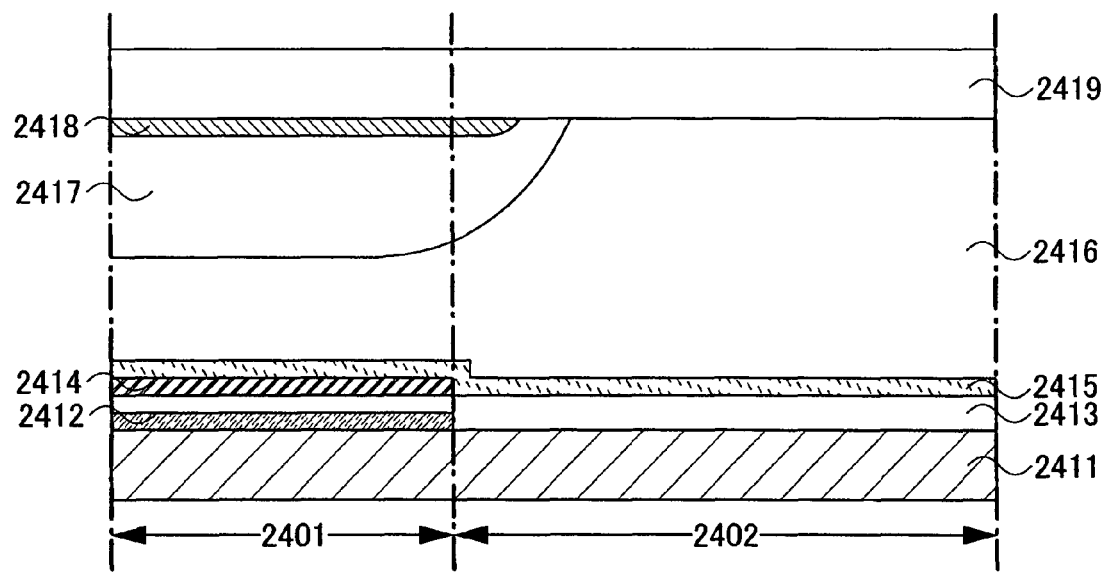

FIG. 24B is a cross-sectional view taken along a line A-B of the pixel 2403 in FIG. 24A. A glass substrate 2411, a transistor layer 2412, an insulating layer 2413, a reflective electrode layer 2414, a transparent electrode layer 2415, a liquid crystal layer 2416, an insulating layer 2417, a color filter 2418, and a glass substrate 2419 are provided.

As compared to the transmissive region 2402, in the reflective region 2401, the transistor layer 2412, the reflective electrode layer 2414, the insulating layer 2417, and the color filter 2418 are provided. The transistor layer 2412 is provided with an element such as a transistor. The reflective electrode layer 2414 is formed using a conductive material and the surface (on the side of the liquid crystal layer 2416) thereof is uneven. When the surface of the reflective electrode layer 2414 is uneven, light which is incident from any direction can be reflected to a direction of the color filter 2418. The insulating layer 2417 is a layer for adjusting the cell gap of the liquid crystal layer 2416. The insulating layer 2417 has such a thickness that the cell gap in the reflection region 2401 is about half of the cell gap in the transmissive region 2402. Therefore, since a distance (time) which is required by light to pass through the liquid crystal layer 2416 in the reflective region 2401 is equivalent to a distance (time) which is required by light to pass through the liquid crystal layer 2416 in the transmissive region 2402, a gray scale expressed in the reflective region 2401 and a gray scale expressed in the transmissive region 2404 are the same.

Only a color component of the color filter may be used as a color component of light which passes through the transmissive region 2402. In addition, the display device of the present invention may select a reflective mode and a transmissive mode. In the transmissive mode, the color component of light of the backlight in one pixel 2403 is made to be changed over time so that full color can be displayed. In the reflective mode, full color can be displayed with the use of the color filter in three pixels 2403.

In a conventional display device, since one frame period is divided into a plurality of lighting periods to display full color, a color filter is not used. Therefore, also when a reflective region is provided in a pixel of the conventional display device, only monochrome display can be performed. However, in the display device of this embodiment mode, full color can be displayed not only in the transmissive region but also in the reflective region.

Figure 25A:
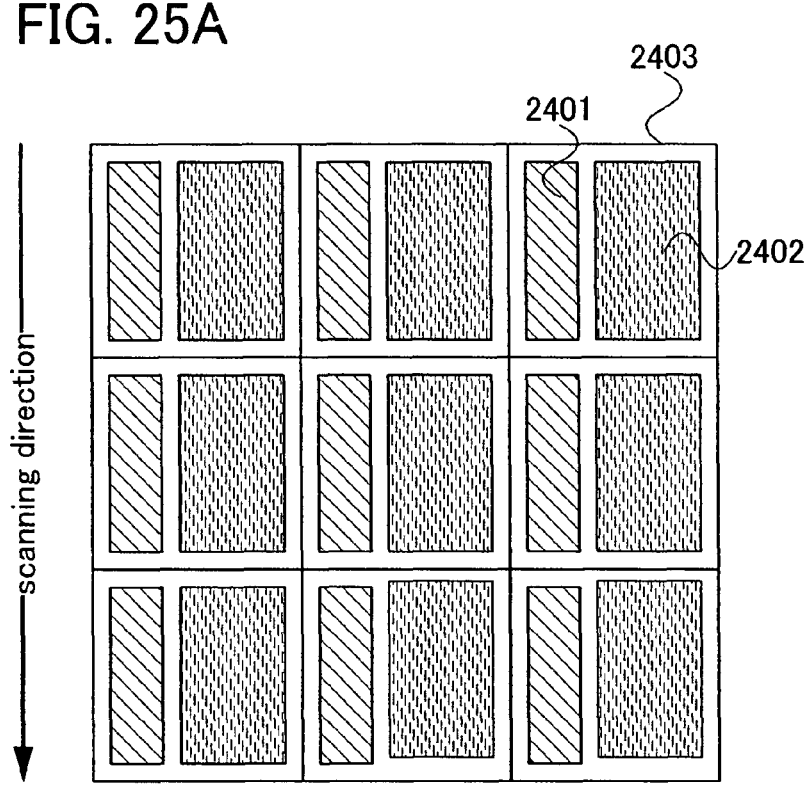
FIGS. 25A and 25B are views each showing a pixel structure of the present invention.
Figure 25B:
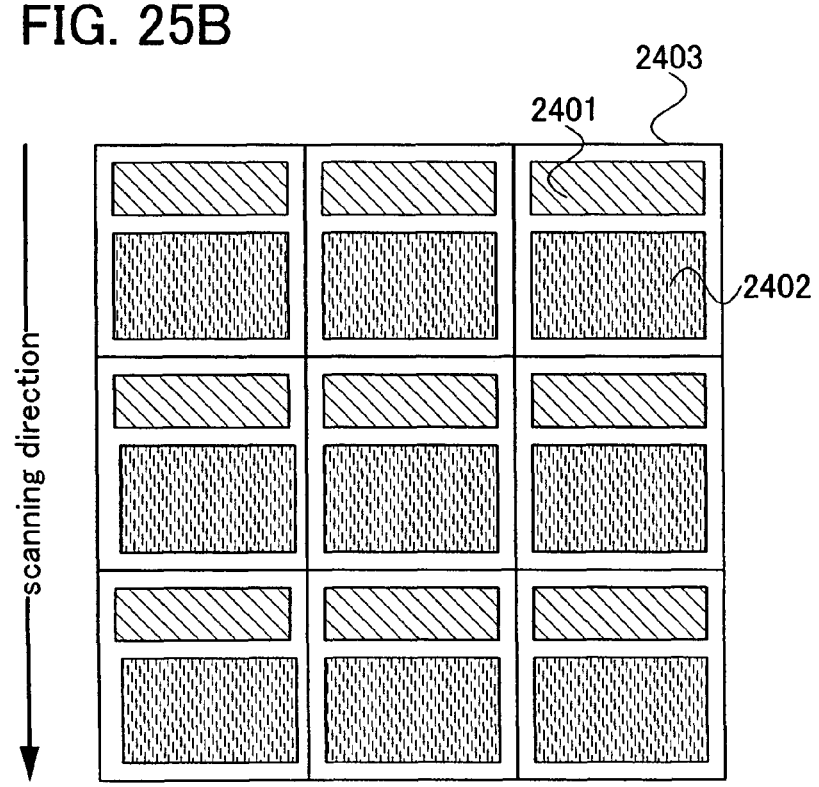

In addition, the reflective regions 2401 may be arranged in parallel to a scanning direction as shown in FIG. 25A, or the reflective regions 2401 may be arranged perpendicular to a scanning direction as shown in FIG. 25B. Since color filters are arranged in one straight line in each column in FIG. 25A, the step of arranging the color filters can be simple. Further, since color filters are arranged in one straight line in each row in FIG. 25B, the step of arranging the color filters can be simple.

This embodiment mode can be implemented by being freely combined with any description of other embodiment modes in this specification. Further, any descriptions in this embodiment mode can be freely combined to be implemented.

Embodiment Mode 3

In this embodiment mode, various liquid crystal modes which can be applied to the display device used in the present invention will be explained.

Various liquid crystal modes which can be applied to a liquid crystal display device of this embodiment mode will be explained.

FIGS. 26A1 and 26A2 each show a schematic view of a liquid crystal display device of a TN mode.

A layer 2600 including a display element is interposed between a first substrate 2601 and a second substrate 2602, which are provided so as to face each other. A first polarizer-including layer 2603 is stacked on the first substrate 2601 side, and a second polarizer-including layer 2604 is stacked on the second substrate 2602 side. The first polarizer-including layer 2603 and the second polarizer-including layer 2604 are arranged so as to be in a cross nicol state.

Although not shown in the drawing, a backlight and the like are provided on the outer side of the second polarizer-including layer. A first electrode 2605 and a second electrode 2606 are provided on the first substrate 2601 and the second substrate 2602, respectively. The first electrode 2605 which is provided to be opposite to the backlight, that is, on the viewing side, is formed so as to have at least a light-transmitting property.

In a case where a liquid crystal display device having such a structure has a normally white mode, when a voltage is applied to the first electrode 2605 and the second electrode 2606 (referred to as a vertical electric field method), black display is performed as shown in FIG. 26A1. At that time, liquid crystal molecules are aligned vertically. Thus, light from the backlight cannot pass through the substrate, which leads to black display.

As shown in FIG. 26A2, when a voltage is not applied between the first electrode 2605 and the second electrode 2606, white display is performed. At this time, liquid crystal molecules are aligned horizontally and rotated in the plane. As a result, light from the backlight can pass through the pair of polarizer-including layers in a cross nicol state (the first polarizer-including layer 2603 and the second polarizer-including layer 2604), whereby a predetermined image is displayed.

At this time, when the reflective region is provided with a color filter, full color display can be performed. The color filter may be provided on either the first substrate 2601 side or the second substrate 2602 side.

By a method for driving a display device of the present invention, a correct gray scale can be expressed even though the response speed of the liquid crystal element is low. Therefore, even when a TN mode is used as the liquid crystal mode of the display device of the present invention, a correct gray scale can be expressed in the display device of the present invention. In addition, the display device using a TN mode has the small number of manufacturing steps and can be inexpensive.

A known liquid crystal material may be used for a TN mode.

FIGS. 26B1 and 26B2 are schematic views each showing a liquid crystal display device of a VA mode. A VA mode is a mode in which liquid crystal molecules are aligned vertically to a substrate when no electric field is applied.

Similarly to FIGS. 26A1 and 26A2, a first electrode 2605 and a second electrode 2606 are provided on a first substrate 2601 and a second substrate 2602, respectively. In addition, the first electrode 2605 on a side opposite to a backlight, that is, on the viewing side, is formed so as to have at least a light-transmitting property. A first polarizer-including layer 2603 is stacked on the first substrate 2601 side, and a second polarizer-including layer 2604 is stacked on the second substrate 2602 side. It is to be noted that the first polarizer-including layer 2603 and the second polarizer-including layer 2604 are arranged so as to be in a cross nicol state.

When a voltage is applied to the first electrode 2605 and the second electrode 2606 (a vertical electric field method) in a liquid crystal display device having such a structure, white display is performed, which means an on state, as shown in FIG. 26B1. At this time, liquid crystal molecules are aligned horizontally. Thus, light from the backlight can pass through the pair of polarizer-including layers in a cross nicol state (the first polarizer-including layer 2603 and the second polarizer-including layer 2604), whereby a predetermined image is displayed. By provision of a color filter at this time, full-color display can be performed. The color filter can be provided on either the first substrate 2601 side or the second substrate 2602 side.

As shown in FIG. 26B2, when a voltage is not applied to the first electrode 2605 and the second electrode 2606, black display is performed, which means an off state. At this time, liquid crystal molecules are aligned vertically. Thus, light from the backlight cannot pass through the substrate, which leads to black display.

As described above, in an off state, liquid crystal molecules are vertical to a substrate; therefore, black display is performed. Meanwhile, in an on state, liquid crystal molecules are horizontal to a substrate; therefore, white display is performed. In an off state, liquid crystal molecules are aligned vertically, polarized light from the backlight passes through a cell without being affected by birefringence of the liquid crystal molecules, and can be completely blocked by a polarizer-including layer on a counter substrate side.

FIGS. 26C1 and 26C2 show an example in which stacked polarizer-including layers are applied to an MVA mode where alignment of a liquid crystal is divided. An MVA mode is a mode in which the viewing angle dependency of each portion is compensated by that of other portions. As shown in FIG. 26C1, in an MVA mode, projections 2607 and 2608, the cross section of each of which is a triangle shape, are provided on a first electrode 2605 and a second electrode 2606, respectively, for controlling alignment. When a voltage is applied to the first electrode 2605 and the second electrode 2606 (a vertical electric field method), white display is performed, which means an on state, as shown in FIG. 26C1. At this time, liquid crystal molecules are aligned so as to tilt toward the projections 2607 and 2608. Thus, light from the backlight can pass through a pair of polarizer-including layers in a cross nicol state (a first polarizer-including layer 2603 and a second polarizer-including layer 2604), whereby a predetermined image is displayed. At this time, by provision of the color filter, full color display can be performed. The color filter can be provided on either the first substrate 2601 side or the second substrate 2602 side.

As shown in FIG. 26C2, when a voltage is not applied to the first electrode 2605 and the second electrode 2606, black display is performed, which means an off state. At that time, liquid crystal molecules are aligned vertically. Thus, light from the backlight cannot pass through the substrate, which leads to black display.

Figure 29A:
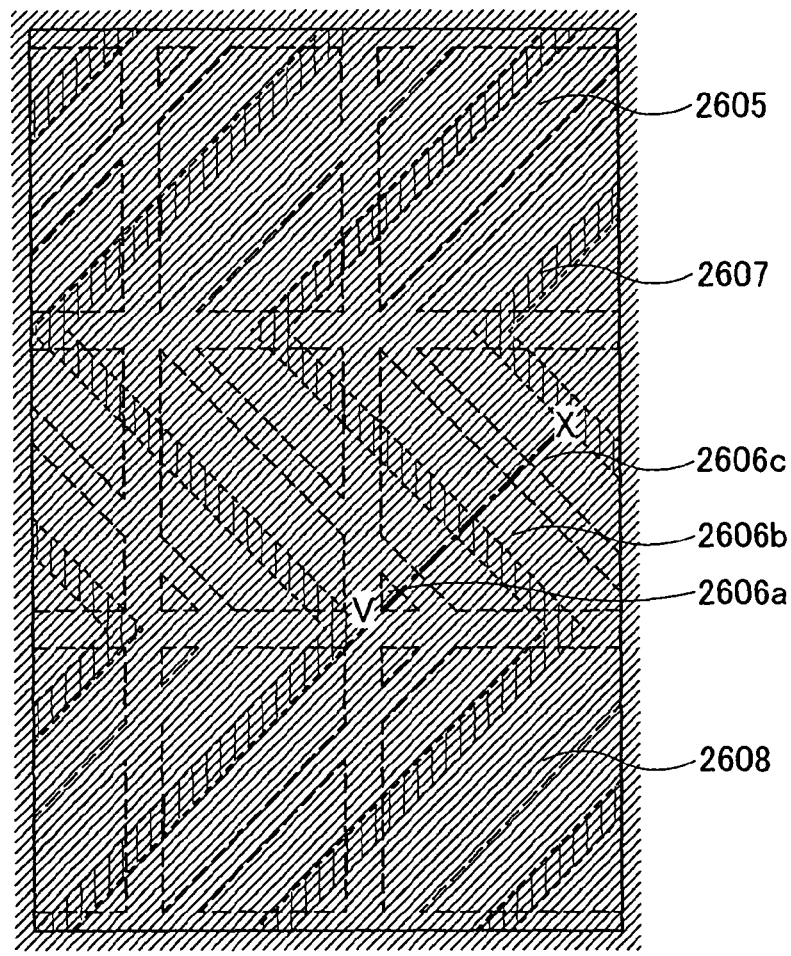
FIGS. 29A and 29B are views each showing a structure of a pixel electrode of the present invention.
Figure 29B:
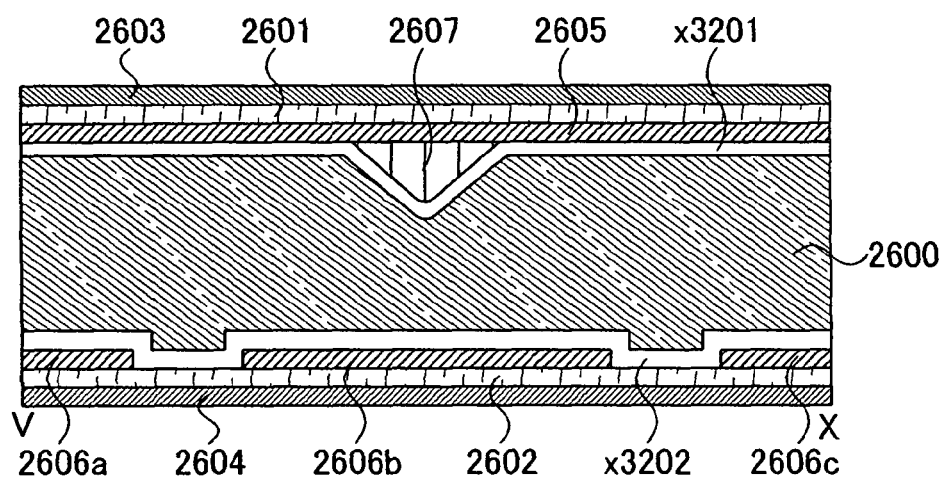

FIGS. 29A and 29B show a top view and a cross sectional view, respectively, of another example of an MVA mode. In FIG. 29A, second electrodes are each formed into a bent pattern of a boomerang shape to be second electrodes 2606*a*, 2606*b*, and 2606*c*. An insulating layer that is an alignment film is formed over the second electrodes 2606*a*, 2606*b*, and 2606*c*. As shown in FIG. 29B, a projection 2607 is formed under a first electrode 2605 so as to have a shape to face the second electrodes 2606*a*, 2606*b*, and 2606*c*. Openings of the second electrodes 2606*a*, 2606*b*, and 2606*c* function like a projection, which can move the liquid crystal molecules. It is to be noted that the first electrode 2605 may also be formed under the projection 2607.

With the use of an MVA mode as the liquid crystal mode of the display device of the present invention, the viewing angle of the display device of the present invention can be wide.

FIGS. 27A1 and 27A2 are schematic views each showing a liquid crystal display device of an OCB mode. In an OCB mode, alignment of liquid crystal molecules forms an optically compensated state in a liquid crystal layer, which is referred to as bend alignment.

Similarly to FIGS. 26A1 to 26C2, a first electrode 2605 and a second electrode 2606 are provided on a first substrate 2601 and a second substrate 2602, respectively. Although not shown in the drawings, a backlight and the like are provided on an outer side of a second polarizer-including layer 2604. In addition, the first electrode 2605 on a side opposite to the backlight, that is, on the viewing side, is formed so as to have at least a light-transmitting property. A first polarizer-including layer 2603 is stacked on the first substrate 2601 side, and the second polarizer-including layer 2604 is stacked on the second substrate 2602 side. It is to be noted that the first polarizer-including layer 2603 and the second polarizer-including layer 2604 are arranged so as to be in a cross nicol state.

When a certain on-voltage is applied to the first electrode 2605 and the second electrode 2606 (a vertical electric field method) in a liquid crystal display device having such a structure, black display is performed as shown in FIG. 27A1. At this time, liquid crystal molecules are aligned vertically. Thus, light from the backlight cannot pass through the substrate, which leads to black display.

When a certain off-voltage is applied between the first electrode 2605 and the second electrode 2606, white display is performed as shown in FIG. 27A2. At this time, liquid crystal molecules are aligned in a state of bend alignment. Thus, light from the backlight can pass through the pair of polarizer-including layers in a cross nicol state (the first polarizer-including layer 2603 and the second polarizer-including layer 2604), whereby a predetermined image is displayed. By provision of a color filter at this time, full-color display can be performed. The color filter can be provided on either the first substrate 2601 side or the second substrate 2602 side.

In such an OCB mode, alignment of liquid crystal molecules can be optically compensated in a liquid crystal layer; therefore, the viewing angle dependency is low. Further, with a pair of stacked polarizer-including layers, the contrast ratio can be enhanced.

With the use of an OCB mode as the liquid crystal mode of the display device of the present invention, much higher gray scale levels can be expressed in the display device of the present invention. This is because, since the liquid crystal element responds at a high speed in an OCB mode, a video signal can be written into a pixel at a high speed when an OCB mode is used as the liquid crystal mode of the display device of the present invention.

In addition, in the display device of the present invention, strong light is transmitted through the liquid crystal element, and thus, the contrast ratio is decreased in some cases. Therefore, when an OCB mode is used as the liquid crystal mode of the display device of the present invention, the contrast ratio can also be improved.

FIGS. 27B1 and 27B2 are schematic views each showing a liquid crystal display device of an FLC mode and an AFLC mode.

Similarly to FIGS. 26A1 to 26C2, a first electrode 2605 and a second electrode 2606 are provided on a first substrate 2601 and a second substrate 2602, respectively. In addition, the first electrode 2605 on a side opposite to a backlight, that is, on the viewing side, is formed so as to have at least a light-transmitting property. A first polarizer-including layer 2603 is stacked on the first substrate 2601 side, and a second polarizer-including layer 2604 is stacked on the second substrate 2602 side.

The first polarizer-including layer 2603 and the second polarizer-including layer 2604 are arranged so as to be in a cross nicol state.

When a voltage is applied to the first electrode 2605 and the second electrode 2606 (referred to as a vertical electric field method) in a liquid crystal display device having such a structure, white display is performed as shown in FIG. 27B1. At this time, liquid crystal molecules are aligned horizontally in a direction deviated from a rubbing direction. Thus, light from the backlight can pass through the pair of polarizer-including layers in a cross nicol state (the first polarizer-including layer 2603 and the second polarizer-including layer 2604), whereby a predetermined image is displayed.

When a voltage is not applied between the first electrode 2605 and the second electrode 2606, black display is performed as shown in FIG. 27B2. At this time, liquid crystal molecules are aligned horizontally along a rubbing direction. Thus, light from the backlight cannot pass through the substrate, which leads to black display.

By provision of a color filter at this time, full-color display can be performed. The color filter can be provided on either the first substrate 2601 side or the second substrate 2602 side.

A known liquid crystal material may be used for an FLC mode and an AFLC mode.

FIGS. 28A1 and 28A2 are schematic views each showing a liquid crystal display device of an IPS mode. In an IPS mode, liquid crystal molecules are rotated constantly in a plane with respect to a substrate, and a horizontal electric field method where electrodes are provided only on one substrate side is employed.

In an IPS mode, a liquid crystal is controlled by a pair of electrodes provided on one substrate side. Therefore, a pair of electrodes 2801 and 2802 are provided over a second substrate 2602. The pair of electrodes 2801 and 2802 each preferably have a light-transmitting property. A first polarizer-including layer 2603 is stacked on a first substrate 2601 side, and a second polarizer-including layer 2604 is stacked on the second substrate 2602 side. The first polarizer-including layer 2603 and the second polarizer-including layer 2604 are arranged so as to be in a cross nicol state.

When a voltage is applied to the pair of electrodes 2801 and 2802 in a liquid crystal display device having such a structure, liquid crystal molecules are aligned along a line of electric force deviated from a rubbing direction so that white display is performed, which means an on state, as shown in FIG. 28A1. Thus, light from the backlight can pass through the pair of polarizer-including layers in a cross nicol state (the first polarizer-including layer 2603 and the second polarizer-including layer 2604), whereby a predetermined image is displayed.

By provision of a color filter at this time, full-color display can be performed. The color filter can be provided on either the first substrate 2601 side or the second substrate 2602 side.

When a voltage is not applied between the pair of electrodes 2801 and 2802, black display is performed, which means an off state, as shown in FIG. 28A2. At that time, liquid crystal molecules are aligned horizontally along a rubbing direction. Thus, light from the backlight cannot pass through the substrate, which leads to black display.

Figure 30A:
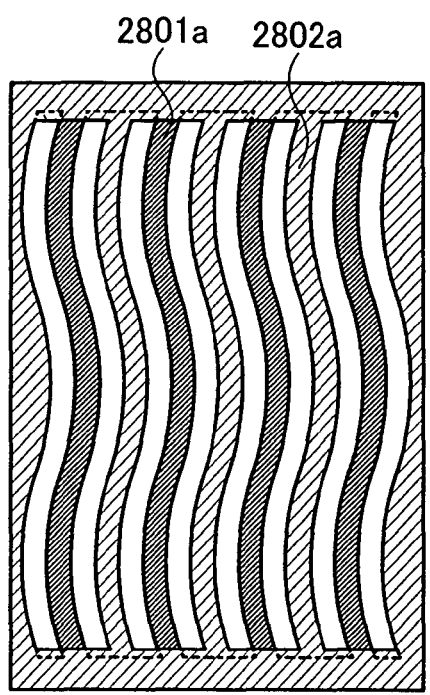
FIGS. 30A to 30D are views each showing a structure of a pixel electrode of the present invention.
Figure 30B:
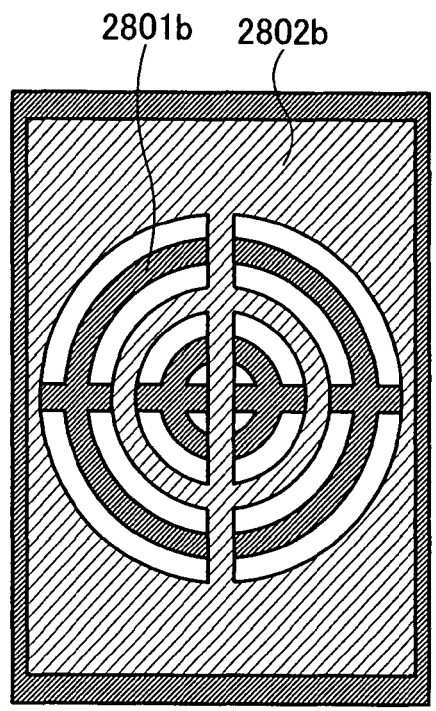
Figure 30C:
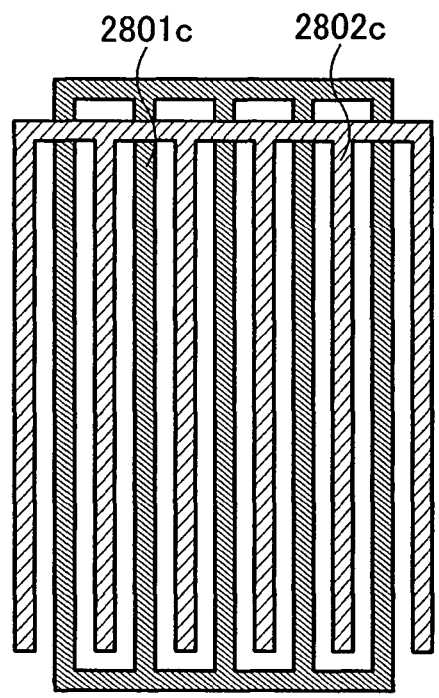
Figure 30D:
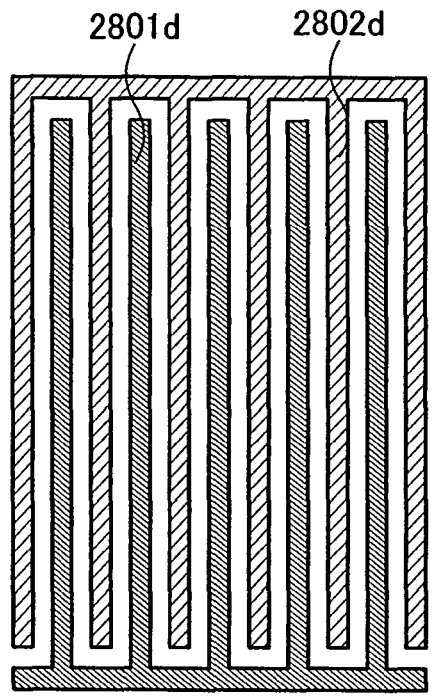

FIGS. 30A to 30D each show an example of the pair of electrodes 2801 and 2802 that can be used in an IPS mode. As shown in top views of FIGS. 30A to 30D, the pair of electrodes 2801 and 2802 are alternately formed. In FIG. 30A, electrodes 2801*a* and 2802*a* each have an undulating wave shape. In FIG. 30B, electrodes 2801*b* and 2802*b* each have a shape with a concentric circular opening. In FIG. 30C, electrodes 2801*c* and 2802*c* each have a comb-shape and are partially overlapped with each other. In FIG. 30D, electrodes 2801d and 2802d each have a comb-shape in which the electrodes are engaged with each other.

An FFS mode can be used in addition to an IPS mode. An FFS mode has a structure in which a pair of electrodes are not formed in the same plane, and an electrode 2804 is formed over an electrode 2803 with an insulating film interposed therebetween as shown in FIGS. 28B1 and 28B2, while the pair of electrodes are formed in the same plane in an IPS mode.

When a voltage is applied to the pair of electrodes 2803 and 2804 in a liquid crystal display device having such a structure, white display is performed, which means an on state, as shown in FIG. 28B1. Thus, light from the backlight can pass through a pair of polarizer-including layers in a cross nicol state (a first polarizer-including layer 2603 and a second polarizer-including layer 2604), whereby a predetermined image is displayed.

By provision of a color filter at this time, full-color display can be performed. The color filter can be provided on either the first substrate 2601 side or the second substrate 2602 side.

When a voltage is not applied between the pair of electrodes 2803 and 2804, black display is performed, which means an off state, as shown in FIG. 28B2. At this time, liquid crystal molecules are aligned horizontally and rotated in a plane. Thus, light from the backlight cannot pass through the substrate, which leads to black display.

Figure 31A:
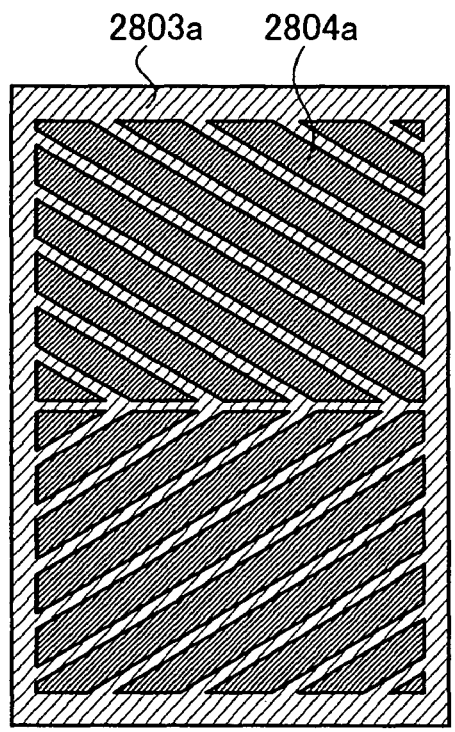
FIGS. 31A to 31D are views each showing a structure of a pixel electrode of the present invention.
Figure 31B:
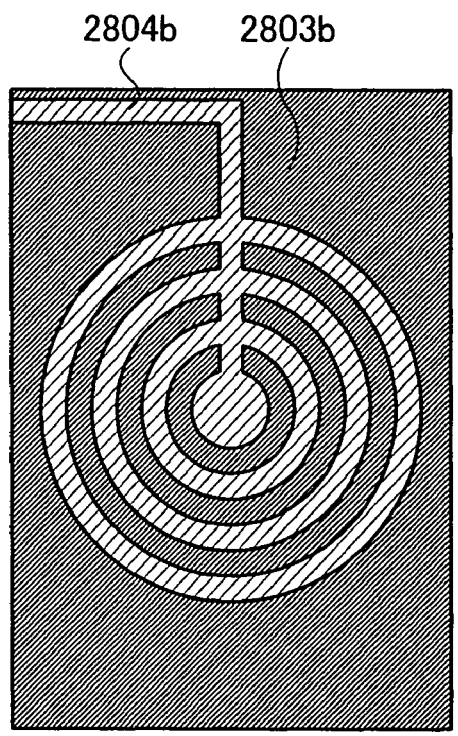
Figure 31C:
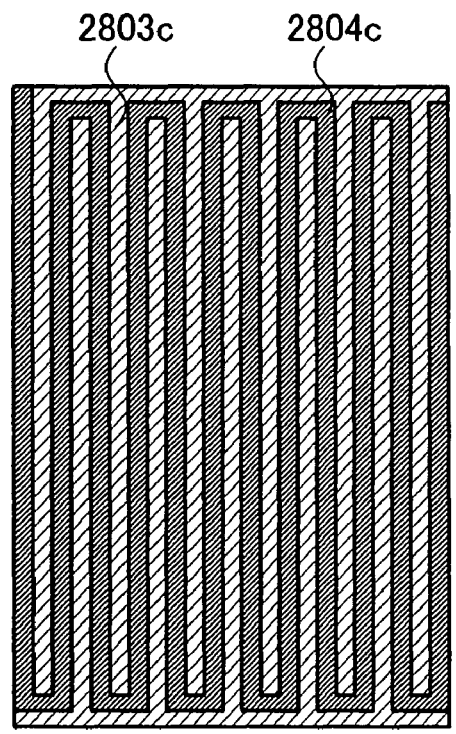
Figure 31D:
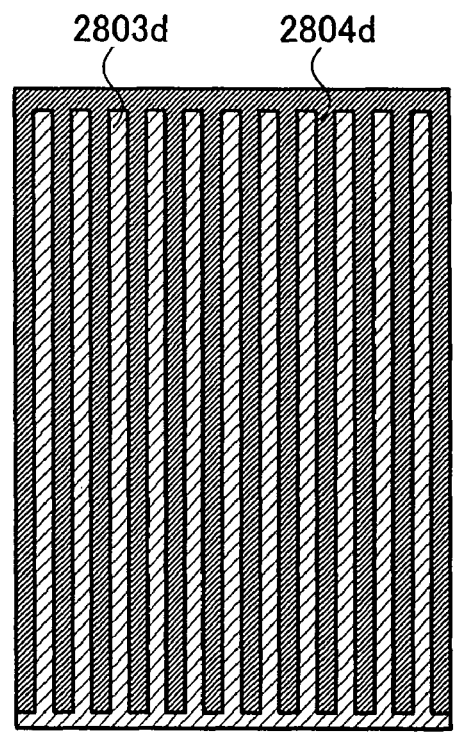

FIGS. 31A to 31D each show an example of the pair of electrodes 2803 and 2804 that can be used in an FFS mode. As shown in top views of FIGS. 31A to 31D, the electrodes 2804 that are formed into various patterns are formed over the electrodes 2803. In FIG. 31A, an electrode 2804a over an electrode 2803a has a bent boomerang shape. In FIG. 31B, an electrode 2804b over an electrode 2803b has a concentric circular shape. In FIG. 31C, an electrode 2804c over an electrode 2803c has a comb-shape in which the electrodes are engaged with each other. In FIG. 31D, an electrode 2804d over an electrode 2803d has a comb-shape.

With the use of an IPS mode and an FFS mode as the liquid crystal mode of the display device of the present invention, the viewing angle of the display device of the present invention can be wide.

A known liquid crystal material may be used for an IPS mode and an FFS mode.

This embodiment mode can be implemented by being freely combined with any description of other embodiment modes in this specification. Further, any descriptions in this embodiment mode can be freely combined to be implemented.

Embodiment Mode 4

Figure 32A:
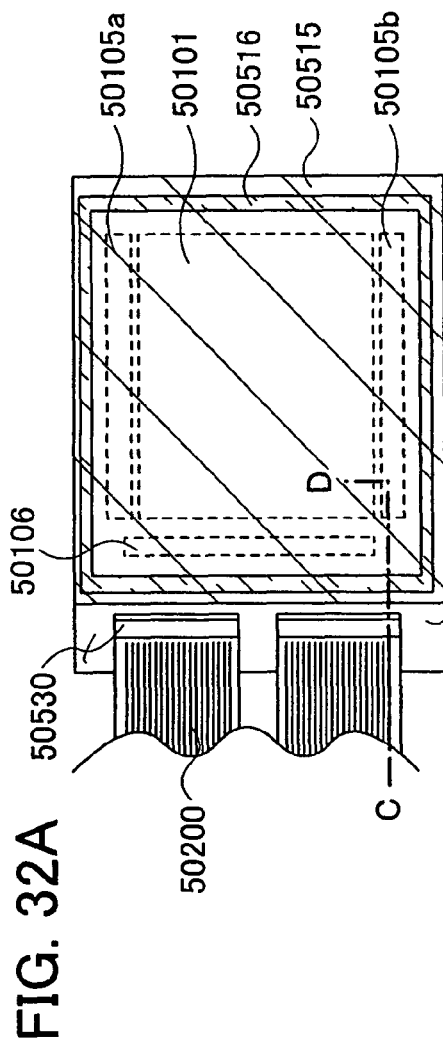
FIG. 32A is a top view and FIG. 32B is a cross-sectional view of a display device of the present invention.
Figure 32B:
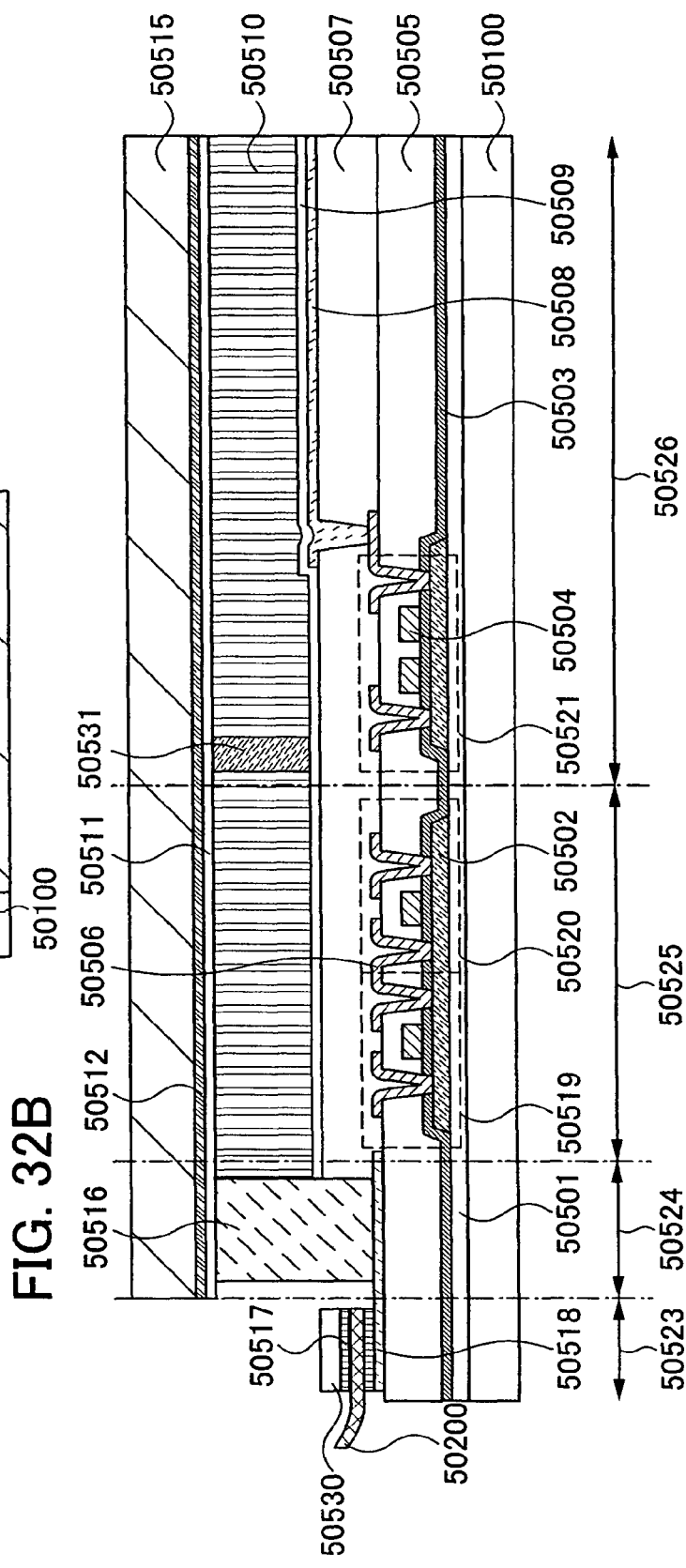

In this embodiment mode, a structure of a liquid crystal panel included in the display device of the present invention will be explained with reference to FIGS. 32A and 32B. Specifically, a structure of a liquid crystal panel including a TFT substrate, a counter substrate, and a liquid crystal layer interposed between the counter substrate and the TFT substrate will be explained. FIG. 32A is a top view of the liquid crystal panel. FIG. 32B is a cross-sectional view taken along a line C-D of FIG. 32A. It is to be noted that FIG. 32B is a cross-sectional view of a top-gate transistor in a case where a crystalline semiconductor film (polysilicon film) is formed as a semiconductor film over a substrate 50100.

The liquid crystal panel shown in FIG. 32A includes, over the substrate 50100, a pixel portion 50101, a scanning line driver circuit 50105a, a scanning line driver circuit 50105b, and a signal line driver circuit 50106. The pixel portion 50101, the scanning line driver circuit 50105a, the scanning line driver circuit 50105b, and the signal line driver circuit 50106 are sealed between the substrate 50100 and a substrate 50515 with a sealing material 50516. In addition, an FPC 50200 and an IC chip 50530 are provided over the substrate 50100 by a TAB method.

Circuits similar to those explained in Embodiment Mode 1 can be used as the scanning line driver circuit (gate driver) 50105a, the scanning line driver circuit 50105b, and the signal line driver circuit (source driver) 50106.

A cross-sectional structure taken along a line C-D of FIG. 32A will be explained with reference to FIG. 32B. Over the substrate 50100, the pixel portion 50101 and a peripheral driver circuit portion thereof (the scanning line driver circuit 50105a, the scanning line driver circuit 50105b, and the signal line driver circuit 50106) are formed. Here, a driver circuit region 50525 (the scanning line driver circuit 50105b) and a pixel region 50526 (the pixel portion 50101) are shown.

First, an insulating film 50501 is formed over the substrate 50100 as a base film. As the insulating film 50501, a single layer of an insulating film such as a silicon oxide film, a silicon nitride film, or a silicon oxynitride film (SiOxNy), or a stacked layer including at least two of these films is used. It is to be noted that a silicon oxide film is preferably used for a portion in contact with a semiconductor. Accordingly, an electron trap in the base film or hysteresis in transistor characteristics can be suppressed. Further, at least one film containing a large amount of nitrogen is preferably provided as the base film. By this film, impurities from glass can be reduced.

Over the insulating film 50501, a semiconductor film 50502 is formed by a photolithography method, an ink jet method, a printing method, or the like.

Next, an insulating film 50503 is formed over the semiconductor film 50502 as a gate insulating film. As the insulating film 50503, a single layer structure or a stacked layer structure of a thermal oxide film, a silicon oxide film, a silicon nitride film, a silicon oxynitride film, or the like can be used. A silicon oxide film is preferably used for the insulating film 50503 which is in contact with the semiconductor film 50502. This is because a trap level at an interface between the gate insulating film and the semiconductor film 50502 can be lowered with the use of a silicon oxide film. Further, when a gate electrode is formed using Mo, a silicon nitride film is preferably used for the gate insulating film which is in contact with the gate electrode. This is because Mo is not oxidized by a silicon nitride film. Here, as the insulating film 50503, a silicon oxynitride film (composition ratio: Si=32%, O=59%, N=7%, and H=2%) having a thickness of 115 nm is formed by a plasma CVD method.

Next, a conductive film 50504 is formed over the insulating film 50503 as a gate electrode by a photolithography method, an ink jet method, a printing method, or the like. As the conductive film 50504, Ti, Mo, Ta, Cr, W, Al, Nd, Cu, Ag, Au, Pt, Nb, Si, Zn, Fe, Ba, Ge, or the like, an alloy of these elements, or the like is used. Alternatively, a stacked layer of these elements or alloys thereof may be used. Here, the gate electrode is formed using Mo. Mo is preferable because it can be easily etched and is resistant to heat. It is to be noted that the semiconductor film 50502 is doped with an impurity element using the conductive film 50504 or a resist as a mask in order to form a channel forming region and impurity regions functioning as a source region and a drain region. It is to be noted that the impurity concentration in the impurity region may be controlled to form a high-concentration impurity region and a low-concentration impurity region. The conductive film 50504 in a transistor 50521 is formed to have a dual-gate structure. When the transistor 50521 has a dual-gate structure, an off-state current of the transistor 50521 can be reduced. The dual-gate structure has two gate electrodes. A plurality of gate electrodes may also be provided over a channel forming region in a transistor. Alternatively, the conductive film 50504 in the transistor 50521 may have a single gate structure. Further, a transistor 50519 and a transistor 50520 can be manufactured in the same process as that of the transistor 50521.

As an interlayer film, an insulating film 50505 is formed over the insulating film 50503 and the conductive film 50504 formed over the insulating film 50503. As the insulating film 50505, an organic material, an inorganic material, or a stacked layer structure thereof can be used. For example, the insulating film 50505 can be formed using a material such as silicon oxide, silicon nitride, silicon oxynitride, silicon nitride oxide, aluminum nitride, aluminum oxynitride, aluminum nitride oxide containing more nitrogen than oxygen, aluminum oxide, diamond like carbon (DLC), polysilazane, nitrogen-containing carbon (CN), PSG (phosphosilicate glass), BPSG (boro-phosphosilicate glass), alumina, or other substances containing an inorganic insulating material. Alternatively, an organic insulating material may also be used. The organic material may be either photosensitive or nonphotosensitive, and polyimide, acrylic, polyamide, polyimide amide, resist, benzocyclobutene, a siloxane resin, or the like can be used. It is to be noted that the siloxane resin corresponds to a resin including a Si—O—Si bond. Siloxane has a skeleton structure of a bond of silicon (Si) and oxygen (O). As for a substituent, an organic group containing at least hydrogen (such as an alkyl group or aromatic hydrocarbon) is used. As for a substituent, a fluoro group may be used. Further, as for a substituent, a fluoro group and an organic group containing at least hydrogen may be used. In addition, contact holes are selectively formed in the insulating film 50503 and the insulating film 50505. For example, a contact hole is formed over the upper surface of the impurity region of each transistor.

Next, over the insulating film 50505, conductive films 50506 are formed as a drain electrode, a source electrode, and a wiring by a photolithography method, an ink jet method, a printing method, or the like. As a material of the conductive film 50506, Ti, Mo, Ta, Cr, W, Al, Nd, Cu, Ag, Au, Pt, Nb, Si, Zn, Fe, Ba, Ge, or the like, an alloy of these elements, or the like is used. Alternatively, a stacked layer structure of these elements or alloys thereof may be used. Further, in a portion where contact holes are formed in the insulating film 50503 and the insulating film 50505, the conductive film 50506 is connected to the impurity region of the semiconductor film 50502 of the transistor.

An insulating film 50507 is formed as a planarizing film over the insulating film 50505 and the conductive film 50506 formed over the insulating film 50505. It is desirable that the insulating film 50507 be favorable for planarity and coverage; thus, the insulating film 50507 is formed using an organic material in many cases. A multi-layer structure in which an organic material is formed over an inorganic material (such as silicon oxide, silicon nitride, or silicon oxynitride) may be used. In addition, a contact hole is selectively formed in the insulating film 50507. For example, a contact hole is formed over the upper surface of the drain electrode of the transistor 50521.

A conductive film 50508 is formed over the insulating film 50507 as a pixel electrode by a photolithography method, an ink jet method, a printing method, or the like. As the conductive film 50508, a transparent electrode which transmits light therethrough or a reflective electrode which reflects light can be used. In a case of a transparent electrode, for example, an indium tin oxide (ITO) film in which tin oxide is mixed in indium oxide, an indium tin silicon oxide (ITSO) film in which silicon oxide is mixed in indium tin oxide (ITO), an indium zinc oxide (IZO) film in which zinc oxide is mixed in indium oxide, a zinc oxide film, a tin oxide film, or the like can be used. It is to be noted that IZO is a transparent conductive material formed by a sputtering method using a target in which 2 to 20 wt % of zinc oxide (ZnO) is mixed in ITO, but is not limited thereto. In the case of a reflective electrode, for example, Ti, Mo, Ta, Cr, W, Al, Nd, Cu, Ag, Au, Pt, Nb, Si, Zn, Fe, Ba, Ge, or the like, or an alloy of these elements, or the like can be used. Alternatively, a two-layer structure in which Ti, Mo, Ta, Cr, or W and Al are stacked or a three-layer structure in which Al is interposed between metals such as Ti, Mo, Ta, Cr, and W may also be used.

An insulating film 50509 is formed as an alignment film over the insulating film 50507 and the conductive film 50508 formed over the insulating film 50507.

The sealing material 50516 is formed around the pixel portion 50101, or around the pixel portion 50101 and the peripheral driver circuit portion thereof by an ink jet method or the like.

Then, the substrate 50515 over which a conductive film 50512, an insulating film 50511, and the like are formed and the substrate 50100 are attached to each other with a spacer 50531 interposed therebetween, and a liquid crystal layer 50510 is provided between the two substrates. It is to be noted that the substrate 50515 serves as a counter substrate. The spacer 50531 may be formed by a method in which particles of several μm are dispersed or by a method in which a resin film is formed over the entire surface of the substrate and etched. The conductive film 50512 serves as a counter electrode. As the conductive film 50512, materials similar to those of the conductive film 50508 can be used. In addition, the insulating film 50511 serves as an alignment film. A known liquid crystal can be freely used for the liquid crystal layer 50510. For example, a ferroelectric liquid crystal or an anti-ferroelectric liquid crystal may be used for the liquid crystal layer 50510. In addition, as a driving method of the liquid crystal, a TN (Twisted Nematic) mode, an MVA (Multi-domain Vertical Alignment) mode, an ASM (Axially Symmetric aligned Micro-cell) mode, an OCB (Optical Compensated Bend) mode, or the like can be freely used.

The FPC 50200 is provided over the conductive film 50518 electrically connected to the pixel portion 50101 and the peripheral driver circuit portion thereof through an anisotropic conductor layer 50517. In addition, the IC chip is provided over the FPC 50200 through the anisotropic conductor layer 50517. That is, the FPC 50200, the conductive film 50518, and the IC chip 50530 are electrically connected to one another.

It is to be noted that the conductive film 50518 has a function of transmitting a signal and a potential input from the FPC 50200 to the pixel or the peripheral circuit. As the conductive film 50518, a material similar to that of the conductive film 50506, a material similar to that of the conductive film 50504, a material similar to that of the impurity region of the semiconductor film 50502, or a film including two or more of the above may be used.

When a functional circuit (such as memory or buffer) is formed in the IC chip 50530, an area of the substrate can be efficiently utilized.

Figure 33A:
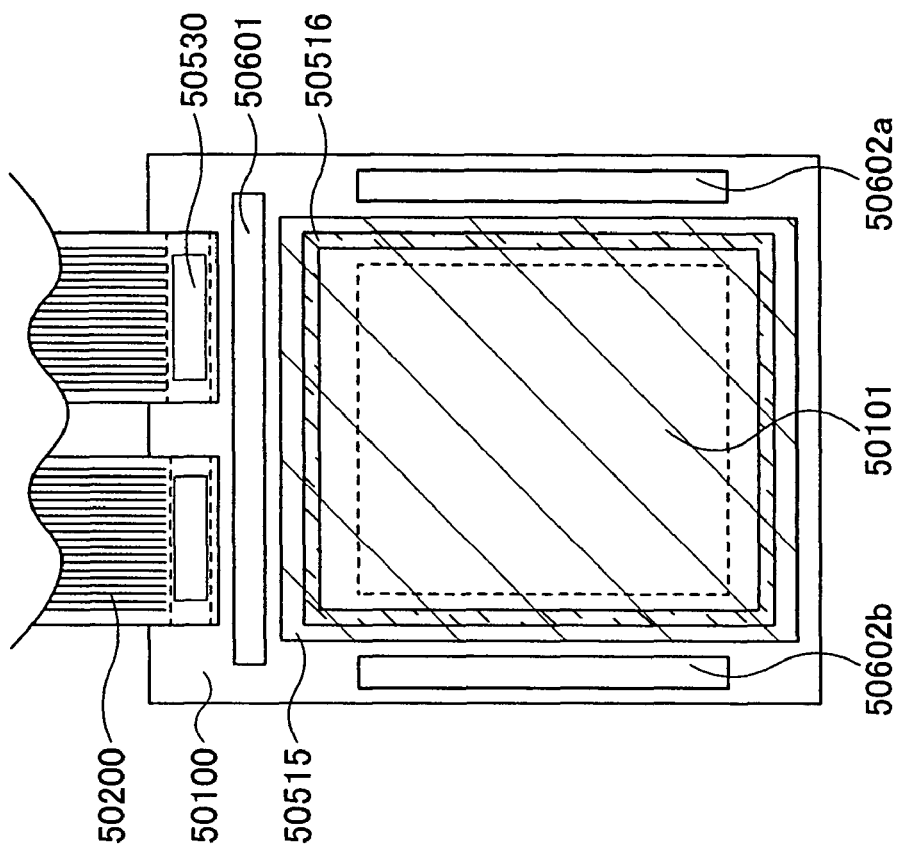
FIGS. 33A and 33B are top views each showing a display device of the present invention.

Although the scanning line driver circuit 50105a, the scanning line driver circuit 50105b, and the signal line driver circuit 50106 are formed over the substrate 50100 in the liquid crystal panel of FIGS. 32A and 32B, a driver circuit corresponding to the signal line driver circuit 50106 may be formed in a driver IC 50601 and mounted on a liquid crystal panel by a COG method as shown in the liquid crystal panel in FIG. 33A. When the signal line driver circuit 50106 is formed in the driver IC 50601, power savings can be achieved. In addition, when the driver IC 50601 is formed as a semiconductor chip such as a silicon wafer, a high speed operation and low power consumption of the liquid crystal panel in FIG. 33A can be achieved.

Figure 33B:
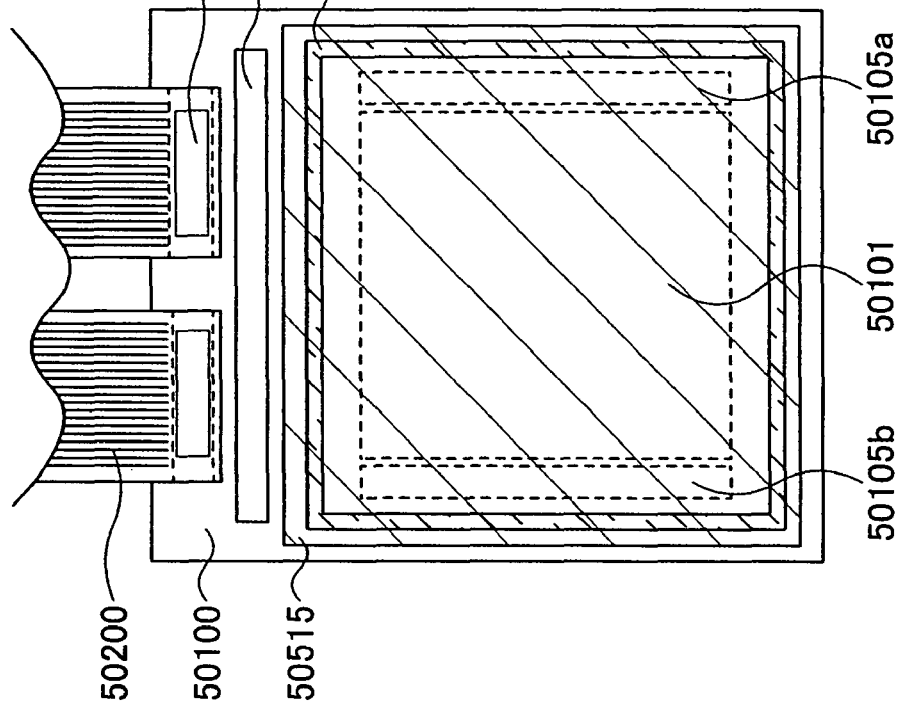

Similarly, as shown in a liquid crystal panel in FIG. 33B, driver circuits corresponding to the scanning line driver circuit 50105*a*, the scanning line driver circuit 50105*b*, and the signal line driver circuit 50106 may be formed in a driver IC 50602*a*, a driver IC 50602*b*, and a driver IC 50601, respectively, and mounted on the liquid crystal panel by a COG method. In addition, when the driver circuits corresponding to the scanning line driver circuit 50105*a*, the scanning line driver circuit 50105*b*, and the signal line driver circuit 50106 are formed in the driver IC 50602*a*, the driver IC 50602*b*, and the driver IC 50601, respectively, lower costs can be achieved.

Figure 34:
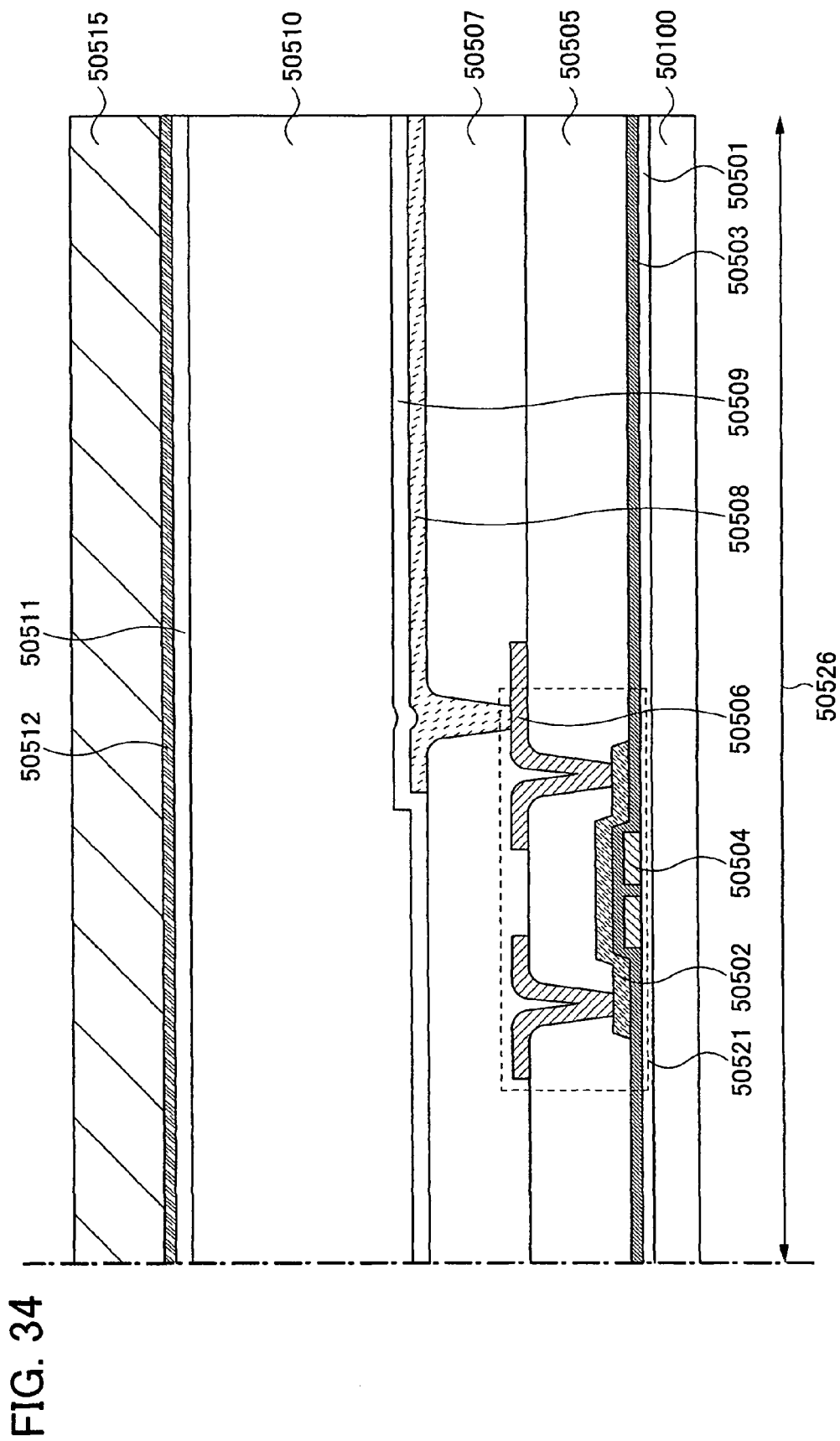
FIG. 34 is a view showing a cross-sectional structure of a pixel of the present invention.

In FIGS. 32A, 32B, 33A, 33B and 36, a cross-sectional view in a case where the top gate transistor is formed over the substrate 50100 is explained. Then, a cross-sectional view in a case where a bottom gate transistor is formed over the substrate 50100 will be explained with reference to FIG. 34. It is to be noted that FIG. 34 shows only the pixel region 50526.

First, an insulating film 50501 is formed over the substrate 50100 as a base film.

Next, a conductive film 50504 is formed over the insulating film 50501 as a gate electrode by a photolithography method, an ink jet method, a printing method, or the like. The conductive film 50504 in a transistor 50521 has a dual-gate structure. This is because, as described above, when the transistor 50521 has a dual-gate structure, an off-state current of the transistor 50521 can be reduced. A plurality of gate electrodes may also be provided over a channel region in a transistor. Alternatively, the conductive film 50504 of the transistor 50521 may be formed to have a single gate structure.

An insulating film 50503 is formed as a gate insulating film over the insulating film 50501 and the conductive film 50504 formed over the insulating film 50501.

Over the insulating film 50503, a semiconductor film 50502 is formed by a photolithography method, an ink jet method, a printing method, or the like. It is to be noted that the semiconductor film 50502 is doped with an impurity element using a resist as a mask in order to form a channel forming region and impurity regions functioning as a source region and a drain region. It is to be noted that the impurity concentration in the impurity region may be controlled to form a high-concentration impurity region and a low-concentration impurity region.

As an interlayer film, an insulating film 50505 is formed over the insulating film 50503 and the semiconductor film 50502 formed over the insulating film 50503. It is to be noted that contact holes are selectively formed in the insulating film 50505. For example, a contact hole is formed over the upper surface of the impurity region of each transistor.

Next, over the insulating film 50505, conductive films 50506 are formed as a drain electrode, a source electrode, and a wiring by a photolithography method, an ink jet method, a printing method, or the like. Further, in a portion where a contact hole is formed in the insulating film 50505, the conductive film 50506 is connected to the impurity region of the semiconductor film 50502 of the transistor.

An insulating film 50507 is formed as a planarizing film over the insulating film 50505 and the conductive film 50506 formed over the insulating film 50505. It is to be noted that a contact hole is selectively formed in the insulating film 50507. For example, a contact hole is formed over the upper surface of the drain electrode of the transistor 50521.

A conductive film 50508 is formed over the insulating film 50507 as a pixel electrode by a photolithography method, an ink jet method, a printing method, or the like.

An insulating film 50509 is formed as an alignment film over the insulating film 50507 and the conductive film 50508 formed over the insulating film 50507.

Then, in a space between the substrate 50515 on which a conductive film 50512, an insulating film 50511, and the like are formed and the substrate 50100, a liquid crystal layer 50510 is provided. In addition, the insulating film 50511 serves as an alignment film.

A cross-sectional view in which the insulating film 50507 is formed as a planarizing film over the insulating film 50505 and the conductive film 50506 formed over the insulating film 50505 is explained with reference to FIGS. 32A and 32B, and 34. However, as shown in FIG. 36, the insulating film 50507 is not always necessary.

Figure 36:
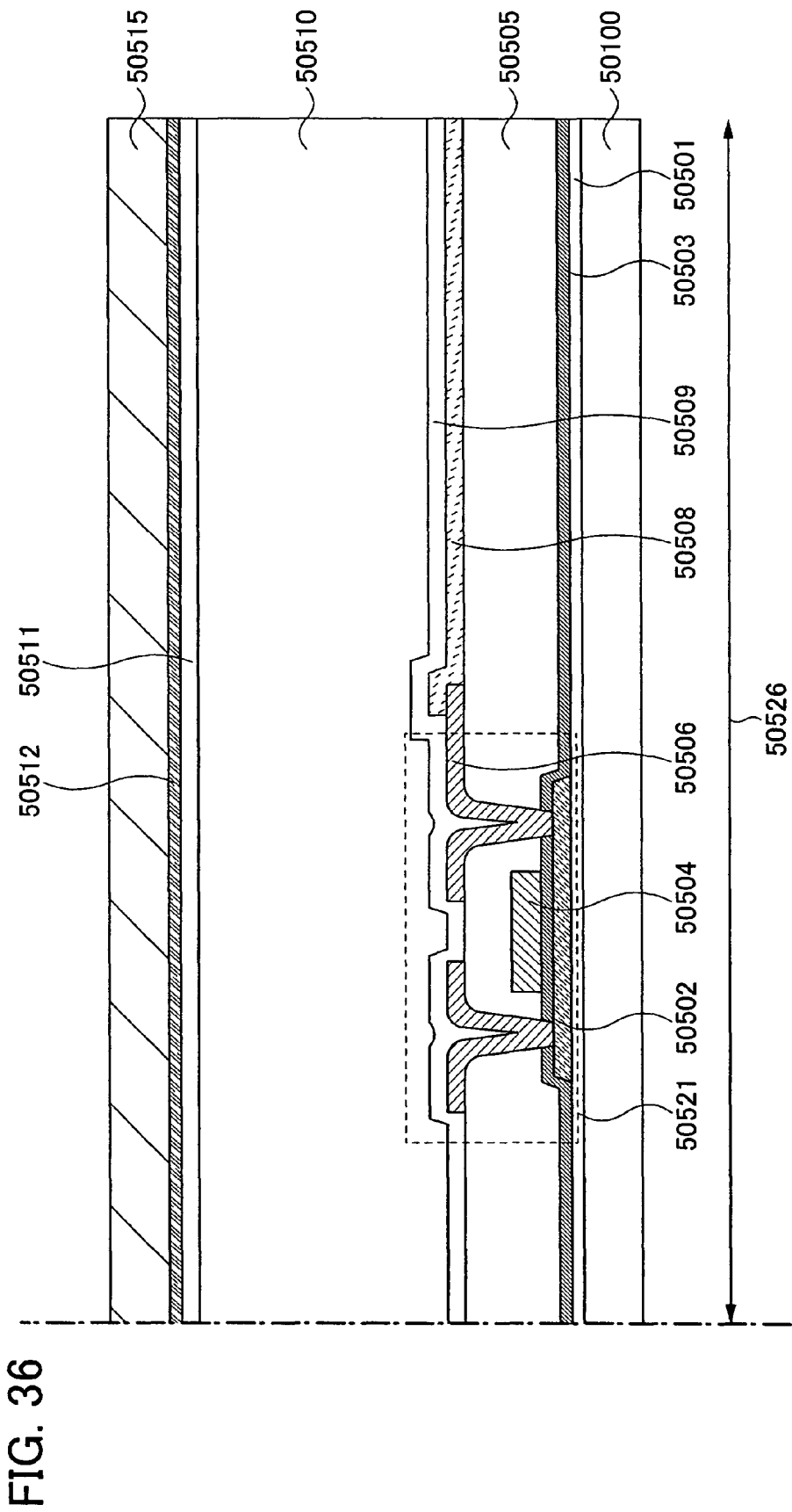
FIG. 36 is a view showing a cross-sectional structure of a pixel of the present invention.

A cross-sectional view of FIG. 36 shows a top gate transistor, but a bottom gate transistor and a double gate transistor may also be formed.

The cross-sectional views in which a transistor is formed using a crystalline semiconductor film (polysilicon film) as a semiconductor film over the substrate 50100 are explained with reference to FIGS. 32A and 32B, 34, and 36. Next, a cross-sectional view in which a transistor is formed using an amorphous semiconductor film (amorphous silicon film) as a semiconductor film over the substrate 50100 will be explained with reference to FIG. 35.

Figure 35:
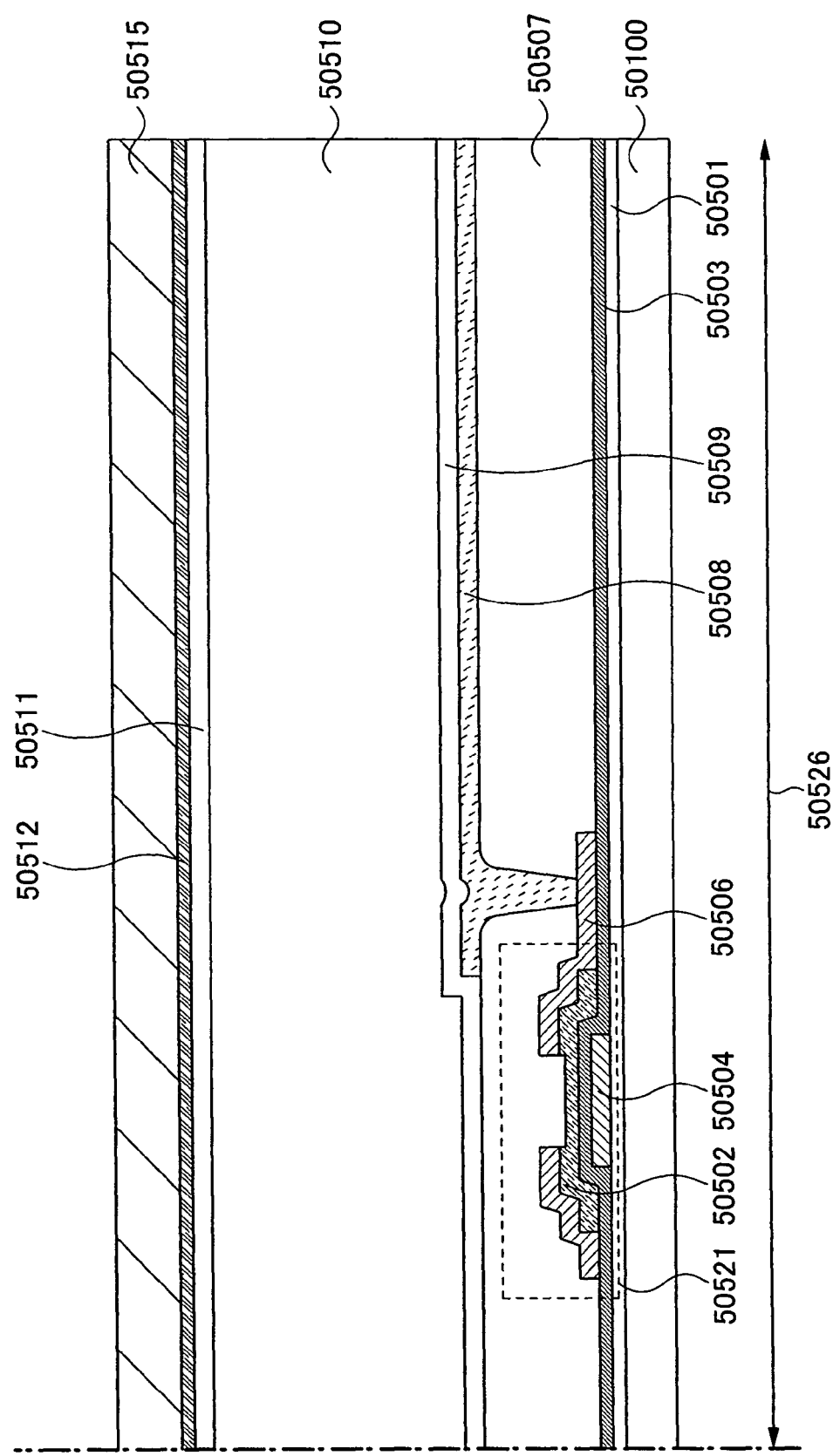
FIG. 35 is a view showing a cross-sectional structure of a pixel of the present invention.

A cross-sectional view of FIG. 35 shows an inverse staggered channel etched transistor.

First, an insulating film 50501 is formed over a substrate 50100 as a base film.

Next, a conductive film 50504 is formed over the insulating film 50501 as a gate electrode by a photolithography method, an ink jet method, a printing method, or the like.

An insulating film 50503 is formed as a gate insulating film over the insulating film 50501 and the conductive film 50504 formed over the insulating film 50501.

Over the insulating film 50503, a semiconductor film 50502 is formed by a photolithography method, an ink jet method, a printing method, or the like. It is to be noted that the semiconductor film 50502 is doped with an impurity element in order to form an impurity region over the entire surface of the semiconductor film 50502.

Next, a conductive film 50506 is formed over the insulating film 50503 and the semiconductor film 50502 formed over the insulating film 50503 by a photolithography method, an ink jet method, a printing method, or the like. The semiconductor film 50502 is etched using the conductive film 50506 as a mask to form a channel forming region and impurity regions functioning as a source region and a drain region.

An insulating film 50507 is formed as a planarizing film over the insulating film 50503, the semiconductor film 50502 formed over the insulating film 50503, and the conductive film 50506 formed over the insulating film 50503 and the semiconductor film 50502. In addition, a contact hole is selectively formed in the insulating film 50507. For example, a contact hole is formed over the upper surface of the drain electrode of the transistor 50521.

A conductive film 50508 is formed as a pixel electrode over the insulating film 50507 by a photolithography method, an ink jet method, a printing method, or the like.

An insulating film 50509 is formed as an alignment film over the insulating film 50507 and the conductive film 50508 formed over the insulating film 50507.

Then, in a space between a substrate 50515 on which a conductive film 50512, an insulating film 50511, and the like are formed and the substrate 50100, a liquid crystal layer 50510 is provided. In addition, the insulating film 50511 serves as an alignment film.

The channel etched transistor is described here, but a channel protective transistor may also be used.

With reference to FIG. 35, the cross-sectional view in which an inverse staggered transistor is formed over the substrate 50100 is explained. Next, with reference to FIG. 37, a cross-sectional view in which a staggered transistor is formed over a substrate 50100 will be explained.

First, an insulating film 50501 is formed over the substrate 50100 as a base film.

Next, a conductive film 50506 is formed over the insulating film 50501 by a photolithography method, an ink jet method, a printing method, or the like.

Over the conductive film 50506, a semiconductor film 50502*a* is formed by a photolithography method, an ink jet method, a printing method, or the like. As the semiconductor film 50502*a*, a material and a structure similar to those of the semiconductor film 50502 can be used. In addition, the semiconductor film 50502*a* is doped with an impurity element in order to form impurity regions functioning as a source region and a drain region.

Over the insulating film 50501 and the semiconductor film 50502*a*, a semiconductor film 50502*b* is formed by a photolithography method, an ink jet method, a printing method, or the like. As the semiconductor film 50502*b*, a material and a structure similar to those of the semiconductor film 50502 can be used. In addition, the semiconductor film 50502*b* is not doped with an impurity element, and a channel forming region is formed.

An insulating film 50503 is formed as a gate insulating film over the insulating film 50501, the semiconductor film 50502*b*, and the conductive film 50506.

Next, a conductive film 50504 is formed over the insulating film 50503 as a gate electrode by a photolithography method, an ink jet method, a printing method, or the like.

As a planarizing film, an insulating film 50507 is formed over the insulating film 50503 and the conductive film 50504 formed over the insulating film 50503. It is to be noted that a contact hole may be selectively formed in the insulating film 50507. For example, a contact hole is formed over an upper surface of a drain electrode of a transistor 50521.

Next, over the insulating film 50507, a conductive film 50508 is formed as a pixel electrode by a photolithography method, an ink jet method, a printing method, or the like.

An insulating film 50509 is formed as an alignment film over the insulating film 50507 and the conductive film 50508 formed over the insulating film 50507.

Then, in a space between a substrate 50515 on which a conductive film 50512, an insulating film 50511, and the like are formed and the substrate 50100, a liquid crystal layer 50510 is provided. In addition, the insulating film 50511 serves as an alignment film.

Figure 37:
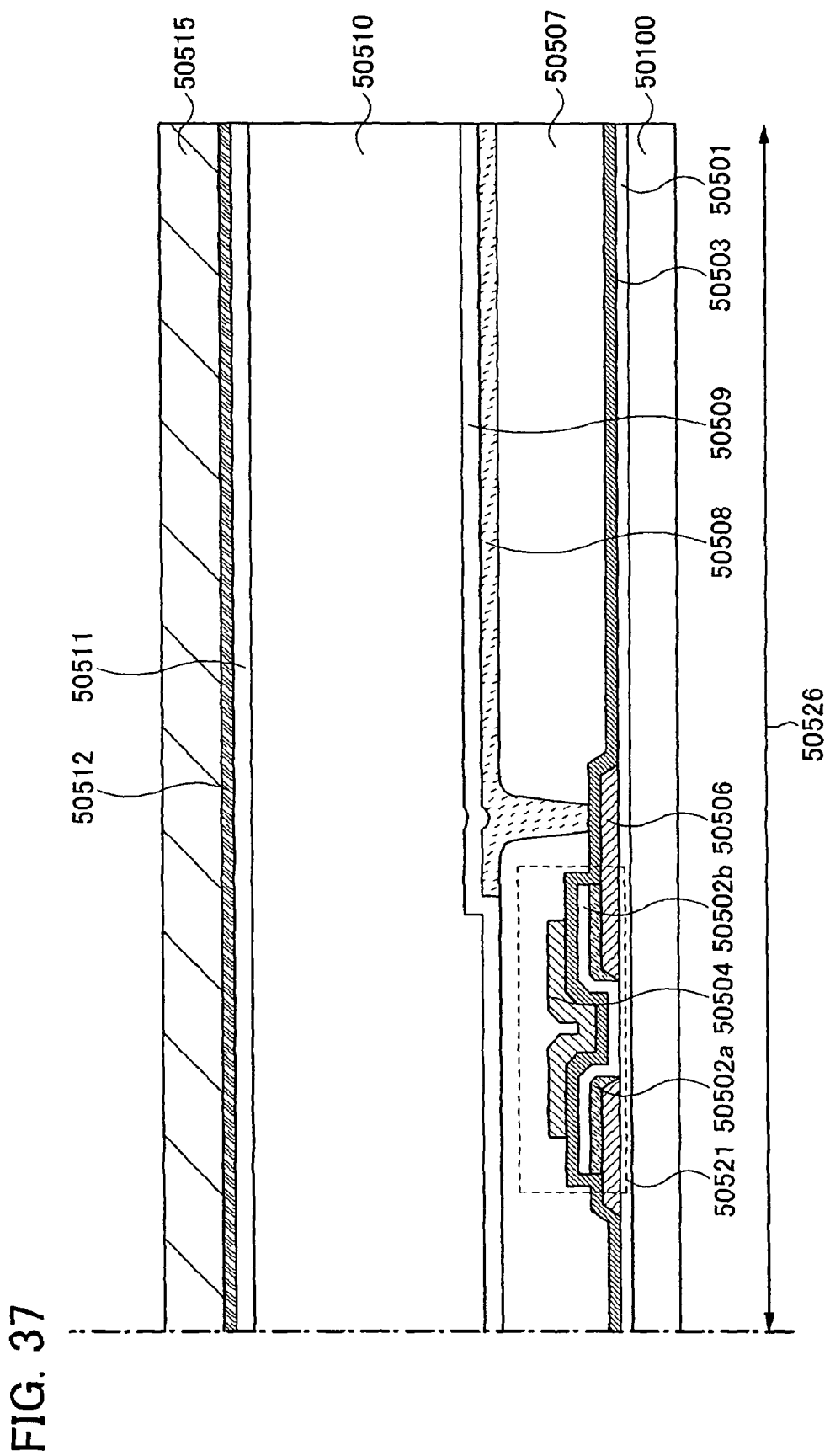
FIG. 37 is a view showing a cross-sectional structure of a pixel of the present invention.

With reference to FIGS. 35 and 37, the cross-sectional view in which the insulating film 50507 is formed as a planarizing film over the insulating film 50505 and the conductive film 50506 formed over the insulating film 50505 is explained. However, as shown in FIG. 38, the insulating film 50507 is not always necessary.

Figure 38:
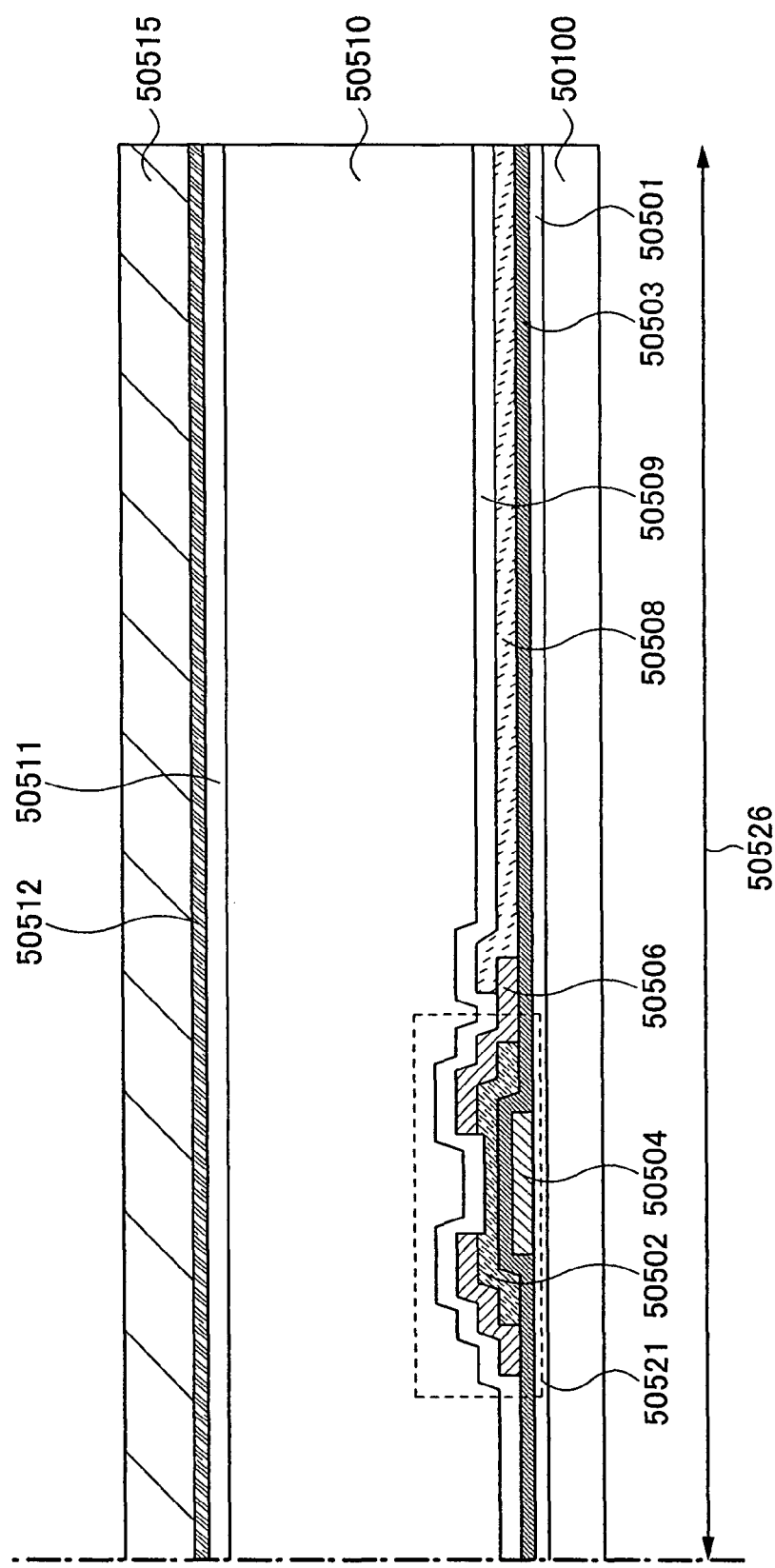
FIG. 38 is a view showing a cross-sectional structure of a pixel of the present invention.

Although the inverse staggered channel etched transistor is shown in a cross-sectional view of FIG. 38, an inverse staggered channel protective transistor may also be formed.

In FIGS. 32A and 32B, 34, 35, 36, and 37, cross-sectional views of reflective or transmissive liquid crystal panels are explained. However, the liquid crystal panel of this embodiment mode may also be a semi-transmissive type as described above. A cross-sectional view of a semi-transmissive liquid crystal panel will be explained with reference to FIG. 39.

Figure 39:
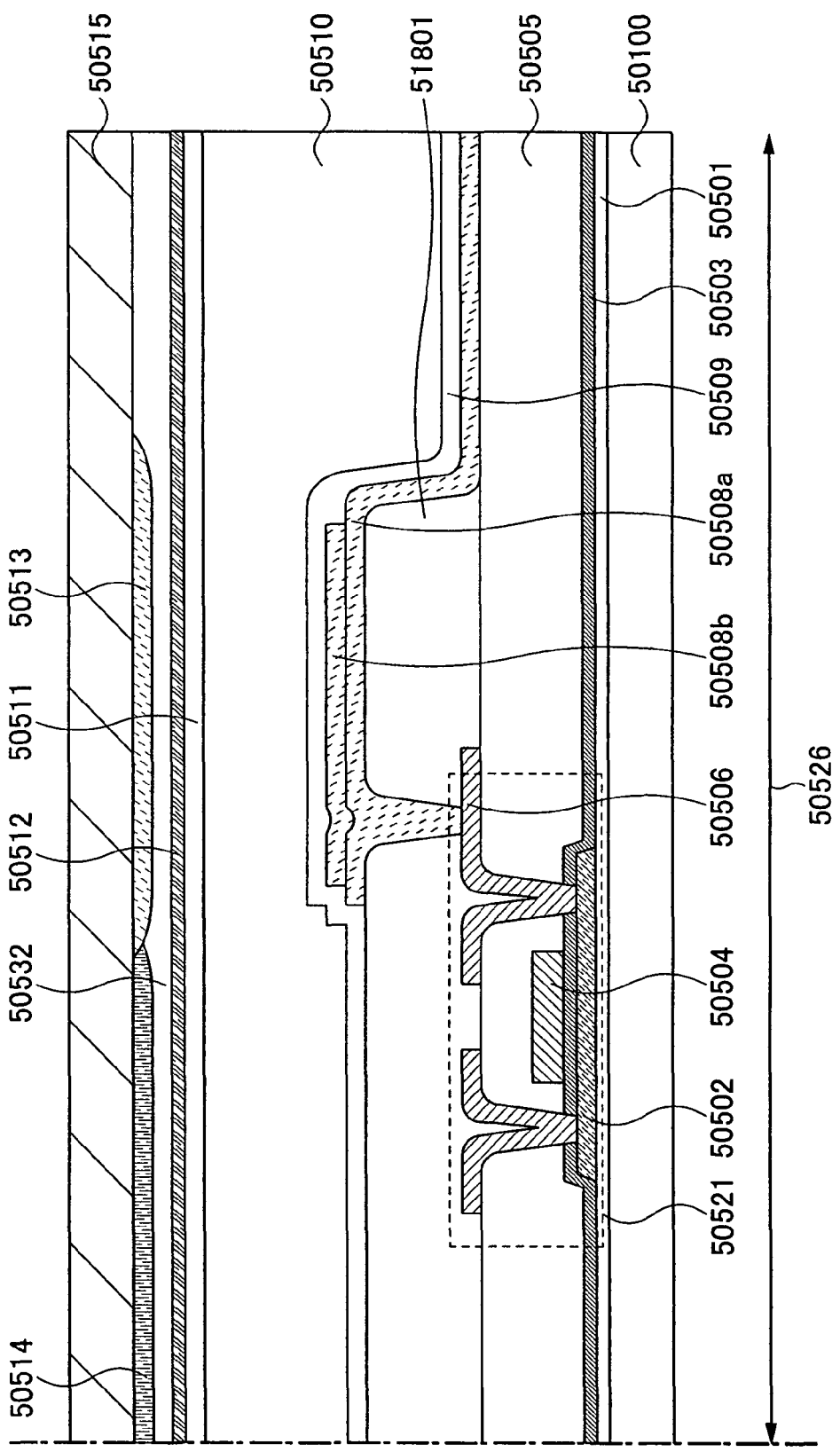
FIG. 39 is a view showing a cross-sectional structure of a pixel of the present invention.

A cross-sectional view of FIG. 39 shows a liquid crystal panel in a case where a polycrystalline semiconductor is used as a semiconductor film of a transistor. The transistor may be either a bottom gate transistor or a double gate transistor. In addition, a gate electrode of the transistor may have a single gate structure or a dual gate structure.

It is to be noted that steps up to formation of the conductive film 50506 is similar to those of FIG. 36. Therefore, steps and a structure after formation of the conductive film 50506 will be explained.

First, an insulating film 51801 is formed over an insulating film 50505 and the conductive film 50506 formed over the insulating film 50505 by a photolithography method, an ink jet method, a printing method, or the like as a film which makes a thickness of a liquid crystal layer 50510 (so-called cell gap) thin. It is desirable that the insulating film 51801 be favorable for planarity and coverage, and the insulating film 51801 is formed using an organic material in many cases. A multi-layer structure in which an organic material is formed over an inorganic material (such as silicon oxide, silicon nitride, or silicon oxynitride) may also be used. In addition, a contact hole is selectively formed in the insulating film 51801. For example, a contact hole is formed over an upper surface of a drain electrode of a transistor 50521.

Next, over the insulating film 50505 and the insulating film 51801, a conductive film 50508*a* is formed as a first pixel electrode by a photolithography method, an ink jet method, a printing method, or the like. As the conductive film 50508*a*, a transparent electrode which transmits light, similar to the conductive film 50508, can be used.

Then, over the conductive film 50508*a*, a conductive film 50508*b* is formed as a second pixel electrode by a photolithography method, an ink jet method, a printing method, or the like. As the conductive film 50508*b*, a reflective electrode which reflects light, similar to the conductive film 50508, can be used. It is to be noted that a region where the conductive film 50508*b* is formed is referred to as a reflective region, and a region where the conductive film 50508*b* is not formed over the conductive film 50508*a* in a region where the conductive film 50508*a* is formed is referred to as a transmissive region.

An insulating film 50509 is formed as an alignment film over the insulating film 51801, the conductive film 50508*a*, and the conductive film 50508*b*.

Then, in a space between a substrate 50515 on which an insulating film 50514, an insulating film 50513, a conductive film 50512, an insulating film 50511, and the like are formed and the substrate 50100, a liquid crystal layer 50510 is provided. In addition, the insulating film 50511 serves as an alignment film. In addition, the insulating film 50513 is formed over the reflective region (over the conductive film 50508*b*).

In FIG. 39, although the conductive film 50508*b* is formed after the conductive film 50508*a* is formed, the conductive film 50508*a* may also be formed after the conductive film 50508*b* is formed.

Figure 40:
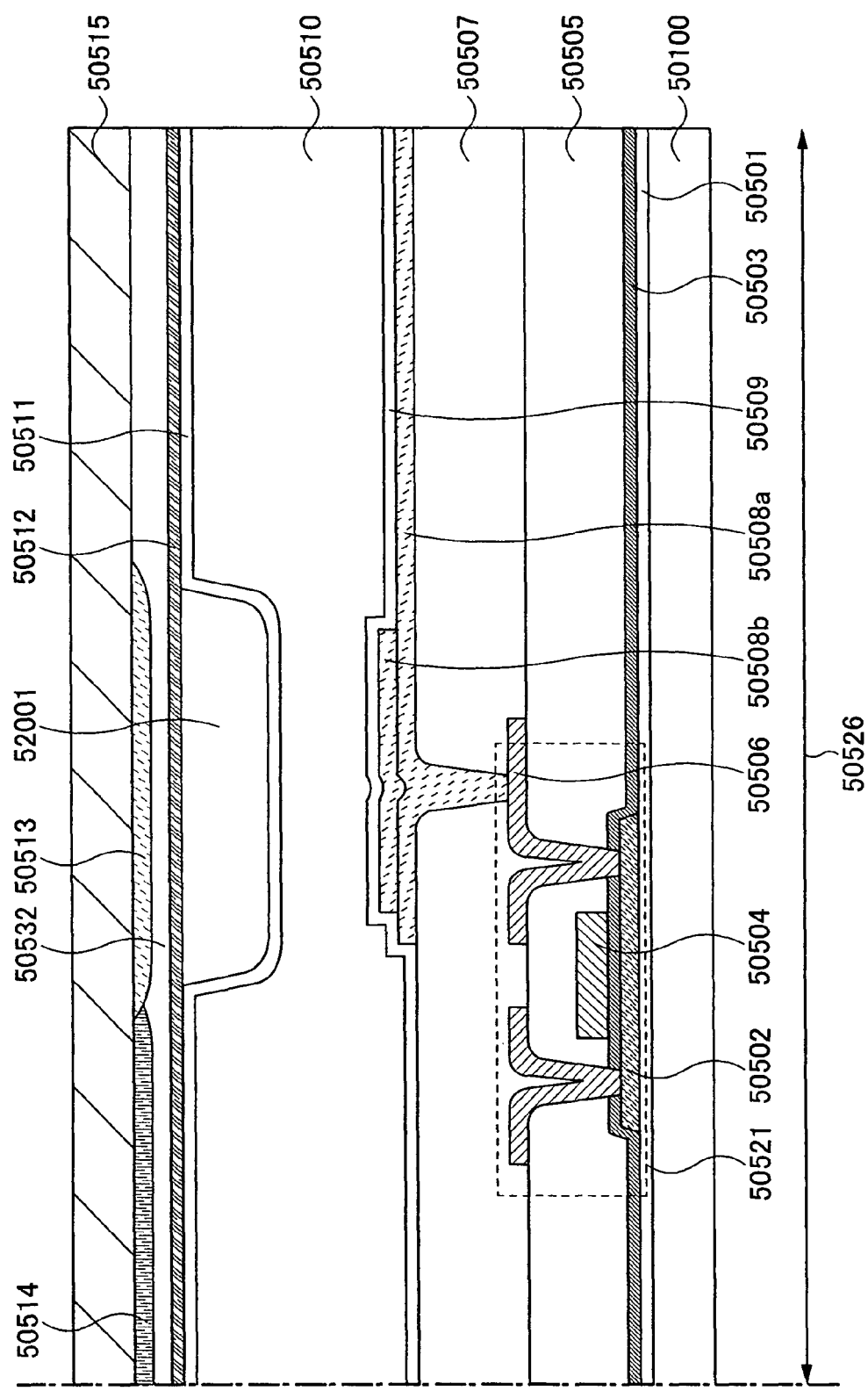
FIG. 40 is a view showing a cross-sectional structure of a pixel of the present invention.

In FIG. 39, an insulating film for adjusting the thickness of the liquid crystal layer 50510 (cell gap) is formed below the conductive film 50508a and the conductive film 50508b. However, as shown in FIG. 40, an insulating film 52001 may also be formed on a substrate 50515 side. The insulating film 52001 is an insulating film for adjusting the thickness of the liquid crystal layer 50510 (cell gap), similar to the insulating film 51801.

In FIG. 40, the case where an insulating film 50507 is formed as a planarizing film is explained, but the insulating film 50507 is not necessarily formed.

In FIGS. 39 and 40, the case where a polycrystalline semiconductor is used as a semiconductor film of a transistor is explained. Then, FIG. 41 shows a cross-sectional view of a liquid crystal panel in which an amorphous semiconductor is used as a semiconductor film of a transistor.

Figure 41:
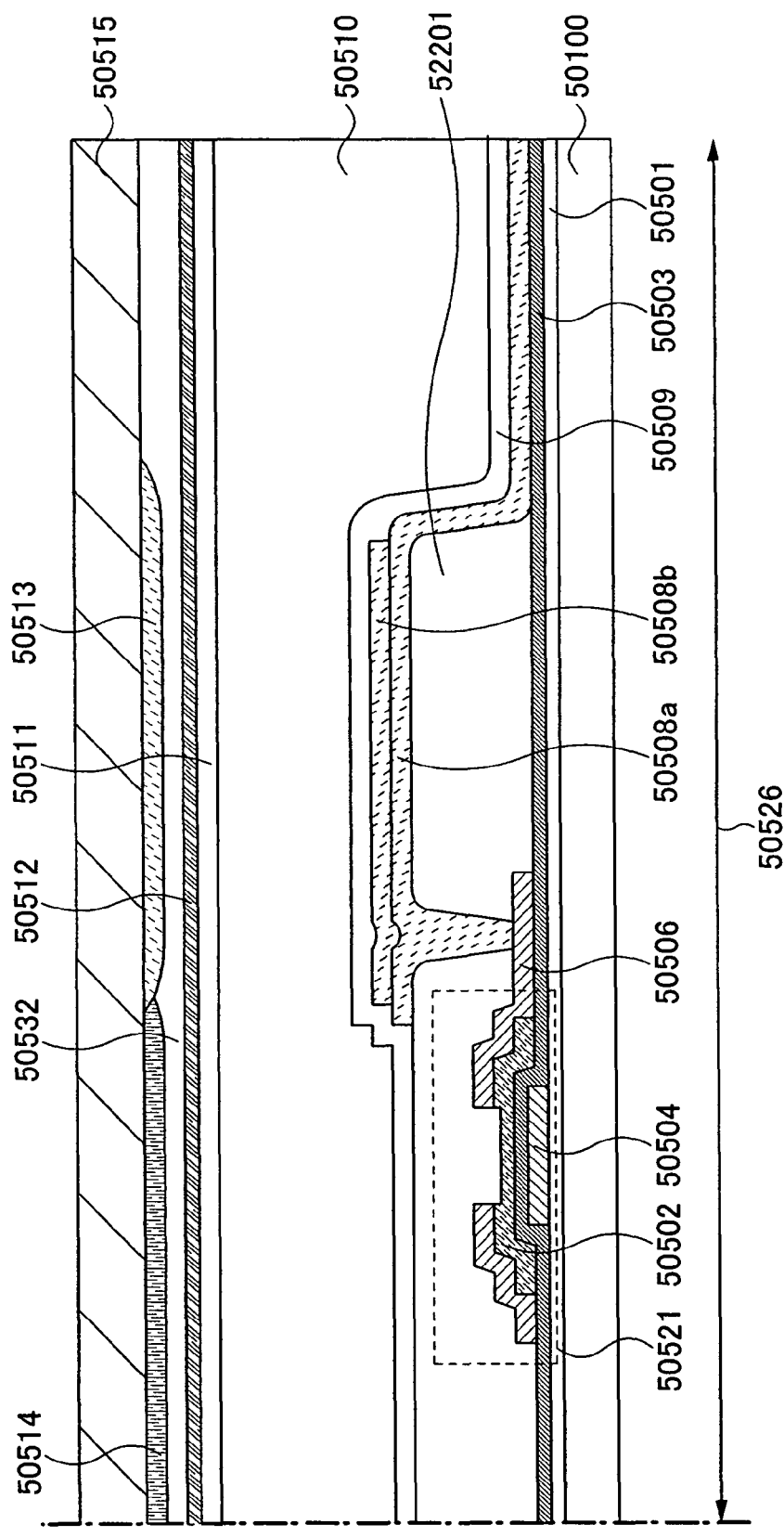
FIG. 41 is a view showing a cross-sectional structure of a pixel of the present invention.

FIG. 41 is a cross-sectional view of a liquid crystal panel including an inverse staggered channel etched transistor. It is to be noted that either a staggered or inverse staggered channel protective transistor may also be used.

It is to be noted that, in FIG. 41, steps up to formation of the conductive film 50506 is similar to those of FIG. 35. Therefore, steps and a structure after formation of the conductive film 50506 will be explained.

First, an insulating film 52201 is formed over a semiconductor film 50502, an insulating film 50503, and a conductive film 50506 by a photolithography method, an ink jet method, a printing method, or the like as a film which makes a thickness of a liquid crystal layer 50501 (so-called cell gap) thin. It is desirable that the insulating film 52201 be favorable for planarity and coverage, and the insulating film 52201 is formed using an organic material in many cases. A multilayer structure in which an organic material is formed over an inorganic material (such as silicon oxide, silicon nitride, or silicon oxynitride) may also be used. It is to be noted that a contact hole is selectively formed in the insulating film 52201. For example, a contact hole is formed over an upper surface of a drain electrode of a transistor 50521.

Next, over the insulating film 50503 and the insulating film 52201, a conductive film 50508a is formed as a first pixel electrode by a photolithography method, an ink jet method, a printing method, or the like.

Then, over the conductive film 50508a, a conductive film 50508b is formed as a second pixel electrode by a photolithography method, an ink jet method, a printing method, or the like. It is to be noted that a region where the conductive film 50508b is formed is referred to as a reflective region, and a region where the conductive film 50508b is not formed over the conductive film 50508a in a region where the conductive film 50508a is formed is referred to as a transmissive region.

An insulating film 50509 is formed as an alignment film over the insulating film 52201, the conductive film 50508a, and the conductive film 50508b.

Then, in a space between a substrate 50515 on which an insulating film 50514, an insulating film 50513, a conductive film 50512, an insulating film 50511, and the like are formed and the substrate 50100, a liquid crystal layer 50510 is provided. In addition, the insulating film 50511 serves as an alignment film. In addition, the insulating film 50513 is formed over the reflective region (over the conductive film 50508b).

In FIG. 41, although the conductive film 50508b is formed after the conductive film 50508a is formed, the conductive film 50508a may also be formed after the conductive film 50508b is formed.

Figure 42:
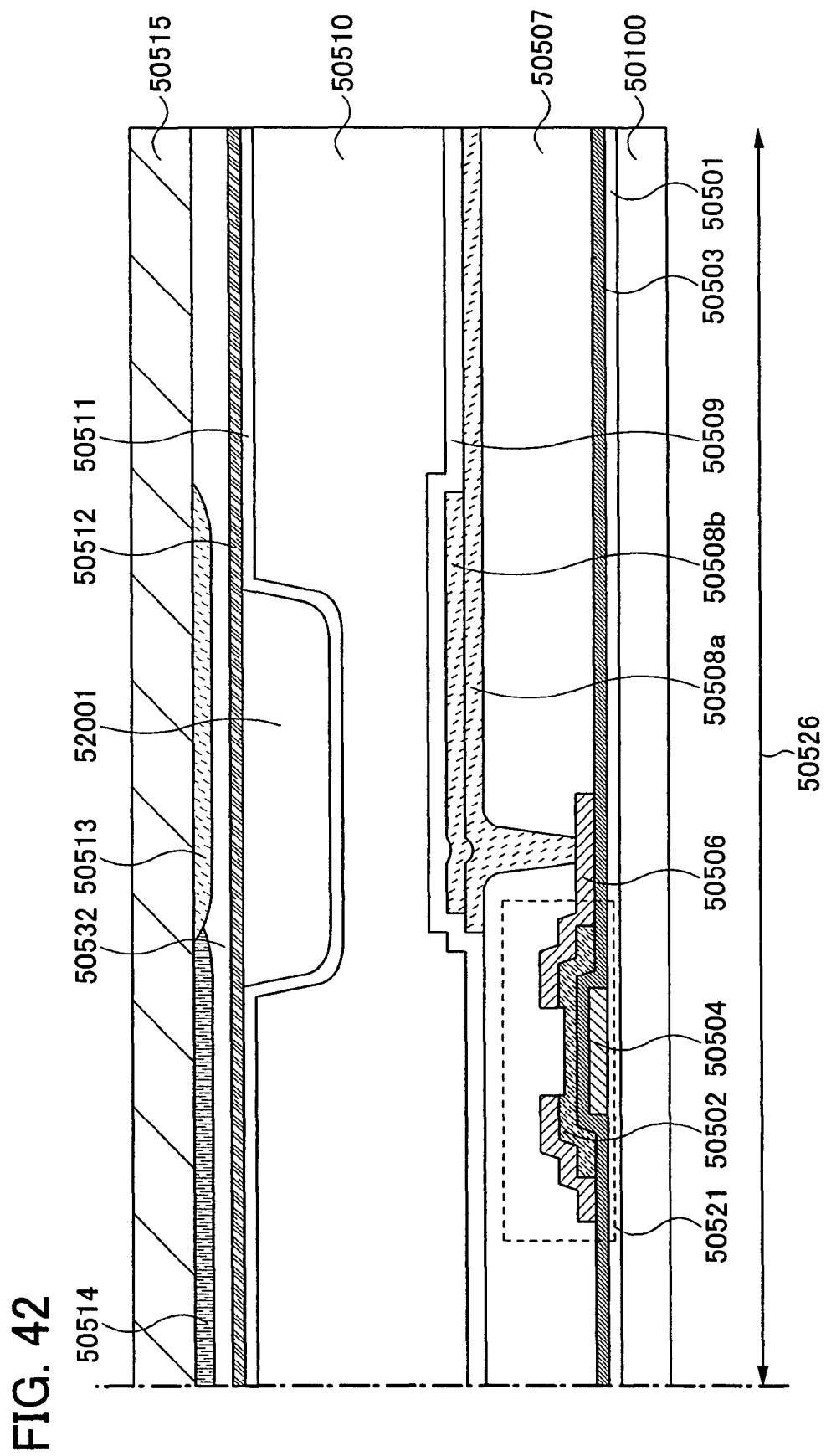
FIG. 42 is a view showing a cross-sectional structure of a pixel of the present invention.

In FIG. 41, the insulating film for adjusting the thickness of the liquid crystal layer 50510 (cell gap) is formed below the conductive film 50508a and the conductive film 50508b. However, as shown in FIG. 42, an insulating film 52001 may also be formed on a substrate 50515 side. The insulating film 52001 is a film for adjusting the thickness of the liquid crystal layer 50510 (cell gap), similar to the insulating film 52201.

In FIG. 42, the case where an insulating film 50507 is formed as a planarizing film is explained, but the insulating film 50507 is not necessarily formed.

FIGS. 32A and 32B, and 34 to 42 each show an example in which a pair of electrodes (the conductive film 50508 and the conductive film 50512), which apply a voltage to the liquid crystal layer 50510, are formed over different substrates. However, the conductive film 50512 may also be provided over the substrate 50100. In such a manner, an IPS (In-Plane-Switching) mode may be used as a driving method of a liquid crystal. Depending on the liquid crystal layer 50510, one or both of two alignment films (the insulating film 50509 and the insulating film 50511) are not required to be provided.

In FIGS. 39 to 42, the conductive film (the conductive film 50508b) is formed as a reflective pixel electrode, and the conductive film 50508b is preferably uneven. This is because the reflective pixel electrode performs display by reflecting external light, and with the uneven shape, external light that is incident to the reflective electrode can be efficiently utilized and reflected diffusely, whereby display luminance is enhanced. When a film below the conductive film 50508b (the insulating film 50505, the insulating film 50507, the insulating film 51801, the insulating film 52201, or the like) is made uneven, the conductive film 50508b becomes uneven.

As partially described above, the wiring and the electrode are formed using one or more elements of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O); a compound or alloy material containing one or more of the aforementioned elements (such as indium tin oxide (ITO), indium zinc oxide (IZO), indium tin oxide doped with silicon oxide (ITSO), zinc oxide (ZnO), aluminum neodymium (Al—Nd), or magnesium silver (Mg—Ag)); a substance obtained by combining such compounds; or the like. Alternatively, a compound (silicide) of silicon and the aforementioned material (such as aluminum silicon, molybdenum silicon, or nickel silicide) or a compound of nitrogen and the aforementioned material (such as titanium nitride, tantalum nitride, or molybdenum nitride) can be used. It is to be noted that silicon (Si) may contain a large amount of n-type impurities (phosphorus or the like) or p-type impurities (boron or the like). When such an impurity is contained, conductivity of silicon is improved and silicon functions similarly to normal conductor; therefore, it becomes easy to use silicon as a wiring or an electrode. Silicon may be single crystalline silicon, polycrystalline silicon (polysilicon), or amorphous silicon. When single crystalline silicon or polycrystalline silicon is used, resistance can be reduced. When amorphous silicon is used, a manufacturing process can be simplified. Aluminum and silver have high conductivity; thus, signal delay can be reduced, and minute processing is possible since they are easy to be etched and patterned. Since copper has high conductivity, signal delay can be reduced. Molybdenum is desirable because it can be manufactured without a problem such as a defect of a material even if molybdenum is in contact with an oxide semiconductor such as ITO or IZO, or silicon; because it is easily patterned and etched; and because it has high heat resistance. Titanium is desirable because it can be manufactured without a problem such as a defect of a material even if titanium is in contact with an oxide semiconductor such as ITO or IZO, or silicon; and because it has high heat resistance. Tungsten is desirable because it has high heat resistance. Neodymium is desirable because it has high heat resistance. In particular, an alloy of neodymium and aluminum is desirable because heat resistance is improved and hillocks of aluminum are hardly generated. Silicon is desirable because it can be manufactured at the same time as the semiconductor layer in the transistor and has high heat resistance. Indium tin oxide (ITO), indium zinc oxide (IZO), indium tin oxide doped with silicon oxide (ITSO), zinc oxide (ZnO), and silicon (Si) are desirable because they have a light-transmitting property and can be used for a portion which transmits light, such as a pixel electrode or a common electrode.

It is to be noted that the wiring and the electrode may have a single layer or multilayer structure of these materials. If a single-layer structure is employed, the manufacturing process can be simplified and the number of steps can be reduced; which leads to reduction in costs. If a multilayer structure is employed, advantage of a material can be derived and disadvantage of the material can be reduced, so that a wiring and an electrode with favorable characteristics can be formed. For example, when a material with low resistance (such as aluminum) is included in the multilayer structure, the resistance of the wiring can be reduced. In addition, if materials with high heat resistance is used, for example, so that a material with low heat resistance and another advantage is interposed between the materials with high heat resistance in a stacked-layer structure, the heat resistance of the wiring and the electrode as a whole can be improved. For example, a stacked layer structure in which a layer containing aluminum is interposed between layers containing molybdenum or titanium is desirable. In addition, there is a case in which a material is directly in contact with a wiring or an electrode of another material, and the materials adversely affect each other. For example, a material may enter another material and change its characteristics; therefore, the material cannot serve its original purpose or a problem occurs in manufacturing and the material cannot be manufactured normally. In such a case, the problem can be solved when a layer is interposed between other layers or a layer is covered with another layer. For example, if indium tin oxide (ITO) and aluminum are desired to be in contact with each other, it is desirable that titanium or molybdenum is interposed therebetween. Also, if silicon and aluminum are desired to be in contact with each other, it is desirable that titanium or molybdenum is interposed therebetween.

This embodiment mode can be implemented by being freely combined with any description of other embodiment modes in this specification. Further, any descriptions in this embodiment mode can be freely combined to be implemented.

Embodiment Mode 5

In this embodiment mode, a pixel structure of the display device used in the present invention will be explained along with a liquid crystal mode.

FIGS. 59A and 59B are a cross-sectional view and a top view, respectively, of a pixel in which a so-called TN mode that is one of pixel structures of a liquid crystal display device is combined with a thin film transistor (TFT). FIG. 59A is a cross-sectional view of a pixel, and FIG. 59B is a top view of the pixel. Further, the cross-sectional view of the pixel shown in FIG. 59A corresponds to a line a-a' in the top view of the pixel shown in FIG. 59B. When the present invention is applied to a liquid crystal display device having the pixel structure shown in FIGS. 59A and 59B, the liquid crystal display device can be manufactured at low costs.

A pixel structure of a TN-mode liquid crystal display device will be explained with reference to FIG. 59A. The liquid crystal display device includes a basic portion that displays images, which is called a liquid crystal panel. The liquid crystal panel is manufactured as follows: two processed substrates are attached to each other with a gap of several μm therebetween, and a liquid crystal material is injected into a space between the two substrates. In FIG. 59A, the two substrates corresponds to a first substrate 5901 and a second substrate 5916. A TFT and a pixel electrode may be formed over the first substrate; and a light-shielding film 5914, a color filter 5915, a fourth conductive layer 5913, a spacer 5917, and a second alignment film 5912 may be formed on the second substrate.

It is to be noted that the present invention can also be implemented without forming a TFT over the first substrate 5901. When the present invention is implemented without forming a TFT, the number of steps is reduced, and the manufacturing costs can be reduced. In addition, since the structure is simple, the yield can be improved. On the other hand, when the present invention is implemented by forming a TFT, a larger-sized display device can be obtained.

The TFT shown in FIGS. 59A and 59B is a bottom gate TFT using an amorphous semiconductor, which has an advantage that it can be manufactured by using a large-area substrate at low costs. However, the present invention is not limited thereto. As a structure of a TFT which can be used, there are a channel-etched type, a channel-protective type, and the like as for a bottom gate TFT. Alternatively, a top gate type may be used. Furthermore, not only the amorphous semiconductor but also a polycrystalline semiconductor may be used.

It is to be noted that the present invention can also be implemented without forming the light-shielding film 5914 on the second substrate 5916. When the present invention is implemented without forming the light-shielding film 5914, the number of steps is reduced, and the manufacturing costs can be reduced. In addition, since the structure is simple, the yield can be improved. On the other hand, when the present invention is implemented by forming the light-shielding film 5914, a display device with little light leakage at the time of black display can be obtained.

It is to be noted that the present invention can also be implemented without forming the color filter 5915 on the second substrate 5916. When the present invention is implemented without forming the color filter 5915, the number of steps is reduced, and the manufacturing costs can be reduced. In addition, since the structure is simple, the yield can be improved. On the other hand, when the present invention is implemented by forming the color filter 5915, a display device capable of color display can be obtained.

It is to be noted that the present invention can also be implemented by dispersing spherical spacers instead of providing the spacer 5917 for the second substrate 5916. When the present invention is implemented by dispersing the spherical spacers, the number of steps is reduced, and the manufacturing costs can be reduced. In addition, since the structure is simple, the yield can be improved. On the other hand, when the present invention is implemented by forming the spacer 5917, there is no variation in positions of the spacers; therefore, a distance between the two substrates can be uniform and a display device with little display unevenness can be obtained.

Next, a process to be performed to the first substrate 5901 will be explained. A substrate having a light-transmitting property is preferably used as the first substrate 5901. For example, a quartz substrate, a glass substrate, or a plastic substrate may be used. Alternatively, the first substrate 5901 may be a light-shielding substrate such as a semiconductor substrate or an SOI (Silicon on Insulator) substrate.

First, a first insulating film 5902 may be formed over the first substrate 5901. The first insulating film 5902 may be an insulating film such as a silicon oxide film, a silicon nitride film, or a silicon oxynitride film (SiOxNy) film. Alternatively, an insulating film having a stacked layer structure in which at least two of these films are combined may be used. When the present invention is implemented by forming the first insulating film 5902, a change in characteristics of the TFT due to an impurity from the substrate which affects a semiconductor layer can be prevented; therefore, a display device with high reliability can be obtained. On the other hand, when the present invention is implemented without forming the first insulating film 5902, the number of steps is reduced, and the manufacturing costs can be reduced. In addition, since the structure is simple, the yield can be improved.

Next, a first conductive layer 5903 is formed over the first substrate 5901 or the first insulating film 5902. The first conductive layer 5903 may be formed with a processed shape. The step of processing the shape may be as follows. First, the first conductive layer is formed over the entire surface. At this time, a film formation apparatus such as a sputtering apparatus or a CVD apparatus may be used. Next, a photosensitive resist material is formed over the entire surface of the first conductive layer that is formed over the entire surface. Then, the resist material is exposed to light in accordance with an intended shape by a photolithography method, a laser drawing method, or the like. Thereafter, either the resist material which is exposed to light or the resist material which is not exposed to light is removed by etching, whereby a mask for processing the shape of the first conductive layer 5903 can be obtained. After that, the first conductive layer 5903 is removed by etching in accordance with the formed mask pattern, whereby the first conductive layer 5903 can be processed into a desired pattern. As a method for etching the first conductive layer 5903, there are a chemical method (wet etching) and a physical method (dry etching), and the method is appropriately selected in consideration of properties of a material of the first conductive layer 5903 and a material used for a portion below the first conductive layer 5903. As a material used for the first conductive layer 5903, Mo, Ti, Al, Nd, Cr, or the like is preferable. Alternatively, a stacked layer structure including these materials may be used. Further alternatively, the first conductive layer 5903 may be formed as a single layer or stacked layer structure of an alloy thereof.

Next, a second insulating film 5904 is formed. At this time, a film formation apparatus such as a sputtering apparatus or a CVD apparatus may be used. As a material used for the second insulating film 5904, a thermal oxide film, a silicon oxide film, a silicon nitride film, a silicon oxynitride film, or the like is preferable. Alternatively, a stacked layer structure including these films may be used. It is particularly preferable that part of the second insulating film 5904 which is in contact with a first semiconductor layer 5905 be a silicon oxide film. This is because, when a silicon oxide film is used, trap level at an interface with the semiconductor film 5905 is decreased. When the first conductive layer 5903 is formed of Mo, it is preferable that part of the second insulating film 5904 which is in contact with the first conductive layer 5903 be a silicon nitride film. This is because a silicon nitride film does not oxidize Mo.

Next, the first semiconductor layer 5905 is formed. It is preferable that a second semiconductor layer 5906 be formed sequentially thereafter. The first semiconductor layer 5905 and the second semiconductor layer 5906 may be each formed with a processed shape. The step of processing the shape is preferably a method such as a photolithography method as described above. As a material used for the first semiconductor layer 5905, silicon, silicon germanium (SiGe), or the like is preferable. Further, as a material used for the second semiconductor layer 5906, silicon that contains phosphorus or the like is preferable.

Next, a second conductive layer 5907 is formed. It is preferable that a sputtering method or a printing method be used at this time. A material used for the second conductive layer 5907 may have transparency or reflectiveness. When the second conductive layer 5907 has transparency, for example, an indium tin oxide (ITO) film formed by mixing tin oxide into indium oxide, an indium tin silicon oxide (ITSO) film formed by mixing silicon oxide into indium tin oxide (ITO), an indium zinc oxide (IZO) film formed by mixing zinc oxide into indium oxide, a zinc oxide film, or a tin oxide film can be used. It is to be noted that IZO is a transparent conductive material formed by sputtering using a target in which 2 to 20 wt % of zinc oxide (ZnO) is mixed into ITO. On the other hand, when the second conductive layer 5907 has reflectiveness, Ti, Mo, Ta, Cr, W, Al, or the like can be used. Furthermore, a two-layer structure in which Al and Ti, Mo, Ta, Cr, or W are stacked, or a three-layer structure in which Al is interposed between metals such as Ti, Mo, Ta, Cr, and W may be employed. The second conductive layer 5907 may be formed with a processed shape. The step of processing the shape is preferably a method such as a photolithography method as described above. In addition, the etching is preferably performed by dry etching. The dry etching may be performed by a dry etching apparatus using a high density plasma source such as ECR (Electron Cycrotron Resonance) or ICP (Inductive Coupled Plasma).

Next, a channel region of a TFT is formed. At this time, etching of the second semiconductor layer 5906 may be performed using the second conductive layer 5907 as a mask. Accordingly, the number of masks can be reduced, and the manufacturing costs can be reduced. When etching of the second semiconductor layer 5906 that has conductivity is performed, a portion where the second semiconductor layer 5906 is removed becomes the channel region of the TFT. Alternatively, without sequentially forming the first semiconductor layer 5905 and the second semiconductor layer 5906, a film to be a stopper may be formed and patterned in a portion to be the channel region of the TFT after the formation of the first semiconductor layer 5905, and then, the second semiconductor layer 5906 may be formed. Accordingly, the channel region of the TFT can be formed without using the second conductive layer 5907 as a mask; therefore, a degree of freedom of layout pattern is increased, which is an advantage. In addition, since the first semiconductor layer 5905 is not etched when the second semiconductor layer 5906 is etched; therefore, a channel region of the TFT can be surely formed without causing an etching defect, which is also an advantage.

Next, a third insulating film 5908 is formed. It is preferable that the third insulating film 5908 have a light-transmitting property. As a material used for the third insulating film 5908, an inorganic material (such as silicon oxide, silicon nitride, or silicon oxynitride), an organic compound material with low permittivity (a photosensitive or nonphotosensitive organic resin material), or the like is preferable. Alternatively, a material that contains siloxane may be used. Siloxane is a material which has a skeleton structure that contains a bond of silicon (Si) and oxygen (O). As a substituent, an organic group containing at least hydrogen (e.g., an alkyl group or aromatic hydrocarbon) can be used. As a substituent, a fluoro group may also be used. Alternatively, as a substituent, a fluoro group and an organic group containing at least hydrogen may be used. It is to be noted that the third insulating film 5908 may be formed with a processed shape. The step of processing the shape is preferably a method such as a photolithography method as described above. At this time, by etching the second insulating film 5904 concurrently, a contact hole reaching not only the second conductive layer 5907 but also the first conductive layer 5903 can be formed. It is preferable that the surface of the third insulating film 5908 be as flat as possible. This is because, when the surface to be in contact with a liquid crystal is uneven, alignment of liquid crystal molecules is affected.

Next, a third conductive layer 5909 is formed. It is preferable that a sputtering method or a printing method be used at this time. A material used for the third conductive layer 5909 may have transparency or reflectiveness, similarly to the second conductive layer 5907. A material which can be used for the third conductive layer 5909 may be similar to that of the second conductive layer 5907. In addition, the third conductive layer 5909 may be formed with a processed shape. The method for processing the shape may be similar to that of the second conductive layer 5907.

Next, a first alignment film 5910 is formed. As the first alignment film 5910, a film of a high molecular compound such as polyimide can be used. After the first alignment film 5910 is formed, rubbing may be performed so as to control the alignment of liquid crystal molecules. Rubbing is a step for forming stripes on an alignment film by rubbing the alignment film with a cloth. By performing the rubbing, the alignment film can be provided with an alignment property.

The first substrate 5901 that is manufactured as described above is attached to the second substrate 5916 provided with the light-shielding film 5914, the color filter 5915, the fourth conductive layer 5913, the spacer 5917, and the second alignment film 5912 with a sealing material with a gap of several µm therebetween, and then, a liquid crystal material is injected into a space between the two substrates, whereby the liquid crystal panel can be manufactured. It is to be noted that, in the TN-mode liquid crystal panel as shown in FIGS. 59A and 59B, the fourth conductive layer 5913 may be formed on the entire surface of the second substrate 5916.

Next, a feature of a pixel structure of the TN-mode liquid crystal panel shown in FIGS. 59A and 59B will be explained. A liquid crystal molecule 5918 shown in FIG. 59A is a long and narrow molecule having a major axis and a miner axis. In FIG. 59A, each liquid crystal molecule 5918 is expressed by its length to show the direction of the liquid crystal molecule. That is, the direction of the major axis of the liquid crystal molecule 5918 which is expressed as a long molecule is parallel to the page; and as the liquid crystal molecule 5918 is expressed to be shorter, the direction of the major axis becomes closer to the normal direction of the page. That is, among the liquid crystal molecules 5918 shown in FIG. 59A, the direction of the major axis of the one which is close to the first substrate 5901 and the direction of the major axis of the one which is close to the second substrate 5916 are different from each other by 90 degrees, and the directions of the major axes of the liquid crystal molecules 5918 therebetween are arranged so as to smoothly link the above two directions. In other words, the liquid crystal molecules 5918 shown in FIG. 59A are aligned to be twisted 90 degrees between the first substrate 5901 and the second substrate 5916.

Next, an example of a pixel layout of a TN-mode liquid crystal display device to which the present invention is applied will be explained with reference to FIG. 59B. The pixel of the TN-mode liquid crystal display device to which the present invention is applied may include a scanning line 5921, a video signal line 5922, a capacitor line 5923, a TFT 5924, a pixel electrode 5925, and a pixel capacitor 5926.

The scanning line 5921 is electrically connected to a gate electrode of the TFT 5924; therefore, it is preferable that the scanning line 5921 be formed of the first conductive layer 5903.

The video signal line 5922 is electrically connected to a source electrode or drain electrode of the TFT 5924; therefore, it is preferable that the video signal line 5922 be formed of the second conductive layer 5907. Furthermore, since the scanning line 5921 and the video signal line 5922 are arranged in a matrix, it is preferable that the scanning line 5921 and the video signal line 5922 be formed of at least conductive layers in different layers.

The capacitor line 5923 is a wiring that is provided so as to be parallel to the pixel electrode 5925 for forming the pixel capacitor 5926, and it is preferable that the capacitor line 5923 be formed of the first conductive layer 5903. The capacitor line 5923 may be extended along the video signal line 5922 so as to surround the video signal line 5922 as shown in FIG. 59B. Accordingly, a cross talk, which is a phenomenon in which a potential of an electrode, which is supposed to be held, is changed in accordance with a potential change of the video signal line 5922, can be reduced. In order to reduce cross capacitance with the video signal line 5922, the first semiconductor layer 5905 may be provided in a cross region of the capacitor line 5923 and the video signal line 5922 as shown in FIG. 59B.

The TFT 5924 operates as a switch for electrically connecting the video signal line 5922 and the pixel electrode 5925. As shown in FIG. 59B, one of a source region and drain region of the TFT 5924 may be provided so as to surround the other one of the source region and drain region. Accordingly, a wide channel width can be obtained even in a small area and the switching capability can be increased. The gate electrode of the TFT 5924 may be provided so as to surround the first semiconductor layer 5905 as shown in FIG. 59B.

The pixel electrode 5925 is electrically connected to one of the source electrode and drain electrode of the TFT 5924. The pixel electrode 5925 is an electrode for giving a signal voltage which is transmitted through the video signal line 5922 to the liquid crystal element. In addition, the pixel electrode 5925 and the capacitor line 5923 may form the pixel capacitor 5926. Accordingly, the pixel electrode 5925 can also have a function of holding the signal voltage which is transmitted through the video signal line 5922. The pixel electrode 5925 may be rectangular as shown in FIG. 59B. With this shape, an aperture ratio of the pixel can be increased and efficiency of the liquid crystal display device can be improved. Furthermore, when the pixel electrode 5925 is formed using a material having transparency, a transmissive liquid crystal display device can be obtained. A transmissive liquid crystal display device can display images with high color reproducibility and high image quality. Alternatively, when the pixel electrode 5925 is formed using a material having reflectiveness, a reflective liquid crystal display device can be obtained. A reflective liquid crystal display device has high visibility in a bright environment such as outside. In addition, since a backlight is not necessary, the power consumption can be drastically reduced. It is to be noted that, when the pixel electrode 5925 is formed using both a material having transparency and a material having reflectiveness, a semi-transmissive liquid crystal display device which has advantages of both of the above can be obtained. When the pixel electrode 5925 is formed using a material having reflectiveness, the surface of the pixel electrode 5925 may be uneven. When the surface is uneven, light is reflected diffusely, and an advantage that angular dependency of intensity distribution of reflected light is decreased can be obtained. In other words, a reflective liquid crystal display device whose brightness is uniform at any angle can be obtained.

Next, a VA (Vertical Alignment) mode liquid crystal display device to which the present invention is applied will be explained with reference to FIGS. 60A and 60B. FIGS. 60A and 60B are a cross-sectional view and a top view, respectively, of a pixel in which the present invention is applied to a so-called MVA (Multi-domain Vertical Alignment) mode that is one of pixel structures of a VA mode liquid crystal display device, in which an alignment control projection is used so that liquid crystal molecules are controlled to have various directions and the viewing angle is widened. FIG. 60A is a cross-sectional view of a pixel, and FIG. 60B is a top view of the pixel. Further, the cross-sectional view of the pixel shown in FIG. 60A corresponds to a line a-a' in the top view of the pixel shown in FIG. 60B. When the present invention is applied to a liquid crystal display device having the pixel structure shown in FIGS. 60A and 60B, a liquid crystal display device with a wide viewing angle, a high response speed, and a high contrast can be obtained.

A pixel structure of an MVA mode liquid crystal display device will be explained with reference to FIG. 60A. The liquid crystal display device includes a basic portion that displays images, which is called a liquid crystal panel. The liquid crystal panel is manufactured as follows: two processed substrates are attached to each other with a gap of several μm therebetween, and a liquid crystal material is injected into a space between the two substrates. In FIG. 60A, the two substrates correspond to a first substrate 6001 and a second substrate 6016. A TFT and a pixel electrode may be formed over the first substrate; and a light-shielding film 6014, a color filter 6015, a fourth conductive layer 6013, a spacer 6017, a second alignment film 6012, and an alignment control projection 6019 may be formed on the second substrate.

It is to be noted that the present invention can also be implemented without forming a TFT over the first substrate 6001. When the present invention is implemented without forming a TFT, the number of steps is reduced, and the manufacturing costs can be reduced. In addition, since the structure is simple, the yield can be improved. On the other hand, when the present invention is implemented by forming a TFT, a larger-sized display device can be obtained.

The TFT shown in FIGS. 60A and 60B is a bottom gate TFT using an amorphous semiconductor, which has an advantage that it can be manufactured by using a large-area substrate at low costs. However, the present invention is not limited thereto. As a structure of a TFT which can be used, there are a channel-etched type, a channel-protective type, and the like as for a bottom gate TFT. Alternatively, a top gate type may be used. Furthermore, not only the amorphous semiconductor but also a polycrystalline semiconductor may be used.

It is to be noted that the present invention can also be implemented without forming the light-shielding film 6014 on the second substrate 6016. When the present invention is implemented without forming the light-shielding film 6014, the number of steps is reduced, and the manufacturing costs can be reduced. In addition, since the structure is simple, the yield can be improved. On the other hand, when the present invention is implemented by forming the light-shielding film 6014, a display device with little light leakage at the time of black display can be obtained.

It is to be noted that the present invention can also be implemented without forming the color filter 6015 on the second substrate 6016. When the present invention is implemented without forming the color filter 6015, the number of steps is reduced, and the manufacturing costs can be reduced. In addition, since the structure is simple, the yield can be improved. On the other hand, when the present invention is implemented by forming the color filter 6015, a display device capable of color display can be obtained.

It is to be noted that the present invention can also be implemented by dispersing spherical spacers instead of providing the spacer 6017 for the second substrate 6016. When the present invention is implemented by dispersing the spherical spacers, the number of steps is reduced, and the manufacturing costs can be reduced. In addition, since the structure is simple, the yield can be improved. On the other hand, when the present invention is implemented by forming the spacer 6017, there is no variation in positions of the spacers; therefore, a distance between the two substrates can be uniform and a display device with little display unevenness can be obtained.

Next, as for a process to be performed to the first substrate 6001, the method explained with reference to FIGS. 59A and 59B may be used; therefore, the explanation is omitted. Here, the first substrate 6001, a first insulating film 6002, a first conductive layer 6003, a second insulating film 6004, a first semiconductor layer 6005, a second semiconductor layer 6006, a second conductive layer 6007, a third insulating film 6008, a third conductive layer 6009, and a first alignment film 6010 correspond to the first substrate 5901, the first insulating film 5902, the first conductive layer 5903, the second insulating film 5904, the first semiconductor layer 5905, the second semiconductor layer 5906, the second conductive layer 5907, the third insulating film 5908, the third conductive layer 5909, and the first alignment film 5910 in FIG. 59A, respectively. Although not shown in the drawings, an alignment control projection may also be provided on the first substrate side. Consequently, alignment of liquid crystal molecules can be controlled more surely. In addition, the first alignment film 6010 and the second alignment film 6012 may be vertical alignment films. Therefore, liquid crystal molecules 6018 can be aligned vertically.

The first substrate 6001 that is manufactured as described above is attached to the second substrate 6016 provided with the light-shielding film 6014, the color filter 6015, the fourth conductive layer 6013, the spacer 6017, and the second alignment film 6012 with a sealing material with a gap of several μm therebetween, and then, a liquid crystal material is injected into a space between the two substrates; whereby the liquid crystal panel can be manufactured. It is to be noted that, in the MVA mode liquid crystal panel as shown in FIGS. 60A and 60B, the fourth conductive layer 6013 may be formed on the entire surface of the second substrate 6016. Furthermore, the alignment control projection 6019 may be formed so as to be in contact with the fourth conductive layer 6013. The shape of the alignment control projection 6019 is not limited, but a shape with a smooth curve is preferable. When the alignment control projection 6019 is shaped in that way, the alignment of adjacent liquid crystal molecules 6018 is extremely similar, and the alignment defect can be reduced. Furthermore, a defect of an alignment film, in which the second alignment film 6012 is disconnected by the alignment control projection 6019, can be reduced.

Next, a feature of the pixel structure of the MVA mode liquid crystal panel shown in FIGS. 60A and 60B will be explained. The liquid crystal molecule 6018 shown in FIG. 60A is a long and narrow molecule having a major axis and a miner axis. In FIG. 60A, each liquid crystal molecule 6018 is expressed by its length to show the direction of the liquid crystal molecule. That is, the direction of the major axis of the liquid crystal molecule 6018 which is expressed as a long molecule is parallel to the page; and as the liquid crystal molecule 6018 is expressed to be shorter, the direction of the major axis becomes closer to the normal direction of the page. That is, the liquid crystal molecules 6018 shown in FIG. 60A are aligned so that the direction of the major axis is normal to the alignment film. Accordingly, the liquid crystal molecules 6018 in a portion where the alignment control projection 6019 is placed are aligned radially with the alignment control projection 6019 as a center. With this state, a liquid crystal display device having a wide viewing angle can be obtained.

Next, an example of a layout of a pixel of an MVA mode liquid crystal display device to which the present invention is applied will be explained with reference to FIG. 60B. The pixel of the MVA mode liquid crystal display device to which the present invention is applied may include a scanning line 6021, a video signal line 6022, a capacitor line 6023, a TFT 6024, a pixel electrode 6025, a pixel capacitor 6026, and an alignment control projection 6019.

The scanning line 6021 is electrically connected to a gate electrode of the TFT 6024; therefore, it is preferable that the scanning line 6021 be formed of the first conductive layer 6003.

The video signal line 6022 is electrically connected to a source electrode or drain electrode of the TFT 6024; therefore, it is preferable that the video signal line 6022 be formed of the second conductive layer 6007. Furthermore, since the scanning line 6021 and the video signal line 6022 are arranged in a matrix, it is preferable that the scanning line 6021 and the video signal line 6022 be formed of at least conductive layers in different layers.

The capacitor line 6023 is a wiring that is provided so as to be parallel to the pixel electrode 6025 for forming the pixel capacitor 6026, and it is preferable that the capacitor line 6023 be formed of the first conductive layer 6003. The capacitor line 6023 may be extended along the video signal line 6022 so as to surround the video signal line 6022 as shown in FIG. 60B. Accordingly, a cross talk, which is a phenomenon in which a potential of an electrode, which is supposed to be held, is changed in accordance with a potential change of the video signal line 6022, can be reduced. In order to reduce cross capacitance with the video signal line 6022, the first semiconductor layer 6005 may be provided in a cross region of the capacitor line 6023 and the video signal line 6022 as shown in FIG. 60B.

The TFT 6024 operates as a switch for electrically connecting the video signal line 6022 and the pixel electrode 6025. As shown in FIG. 60B, one of a source region and drain region of the TFT 6024 may be provided so as to surround the other one of the source region and drain region. Accordingly, a wide channel width can be obtained even in a small area and the switching capability can be increased. The gate electrode of the TFT 6024 may be provided so as to surround the first semiconductor layer 6005 as shown in FIG. 60B.

The pixel electrode 6025 is electrically connected to the source electrode or drain electrode of the TFT 6024. The pixel electrode 6025 is an electrode for giving a signal voltage which is transmitted through the video signal line 6022 to the liquid crystal element. In addition, the pixel electrode 6025 and the capacitor line 6023 may form the pixel capacitor 6026. Therefore, the pixel electrode 6025 can also have a function of holding the signal voltage which is transmitted through the video signal line 6022. The pixel electrode 6025 may be rectangular as shown in FIG. 60B. With this shape, an aperture ratio of the pixel can be increased and efficiency of the liquid crystal display device can be improved. Furthermore, when the pixel electrode 6025 is formed using a material having transparency, a transmissive liquid crystal display device can be obtained. A transmissive liquid crystal display device can display images with high color reproducibility and high image quality. Alternatively, when the pixel electrode 6025 is formed using a material having reflectiveness, a reflective liquid crystal display device can be obtained. A reflective liquid crystal display device has high visibility in a bright environment such as outside. In addition, since a backlight is not necessary, the power consumption can be drastically reduced. It is to be noted that, when the pixel electrode 6025 is formed by using both a material having transparency and a material having reflectiveness, a semi-transmissive liquid crystal display device which has advantages of both of the above can be obtained. When the pixel electrode 6025 is formed using a material having reflectivity, the surface of the pixel electrode 6025 may be uneven. When the surface is uneven, light is reflected diffusely, and an advantage that angular dependency of intensity distribution of reflected light is decreased can be obtained. In other words, a reflective liquid crystal display device whose brightness is uniform at any angle can be obtained.

Next, another example of a VA (vertical alignment) mode liquid crystal display device to which the present invention is applied will be explained with reference to FIGS. 61A and 61B. FIGS. 61A and 61B are a cross-sectional view and a top view, respectively, of a pixel in which the present invention is applied to a so-called PVA (Patterned Vertical Alignment) mode that is one of pixel structures of a VA-mode liquid crystal display device, in which a fourth conductive layer 6113 is patterned so that liquid crystal molecules are controlled to have various directions and the viewing angle is widened. FIG. 61A is a cross-sectional view of a pixel, and FIG. 61B is a top view of the pixel. Further, the cross-sectional view of the pixel shown in FIG. 61A corresponds to a line a-a' in the top view of the pixel shown in FIG. 61B. When the present invention is applied to a liquid crystal display device having the pixel structure shown in FIGS. 61A and 61B, a liquid crystal display device with a wide viewing angle, a high response speed, and a high contrast can be obtained.

A pixel structure of a PVA mode liquid crystal display device will be explained with reference to FIG. 61A. The liquid crystal display device includes a basic portion that displays images, which is called a liquid crystal panel. The liquid crystal panel is manufactured as follows: two processed substrates are attached to each other with a gap of several µm therebetween, and a liquid crystal material is injected into a space between the two substrates. In FIG. 61A, the two substrates correspond to a first substrate 6101 and a second substrate 6116. A TFT and a pixel electrode may be formed over the first substrate; and a light-shielding film 6114, a color filter 6115, a fourth conductive layer 6113, a spacer 6117, and a second alignment film 6112 may be formed on the second substrate.

It is to be noted that the present invention can also be implemented without forming a TFT over the first substrate 6101. When the present invention is implemented without forming a TFT, the number of steps is reduced, and the manufacturing costs can be reduced. In addition, since the structure is simple, the yield can be improved. On the other hand, when the present invention is implemented by forming a TFT, a larger-sized display device can be obtained.

The TFT shown in FIGS. 61A and 61B is a bottom gate TFT using an amorphous semiconductor, which has an advantage that it can be manufactured by using a large-area substrate at low costs. However, the present invention is not limited thereto. As a structure of a TFT which can be used in the present invention, there are a channel-etched type, a channel-protective type, and the like as for a bottom gate TFT. Alternatively, a top gate type may be used. Furthermore, not only the amorphous semiconductor but also a polycrystalline semiconductor may be used.

It is to be noted that the present invention can also be implemented without forming the light-shielding film 6114 on the second substrate 6116. When the present invention is implemented without forming the light-shielding film 6114, the number of steps is reduced, and the manufacturing costs can be reduced. In addition, since the structure is simple, the yield can be improved. On the other hand, when the present invention is implemented by forming the light-shielding film 6114, a display device with little light leakage at the time of black display can be obtained.

It is to be noted that the present invention can also be implemented without forming the color filter 6115 on the second substrate 6116. When the present invention is implemented by forming the color filter 6115, the number of steps is reduced, and the manufacturing costs can be reduced. In addition, since the structure is simple, the yield can be improved. On the other hand, when the present invention is implemented by forming the color filter 6115, a display device capable of color display can be obtained.

It is to be noted that the present invention can also be implemented by dispersing spherical spacers instead of providing the spacer 6117 for the second substrate 6116. When the present invention is implemented by dispersing the spherical spacers, the number of steps is reduced, and the manufacturing costs can be reduced. In addition, since the structure is simple, the yield can be improved. On the other hand, when the present invention is implemented by forming the spacer 6117, there is no variation in positions of the spacers; therefore, a distance between the two substrates can be uniform and a display device with little display unevenness can be obtained.

Next, as for a process to be performed to the first substrate 6101, the method explained with reference to FIGS. 59A and 59B may be used; therefore, the explanation is omitted. Here, the first substrate 6101, a first insulating film 6102, a first conductive layer 6103, a second insulating film 6104, a first semiconductor layer 6105, a second semiconductor layer 6106, a second conductive layer 6107, a third insulating film 6108, a third conductive layer 6109, and a first alignment film 6110 correspond to the first substrate 5901, the first insulating film 5902, the first conductive layer 5903, the second insulating film 5904, the first semiconductor layer 5905, the second semiconductor layer 5906, the second conductive layer 5907, the third insulating film 5908, the third conductive layer 5909, and the first alignment film 5910 in FIG. 59A, respectively. It is to be noted that an electrode notch portion may be provided in the third conductive layer 6109 on the first substrate 6101 side. Consequently, alignment of liquid crystal molecules can be controlled more surely. In addition, the first alignment film 6110 and the second alignment film 6112 may be vertical alignment films. Consequently, liquid crystal molecules 6118 can be aligned vertically.

The first substrate 6101 that is manufactured as described above is attached to the second substrate 6116 provided with the light-shielding film 6114, the color filter 6115, the fourth conductive layer 6113, the spacer 6117, and the second alignment film 6112 with a sealing material with a gap of several μm therebetween, and then, a liquid crystal material is injected into a space between the two substrates; whereby the liquid crystal panel can be manufactured. It is to be noted that, in the PVA mode liquid crystal panel as shown in FIGS. 61A and 61B, the fourth conductive layer 6113 may be patterned so as to have an electrode notch portion 6119. Although the shape of the electrode notch portion 6119 is not limited, a shape that is formed by combining a plurality of rectangles having different directions is preferable. Consequently, a plurality of regions with different alignment can be formed, whereby a liquid crystal display device with a wide viewing angle can be obtained. Furthermore, it is preferable that the shape of the fourth conductive layer 6113 at the boundary between the electrode notch portion 6119 and the fourth conductive layer 6113 be a smooth curve. Consequently, the alignment of the adjacent liquid crystal molecules 6118 is extremely similar, and the alignment defect can be reduced. Furthermore, a defect of an alignment film, in which the second alignment film 6112 is disconnected by the electrode notch portion 6119, can be reduced.

Next, a feature of the pixel structure of the PVA mode liquid crystal panel shown in FIGS. 61A and 61B will be explained. The liquid crystal molecule 6118 shown in FIG. 61A is a long and narrow molecule having a major axis and a miner axis. In FIG. 61A, each liquid crystal molecule 6118 is expressed by its length to show the direction of the liquid crystal molecule. That is, the direction of the major axis of the liquid crystal molecule 6118 which is expressed as a long molecule is parallel to the page; and as the liquid crystal molecule 6118 is expressed to be shorter, the direction of the major axis becomes closer to the normal direction of the page. That is, the liquid crystal molecules 6118 shown in FIG. 61A are aligned so that the direction of the major axis is normal to the alignment film. Accordingly, the liquid crystal molecules 6118 in a portion where the electrode notch portion 6119 is placed are aligned radially with the boundary between the electrode notch portion 6119 and the fourth conductive layer 6113 as a center. With this state, a liquid crystal display device having a wide viewing angle can be obtained.

Next, an example of a layout of a pixel of a PVA mode liquid crystal display device to which the present invention is applied will be explained with reference to FIG. 61B. The pixel of the PVA mode liquid crystal display device to which the present invention is applied may include a scanning line 6121, a video signal line 6122, a capacitor line 6123, a TFT 6124, a pixel electrode 6125, a pixel capacitor 6126, and an electrode notch portion 6119.

The scanning line 6121 is electrically connected to a gate electrode of the TFT 6124; therefore, it is preferable that the scanning line 6121 be formed of the first conductive layer 6103.

The video signal line 6122 is electrically connected to a source electrode or drain electrode of the TFT 6124; therefore, it is preferable that the video signal line 6122 be formed of the second conductive layer 6107. Furthermore, since the scanning line 6121 and the video signal line 6122 are arranged in a matrix, it is preferable that the scanning line 6121 and the video signal line 6122 be formed of at least conductive layers in different layers.

The capacitor line 6123 is a wiring that is provided so as to be parallel to the pixel electrode 6125 for forming the pixel capacitor 6126, and it is preferable that the capacitor line 6123 be formed of the first conductive layer 6103. The capacitor line 6123 may be extended along the video signal line 6122 so as to surround the video signal line 6122 as shown in FIG. 61B. Accordingly, a cross talk, which is a phenomenon in which a potential of an electrode, which is supposed to be held, is changed in accordance with a potential change of the video signal line 6122, can be reduced. In order to reduce cross capacitance with the video signal line 6122, the first semiconductor layer 6105 may be provided in a cross region of the capacitor line 6123 and the video signal line 6122 as shown in FIG. 61B.

The TFT 6124 operates as a switch for electrically connecting the video signal line 6122 and the pixel electrode 6125. As shown in FIG. 61B, one of a source region and drain region of the TFT 6124 may be provided so as to surround the other one of the source region or drain region. Accordingly, a wide channel width can be obtained even in a small area and the switching capability can be increased. The gate electrode of the TFT 6124 may be provided so as to surround the first semiconductor layer 6105 as shown in FIG. 61B.

The pixel electrode 6125 is electrically connected to one of the source electrode and drain electrode of the TFT 6124. The pixel electrode 6125 is an electrode for giving a signal voltage which is transmitted through the video signal line 6122 to the liquid crystal element. In addition, the pixel electrode 6125 and the capacitor line 6123 may form the pixel capacitor 6126. Accordingly, the pixel electrode 6125 can also have a function of holding the signal voltage which is transmitted through the video signal line 6122. It is preferable that the pixel electrode 6125 have a notched portion in a portion where the electrode notch portion 6119 does not exist, in accordance with the shape of the electrode notch portion 6119 provided in the fourth conductive layer 6113 as shown in FIG. 61B. Consequently, a plurality of regions with different alignment of the liquid crystal molecules 6118 can be formed; whereby a liquid crystal display device with a wide viewing angle can be obtained. Furthermore, when the pixel electrode 6125 is formed using a material having transparency, a transmissive liquid crystal display device can be obtained. A transmissive liquid crystal display device can display images with high color reproducibility and high image quality. Alternatively, when the pixel electrode 6125 is formed using a material having reflectiveness, a reflective liquid crystal display device can be obtained. A reflective liquid crystal display device has high visibility in a bright environment such as outside. In addition, since a backlight is not necessary, the power consumption can be drastically reduced. It is to be noted that, when the pixel electrode 6125 is formed by using both a material having transparency and a material having reflectiveness, a semi-transmissive liquid crystal display device which has advantages of both of the above can be obtained. When the pixel electrode 6125 is formed using a material having reflectiveness, the surface of the pixel electrode 6125 may be uneven. When the surface is uneven, light is reflected diffusely, and an advantage that angular dependency of intensity distribution of reflected light is decreased can be obtained. In other words, a reflective liquid crystal display device whose brightness is uniform at any angle can be obtained.

Next, a horizontal electric field liquid crystal display device to which the present invention is applied will be explained with reference to FIGS. 62A and 62B. FIGS. 62A and 62B are a cross-sectional view and a top view, respectively, of a pixel in which the present invention is applied to a so-called IPS (In-Plane-Switching) mode that is one of pixel structures of a liquid crystal display device in which an electric field is applied horizontally in order to perform switching so that the alignment of liquid crystal molecules is always horizontal to the substrate. Specifically, a pixel electrode 6225 and a common electrode 6223 are each patterned into a comb-shape and an electrical field is applied horizontally. FIG. 62A is a cross-sectional view of a pixel, and FIG. 62B is a top view of the pixel. Further, the cross-sectional view of the pixel shown in FIG. 62A corresponds to a line a-a' in the top view of the pixel shown in FIG. 62B. When the present invention is applied to a liquid crystal display device having the pixel structure shown in FIGS. 62A and 62B, a liquid crystal display device whose viewing angle is theoretically wide and response speed's dependency on a gray scale is small can be obtained.

A pixel structure of an IPS mode liquid crystal display device will be explained with reference to FIG. 62A. The liquid crystal display device includes a basic portion that displays images, which is called a liquid crystal panel. The liquid crystal panel is manufactured as follows: two processed substrates are attached to each other with a gap of several μm therebetween, and a liquid crystal material is injected into a space between the two substrates. In FIG. 62A, the two substrates correspond to a first substrate 6201 and a second substrate 6216. A TFT and a pixel electrode may be formed over the first substrate; and a light-shielding film 6214, a color filter 6215, a spacer 6217, and a second alignment film 6212 may be formed on the second substrate.

It is to be noted that the present invention can also be implemented without forming a TFT over the first substrate 6201. When the present invention is implemented without forming a TFT, the number of steps is reduced, and the manufacturing costs can be reduced. In addition, since the structure is simple, the yield can be improved. On the other hand, when the present invention is implemented by forming a TFT, a larger-sized display device can be obtained.

The TFT shown in FIGS. 62A and 62B is a bottom gate TFT using an amorphous semiconductor, which has an advantage that it can be manufactured by using a large-area substrate at low costs. However, the present invention is not limited thereto. As a structure of a TFT which can be used, there are a channel-etched type, a channel-protective type, and the like as for a bottom gate TFT. Alternatively, a top gate type may be used. Furthermore, not only the amorphous semiconductor but also a polycrystalline semiconductor may be used.

It is to be noted that the present invention can also be implemented without forming the light-shielding film 6214 on the second substrate 6216. When the present invention is implemented without forming the light-shielding film 6214, the number of steps is reduced, and the manufacturing costs can be reduced. In addition, since the structure is simple, the yield can be improved. On the other hand, when the present invention is implemented by forming the light-shielding film 6214, a display device with little light leakage at the time of black display can be obtained.

It is to be noted that the present invention can also be implemented without forming the color filter 6215 on the second substrate 6216. When the present invention is implemented without forming the color filter 6215, the number of steps is reduced, and the manufacturing costs can be reduced. In addition, since the structure is simple, the yield can be improved. On the other hand, when the present invention is implemented by forming the color filter 6215, a display device capable of color display can be obtained.

It is to be noted that the present invention can also be implemented by dispersing spherical spacers instead of providing the spacer 6217 for the second substrate 6216. When the present invention is implemented by dispersing the spherical spacers, the number of steps is reduced, and the manufacturing costs can be reduced. In addition, since the structure is simple, the yield can be improved. On the other hand, when the present invention is implemented by forming the spacer 6217, there is no variation in positions of the spacers; therefore, a distance between the two substrates can be uniform and a display device with little display unevenness can be obtained.

Next, as for a process to be performed to the first substrate 6201, the method explained with reference to FIGS. 59A and 59B may be used; therefore, the explanation is omitted. Here, the first substrate 6201, a first insulating film 6202, a first conductive layer 6203, a second insulating film 6204, a first semiconductor layer 6205, a second semiconductor layer 6206, a second conductive layer 6207, a third insulating film 6208, a third conductive layer 6209, and a first alignment film 6210 correspond to the first substrate 5901, the first insulating film 5902, the first conductive layer 5903, the second insulating film 5904, the first semiconductor layer 5905, the second semiconductor layer 5906, the second conductive layer 5907, the third insulating film 5908, the third conductive layer 5909, and the first alignment film 5910 in FIG. 59A, respectively. It is to be noted that the third conductive layer 6209 on the first substrate 6201 side may be patterned so as to have a shape in which two combs are engaged with each other. Furthermore, one of comb-shaped electrodes may be electrically connected to one of a source electrode and drain electrode of the TFT 6224, and the other comb-shaped electrode may be electrically connected to a common electrode 6223. Consequently, a horizontal electric field can be applied to liquid crystal molecules 6218 efficiently.

The first substrate 6201 that is manufactured as described above is attached to the second substrate 6216 provided with the light-shielding film 6214, the color filter 6215, the spacer 6217, and the second alignment film 6212 with a sealing material with a gap of several μm therebetween, and then, a liquid crystal material is injected into a space between the two substrates; whereby the liquid crystal panel can be manufactured. Although not shown in the drawings, a conductive layer may be formed on the second substrate 6216 side. By formation of a conductive layer on the second substrate 6216 side, an influence of an electromagnetic wave noise from an external portion can be reduced.

Next, a feature of the pixel structure of the IPS mode liquid crystal panel shown in FIGS. 62A and 62B will be explained. The liquid crystal molecule 6218 shown in FIG. 62A is a long and narrow molecule having a major axis and a miner axis. In FIG. 62A, each liquid crystal molecule 6218 is expressed by its length to show the direction of the liquid crystal molecule. That is, the direction of the major axis of the liquid crystal molecule 6218 which is expressed as a long molecule is parallel to the page; and as the liquid crystal molecule 6218 is expressed to be shorter, the direction of the major axis becomes closer to the normal direction of the page. That is, the liquid crystal molecules 6218 shown in FIG. 62A are aligned so that the direction of the major axis is always horizontal to the substrate. In FIG. 62A, the alignment in a condition where an electric field is not applied is shown. When an electric field is applied to the liquid crystal molecules 6218, the liquid crystal molecules rotate in the horizontal plane while the direction of the major axis is kept always horizontal to the substrate. With this state, a liquid crystal display device having a wide viewing angle can be obtained.

Next, an example of a layout of a pixel of an IPS mode liquid crystal display device to which the present invention is applied will be explained with reference to FIG. 62B. The pixel of the IPS mode liquid crystal display device to which the present invention is applied may include a scanning line 6221, a video signal line 6222, the common electrode 6223, the TFT 6224, and a pixel electrode 6225.

The scanning line 6221 is electrically connected to a gate electrode of the TFT 6224; therefore, it is preferable that the scanning line 6221 be formed of the first conductive layer 6203.

The video signal line 6222 is electrically connected to a source electrode or drain electrode of the TFT 6224; therefore, it is preferable that the video signal line 6222 be formed of the second conductive layer 6207. Furthermore, since the scanning line 6221 and the video signal line 6222 are arranged in a matrix, it is preferable that the scanning line 6221 and the video signal line 6222 be formed of at least conductive layers in different layers. It is to be noted that the video signal line 6222 may be formed so as to bend along with the shapes of the pixel electrode 6225 and the common electrode 6223 in the pixel, as shown in FIG. 62B. Consequently, an aperture ratio of the pixel can be increased, and efficiency of the liquid crystal display device can be improved.

The common electrode 6223 is an electrode that is provided so as to be parallel to the pixel electrode 6225 for generating a horizontal electric field, and it is preferable that the common electrode 6223 be formed of the first conductive layer 6203 and the third conductive layer 6209. The common electrode 6223 may be extended along the video signal line 6222 so as to surround the video signal line 6222 as shown in FIG. 62B. Accordingly, a cross talk, which is a phenomenon in which a potential of an electrode, which is supposed to be held, is changed in accordance with a potential change of the video signal line 6222, can be reduced. In order to reduce cross capacitance with the video signal line 6222, the first semiconductor layer 6205 may be provided in a cross region of the common electrode 6223 and the video signal line 6222 as shown in FIG. 62B.

The TFT 6224 operates as a switch for electrically connecting the video signal line 6222 and the pixel electrode 6225. As shown in FIG. 62B, one of a source region and drain region of the TFT 6224 may be provided so as to surround the other one of the source region and drain region. Accordingly, a wide channel width can be obtained even in a small area and the switching capability can be increased. The gate electrode of the TFT 6224 may be provided so as to surround the first semiconductor layer 6205 as shown in FIG. 62B.

The pixel electrode 6225 is electrically connected to one of the source electrode and drain electrode of the TFT 6224. The pixel electrode 6225 is an electrode for giving a signal voltage which is transmitted through the video signal line 6222 to the liquid crystal element. In addition, the pixel electrode 6225 and the common electrode 6223 may form a pixel capacitor. Accordingly, the pixel electrode 6225 can also have a function of holding the signal voltage which is transmitted through the video signal line 6222. It is preferable that the comb-shaped pixel electrode 6225 and the comb-shaped common electrode 6223 be each formed into a bent comb-shape as shown in FIG. 62B. Accordingly, a plurality of regions with different alignment of the liquid crystal molecules 6218 can be formed, whereby a liquid crystal display device with a wide viewing angle can be obtained. Furthermore, when the comb-shaped pixel electrode 6225 and the comb-shaped common electrode 6223 are formed using materials having transparency, a transmissive liquid crystal display device can be obtained. A transmissive liquid crystal display device can display images with high color reproducibility and high image quality. Alternatively, when the comb-shaped pixel electrode 6225 and the comb-shaped common electrode 6223 are formed using materials having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, when the comb-shaped pixel electrode 6225 and the comb-shaped common electrode 6223 are formed by using both a material having transparency and a material having reflectivity, a semi-transmissive liquid crystal display device which has advantages of both of the above can be obtained. When the comb-shaped pixel electrode 6225 and the comb-shaped common electrode 6223 are formed using materials having reflectivity, the surfaces of the pixel electrode 6225 and the comb-shaped common electrode 6223 may be uneven. When the surfaces are uneven, light is reflected diffusely, and an advantage that angular dependency of intensity distribution of reflected light is decreased can be obtained. In other words, a reflective liquid crystal display device whose brightness is uniform at any angle can be obtained.

Although it is explained that the comb-shaped pixel electrode 6225 and the comb-shaped common electrode 6223 are both formed of the third conductive layer 6209, a pixel structure to which the present invention can be applied is not limited thereto and can be appropriately selected. For example, the comb-shaped pixel electrode 6225 and the comb-shaped common electrode 6223 may be both formed of the second conductive layer 6207, or may be both formed of the first conductive layer 6203. Alternatively, one of them may be formed of the third conductive layer 6209 and the other may be formed of the second conductive layer 6207. Alternatively, one of them may be formed of the third conductive layer 6209 and the other may be formed of the first conductive layer 6203. Further alternatively, one of them may be formed of the second conductive layer 6207 and the other may be formed of the first conductive layer 6203.

Next, another horizontal electric field liquid crystal display device to which the present invention is applied will be explained with reference to FIGS. 63A and 63B. FIGS. 63A and 63B are views of another pixel structure of a liquid crystal display device in which an electric field is applied horizontally in order to perform switching so that the alignment of liquid crystal molecules is always horizontal to the substrate. More specifically, FIGS. 63A and 63B are a cross-sectional view and a top view, respectively, of a pixel of a so-called FFS (Fringe Field Switching) mode to which the present invention is applied, in which one of a pixel electrode 6325 and a common electrode 6323 is patterned into a comb-shape and the other is formed into a planar-shape in a region overlapping with the comp-shape so that an electric field is applied horizontally. FIG. 63A is a cross-sectional view of a pixel, and FIG. 63B is a top view of the pixel. Further, the cross-sectional view of the pixel shown in FIG. 63A corresponds to a line a-a' in the top view of the pixel shown in FIG. 63B. When the present invention is applied to a liquid crystal display device having the pixel structure shown in FIGS. 63A and 63B, a liquid crystal display device whose viewing angle is theoretically wide and response speed's dependency on a gray scale is small can be obtained.

A pixel structure of an FFS mode liquid crystal display device will be explained with reference to FIG. 63A. The liquid crystal display device includes a basic portion that displays images, which is called a liquid crystal panel. The liquid crystal panel is manufactured as follows: two processed substrates are attached to each other with a gap of several μm therebetween, and a liquid crystal material is injected into a space between the two substrates. In FIG. 63A, the two substrates correspond to a first substrate 6301 and a second substrate 6316. A TFT and a pixel electrode may be formed over the first substrate; and a light-shielding film 6314, a color filter 6315, a spacer 6317, and a second alignment film 6312 may be provided for the second substrate.

It is to be noted that the present invention can also be implemented without forming a TFT over the first substrate 6301. When the present invention is implemented without forming a TFT, the number of steps is reduced, and the manufacturing costs can be reduced. In addition, since the structure is simple, the yield can be improved. On the other hand, when the present invention is implemented by forming a TFT, a larger-sized display device can be obtained.

The TFT shown in FIGS. 63A and 63B is a bottom gate TFT using an amorphous semiconductor, which has an advantage that it can be manufactured by using a large-area substrate at low costs. However, the present invention is not limited thereto. As a structure of a TFT which can be used, there are a channel-etched type, a channel-protective type, and the like as for a bottom gate TFT. Alternatively, a top gate type may be used. Furthermore, not only the amorphous semiconductor but also a polycrystalline semiconductor may be used.

It is to be noted that the present invention can also be implemented without forming the light-shielding film 6314 on the second substrate 6316. When the present invention is implemented without forming the light-shielding film 6314, the number of steps is reduced, and the manufacturing costs can be reduced. In addition, since the structure is simple, the yield can be improved. On the other hand, when the present invention is implemented by forming the light-shielding film 6314, a display device with little light leakage at the time of black display can be obtained.

It is to be noted that the present invention can also be implemented without forming the color filter 6315 on the second substrate 6316. When the present invention is implemented without forming the color filter 6315, the number of steps is reduced, and the manufacturing costs can be reduced. In addition, since the structure is simple, the yield can be improved. On the other hand, when the present invention is implemented by forming the color filter 6315, a display device capable of color display can be obtained.

It is to be noted that the present invention can also be implemented by dispersing spherical spacers instead of providing the spacer 6317 for the second substrate 6316. When the present invention is implemented by dispersing the spherical spacers, the number of steps is reduced, and the manufacturing costs can be reduced. In addition, since the structure is simple, the yield can be improved. On the other hand, when the present invention is implemented by forming the spacer 6317, there is no variation in positions of the spacers; therefore, a distance between the two substrates can be uniform and a display device with little display unevenness can be obtained.

Next, as for a process to be performed to the first substrate 6301, the method explained with reference to FIGS. 59A and 59B may be used; therefore, the explanation is omitted. Here, the first substrate 6301, a first insulating film 6302, a first conductive layer 6303, a second insulating film 6304, a first semiconductor layer 6305, a second semiconductor layer 6306, a second conductive layer 6307, a third insulating film 6308, a third conductive layer 6309, and a first alignment film 6310 correspond to the first substrate 5901, the first insulating film 5902, the first conductive layer 5903, the second insulating film 5904, the first semiconductor layer 5905, the second semiconductor layer 5906, the second conductive layer 5907, the third insulating film 5908, the third conductive layer 5909, and the first alignment film 5910 in FIG. 59A, respectively.

However, the difference from FIGS. 59A and 59B is that a fourth insulating film 6319 and a fourth conductive layer 6313 may be formed on the first substrate 6301 side. More specifically, the film formation may be performed as follows: after the third conductive layer 6309 is patterned, the fourth insulating film 6319 is formed, and then, it is patterned so as to form a contact hole. After that, the fourth conductive layer 6313 is formed and patterned similarly, and then, the first alignment film 6310 is formed. As materials and processing methods of the fourth insulating film 6319 and the fourth conductive layer 6313, materials and processing methods which are similar to those of the third insulating film 6308 and the third conductive layer 6309 may be used. Furthermore, one comb-shaped electrode may be electrically connected to one of a source electrode and drain electrode of the TFT 6324 and the other planar electrode may be electrically connected to the common electrode 6323. Consequently, a horizontal electric field can be applied to the liquid crystal molecules 6318 efficiently.

The first substrate 6301 that is manufactured as described above is attached to the second substrate 6316 provided with the light-shielding film 6314, the color filter 6315, the spacer 6317, and the second alignment film 6312 with a sealing material with a gap of several μm therebetween, and then, a liquid crystal material is injected into a space between the two substrates; whereby the liquid crystal panel can be manufactured. Although not shown in the drawings, a conductive layer may be formed on the second substrate 6316 side. By formation of the conductive layer on the second substrate 6316 side, an influence of an electromagnetic wave noise from an external portion can be reduced.

Next, a feature of the pixel structure of the FFS mode liquid crystal panel shown in FIGS. 63A and 63B will be explained. The liquid crystal molecule 6318 shown in FIG. 63A is a long and narrow molecule having a major axis and a miner axis. In FIG. 63A, each liquid crystal molecule 6318 is expressed by its length to show the direction of the liquid crystal molecule. That is, the direction of the major axis of the liquid crystal molecule 6318 which is expressed as a long molecule is parallel to the page; and as the liquid crystal molecule 6318 is expressed to be shorter, the direction of the major axis becomes closer to the normal direction of the page. That is, the liquid crystal molecules 6318 shown in FIG. 63A are aligned so that the direction of the major axis is always horizontal to the substrate. In FIG. 63A, the alignment in a condition where an electric field is not applied is shown. When an electric field is applied to the liquid crystal molecules 6318, the liquid crystal molecules rotate in the horizontal plane while the direction of the major axis is kept always horizontal to the substrate. With this state, a liquid crystal display device having a wide viewing angle can be obtained.

Next, an example of a layout of a pixel of an FFS mode liquid crystal display device to which the present invention is applied will be explained with reference to FIG. 63B. The pixel of the FFS mode liquid crystal display device to which the present invention is applied may include a scanning line 6321, a video signal line 6322, the common electrode 6323, the TFT 6324, and the pixel electrode 6325.

The scanning line 6321 is electrically connected to a gate electrode of the TFT 6324; therefore, it is preferable that the scanning line 6321 be formed of the first conductive layer 6303.

The video signal line 6322 is electrically connected to a source electrode or drain electrode of the TFT 6324; therefore, it is preferable that the video signal line 6322 be formed of the second conductive layer 6307. Furthermore, since the scanning line 6321 and the video signal line 6322 are arranged in a matrix, it is preferable that the scanning line 6321 and the video signal line 6322 be formed of at least conductive layers in different layers. It is to be noted that the video signal line 6322 may be formed so as to bend along with the shape of the pixel electrode 6325 in the pixel as shown in FIG. 63B. Consequently, an aperture ratio of the pixel can be increased and efficiency of the liquid crystal display device can be improved.

The common electrode 6323 is an electrode that is provided so as to be parallel to the pixel electrode 6325 for generating a horizontal electric field, and it is preferable that the common electrode 6323 be formed of the first conductive layer 6303 and the third conductive layer 6309. The common electrode 6323 may be shaped along the video signal line 6322 as shown in FIG. 63B. Accordingly, a cross talk, which is a phenomenon in which a potential of an electrode, which is supposed to be held, is changed in accordance with a potential change of the video signal line 6322, can be reduced. In order to reduce cross capacitance with the video signal line 6322, the first semiconductor layer 6305 may be provided in a cross region of the common electrode 6323 and the video signal line 6322 as shown in FIG. 63B.

The TFT 6324 operates as a switch for electrically connecting the video signal line 6322 and the pixel electrode 6325. As shown in FIG. 63B, one of a source region and drain region of the TFT 6324 may be provided so as to surround the other one of the source region and drain region of the TFT 6324. Accordingly, a wide channel width can be obtained even in a small area and the switching capability can be increased. The gate electrode of the TFT 6324 may be provided so as to surround the first semiconductor layer 6305 as shown in FIG. 63B.

The pixel electrode 6325 is electrically connected to one of the source electrode and drain electrode of the TFT 6324. The pixel electrode 6325 is an electrode for giving a signal voltage which is transmitted through the video signal line 6322 to the liquid crystal element. In addition, the pixel electrode 6325 and the common electrode 6323 may form a pixel capacitor. Accordingly, the pixel electrode 6325 can also have a function of holding the signal voltage which is transmitted through the video signal line 6322. It is preferable that the pixel electrode 6325 be formed into a bent comb-shape as shown in FIG. 63B. Accordingly, a plurality of regions with different alignment of the liquid crystal molecules 6318 can be formed, whereby a liquid crystal display device with a wide viewing angle can be obtained. Furthermore, when the comb-shaped pixel electrode 6325 and the common electrode 6323 are formed using materials having transparency, a transmissive liquid crystal display device can be obtained. A transmissive liquid crystal display device can display images with high color reproducibility and high image quality. Alternatively, when the comb-shaped pixel electrode 6325 and the common electrode 6323 are formed using materials having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, when the comb-shaped pixel electrode 6325 and the common electrode 6323 are formed by using both a material having transparency and a material having reflectivity, a semi-transmissive liquid crystal display device which has advantages of both of the above can be obtained. When the comb-shaped pixel electrode 6325 and the common electrode 6323 are formed using materials having reflectivity, the surfaces of the comb-shaped pixel electrode 6325 and the common electrode 6323 may be uneven. When the surfaces are uneven, light is reflected diffusely, and an advantage that angular dependency of intensity distribution of reflected light is decreased can be obtained. In other words, a reflective liquid crystal display device whose brightness is uniform at any angle can be obtained.

Although it is explained that the comb-shaped pixel electrode 6325 is formed of the fourth conductive layer 6313 and the planar common electrode 6323 is formed of the third conductive layer 6309, a pixel structure to which the present invention can be applied is not limited thereto and can be appropriately selected as long as the structure meets a certain condition. More specifically, the comb-shaped electrode may be located closer to the liquid crystal than the planar electrode, when seen from the first substrate 6301. This is because a horizontal electric field is always generated on the side opposite to the planar electrode, with the comb-shaped electrode as a center, that is, because the comb-shaped electrode needs to be located closer to the liquid crystal than the planar electrode in order to apply a horizontal electric field to the liquid crystal.

For meeting this condition, for example, the comb-shaped electrode may be formed of the fourth conductive layer 6313, and the planar electrode may be formed of the third conductive layer 6309. Alternatively, the comb-shaped electrode may be formed of the fourth conductive layer 6313, and the planar electrode may be formed of the second conductive layer 6307. Alternatively, the comb-shaped electrode may be formed of the fourth conductive layer 6313, and the planar electrode may be formed of the first conductive layer 6303. Alternatively, the comb-shaped electrode may be formed of the third conductive layer 6309, and the planar electrode may be formed of the second conductive layer 6307. Alternatively, the comb-shaped electrode may be formed of the third conductive layer 6309, and the planar electrode may be formed of the first conductive layer 6303. Alternatively, the comb-shaped electrode may be formed of the second conductive layer 6307, and the planar electrode may be formed of the first conductive layer 6303. Although it is explained that the comb-shaped electrode is electrically connected to one of the source region and drain region of the TFT 6324 and the planar electrode is electrically connected to the common electrode 6323, the connections may be reversed. In that case, the planar electrode may be formed individually for each pixel.

This embodiment mode can be implemented by being freely combined with any description of other embodiment modes in this specification. Further, any descriptions in this embodiment mode can be freely combined to be implemented.

Embodiment Mode 6

In this embodiment mode, a method for driving a liquid crystal display device, which enables the display device used in the present invention to have high image quality, will be explained.

An overdriving method will be explained with reference to FIGS. 68A to 68C. FIG. 68A shows a change over time in output luminance with respect to an input voltage of a display element. A change over time in output luminance of a display element with respect to an input voltage 1 indicated by a dashed line is output luminance 1 also indicated by a dashed line. In other words, a voltage for obtaining intended output luminance Low is Vi, but when Vi is directly input as an input voltage, time corresponding to the response speed of the element is required to achieve the intended output luminance Low.

An overdriving method is a technique to enhance the response speed. Specifically, this is a method in which, after the response speed of the element is enhanced by applying a voltage Vo higher than Vi to the element for a certain period of time so that the element has output luminance close to the intended output luminance Low, the input voltage is decreased to Vi. At this time, an input voltage is indicated by an input voltage 2, and output luminance is indicated by output luminance 2. The time to the intended luminance Low of the output luminance 2 is shorter than that of the output luminance 1.

The case where the output luminance is changed positively with respect to the input voltage is described with reference to FIG. 68A; however, the present invention also includes a case where the output luminance is changed negatively with respect to the input voltage.

A circuit for achieving such driving will be explained with reference to FIGS. 68B and 68C. First, with reference to FIG. 68B, a case will be explained, where an input video signal Gi is a signal having an analog value (may be a discrete value), and an output video signal Go is also a signal having an analog value. An overdriving circuit shown in FIG. 68B includes an encoding circuit 6801, a frame memory 6802, a correction circuit 6803, and a DA converter circuit 6804.

The input video signal Gi is first input to the encoding circuit 6801 and is encoded. That is, the input video signal Gi is converted from an analog signal to a digital signal having the appropriate number of bits. Thereafter, the converted digital signal is input to the frame memory 6802 and the correction circuit 6803. A video signal of the previous frame held in the frame memory 6802 is also input to the correction circuit 6803 at the same time. Then, the correction circuit 6803 outputs a corrected video signal in accordance with a numerical value table which has been prepared in advance from the video signal of this frame and the video signal of the previous frame. At this time, an output switching signal may be input to the correction circuit 6803 so that the video signal of this frame and the corrected video signal are alternated and output. Next, the corrected video signal or the video signal of this frame is input to the DA converter circuit 6804. Then, an output video signal Go that is an analog signal in accordance with the corrected video signal or the video signal of this frame is output. In such a manner, overdriving can be achieved.

Next, with reference to FIG. 68C, a case where the input video signal Gi is a signal having a digital value and the output video signal Go is also a signal having a digital value will be explained. An overdriving circuit shown in FIG. 68C includes a frame memory 6812 and a correction circuit 6813.

The input video signal Gi is a digital signal and is input to the frame memory 6812 and the correction circuit 6813. A video signal of the previous frame held in the frame memory 6812 is also input to the correction circuit 6813 at the same time. Then, the correction circuit 6813 outputs a corrected video signal in accordance with a numerical value table which has been prepared in advance from the video signal of this frame and the video signal of the previous frame. At this time, an output switching signal may be input to the correction circuit 6813 so that the video signal of this frame and the corrected video signal are alternated and output. In such a manner, overdriving can be achieved.

It is to be noted that the overdriving circuit in the present invention also includes a case where the input video signal Gi is an analog signal and the output video signal Go is a digital signal. At this time, the DA converter circuit 6804 may be removed from the circuit shown in FIG. 68B. In addition, the overdriving circuit in the present invention also includes a case where the input video signal Gi is a digital signal and the output video signal Go is an analog signal. At this time, the encoding circuit 6801 may be removed from the circuit shown in FIG. 68B.

Driving for controlling a potential of a common line will be explained with reference to FIGS. 64A and 64B. FIG. 64A is a diagram showing a plurality of pixel circuits in which one common line is arranged with respect to one scanning line in a display device using a display element which has capacitive characteristics like a liquid crystal element. The pixel circuit shown in FIG. 64A includes a transistor 6401, an auxiliary capacitor 6402, a display element 6403, a video signal line 6404, a scanning line 6405, and a common line 6406.

A gate electrode of the transistor 6401 is electrically connected to the scanning line 6405, one of a source electrode and a drain electrode of the transistor 6401 is electrically connected to the video signal line 6404, and the other of the source electrode and the drain electrode of the transistor 6401 is electrically connected to one electrode of the auxiliary capacitor 6402 and one electrode of the display element 6403. In addition, the other electrode of the auxiliary capacitor 6402 is electrically connected to the common line 6406.

First, in a pixel selected by the scanning line 6405, since the transistor 6401 is turned on, a voltage corresponding to a video signal is applied to the display element 6403 and the auxiliary capacitor 6402 through the video signal line 6404. At this time, when the video signal is a signal which makes all the pixels connected to the common line 6406 display the lowest level gray scale or when the video signal is a signal which makes all the pixels connected to the common line 6406 display the highest level gray scale, the video signal is not necessarily written into the pixels through the video signal line 6404. Instead of writing the video signal through the video signal line 6404, a potential of the common line 6406 is changed so that a voltage applied to the display element 6403 can be changed.

A method for changing a potential of the common line 6406 so that a voltage applied to the display element 6403 is changed has particularly a great effect by being combined with the method for driving a display device shown in FIGS. 1A and 1B. That is, when a whole image has a darker gray scale, gray scales in all the pixels connected to the common line 6406 are also dark as a whole. At this time, in a sub-frame which inserts a dark image, a ratio of the pixels which do not emit light at all is significantly increased. This is because frequency of changing a voltage applied to the display element 6403 is significantly increased when a potential of the common line 6406 is changed instead of writing the video signal through the video signal line 6404. Similarly, also when a whole image has a brighter gray scale, frequency of changing a voltage applied to the display element 6403 is significantly increased when a potential of the common line 6404 is changed instead of writing the video signal through the video signal line 6404. When a whole image has a brighter gray scale, gray scales in all the pixels connected to the common line 6406 are also bright as a whole. This is because, in a sub-frame which inserts a bright image, a ratio of the pixels which emit light at the highest luminance of the sub-frame is significantly increased at this time.

FIG. 64B is a diagram showing a plurality of pixel circuits in which two common lines are arranged with respect to one scanning line in a display device using a display element which has capacitive characteristics like a liquid crystal element. The pixel circuit shown in FIG. 64B includes a transistor 6411, an auxiliary capacitor 6412, a display element 6413, a video signal line 6414, a scanning line 6415, a first common line 6416, and a second common line 6417.

A gate electrode of the transistor 6411 is electrically connected to the scanning line 6415, one of a source electrode and a drain electrode of the transistor 6411 is electrically connected to the video signal line 6414, and the other of the source electrode and the drain electrode of the transistor 6411 is electrically connected to one electrode of the auxiliary capacitor 6412 and one electrode of the display element 6413. In addition, the other electrode of the auxiliary capacitor 6412 is electrically connected to the first common line 6416. In addition, in a pixel adjacent to the above pixel, the other electrode of the auxiliary capacitor 6412 is electrically connected to the second common line 6417.

In the pixel circuit shown in FIG. 64B, less pixels are electrically connected to one common line. Therefore, when a potential of the first common line 6416 or the second common line 6417 is changed instead of writing a video signal through the video signal line 6414, frequency of changing a voltage applied to the display element 6413 is significantly increased. In addition, source inversion driving or dot inversion driving can be performed. By source inversion driving or dot inversion driving, reliability of an element can be improved while flickers can be suppressed.

A scanning backlight will be explained with reference to FIGS. 65A to 65C. FIG. 65A is a view showing a scanning backlight in which cold-cathode tubes are arranged. The scanning backlight shown in FIG. 65A includes a diffusing plate 6501 and N pieces of cold-cathode tubes 6502-1 to 6502-N. The N pieces of the cold-cathode tubes 6502-1 to 6502-N are arranged on the back side of the diffusing plate 6501; therefore, the N pieces of the cold-cathode tubes 6502-1 to 6502-N can be scanned while their luminance is changed.

Change in luminance of each cold-cathode tube in scanning will be explained with reference to FIG. 65C. First, luminance of the cold-cathode tube 6502-1 is changed for a certain period of time. Thereafter, luminance of the cold-cathode tube 6502-2 provided adjacent to the cold-cathode tube 6502-1 is changed for the same period of time. In such a manner, luminance is changed sequentially from the cold-cathode tube 6502-1 to the cold-cathode tube 6502-N. Although luminance that is changed for a certain period of time is set to be lower than the original luminance in FIG. 65C, it may also be higher than the original one. In addition, although the cold-cathode tubes 6502-1 to 6502-N are scanned in this order, the cold-cathode tubes 6502-1 to 6502-N may also be scanned in a reversed order.

It is preferable that backlight luminance in a period with low luminance be roughly the same as the highest luminance of the sub-frame which inserts a dark image. Specifically, when a dark image is inserted in 1SF, the backlight luminance is preferably the highest luminance Lmax 1 of 1SF, and when a dark image is inserted in 2SF, the backlight luminance is preferably the highest luminance Lmax 2 of 2SF.

It is to be noted that an LED may be used as a light source of the scanning backlight. The scanning backlight in such a case is shown in FIG. 65B. The scanning backlight shown in FIG. 65B includes a diffusing plate 6511 and light sources 6512-1 to 6512-N, in each of which LEDs are arranged. When the LED is used as a light source of the scanning backlight, there is an advantage that the backlight can be thin and lightweight. Further, there is also an advantage that a color reproduction range can be widened. Furthermore, since the LEDs that are arranged in each of the light sources 6512-1 to 6512-N can be similarly scanned, a dot scanning backlight can also be obtained. With the use of dot scanning, the image quality of a moving image can be further improved.

A high frequency driving method will be explained with reference to FIGS. 66A to 66C. FIG. 66A is a view in which a display element is driven by insertion of a dark image at a frame frequency of 60 Hz. Reference numeral 6601 denotes a bright image of this frame; 6602, a dark image of this frame; 6603, a bright image of the next frame; and 6604, a dark image of the next frame. The driving at 60 Hz has an advantage that harmonization with a frame rate of a video signal can be easily obtained and an image processing circuit does not become complicated.

FIG. 66B is a view in which a display element is driven by insertion of a dark image at a frame frequency of 90 Hz. Reference numeral 6611 denotes a bright image of this frame; 6612, a dark image of this frame; 6613, a bright image of a first image which is formed from this frame, the next frame, and the frame after next; 6614, a dark image of the first image which is formed from this frame, the next frame, and the frame after next; 6615, a bright image of a second image which is formed from this frame, the next frame, and the frame after next; and 6616, a dark image of the second image which is formed from this frame, the next frame, and the frame after next. The driving at 90 Hz has an advantage that an operation frequency of a peripheral driver circuit is made not so high and the image quality of a moving image can be efficiently improved.

FIG. 66C is a view in which a display element is driven by insertion of a dark image at a frame frequency of 120 Hz. Reference numeral 6621 denotes a bright image of this frame; 6622, a dark image of this frame; 6623, a bright image of an image which is formed from this frame and the next frame; 6624, a dark image of the image which is formed from this frame and the next frame; 6625, a bright image of the next frame; 6626, a dark image of the next frame; 6627, a bright image of an image which is formed from the next frame and the frame after next; and 6628, a dark image of the image which is formed form the next frame and the frame after next. The driving at 120 Hz has an advantage that an effect of improving the image quality of a moving image is favorable and an image lag is scarcely observed.

This embodiment mode can be implemented by being freely combined with any description of other embodiment modes in this specification. Further, any descriptions in this embodiment mode can be freely combined to be implemented.

Embodiment Mode 7

In this embodiment mode, a display module on which a circuit inputting a signal into a panel related to the present invention is mounted will be explained with reference to FIG. 43.

Figure 43:
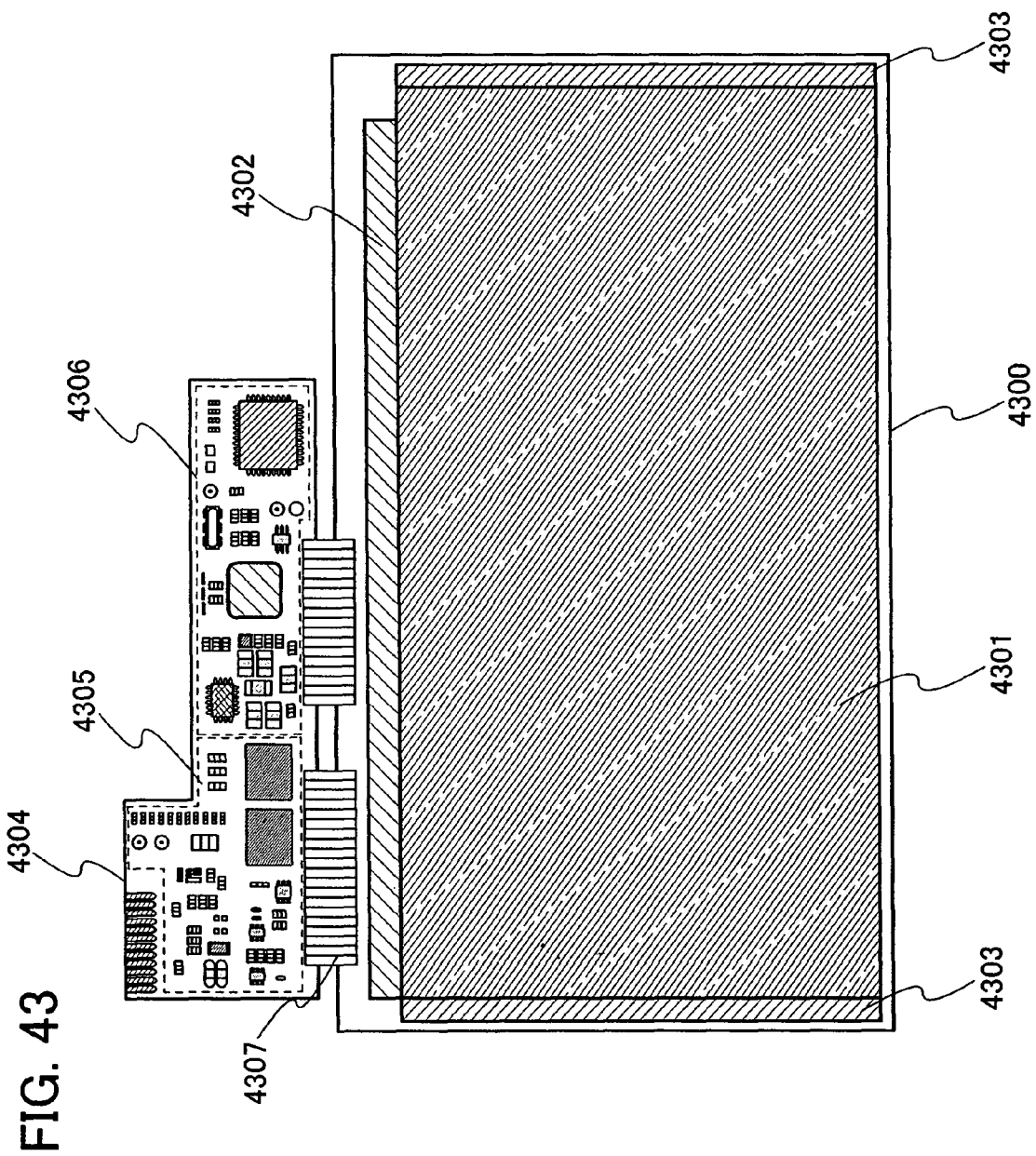
FIG. 43 is a view showing a liquid crystal module of the present invention.

FIG. 43 shows a display module in which a panel 4300 and a circuit substrate 4304 are combined. A pixel portion 4301 is formed in the panel 4300. In addition, in the panel 4300, a source driver 4302 and a gate driver 4303 are formed over the same substrate as the pixel portion 4301. Over the circuit substrate 4304, a controller 4305, a signal dividing circuit 4306, and the like are provided. The circuit substrate 4304 and the panel 4300 are connected to each other through an FPC 4307.

In addition, in the panel 4300, a power source circuit, a signal generating circuit, and the like may be formed over the same substrate as the pixel portion 4301. Further, as described above, an IC chip and the like may be provided over the panel 4300.

Over the circuit substrate 4304, a CPU or a power source circuit may be provided in addition to the controller 4305 and the signal dividing circuit 4306.

Over the FPC 4307, an IC chip, a resistor, and a capacitor may also be provided.

This embodiment mode can be implemented by being freely combined with any description of other embodiment modes in this specification. Further, any descriptions in this embodiment mode can be freely combined to be implemented.

Embodiment Mode 8

In this embodiment mode, a structure which can operate the display device of the present invention also at a low temperature will be explained with reference to FIG. 44.

Figure 44:
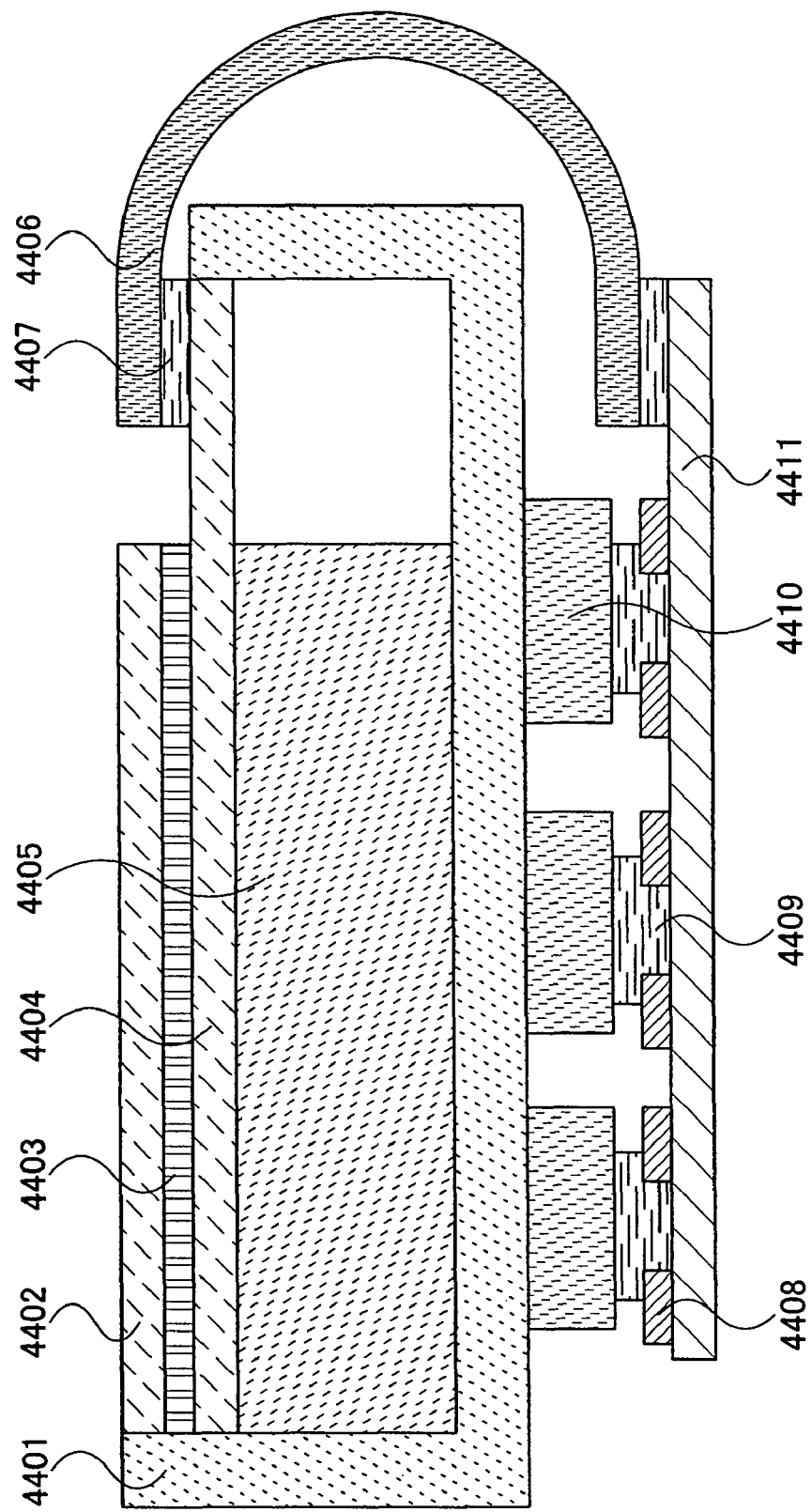
FIG. 44 is a view showing a liquid crystal module of the present invention.

FIG. 44 shows a display module in which a panel (a glass substrate 4404, a liquid crystal layer 4403, and a counter substrate 4402), a circuit substrate 4411, a backlight unit 4405, and a housing 4401 are combined. The glass substrate 4404 is connected to the circuit substrate 4411 through an FPC 4406. It is to be noted that the FPC is electrically connected to the glass substrate 4404 and the circuit substrate 4411 through a conductive member 4407. In addition, the panel and the backlight unit 4405 are incorporated in the housing 4401.

Over the glass substrate 4404, a pixel portion, a source driver, a gate driver, a power source circuit, a signal circuit, and the like are formed. As described above, an IC chip and the like may be provided over the glass substrate 4404.

A wiring 4408 is formed over the circuit substrate 4411. In addition, the wiring 4408 and an IC chip 4410 are electrically connected to each other through a conductive member 4409.

Here, the display module has a feature that the IC chip 4410 is provided to be in contact with one surface of the housing 4401, which is opposite to the panel. The reason is as follows. A liquid crystal element in the liquid crystal layer 4403 cannot express a correct gray scale or its response speed is slowed down at a low temperature. Therefore, thermal energy discharged from the IC chip 4410 is supplied to the housing 4401. Then, the display module incorporated in the housing 4401 is warmed and the temperature of the liquid crystal layer 4403 is increased. Accordingly, the display device of this embodiment mode can express a correct gray scale also in low-temperature environment.

The above feature is that the display module is warmed by thermal energy of the IC chip 4410 through the housing 4401. For example, when thermal energy of the IC chip 4410 is supplied to the glass substrate 4404, temperature variation is generated in the glass substrate 4404; therefore, display variation is generated. In addition, also when thermal energy of the IC chip 4410 is supplied to the backlight unit 4405, variation in light quantity of the backlight unit is generated or the wavelength of the light is deviated; therefore, display variation is generated. Accordingly, the display device of FIG. 44 can suppress generation of display variation by supply of thermal energy of the IC chip 4410 to the housing 4401. Even when thermal energy of the IC chip 4410 is supplied to the glass substrate 4404 through a heat diffusing sheet, metal, a material having high thermal conductivity, or the like, the display device of this embodiment mode can obtain the similar effect.

Figure 45:
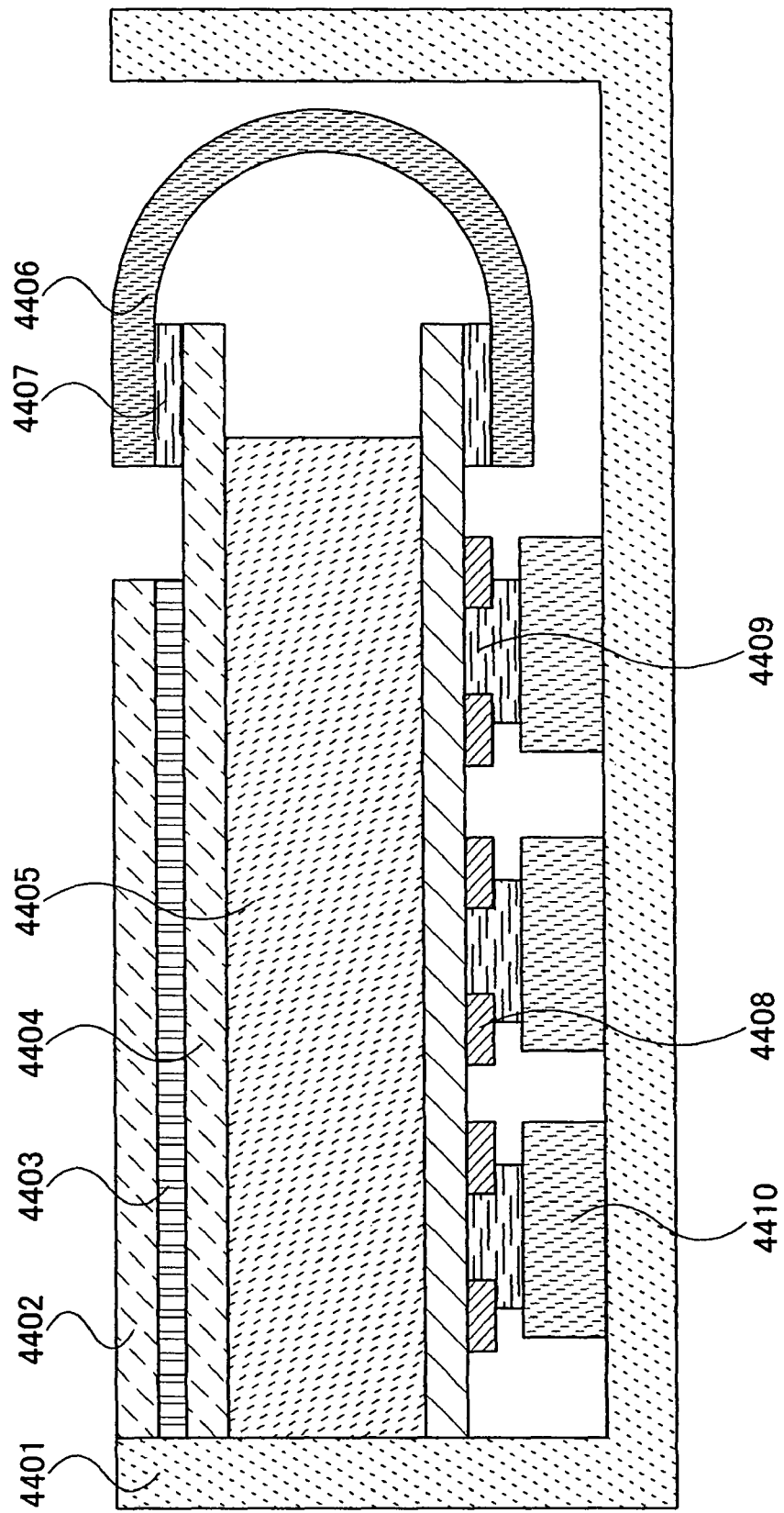
FIG. 45 is a view showing a liquid crystal module of the present invention.

FIG. 44 shows a structure in the case where the IC chip 4410 is provided on the outer side of the housing 4401. However, the IC chip 4410 may also be provided on the inner side of the housing 4401 as shown in FIG. 45. This is because thermal energy is efficiently supplied to the display module when the IC chip 4410 is provided on the inner side of the housing 4401.

Figure 67:
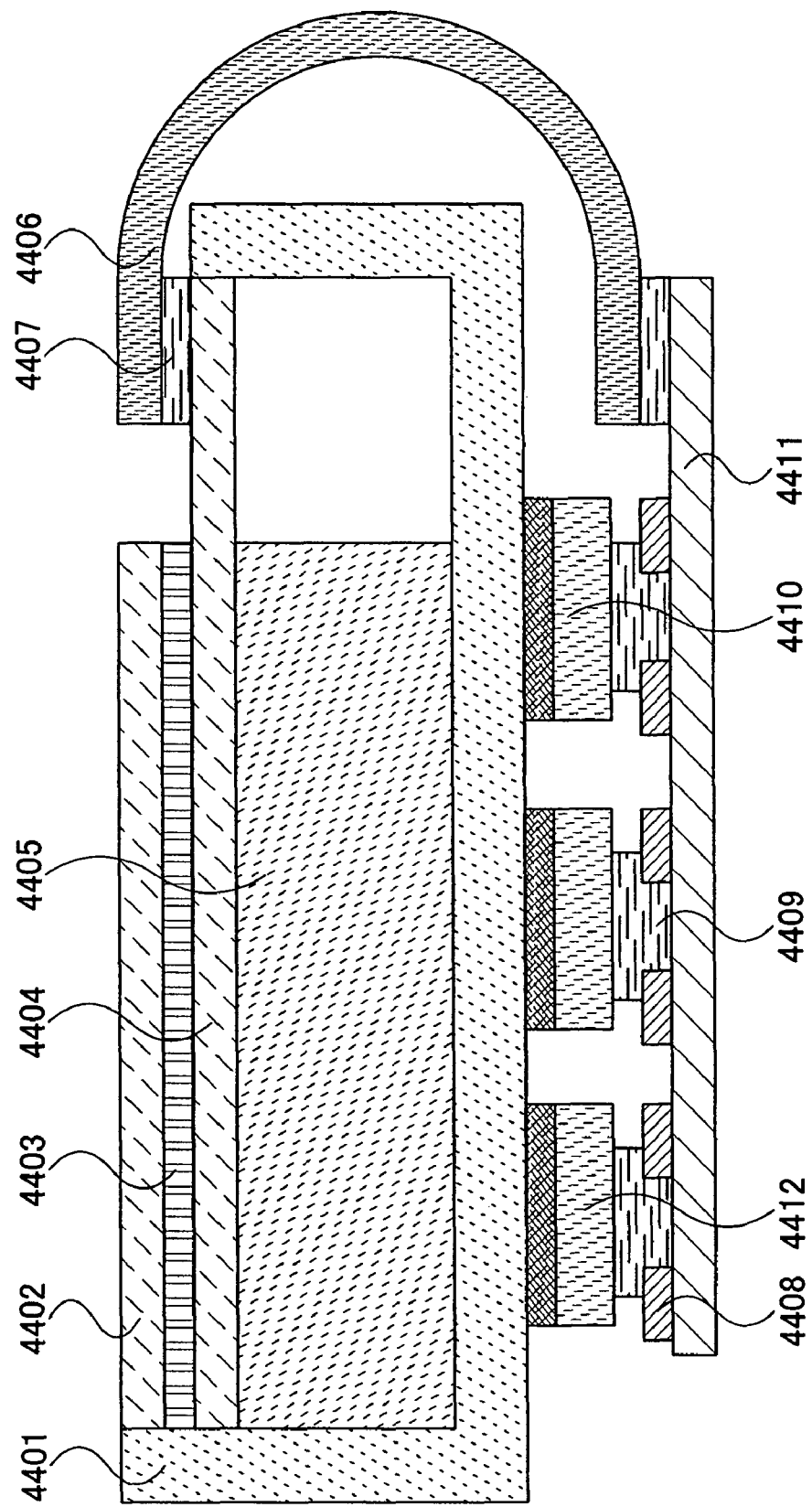
FIG. 67 is a diagram for explaining the present invention.

It is to be noted that the IC chip 4410 may also be provided below the housing 4401 through an adhesive material 4412 having high thermal conductivity as shown in FIG. 67. This is because the IC chip 4410 can adhere to the housing 4401, and thermal energy of the IC chip 4410 can be efficiently transmitted to the housing 4401.

This embodiment mode can be implemented by being freely combined with any description of other embodiment modes in this specification. Further, any descriptions in this embodiment mode can be freely combined to be implemented.

Embodiment Mode 9

The present invention can be applied to various electronic devices such as a camera (such as a video camera or a digital camera), a projector, a head mounted display (goggle type display), a navigation system, a car audio stereo, a personal computer, a game machine, a portable information terminal (such as a mobile computer, a mobile phone, or an electronic book), and an image reproducing device provided with a storage medium. As an image reproducing device provided with a storage medium, specifically, a device which reproduces a storage medium such as a digital versatile disc (DVD) and has a display for displaying the reproduced image, and the like can be given. Examples of such electronic devices are shown in FIGS. 46A to 46D.

Figure 46A:
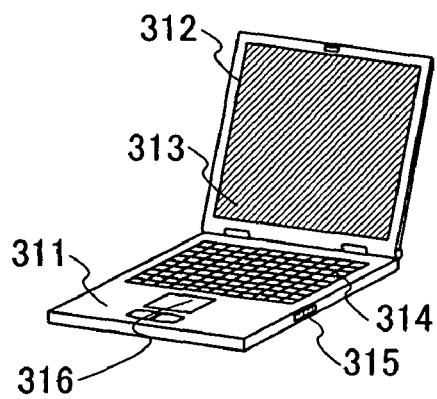
FIGS. 46A to 46D are views each showing an electronic device of the present invention.

FIG. 46A shows a laptop personal computer, which includes a main body 311, a housing 312, a display portion 313, a keyboard 314, an external connecting port 315, a pointing device 316, and the like. The present invention can be applied to the display portion 313. With the use of the present invention, power consumption of the display portion can be reduced.

Figure 46B:
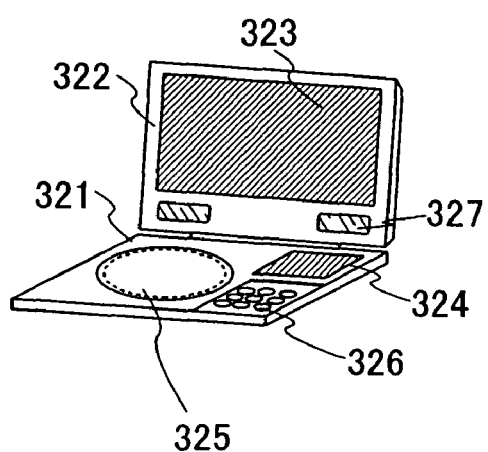

FIG. 46B shows an image reproducing device provided with a storage medium (specifically, a DVD player), which includes a main body 321, a housing 322, a first display portion 323, a second display portion 324, a storage medium (such as DVD) reading portion 325, operation keys 326, a speaker portion 327, and the like. The first display portion 323 mainly displays image data, while the second display portion 324 mainly displays text data. The present invention can be applied to the first display portion 323 and the second display portion 324. With the use of the present invention, power consumption of the display portion can be reduced.

Figure 46C:
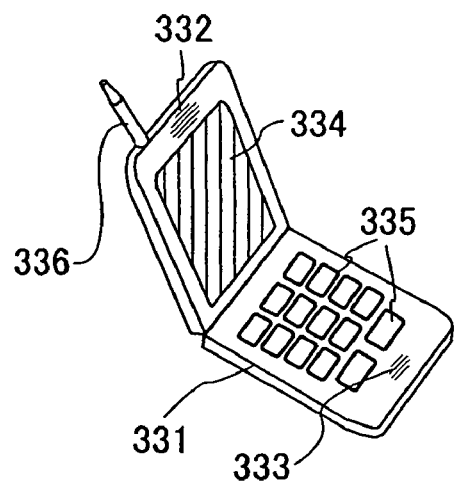

FIG. 46C shows a mobile phone, which includes a main body 331, an audio output portion 332, an audio input portion 333, a display potion 334, operation switches 335, an antenna 336, and the like. The present invention can be applied to the display portion 334. With the use of the present invention, power consumption of the display portion can be reduced.

Figure 46D:
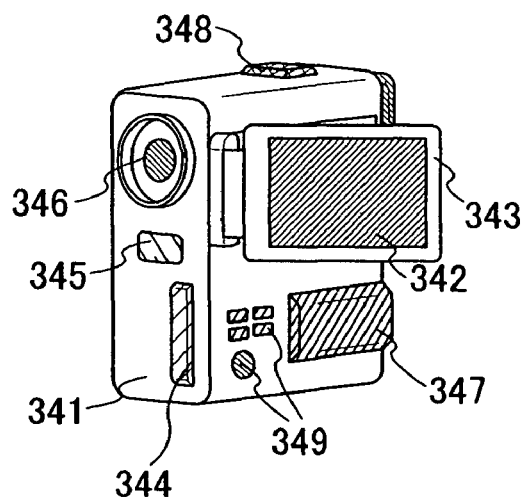

FIG. 46D shows a camera, which includes a main body 341, a display portion 342, a housing 343, an external connecting port 344, a remote control receiving portion 345, an image receiving portion 346, a battery 347, an audio input portion 348, operations keys 349, and the like. The present invention can be applied to the display portion 342. With the use of the present invention, power consumption of the display portion can be reduced.

This embodiment mode can be implemented by being freely combined with any description of other embodiment modes in this specification. Further, any descriptions in this embodiment mode can be freely combined to be implemented.

Embodiment Mode 10

In this embodiment mode, an application example using a display panel including the liquid crystal display device of the present invention in a display portion will be explained through illustration of application modes. A display panel including the liquid crystal display device of the present invention in a display portion can also be incorporated into a movable object, a constructed object, and the like.

Figure 47A:
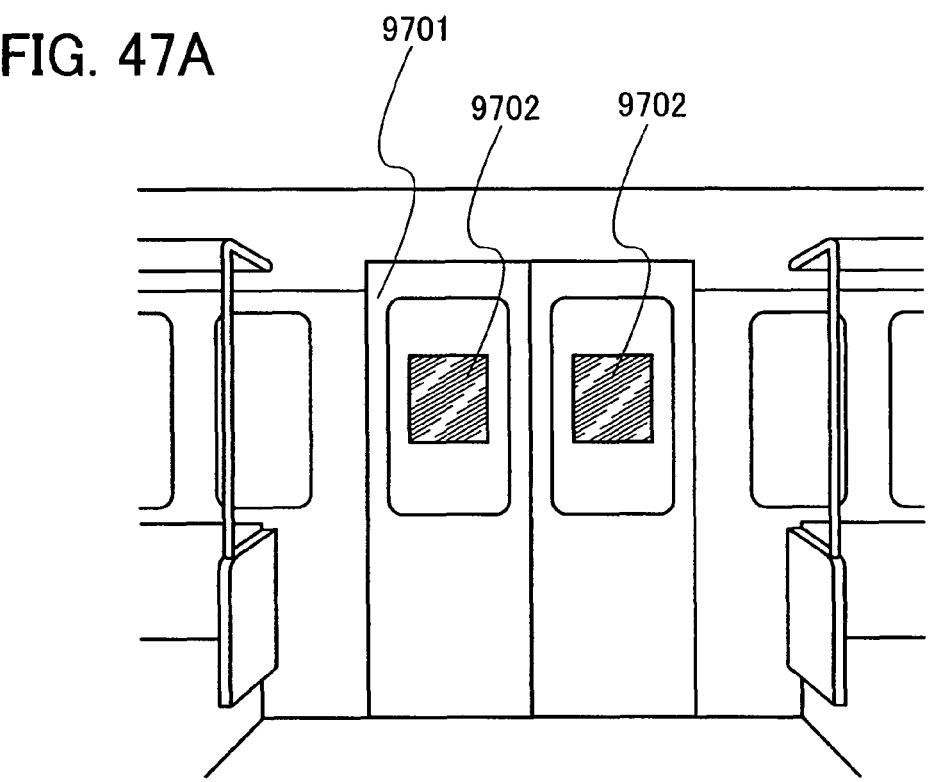
FIGS. 47A and 47B are views each showing a usage pattern of an electronic device of the present invention.
Figure 47B:
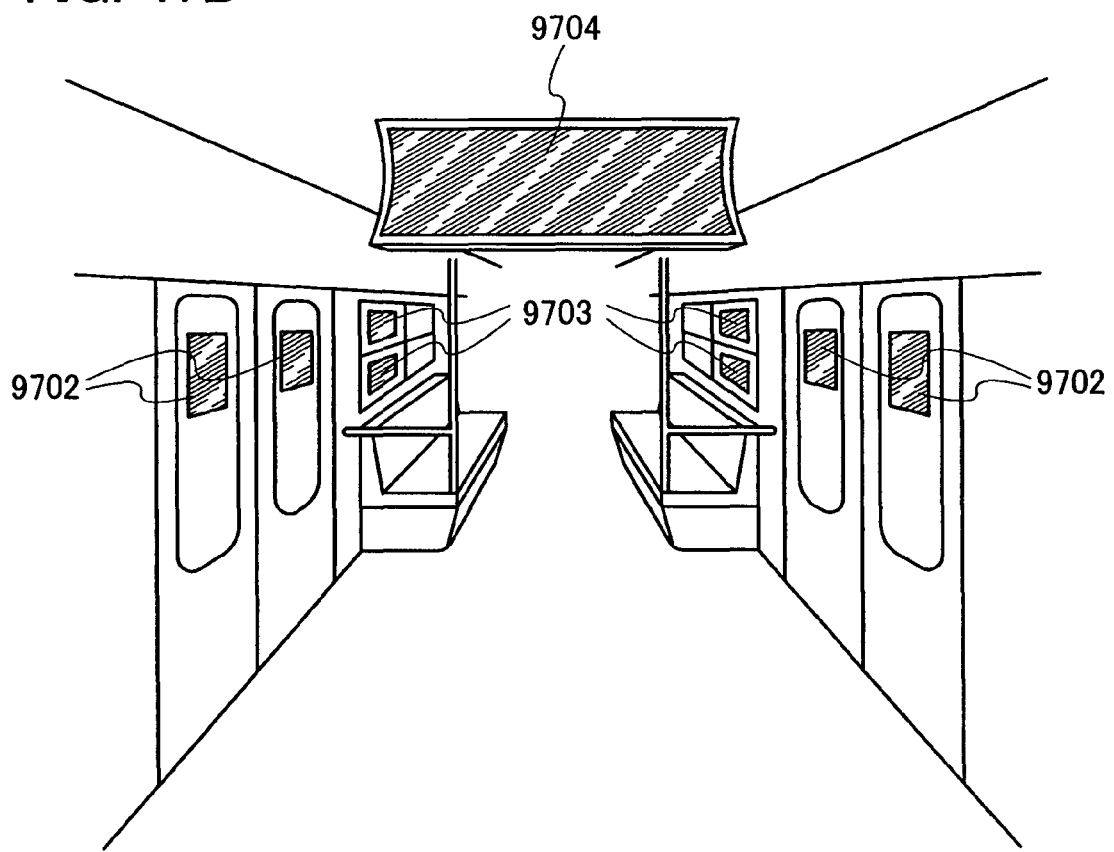

As for an example of a display panel including the liquid crystal display device of the present invention in a display portion, a movable object incorporated with a display device is shown in FIGS. 47A and 47B. As an example of a movable object incorporated with a display device, FIG. 47A shows an example using a display panel 9702 for a glass part of a door in a train car body 9701. In the display panel 9702 including the liquid crystal display device of the present invention in a display portion shown in FIG. 47A, images displayed on the display portion can be easily switched by a signal from an external portion. Therefore, images on the display panel are switched in every time period when the types of passengers in the train are changed; thus, a more effective advertisement effect can be expected.

It is to be noted that the display panel including the liquid crystal display device of the present invention in a display portion is not limited to be applied to a glass part of a door in a train car body as shown in FIG. 47A and can be applied to any place by being changed into various shapes. An example thereof will be explained with reference to FIG. 47B.

A condition inside a train car body is shown in FIG. 47B. In FIG. 47B, a display panel 9703 provided in a glass window and a display panel 9704 suspended from a ceiling are shown in addition to the display panel 9702 in a glass part of a door shown in FIG. 47A. In addition, by providing a switching element such as an organic transistor over a film-substrate, the display panel 9704 including the liquid crystal display device of the present invention can perform display also in a bent state.

Another application mode will be explained with reference to FIG. 48 as an application example of a movable object incorporated with a display device using a display panel including the liquid crystal display device of the present invention in a display portion.

Figure 48:
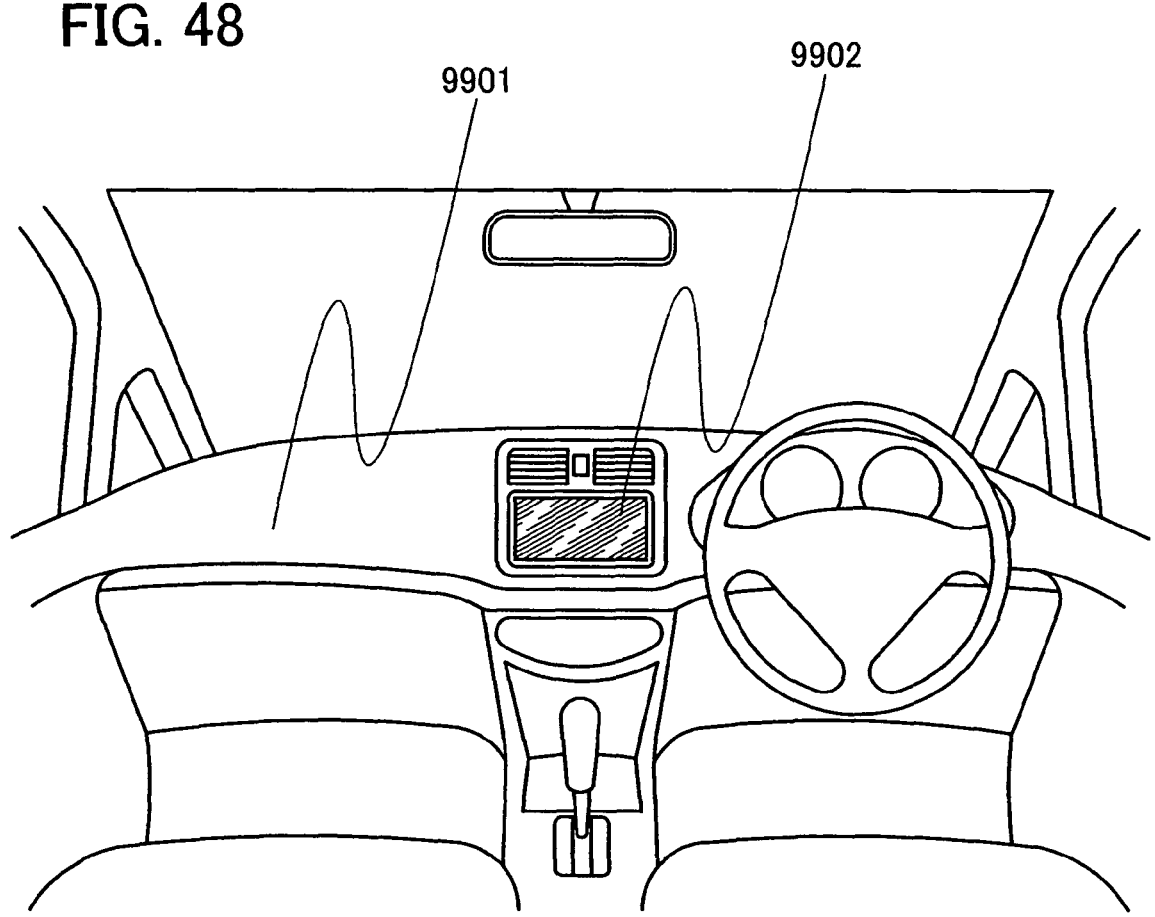
FIG. 48 is a view showing a usage pattern of an electronic device of the present invention.

As for an example of a display panel including the liquid crystal display device of the present invention in a display portion, a movable object incorporated with a display device is shown in FIG. 48. As an example of a movable object incorporated with a display device, FIG. 48 shows a display panel 9902 incorporated into a body 9901 of a car. The display panel 9902 including the liquid crystal display device of the present invention in a display portion shown in FIG. 48 is incorporated into a body of a car, displays an operation of a car body and data input from an internal or external portion of a car body in a on-demand manner, and has a function to navigate a car to its destination.

It is to be noted that a display panel including the liquid crystal display device of the present invention in a display portion is not limited to be applied to a front part of a car body as shown in FIG. 48 and can be applied to any place such as a glass window or a door by being changed into various shapes.

As for an application example of a movable object incorporated with a display device using a display panel including the liquid crystal display device of the present invention in a display portion, another application mode will be explained with reference to FIGS. 49A and 49B.

Figure 49A:
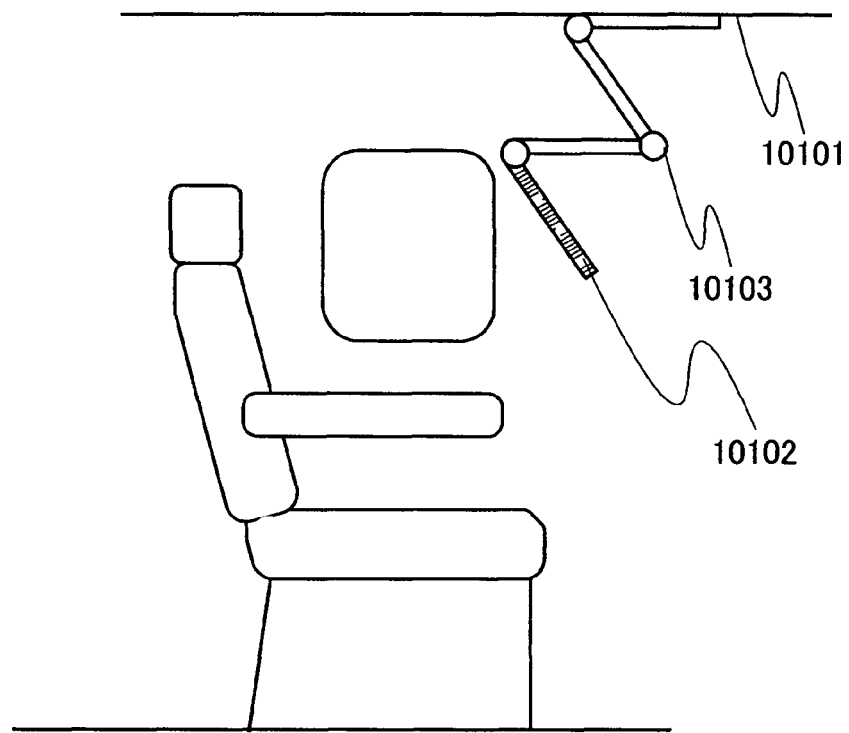
FIGS. 49A and 49B are views each showing a usage pattern of an electronic device of the present invention.
Figure 49B:
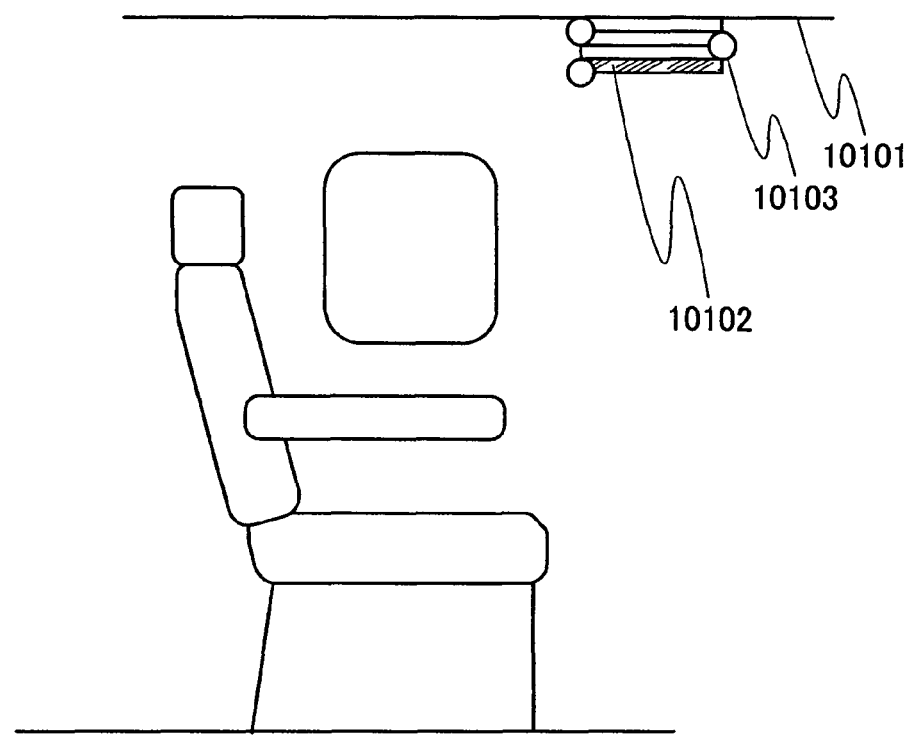

As for an example of a display panel including the liquid crystal display device of the present invention in a display portion, a movable object incorporated with a display device is shown in FIGS. 49A and 49B. As for an example of a movable object incorporated with a display device, FIG. 49A shows a display panel 10102 incorporated into a ceiling above a passenger seat of a body 10101 of an airplane. The display panel 10102 including the liquid crystal display device of the present invention in a display portion shown in FIG. 49A is incorporated into the body 10101 of an airplane through a hinge portion 10103, and the passengers can view the display panel 10102 by stretching of the hinge portion 10103. The display panel 10102 can display data by an operation by the passengers and can be used as advertisement or entertainment means. In addition, when the hinge portion is bent and put in the body 10101 of an airplane as shown in FIG. 49B, safety in taking-off and landing can be assured. Further, when a display element in the display panel is lighted in the case of emergency, the display panel can also be used as an evacuation light in the body 10101 of an airplane.

It is to be noted that a display panel including the liquid crystal display device of the present invention in a display portion is not limited to be applied to a ceiling of the body 10101 of an airplane as shown in FIGS. 49A and 49B and can be applied to any place such as a seat or a door by being changed into various shapes. For example, a display panel is provided on a back side of a seat and is operated and viewed.

In this embodiment mode, a body of a train car, a body of a car, a body of an airplane are illustrated as a movable object, but the present invention is not limited thereto, and various moving objects such as a motorcycle, an auto four-wheel car (including a car, a bus, and the like), a train (including a monorail, a railroad car, and the like), and a vessel can be provided. By employing the display panel of the present invention, downsizing and low power consumption of the display panel can be achieved, and further, a movable object including a display medium which operates favorably can be provided. In particular, since display on the display panels in movable objects can be easily switched at the same time by a signal from an external portion, the display panel is highly effective as an advertisement display board for an indefinite number of customers or an information display board in the case of emergency or disaster.

As for an application example using a display panel including the liquid crystal display device of the present invention in a display portion, an application mode using a constructed object will be explained with reference to FIG. 50.

Figure 50:
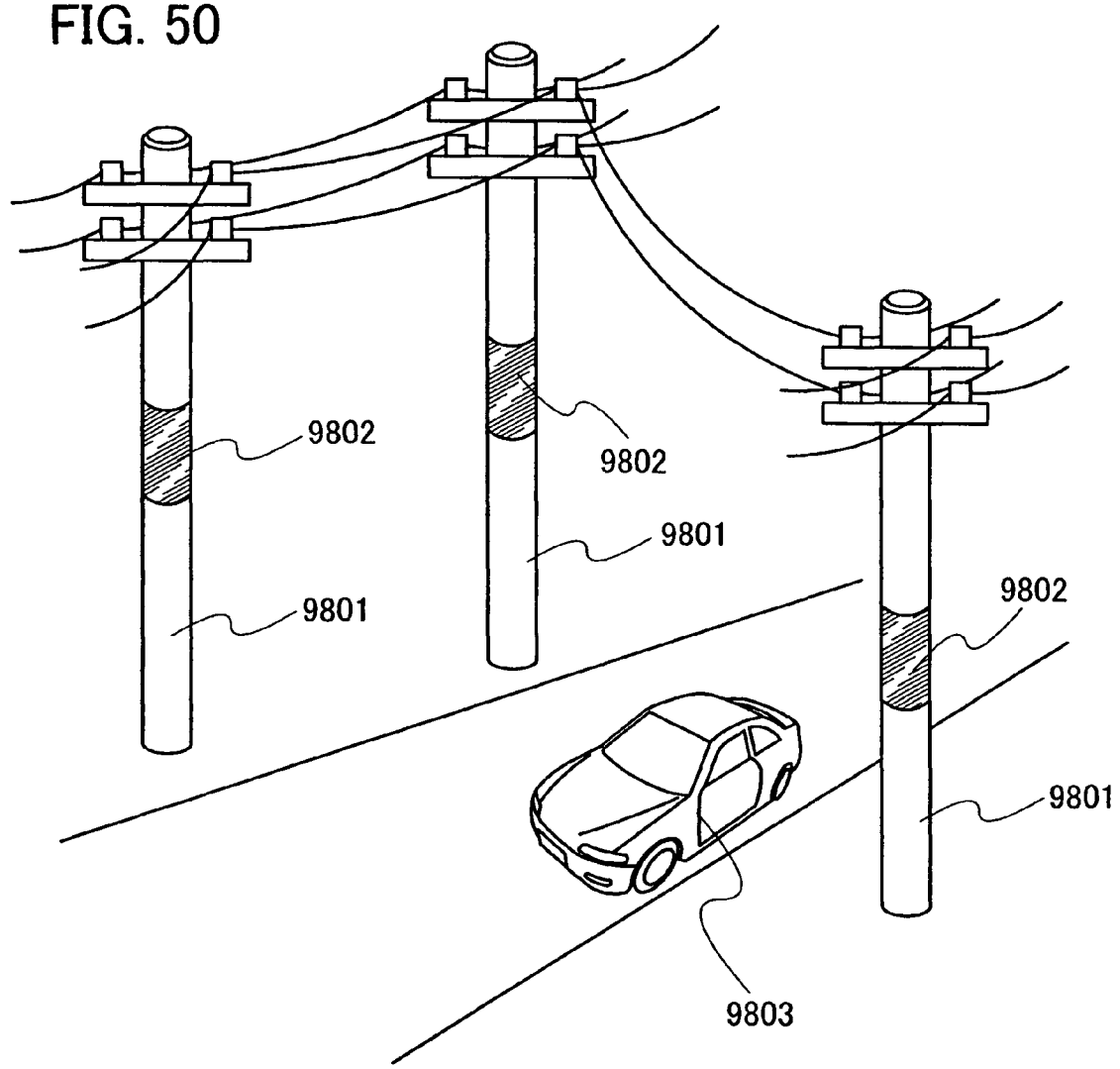
FIG. 50 is a view showing a usage pattern of an electronic device of the present invention.

As an application example of a display panel including the liquid crystal display device of the present invention in a display portion, in FIG. 50, a switching element such as an organic transistor is provided over a film-substrate so that a display panel which can perform display even when being bent can be obtained. In FIG. 50, a display panel is provided on a curved surface of a column-shaped object provided outside, such as a power pole, as a constructed object. Here, as a column-shaped object, a power pole 9801 provided with a display panel 9802 will be explained.

The display panel 9802 shown in FIG. 50 is positioned around the middle of the height of the power pole and is provided at a position higher than the eyepoint. Thus, when viewing the display panel from a movable object 9803, an image on the display panel 9802 can be viewed. When the power poles stand together in large numbers repeatedly and the same images are displayed on the display panels 9802 on the power poles, viewers can view information display and advertisement display. Since it is easy to display the same images from an external portion on the display panels 9802 provided on the power poles 9801, highly effective information display and advertisement effect can be expected.

As for an application example using a display panel including the liquid crystal display device of the present invention in a display portion, an application mode of a constructed object that is different from that of FIG. 50 will be explained with reference to FIG. 51.

Figure 51:
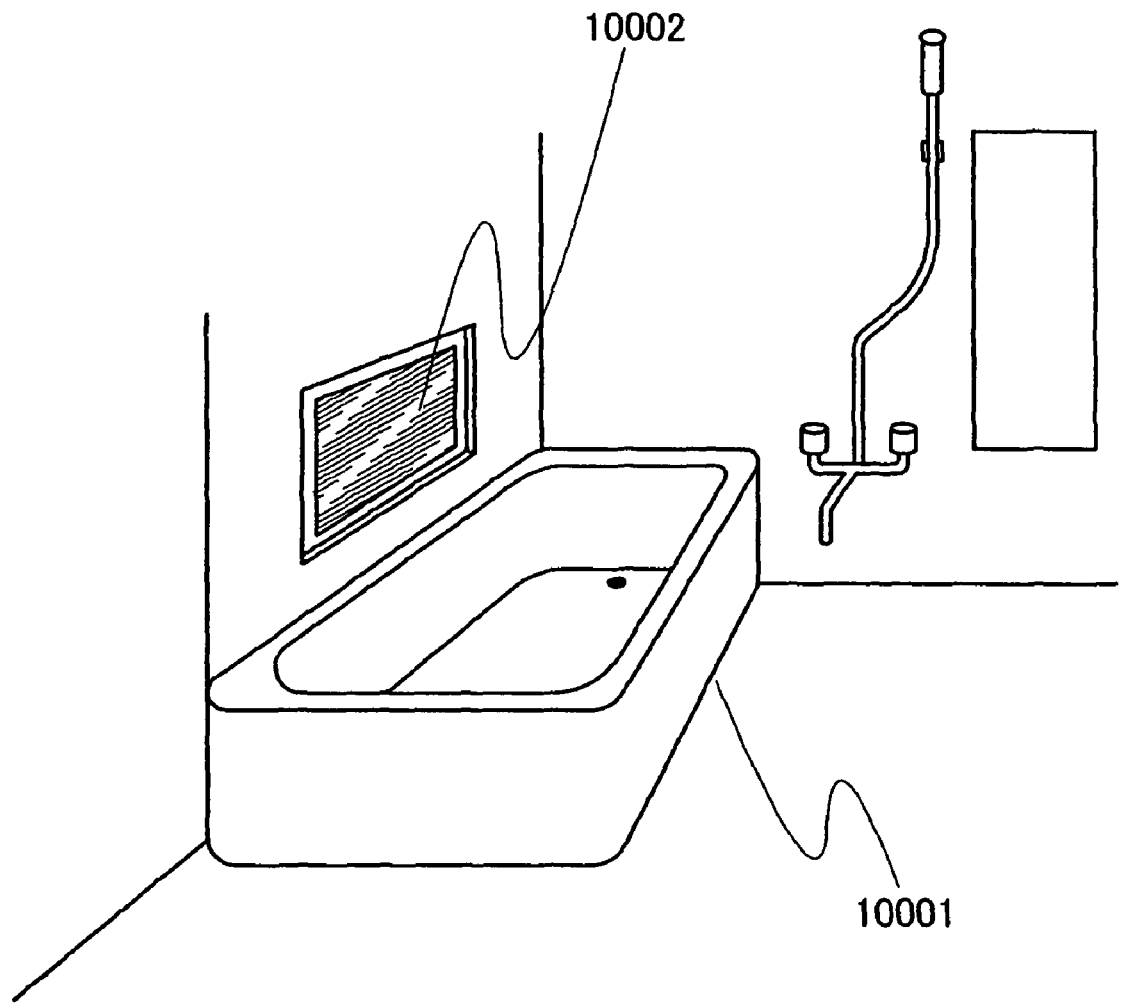
FIG. 51 is a view showing a usage pattern of an electronic device of the present invention.

FIG. 51 shows an application example of a display panel including the liquid crystal display device of the present invention in a display portion. FIG. 51 shows a display panel 10002 incorporated into a side wall of a prefabricated bath 10001 as an example of a constructed object incorporated with a display device. The display panel 10002 including the liquid crystal display device of the present invention in a display portion shown in FIG. 51 is incorporated into the prefabricated bath 10001, and a person who takes a bath can view the display panel 10002. The display panel 10002 can display data by an operation by a person who takes a bath and can be used as advertisement or entertainment means.

It is to be noted that the display panel including the liquid crystal display device of the present invention in a display portion is not limited to be applied to the side wall of the prefabricated bath as shown in FIG. 51 and can be applied to any place such as part of a mirror or a bathtub by being changed into various shapes.

Figure 52:
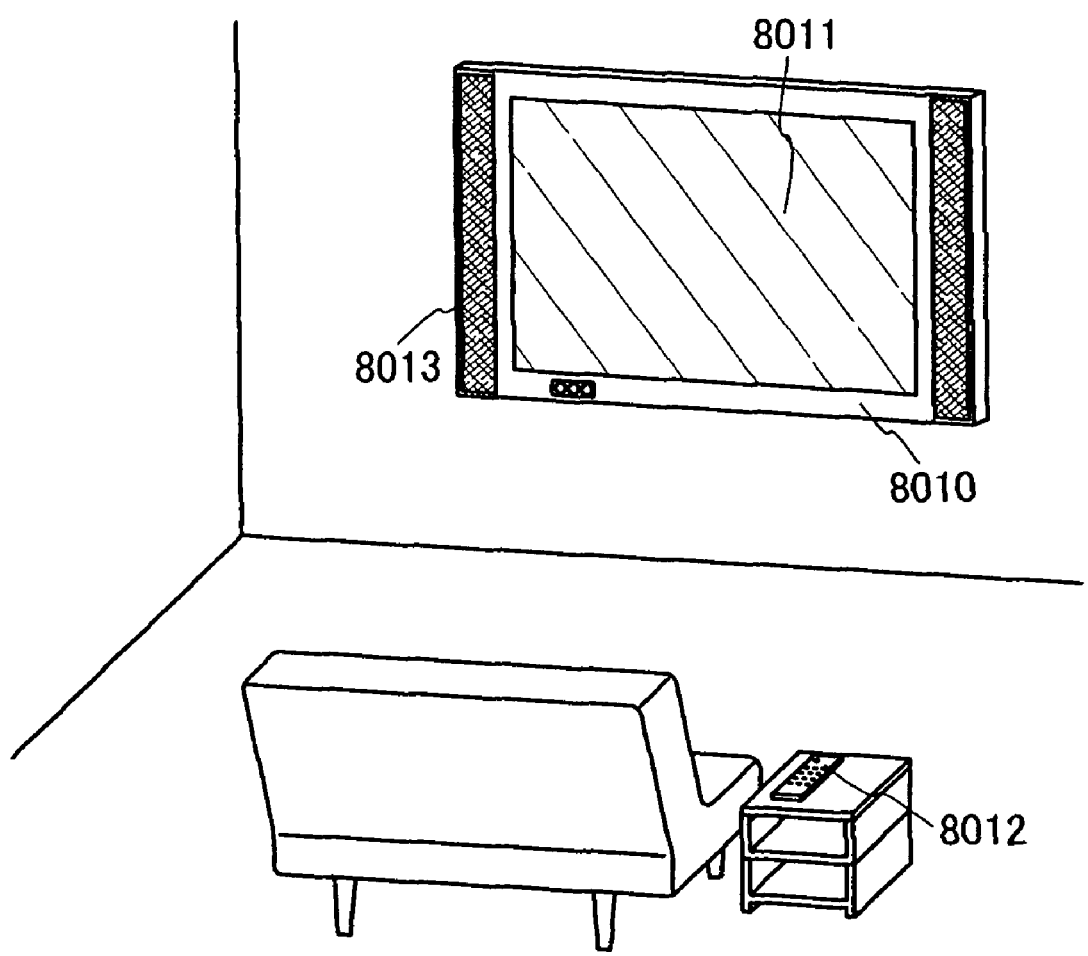
FIG. 52 is a view showing a usage pattern of an electronic device of the present invention.

In addition, FIG. 52 shows an example in which a television device having a large display portion is provided inside a building. The television device shown in FIG. 52 includes a housing 8010, a display portion 8011, a remote control device 8012 that is an operation portion, a speaker portion 8013, and the like. The display panel including the liquid crystal display device of the present invention in a display portion is applied to manufacture the display portion 8011. The television device shown in FIG. 52 is incorporated into the building as a wall-hanging type and can be provided without requiring a wide space.

In this embodiment mode, as a constructed object, a power pole as a column-shaped body, a prefabricated bath, and the like are shown as examples; however, this embodiment mode is not limited thereto, and any constructed object that can be provided with a display panel may be used. By employing the display device of the present invention, a movable object including a display medium which can display a correct gray scale and high-definition image can be provided.

This embodiment mode can be implemented by being freely combined with any description of other embodiment modes in this specification. Further, any descriptions in this embodiment mode can be freely combined to be implemented.

This application is based on Japanese Patent Application serial no. 2006-155468 filed in Japan Patent Office on Jun. 2, 2006, the entire contents of which are hereby incorporated by reference.

What is claimed is:

1. A method for driving a liquid crystal display device which comprises a pixel, a source driver, a gate driver, and a backlight, the method comprising:
supplying a scan signal from the gate driver to the pixel in each of a plurality of lighting periods included in one frame period, whereby the pixel is in a selected state in each of the plurality of lighting periods; and
supplying a plurality of digital signals from the source driver to the pixel while the pixel is in the selected state in each of the plurality of lighting periods, wherein a wavelength of light of the backlight is changed in each of the plurality of lighting periods, and wherein at least one of the plurality of digital signals are supplied to the pixel while the backlight emits light.

2. A liquid crystal display device using the method for driving a liquid crystal display device according to claim 1.

3. A liquid crystal display device according to claim 2, wherein a plurality of red light-emitting diodes, a plurality of green light-emitting diodes, and a plurality of blue light-emitting diodes are included in the backlight.

4. A liquid crystal display device according to claim 2, wherein the pixel includes a reflective region and a transmissive region, and a color filter is provided in the reflective region.

5. An electronic device using the liquid crystal display device according to claim 2.

6. A method for driving a liquid crystal display device according to claim 1, wherein the plurality of digital signals are three voltage level signals.

7. A method for driving a liquid crystal display device which comprises a pixel, a source driver, a gate driver, and a backlight, the method comprising:

supplying a scan signal from the gate driver to the pixel in each of a plurality of lighting periods included in one frame period, whereby the pixel is in a selected state in each of the plurality of lighting periods; and supplying a plurality of digital signals from the source driver to the pixel while the pixel is in the selected state in each of the plurality of lighting periods, wherein a wavelength of light of the backlight is changed in each of the plurality of lighting periods, wherein the backlight emits no light when the pixel is scanned and emits light when the pixel is in the selected state, and wherein at least one of the plurality of digital signals are supplied to the pixel while the backlight emits light.

8. A liquid crystal display device using the method for driving a liquid crystal display device according to claim 7.

9. A liquid crystal display device according to claim 8, wherein a plurality of red light-emitting diodes, a plurality of green light-emitting diodes, and a plurality of blue light-emitting diodes are included in the backlight.

10. A liquid crystal display device according to claim 8, wherein the pixel includes a reflective region and a transmissive region, and a color filter is provided in the reflective region.

11. An electronic device using the liquid crystal display device according to claim 8.

12. A method for driving a liquid crystal display device according to claim 7, wherein the plurality of digital signals are three voltage level signals.

13. A method for driving a liquid crystal display device which comprises a pixel, a source driver, a gate driver, and a backlight, the method comprising:

supplying a scan signal from the gate driver to the pixel in each of a plurality of lighting periods included in one frame period, whereby the pixel is in a selected state in each of the plurality of lighting periods; and supplying a plurality of digital signals from the source driver to the pixel while the pixel is in the selected state in each of the plurality of lighting periods, wherein a wavelength of light of the backlight is changed in each of the plurality of lighting periods, wherein a second scan signal having a value which turns the pixel into a non-selected state is supplied to the pixel at an end of scanning in each of the plurality of lighting periods, and wherein at least one of the plurality of digital signals are supplied to the pixel while the backlight emits light.

14. A liquid crystal display device using the method for driving a liquid crystal display device according to claim 13.

15. A liquid crystal display device according to claim 14, wherein a plurality of red light-emitting diodes, a plurality of green light-emitting diodes, and a plurality of blue light-emitting diodes are included in the backlight.

16. A liquid crystal display device according to claim 14, wherein the pixel includes a reflective region and a transmissive region, and a color filter is provided in the reflective region.

17. An electronic device using the liquid crystal display device according to claim 14.

18. A method for driving a liquid crystal display device according to claim 13, wherein the plurality of digital signals are three voltage level signals.

* * * * *